(12) United States Patent
Hirai

(10) Patent No.: US 7,848,209 B2
(45) Date of Patent: Dec. 7, 2010

(54) OPTICAL PICKUP AND OPTICAL INFORMATION PROCESSING APPARATUS WITH LIGHT SOURCES OF THREE DIFFERENT WAVELENGTHS

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/580,019

(22) Filed: Oct. 13, 2006

(65) Prior Publication Data

US 2007/0030770 A1   Feb. 8, 2007

Related U.S. Application Data

(62) Division of application No. 10/372,916, filed on Feb. 26, 2003, now Pat. No. 7,142,497.

(30) Foreign Application Priority Data

| Feb. 27, 2002 | (JP) | ............................... 2002-051722 |
| May 16, 2002 | (JP) | ............................... 2002-140998 |
| Jul. 2, 2002 | (JP) | ............................... 2002-193248 |
| Jul. 22, 2002 | (JP) | ............................... 2002-212224 |
| Aug. 2, 2002 | (JP) | ............................... 2002-226011 |
| Aug. 2, 2002 | (JP) | ............................... 2002-226023 |
| Dec. 18, 2002 | (JP) | ............................... 2002-366552 |
| Jan. 9, 2003 | (JP) | ............................... 2003-003506 |
| Jan. 9, 2003 | (JP) | ............................... 2003-003525 |
| Jan. 30, 2003 | (JP) | ............................... 2003-021862 |

(51) Int. Cl.
*G11B 7/135* (2006.01)
*G11B 7/00* (2006.01)

(52) U.S. Cl. ............................... 369/112.16; 369/44.24
(58) Field of Classification Search ...............................
369/112.16–112.22, 112.03–112.09, 112.11–112.14
See application file for complete search history.

(56) References Cited

U.S. PATENT DOCUMENTS

| 5,687,153 | A | * | 11/1997 | Komma et al. | ......... | 369/112.18 |
| 5,859,818 | A | | 1/1999 | Tateishi et al. | | |
| 5,889,748 | A | | 3/1999 | Shimano et al. | | |
| 6,034,935 | A | | 3/2000 | Kim et al. | | |

(Continued)

FOREIGN PATENT DOCUMENTS

EP    0 284 056    9/1988

(Continued)

OTHER PUBLICATIONS

Machine-Assisted translation of JP 2001-209966.*

(Continued)

*Primary Examiner*—Wayne R Young
*Assistant Examiner*—Nathan A Danielsen
(74) *Attorney, Agent, or Firm*—Dickstein Shapiro LLP

(57) ABSTRACT

An optical pickup apparatus for performing recording, reproduction and deletion of information onto each of three types of optical recording mediums including light sources of a blue wavelength zone, light sources of a red wavelength zone and light sources of an infrared wavelength zone. The optical pickup apparatus also has a single object lens which condenses a light from any of the light sources and a single aberration correction device disposed in a common light path between each of the light sources and the object lens.

11 Claims, 112 Drawing Sheets

U.S. PATENT DOCUMENTS

| | | | |
|---|---|---|---|
| 6,067,283 A | 5/2000 | Muramatsu | |
| 6,069,860 A * | 5/2000 | Mizuno et al. | 369/112.26 |
| 6,078,554 A | 6/2000 | Ootaki | |
| 6,195,315 B1 * | 2/2001 | Takahashi et al. | 369/44.23 |
| 6,205,108 B1 | 3/2001 | Yamanaka | |
| 6,275,461 B1 | 8/2001 | Yoo et al. | |
| 6,430,137 B1 | 8/2002 | Saimi et al. | |
| 6,449,235 B1 * | 9/2002 | Kim et al. | 369/112.01 |
| 6,456,578 B2 | 9/2002 | Iwata et al. | |
| 6,490,100 B1 | 12/2002 | Sasano et al. | |
| 6,512,733 B1 | 1/2003 | Kawano et al. | |
| 6,545,958 B1 * | 4/2003 | Hirai et al. | 369/44.32 |
| 6,580,674 B1 * | 6/2003 | Nishiyama et al. | 369/112.01 |
| 6,594,042 B2 * | 7/2003 | Asada et al. | 369/112.15 |
| 6,728,193 B1 | 4/2004 | Uchizaki et al. | |
| 6,738,332 B2 | 5/2004 | Sato et al. | |
| 6,804,186 B2 | 10/2004 | Kojima et al. | |
| 6,807,019 B2 | 10/2004 | Takeuchi et al. | |
| 6,807,133 B2 | 10/2004 | Ariyoshi et al. | |
| 7,012,875 B2 | 3/2006 | Shimano et al. | |
| 7,180,846 B2 | 2/2007 | Kim et al. | |
| 2001/0008513 A1 * | 7/2001 | Arai et al. | 369/112.08 |
| 2001/0019528 A1 * | 9/2001 | Shiono et al. | 369/112.08 |
| 2001/0038583 A1 | 11/2001 | Miyagawa et al. | |
| 2001/0038597 A1 * | 11/2001 | Shimozono | 369/112.26 |
| 2001/0040854 A1 | 11/2001 | Lee et al. | |
| 2002/0003767 A1 * | 1/2002 | Ota et al. | 369/112.09 |
| 2002/0093902 A1 | 7/2002 | Hirai et al. | |
| 2002/0150017 A1 | 10/2002 | Ono et al. | |
| 2002/0181366 A1 * | 12/2002 | Katayama | 369/53.2 |
| 2002/0191502 A1 | 12/2002 | Hirai | |
| 2003/0072247 A1 | 4/2003 | Hirai | |
| 2003/0107979 A1 | 6/2003 | Kim et al. | |
| 2005/0226122 A1 | 10/2005 | Ooi et al. | |

FOREIGN PATENT DOCUMENTS

| | | |
|---|---|---|
| EP | 0 583 036 | 2/1994 |
| EP | 0881 634 | 12/1998 |
| EP | 1 022 731 A2 | 7/2000 |
| EP | 1 022 731 A3 | 4/2001 |
| EP | 1 154 417 A2 | 11/2001 |
| EP | 1 172808 | 1/2002 |
| JP | 2-252131 | 10/1990 |
| JP | 06-215411 | 8/1994 |
| JP | 7-311337 | 11/1995 |
| JP | 8-62496 | 3/1996 |
| JP | 3036314 | 1/1997 |
| JP | 9-128785 | 5/1997 |
| JP | 2713257 | 10/1997 |
| JP | 9-311271 | 12/1997 |
| JP | 9-318873 | 12/1997 |
| JP | 9-320083 | 12/1997 |
| JP | 2725653 | 12/1997 |
| JP | 10-20263 | 1/1998 |
| JP | 10-91990 | 4/1998 |
| JP | 10-124921 | 5/1998 |
| JP | 10-188322 | 7/1998 |
| JP | 10-228653 | 8/1998 |
| JP | 10-334504 | 12/1998 |
| JP | 11-261171 | 9/1999 |
| JP | 11-328719 | 11/1999 |
| JP | 2000-30283 | 1/2000 |
| JP | 2000-131603 | 5/2000 |
| JP | 2000-155974 | 6/2000 |
| JP | 2000-187870 | 7/2000 |
| JP | 2000-242963 | 9/2000 |
| JP | 3108695 | 9/2000 |
| JP | 2000-276766 | 10/2000 |
| JP | 3142251 | 12/2000 |
| JP | 2001-006203 | 1/2001 |
| JP | 2001-13406 | 1/2001 |
| JP | 2001-28147 | 1/2001 |
| JP | 2001-043559 | 2/2001 |
| JP | 2001-143303 | 5/2001 |
| JP | 2001-143309 | 5/2001 |
| JP | 2001-209966 | 8/2001 |
| JP | 2001-216676 | 8/2001 |
| JP | 2001-220075 | 8/2001 |
| JP | 2001-266392 | 9/2001 |
| JP | 2001- 297472 | 10/2001 |
| JP | 3240846 | 10/2001 |
| JP | 2001-318231 | 11/2001 |
| JP | 2001-337269 | 12/2001 |
| JP | 2002-50068 | 2/2002 |
| JP | 2002-107617 | 4/2002 |
| JP | 2003-207714 | 7/2003 |
| WO | WO 96/28816 | 9/1996 |
| WO | WO 01/13369 | 2/2001 |
| WO | WO 02/21520 A1 | 3/2002 |

OTHER PUBLICATIONS

'Optical design for compatible lens between DVD and the next generation video disk system', J. Magn, Soc, Japan, 25, 449-450 (2001).

'Optical disk technology', Radio Technology Co., Ltd., (1989), pp. 66-68.

'Next Generation Optical Disc', Hiroshi Ogawa, ISOM2001, draft, WE-A-03.

'Blue/DVD/CD compatible optical head with three wavelength and a wavelength selective filter', Ryuichi Katayama et al., ISOM2001, We-C-05.

'Laser & Optics guide IV (2)', Melles Griot, pp. 22-27 through 8.

'Phase-Changememory', Optronics (2001) No. 11, pp. 149-154.

* cited by examiner

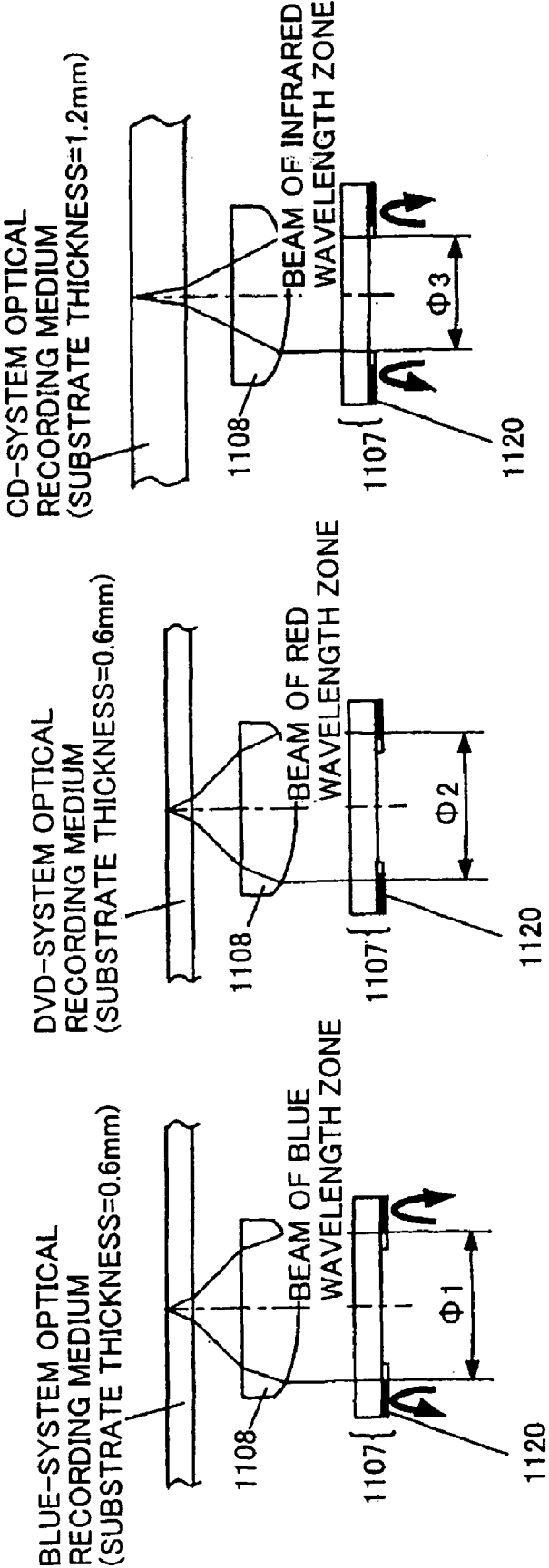

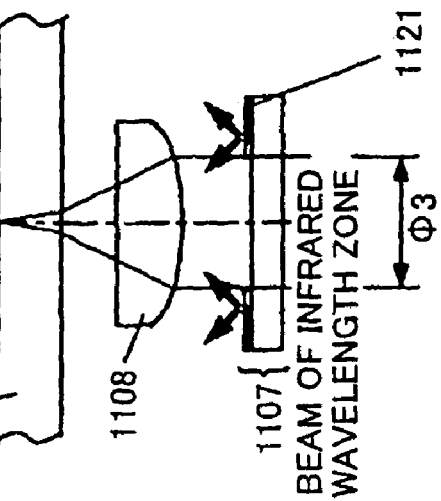
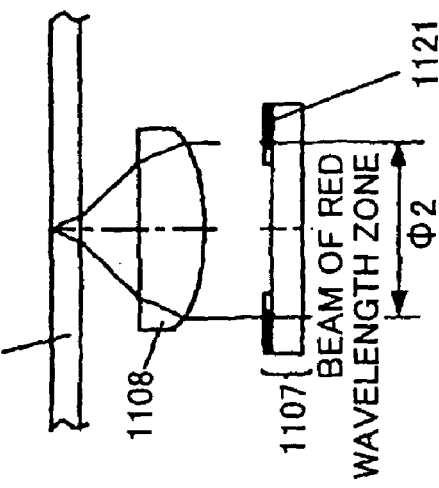
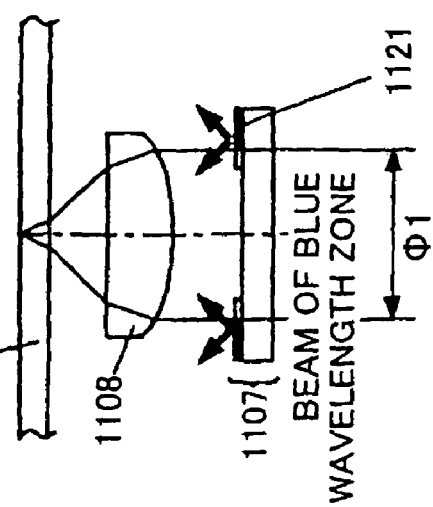

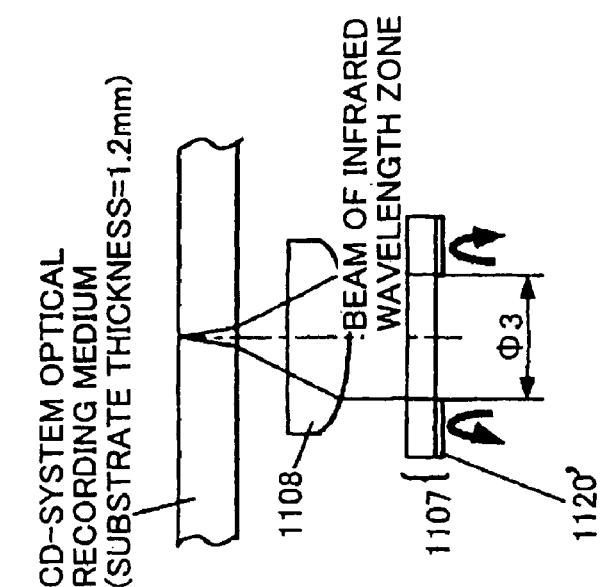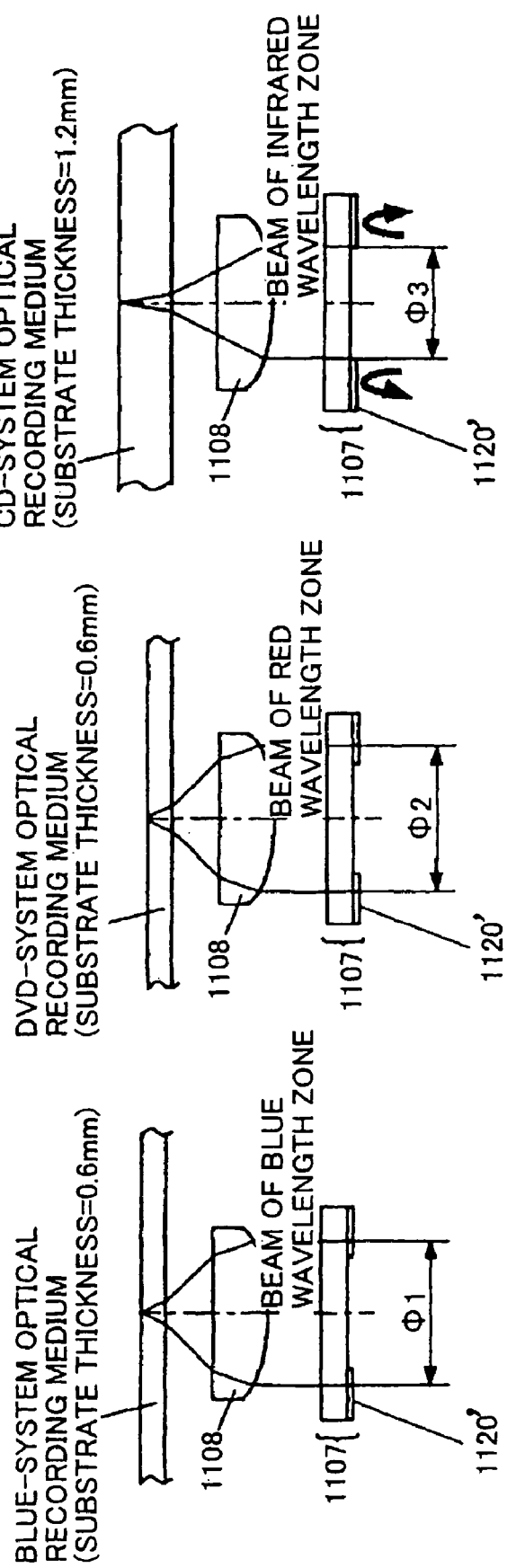

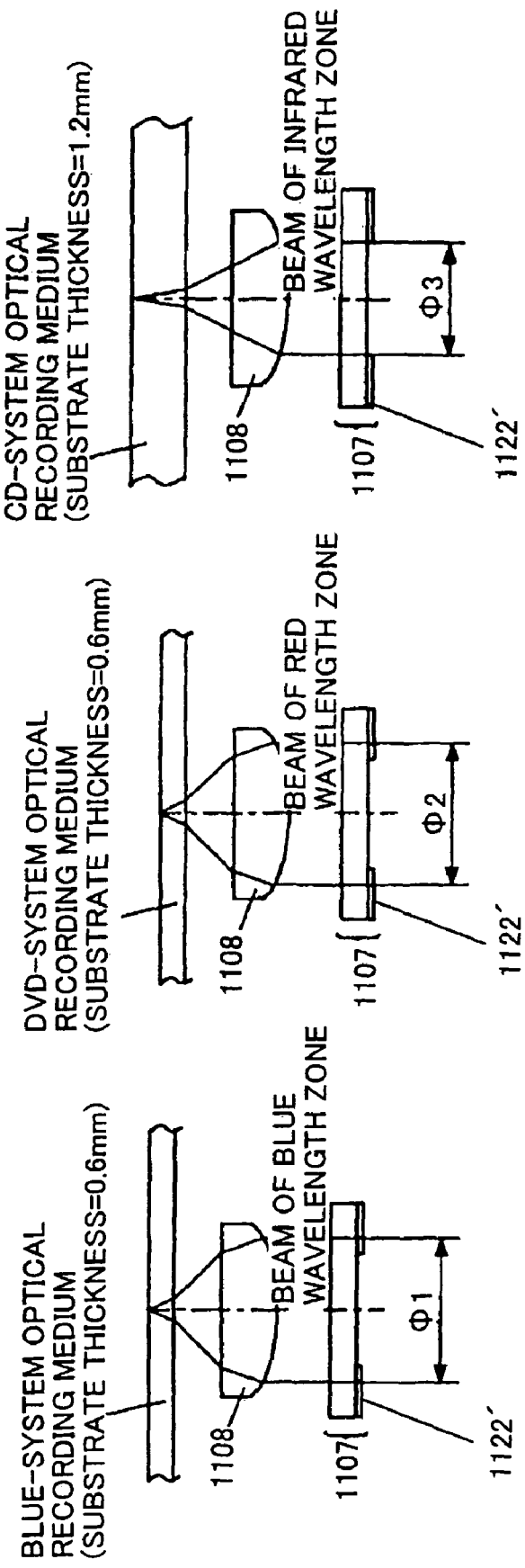

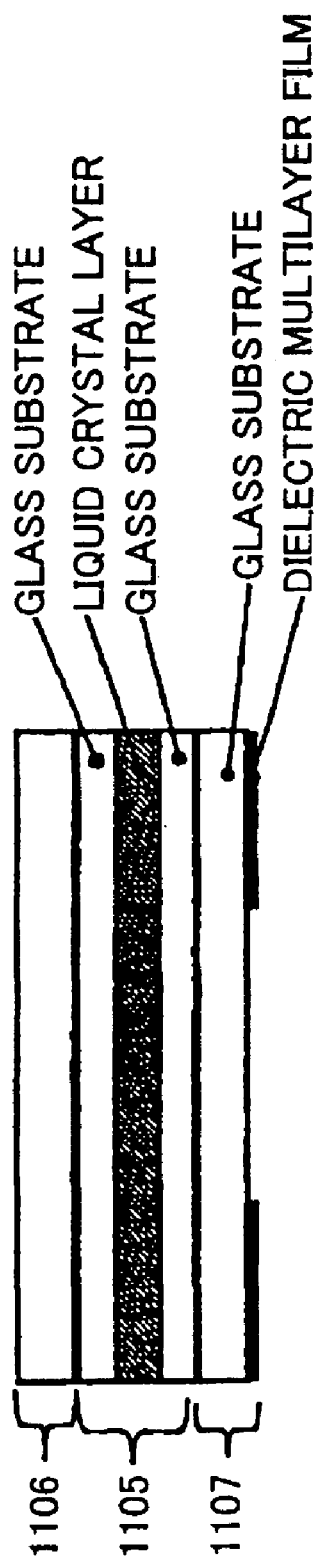
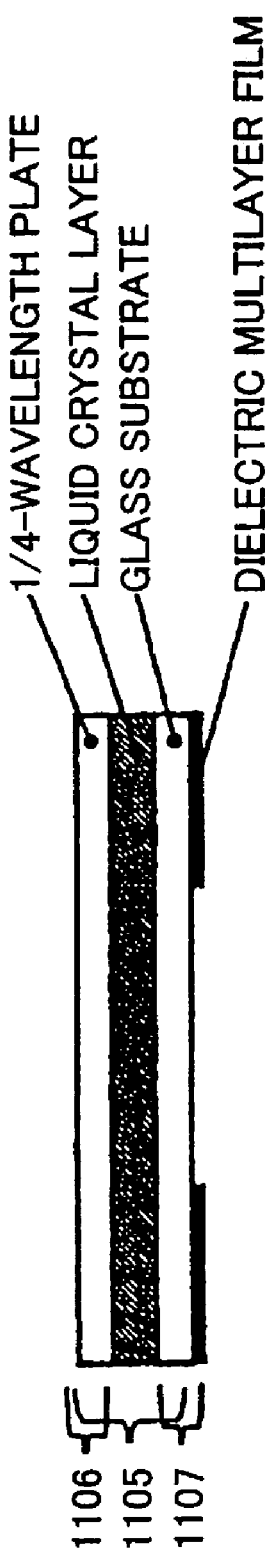

WAVELENGTH SHIFT[nm]

WAVELENGTH SHIFT[nm]

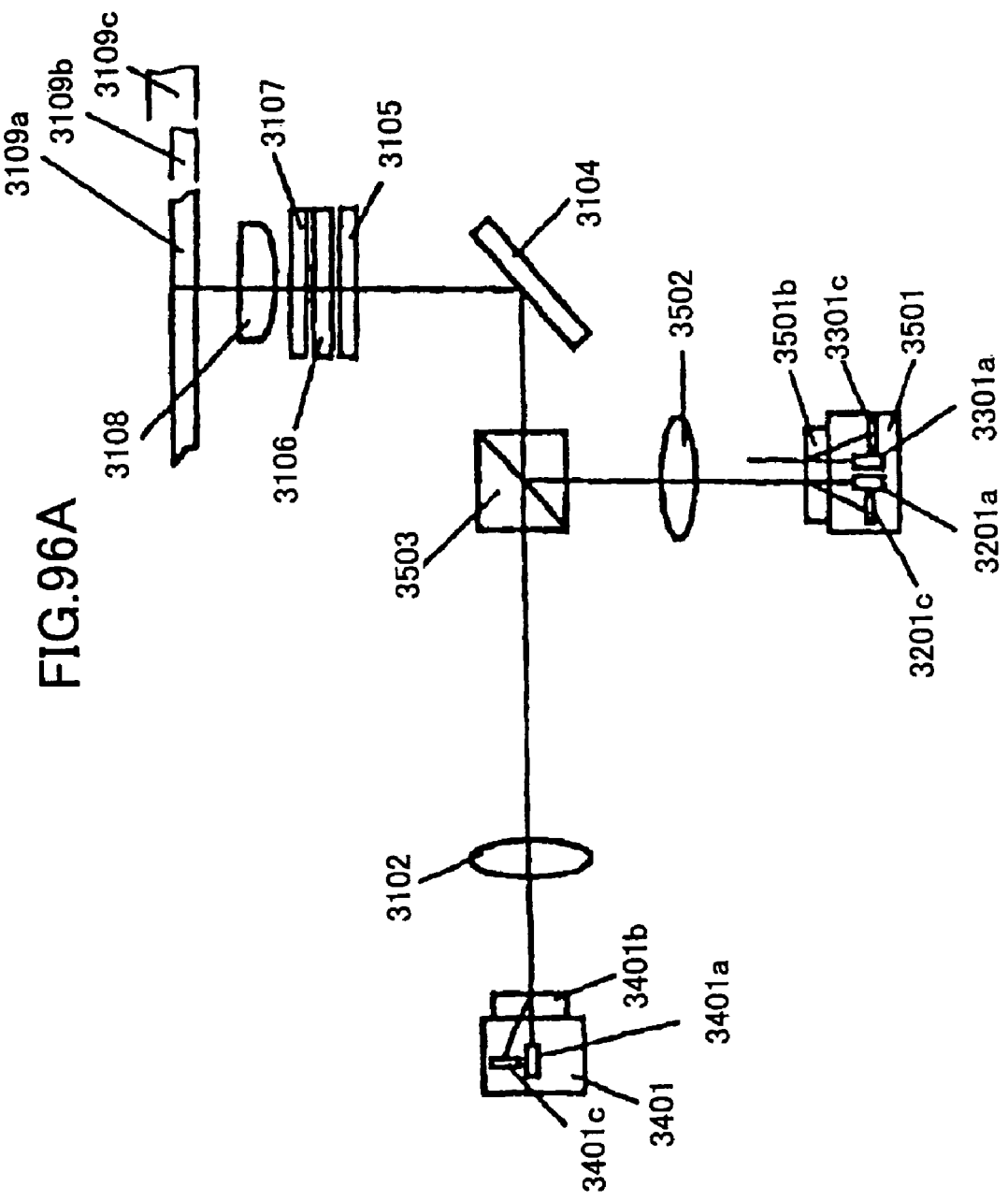

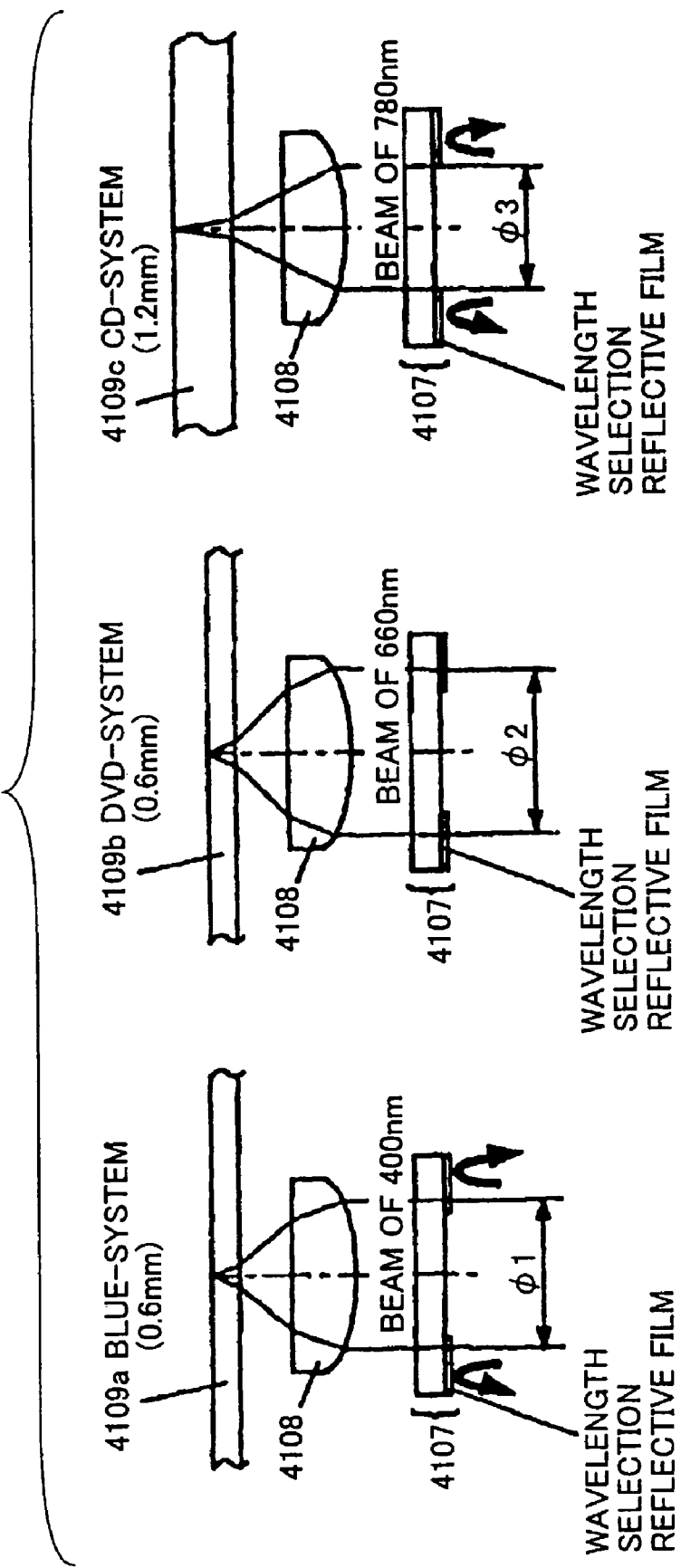

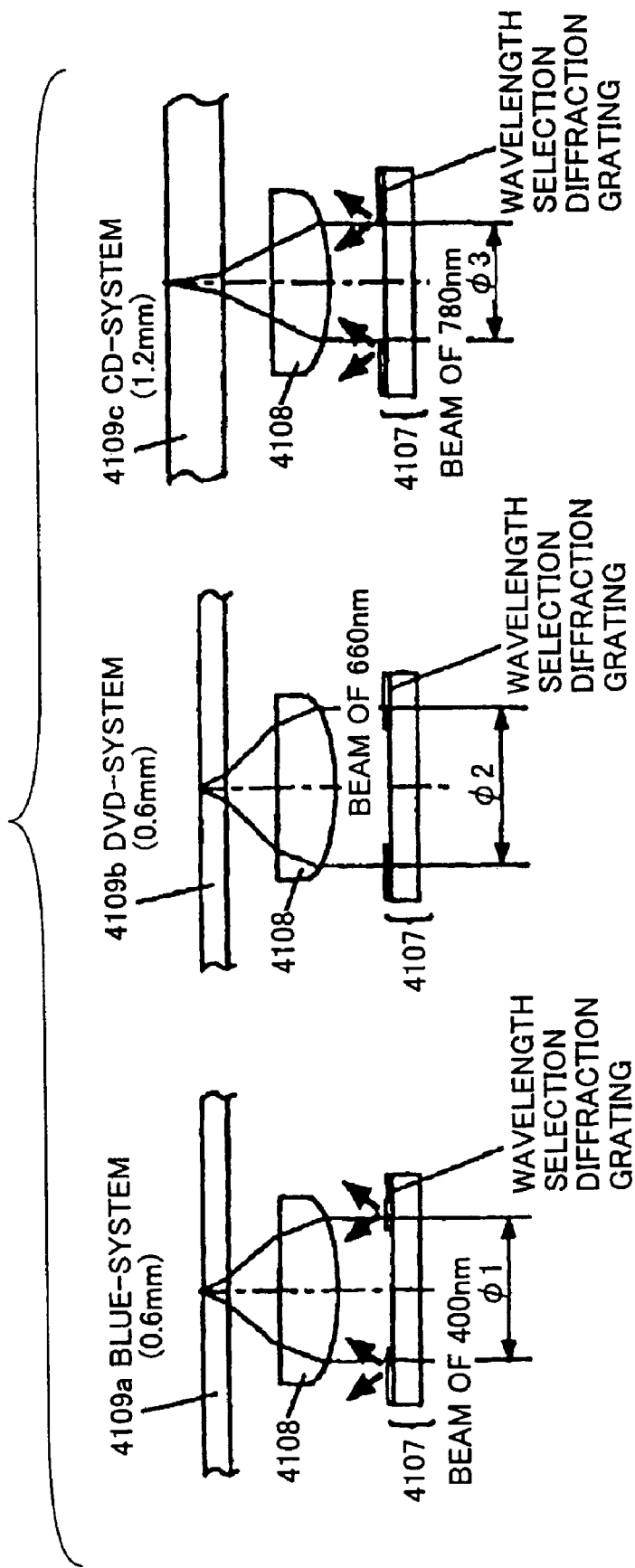

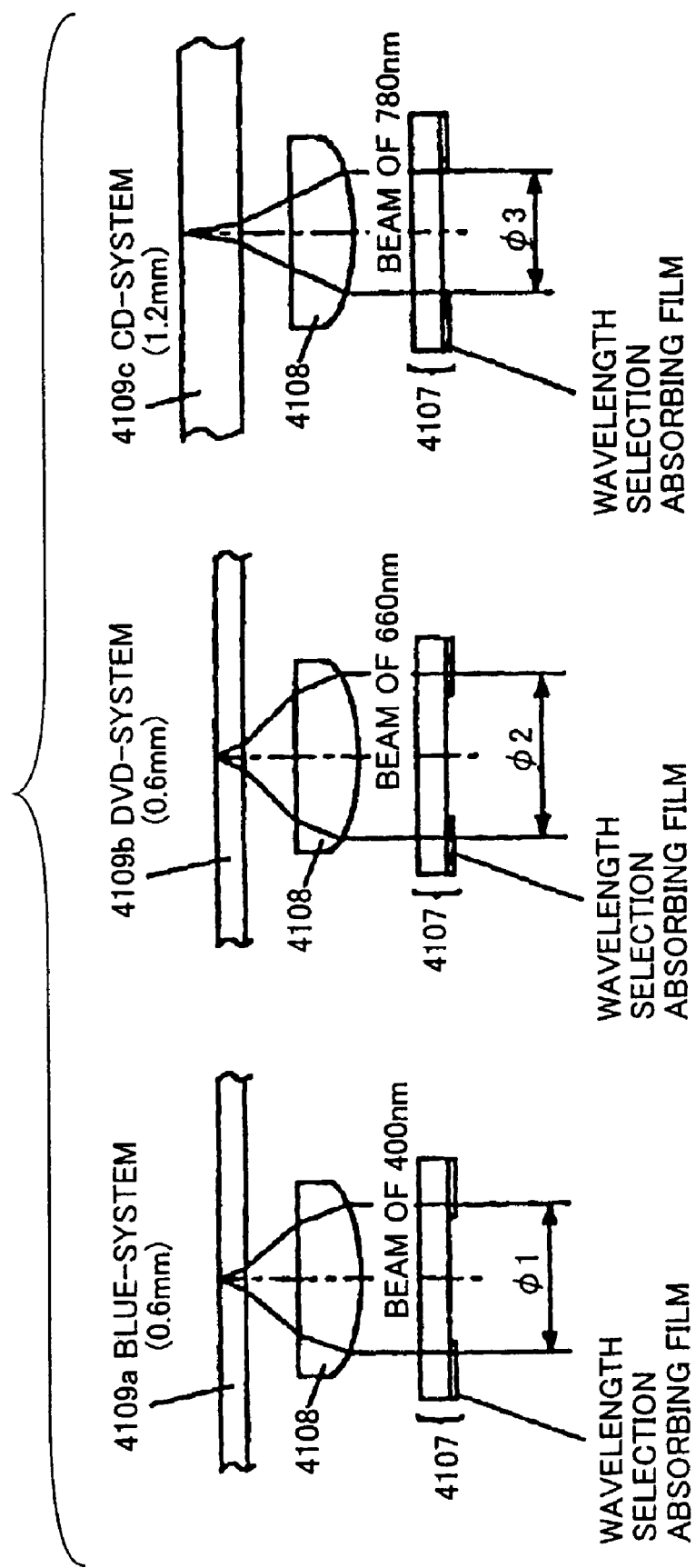

GLASS SUBSTRATE

DIELECTRIC MULTI-LAYER FILM

WAVEFRONT ON 660nm (INFINITE SYSTEM)

WAVEFRONT ON 780nm
(INFINITE SYSTEM)

WAVEFRONT ON 660nm
(FINITE SYSTEM)

OPTICAL PICKUP AND OPTICAL INFORMATION PROCESSING APPARATUS WITH LIGHT SOURCES OF THREE DIFFERENT WAVELENGTHS

CROSS REFERENCE TO RELATED APPLICATIONS

The present application is a divisional of U.S. application Ser. No. 10/372,916, filed on Feb. 26, 2003, now U.S. Pat. No. 7,142,497 the disclosure of which is herewith incorporated by reference in its entirety.

BACKGROUND OF THE INVENTION

1. Field of the Invention

The present invention relates to an optical pickup and an optical information processing apparatus using the optical pickup by which a satisfactory beam spot on an information recording surface of a blue-system optical recording medium which uses a light source of a blue wavelength zone, to a DVD-system optical recording medium using a light source of a red wavelength zone, or to a CD-system optical recording medium using a light source of an infrared wavelength zone.

2. Description of the Related Art

Optical recording media, such as a CD with a storage capacity of 0.65 GB and a DVD with a storage capacity of 4.7 GB, are spreading as means to store data of image information, voice information, or computer data. Further, demands for a further improvement in recording density and storage capacity have become stronger in recent years. Specifically, the necessity for a storage capacity such as for 22 GB by which a high-definition television program can be stored for two hours for recording one movie program, or for 44 GB by which the same can be stored for four hours for recording a sport relay broadcast or so.

In an optical pickup which performs information writing or, informational reading to/from an optical recording medium, in order to improve the recording density of such an optical recording medium, it is effective to reduce the diameter of the beam spot which is formed by a beam condensed with an object lens and formed on an optical recording medium by enlarging the numerical aperture (which may be abbreviated as 'NA') of the object lens, or by shortening the wavelength of a light emitted by a light source. Therefore, for example, in a "DVD-system optical recording medium" with which high recording density is achievable for which NA of the object lens is set as 0.65 and the light source is set to emit a light of the wavelength of 660 nm in comparison to a "CD-system optical recording medium" for which NA of the object lens is set as 0.50 and the light source is set to emit a light with the wavelength of 780 nm.

As for such an optical recording medium, as mentioned above, further improvement in the recording density and storage capacity is demanded, and, for this purpose, it is desirable to increase from 0.65 in NA of the object lens, or to make the wavelength of the light source shorter than 660 nm. In this regard, in a document of an ISOM 2001 collection of preliminary reports 'Next Generation Optical Disc', by Hiroshi Ogawa, pages 6-7, a system is proposed by which the storage capacity of 22 GB is achievable by using a light source of a blue wavelength zone and an object lens of NA: 0.85, for example. Further, another system is proposed in which 12 GB in the storage capacity is achievable by employing a light source of a blue wavelength zone, with NA of 0.65-0.75.

However, when a further improvement in NA of the object lens or the wavelength of the light source is attained, various problems are anticipated. The anticipated problems include, for example, those caused by a manufacture error of a lens, an even-th aberration which means a distortion in an isotropic wavefront with respect to the optical axis produced according to a manufacture error of a lens applied, a thickness error of a transparent substrate of an optical recording medium loaded, an odd-th aberration which means a distortion in an anisotropic wavefront with respect to the optical axis generated by an inclination of the optical recording medium, or so.

Generally, the even-th aberration generated according to a thickness error of a transparent substrate of an optical recording medium is given the following spherical aberration:

$$W_{40} = ((n^2-1)/(8n^3)) \times (d \times NA^4/\lambda)$$

where n denotes the refractive index of the transparent substrate of the optical recording medium, d denotes the thickness of the same, NA denotes the numerical aperture of the object lens, and, λ denotes the wavelength of the light source.

From the above formula, it can be seen that, as the wavelength becomes shorter or NA becomes higher, the aberration becomes larger accordingly. In an optical information processing device which performs writing/reading of information onto/from a conventional optical recording medium, such as a CD or a DVD, since the wavefront degradation by this spherical aberration is as small as less than 0.07λ in the RMS value, not a special means of correction of the aberration is needed. However, when the operating wavelength of 407 nm±10 nm in a light source of a blue wavelength zone is used, the wavefront degradation caused by such a thickness error of the transparent substrate becomes more than 0.07λ, and, therefore, some sort of correction becomes required.

For this purpose, various proposals have been made. For example, proposed is a means to change the phase state of an incident beam to an object lens (Japanese laid-open patent applications Nos. 2000-131603, 2000-242963, and 2001-28147), a means to change the divergence state of the beam incident onto the object lens by means of an appropriate movement of a plurality of lenses (Japanese laid-open patent applications Nos. 9-128785, and 10-20263), and so forth.

Moreover, generally the above-mentioned odd-th aberration generated by an inclination, a rotation or so of an optical recording medium is given by the following coma aberration:

$$W_{31} = ((n^2-1)/(2n^3)) \times (d \times NA^3 \times \theta/\lambda)$$

where θ denotes an inclination of the optical recording medium.

From this formula, it can be seen that the shorter wavelength or higher NA results in an increase in this sort of aberration. In an optical information processing device which performs writing/reading of the information onto/from a CD, since the wavefront degradation caused by this coma aberration is as low as 0.07λ in the RMS value, no special means for correcting it is needed. However, when the operating wavelength of 660 nm±10 nm in the light source of a red wavelength zone is used, the wavefront degradation caused by a change of ±1 degree in the inclination results in 0.07λ, and, thus, some sort of correction is required in a generation of DVD-system information recording media. Proposals have been made for such a correction, for example, in Japanese laid-open patent applications Nos. 10-91990, 2001-220075, Japanese patent No. 3142251, Japanese laid-open patent application No. 9-128785, etc.

Moreover, in such an optical pickup, a beam emitted from a light source is focused onto an optical recording medium in one light path, while a light reflected from the optical recording medium is detected by a light detecting device in another light path. To improve the light usage efficiency in both of these light paths is desired. Namely, as a consideration is made into a matter as to whether or not the light usage efficiency in the going light path until the beam emitted from the light source is incident on the optical recording medium, it becomes possible to raise the condensing power for a beam spot on the optical recording medium by which the rotational speed of the optical recording medium can be improved. Alternatively, in case merely the same condensing power for the optical beam is required, it becomes possible to reduce the required power in the light source, and thus cost saving can be realized.

On the other hand, in case the light usage efficiency on the returning light path of being directed toward the light detection device from the optical recording medium can be made higher, the optical signal from the optical recording medium can be detected at a high S/N. Morio Onoe discloses a scheme for improving the light usage efficiency in both the going and returning light paths in a document 'Optical Technology', published by Radio Technology Co., Ltd., 1989, pages 66-68, in which a ¼-wavelength plate and a polarization splitter are disposed in the light path for this purpose.

Generally speaking, such a scheme of applying a polarization beam splitter and a phase plate or the like is preferable for a blue-system optical recording medium with a wavelength of 407 nm and a DVD-system optical recording medium with a wavelength of 660 nm. On the other hand, for a CD-system optical recording medium with a wavelength of 780 nm, many optical pickups using a light path separation device which does not perform polarization have been put into commercial use. However, when a light path separation device which does not perform polarization is used, a part of light reflected from the optical recording medium returns to the light source. In case of using a semiconductor laser as the light source, when a part of reflected light from the optical recording medium returns to the semiconductor laser, the oscillation characteristic of the semiconductor laser is changed, and, thus, there occurs a possibility of generating a noise, at a time of information recording/reproduction/deletion onto the optical recording mediums.

Such a matter of noise generation by the returning light does not almost become a serious problem in an optical pickup used only for information reproduction. However, in case of using a high output type semiconductor laser in which the oscillation characteristic is likely to change, and, thus, the above-mentioned noise generation may cause a serious problem in an optical pickup also used for information recording. Japanese laid-open patent application No. 11-261171 discloses an optical pickup directed to solving such a problem. In the disclosed configuration, a wavelength plate is disposed for the purpose of eliminating such a noise occurring due to a returning light in a single-wavelength optical system.

On the other hand, according to the above-mentioned document of ISOM 2001 collection of preliminary reports 'Next Generation Optical Disc', by Hiroshi Ogawa, pages 6-7, a system using a light source of a blue wavelength zone in an operating wavelength of 407 nm±10 nm and an object lens of NA of 0.85 is such that a setting is made on the optical-incident side substrate thickness of an optical recording medium as being 0.1 mm, and, thereby, an aberration increase amount occurring due to reduction in wavelength or increase in NA may be compensated, and, thus, even if there occurs a wavefront degradation caused due to an inclination change of the optical recording medium, it may be kept not more than 0.07%.

On the other hand, a manufacture error in products of optical devices, especially, as an object lens, used in an optical pickup may cause a problem concerning an aberration. Generally, a thickness error, a refractive-index error, a curvature radius error and so forth in the lens may cause generation of the even-th aberration, while a tilt or eccentricity of the lens may cause the odd-th aberration.

Another problem is such that users still have conventional recording medium such as CDs and DVDs. It is desirable that these conventional optical recording media and new optical recording media according to the above-mentioned new standard should be handled with a single common optical information processing device. One easier method of solving this problem is such that an optical pickup according to the conventional standard and an optical pickup according to the new standard are both mounted in one machine separately. However, this method may raise the cost or increase the size of the whole machine.

Thus, problems to be solved occurring when achieving an optical pickup directed to the future of high-density optical recording media are to reduce aberrations which otherwise increase due to increase in the NA or reduction in wavelength, and, also, to achieve a compatibility between the conventional standard and new standard optical recording media (i.e., of different generations). Further, it is also a problem to be solved to achieve these objects without a remarkable increase in size/costs of the machine.

Furthermore, as described above, as long as the conventional recording media such as CDs and DVDs are applied, spherical aberration occurring in connection with a thickness error of optical recording medium may be reduced by means of improvement in the manufacture accuracy of the optical recording medium. Further, coma aberration in connection with an inclination of an optical recording medium may also be reduced by setting the substrate thickness thereof into 0.1 mm, even when the light source of a blue wavelength zone and NA of 0.85 are applied. However, in the future, in connection with achievement of high-speed rotation of an optical recording medium, application of a multi-layer-type optical recording medium, which will be described later, and also application of a multi-level recording scheme, it may become not possible to tolerate such an aberration matter, and thus, some special scheme for correcting it should be needed.

SUMMARY OF THE INVENTION

An object of the present invention is to solve these problems, and to provide an optical information processing apparatus in which, without a remarkable increase of the number of required parts/components of the machine by sharing an optical device such as an aberration correction device, it should be possible to form a satisfactory beam spot on each of a blue-system optical recording medium using a light source with a wavelength of a blue wavelength zone of 407 nm, a DVD-system optical recording medium using a light source with a wavelength of a red wavelength zone of 660 nm and a CD-system optical recording medium using a light source with a wavelength of an infrared wavelength zone of 780 nm.

According to the present invention, for these two or three types of optical recording media, i.e., a new blue system, and conventional DVD system and/or CD system, a single object lens and a single aberration correction device are provided by which various types of aberrations occurring mainly due to compatible use of these different types of optical recording media can be effectively controlled, or well reduced. As a result, a satisfactory beam spot can be formed on the optical recording medium in any case with a simple configuration. For example, the divergent state of a beam applied is controlled, a phase shift for canceling out an originally occurring (wavefront/spherical) aberration is provided, or so, whereby the originally occurring aberration can be effectively controlled.

According to the present invention, as various optical parts/components are used in common for applying these types of optical recording medium, or various optical parts/components may be integrally combined. Also for this reason, a compact optical pickup which can be compatibly applied to the two/three types of optical recording media (two/three generations) is achieved.

According to the present invention, by applying the aberration correction device, it is also possible to deal with/cope with problems that manufacture errors of optical recording media may cause an aberration, that a variation/fluctuation occurring in the light sources (semiconductor lasers) causes an aberration, that a difference between information recording surfaces in a multi-layer optical recording medium causes an aberration, and so forth.

Further, according to another aspect of the present invention, by applying an aperture control/switching device which controls a diameter of a beam passing therethrough according to the wavelength applied, it becomes possible to achieve a compatible configuration of an optical pickup for the above-mentioned two or three generations of optical recording media, with a simple configuration.

Further, by applying an elliptic shape of cross section to a beam to be applied to the optical recording medium via the object lens, wherein the minor axis of the elliptic shape corresponds to the tangential direction of the disk-shaped optical recording medium, it is possible to effectively reduce the beam diameter, and, thus, to effectively improve the S/N even when a multi-level recording is performed.

Furthermore, according to another aspect of the present invention, two types of chromatic aberrations can be effectively controlled or well reduced by generally the same concept.

According to the present invention, the above-mentioned aberration correction device may be dynamically controlled according to a result of detection of various causes of the aberration to be controlled, i.e., optical recording identification, spherical aberration detection, layer detection on a multi-layer optical recording medium, or so. Thereby, aberration correction/control can be further effectively performed, and, thus, more high quality information recording/reproduction can be achieved with a high-quality or high-accurate beam spot formed on the optical recording medium.

According to another aspect of the present invention, a phase correction device is configured such that a desired phase shift is given only on a light of relevant wavelength, while no substantially effect is applied to a light of a non-relevant wavelength, as the phase shift in this case is made as being an integer multiple of $2\pi$. Thereby, it becomes possible to apply a common light path having the phase correction device therein for various wavelengths. Thus, the configuration of optical pickup can be effectively simplified.

According to another aspect of the present invention, a liquid crystal device is applied to the above-mentioned phase correction device or aberration correction device. Then, a concentric pupil radius positions with respect to an optical axis of the optical pickup at which a large phase shift is applied by the liquid crystal device is controlled according to an originally occurring concentric aberration to be controlled. By thus applying the liquid crystal device, it becomes possible to easily control the pupil radius position having the large phase shift amount or to easily control the magnitude of the phase shift amount provided to a beam passing therethrough merely by controlling a voltage applied to electrode pattern formed in the liquid crystal device. By thus controlling the voltage applied to the liquid crystal device, the refractive index thereof can be controlled accordingly, and, thus, the phase shift provided to the passing beam can be controlled accordingly. As a result, a dynamic control of phase shift provided to the passing beam is archived, and, thus, control of aberration can be performed finely, or with a higher accuracy.

In this scheme of applying the liquid crystal device for controlling a phase shift provided to a passing beam, by appropriately configuring an arrangement of electrode patterns formed in the liquid crystal device, it is possible also to simplify the electrode pattern, or miniaturize the liquid crystal device. For example, a finite system and an infinite system are used appropriately for different wavelengths, and, thereby, a relevant pupil radius position at which a phase shift should be provided can be controlled differently according to the wavelength. Thereby, a time required for driving the liquid crystal device can be shortened. Further, by setting the pupil radius position at which a phase shift is provided in a mid point between actually relevant pupil radius positions, the electrode pattern of the liquid crystal device required can be simplified. Furthermore, by applying a finite system for a particular wavelength, this wavelength can be omitted from those for each of which a phase correction is required, and, thus, the electrode pattern can be simplified. Further, whether the required electrode patterns may be formed on one or both of opposite electrodes in the liquid crystal device may be determined according to particular purposes, i.e., electrode pattern simplification, miniaturization of liquid crystal device, or so.

BRIEF DESCRIPTION OF THE DRAWINGS

Other objects and further features of the present invention will become more apparent from the following detailed description when read in conjunction with the following accompanying drawings:

FIGS. 31A through 31C illustrate a reflective-type aperture switching device;

FIGS. 32A through 32C illustrate a diffraction-type aperture switching device;

FIGS. 35A through 35C illustrate a reflective-type aperture switching device;

FIGS. 37A through 37C illustrate an absorbing-type aperture switching device;

FIGS. 44A and 44B illustrate a scheme of integral combination configurations according to the present invention;

FIGS. 83A and 84B show spherical aberrations in cases of employing different types of phase correction devices in the twenty-ninth embodiment in case of applying 407 nm;

FIG. 96A shows a general configuration of an optical pickup according to a variant embodiment of the thirty-first embodiment of the present invention;

FIG. 103A illustrates a reflective-type aperture switching device;

FIG. 103B illustrates a diffraction-type aperture switching device;

FIG. 103C illustrates an absorbing-type aperture switching device;

FIGS. 116A and 116B illustrate a scheme of integral combination configurations according to the present invention;

FIG. 117 illustrates an electrode pattern of the liquid crystal device used for spherical aberration correction according to the present invention;

FIG. 118 shows a general configuration of an optical pickup according to a thirty-fourth embodiment of the present invention;

FIG. 119A shows a general configuration of an optical pickup according to a variant embodiment of the thirty-third embodiment of the present invention;

FIG. 119B illustrates a hologram unit shown in FIG. 119A;

FIGS. 120A, 120B and 120C illustrate how a remaining aberration occurs due to a shift of object lens even after aberration correction;

FIGS. 121A, 121B and 122 illustrate an interference zone occurring due to a shift of object lens;

FIG. 123 illustrates a principle of coma aberration detection scheme according to the present invention;

FIG. 124 shows a change in interference zone according to a relative positional difference between the object lens and liquid crystal device;

FIG. 125 shows an electrode pattern of the liquid crystal device;

FIGS. 126, 127A and 127B illustrate a principle of correction of coma aberration according to the present invention;

FIG. 128 illustrates a block diagram of a three-generation compatible type optical pickup; and FIGS. 129, 130 and 131 illustrate spherical aberrations in cases of applying different types of optical recording medium and applying different types of optical systems for applying a beam.

DETAILED DESCRIPTION OF THE PREFERRED EMBODIMENTS

With reference to figures, preferred embodiments of the present invention will now be described.

Figure 1:
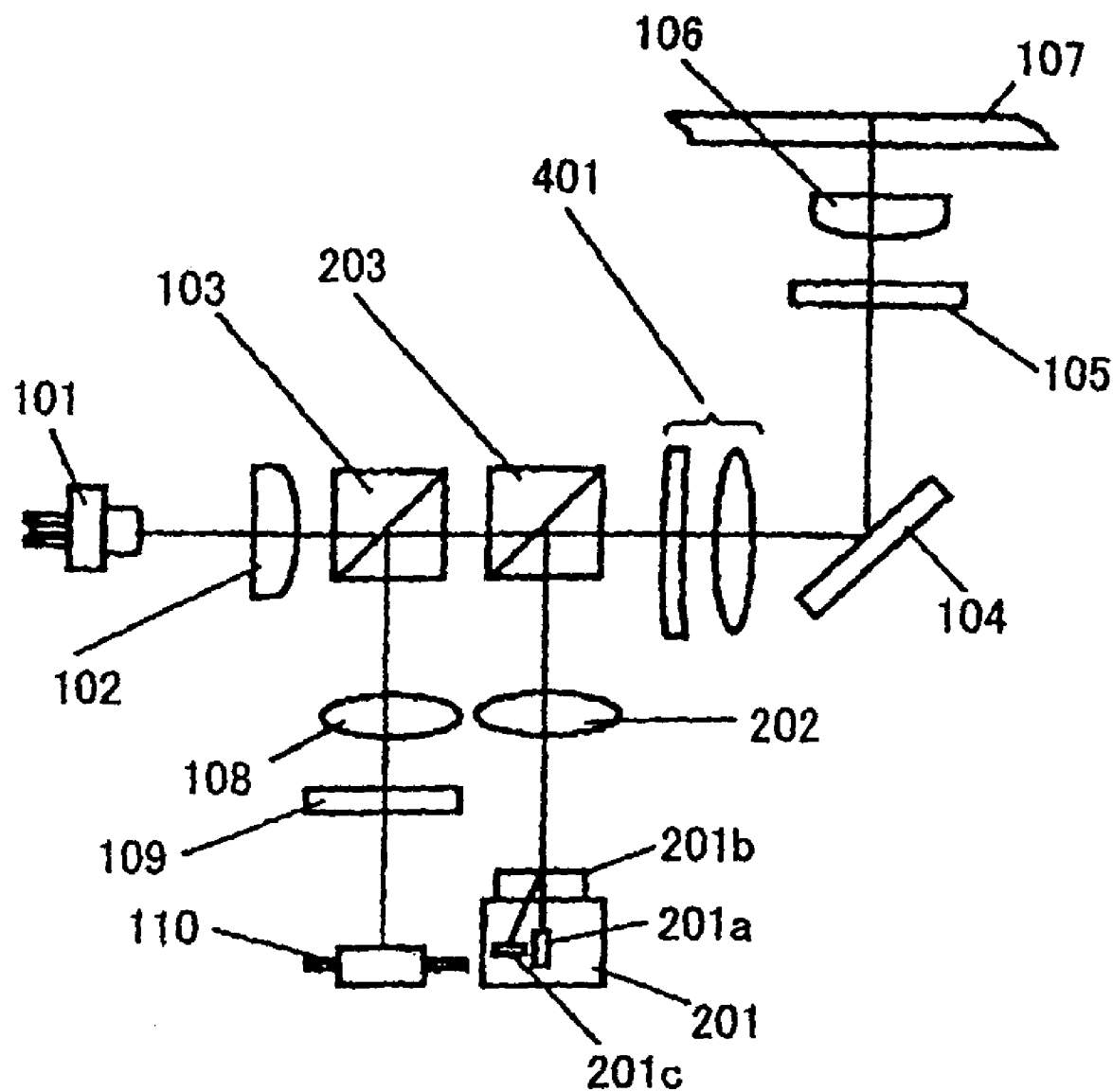
FIG. 1 shows a general configuration of an optical pickup according to a first embodiment of the present invention.

FIG. 1 is a block diagram showing a general configuration of an optical pickup in a first embodiment of the present invention. According to the first embodiment, an optical pickup uses a light source with an operating wavelength of a blue wavelength zone of 407 nm, and an object lens of NA:0.65 for a blue-system (large storage capacity) optical recording medium having a light-incidence-side substrate with a thickness of 0.6 mm, and, also, uses a light source with an operating wavelength of 660 nm and the object lens with NA: 0.65 for a DVD-system optical recording medium having an light-incidence-side substrate with a thickness of 0.6 mm.

Specifically, as shown in FIG. 1, this pickup includes a blue-system optical system for a blue-wavelength-zone light including a semiconductor laser 101 which is a light source of a blue wavelength zone, a collimator lens 102, a polarization beam splitter 103, a dichroic prism 203, an even-th aberration correction device 401, a deflection prism 104, a ¼-wavelength plate 105, the object lens 106, a detection lens 108, a beam splitting device 109 and a light-receiving device 110; and also, a DVD red-system optical system for a red-wavelength-zone light including a hologram unit 201, a collimator lens 202, the dichroic prism 203, the even-th aberration correction device 401, the ¼-wavelength plate 105, and the object lens 106.

That is, the even-th-aberration correction device 401, the dichroic prism 203, the deflection prism 104, the ¼-wavelength plate 105, and the object lenses 106 are the common parts of the two optical systems.

First, a case of recording, reproduction, or deletion with the light source with the operating wavelength of a blue wavelength zone of 407 nm and the object lens with NA: 0.65 onto the blue optical recording medium of 0.6 mm in light-incident side substrate thickness will now be described. A divergent beam of linear polarization from the semiconductor laser 101 with the wavelength of 407 nm transformed into an approximately parallel beam by the collimator lens 102 passes through the polarization beam splitter 103, the dichroic prism 203 and the even-th aberration correction device 401. After that, the beam is deflected by 90 degrees in the light path with the deflection prism 104, passes through the ¼-wavelength plate 105 so as to be transformed into a circular polarization, is incident onto the object lens 106, and then, is focused onto the optical recording medium 107 as a minute beam spot, by which information recording, reproduction, or deletion is performed on the recording medium 107. The light path of the beam passes in this case is referred to as a going light path.

Then, the beam reflected by the optical recording medium 107 becomes a circular polarization in a direction opposite to the beam in the going light path, and, then, again is transformed into a parallel beam, is transformed into a linear polarized light perpendicular to the beam in the going light path as a result of passing through the ¼-wavelength plate 105. After that, it is reflected by the polarization beam splitter 103, is made into a convergent beam with the focus lens 108, is deflected and split into a plurality of beams by the beam splitting device 109. Thus, it reaches the light-receiving device 110, by which an aberration signal, an information signal, and a servo signal are detected.

Next, a case of recording, reproduction, or deletion of information with the light source with the operating wavelength of a red wavelength zone of 660 nm, the object lens with NA: 0.65, onto the DVD optical recording medium of 0.6 mm in thickness of the light-incident side substrate thickness will now be described. In recent years, generally, a scheme has been employed in which light receiving/emitting devices are installed into a single can (container) in an optical pickup for DVD, and, a hologram unit which splits a beam using a hologram technology.

In FIG. 1, the hologram unit 201 includes an integrated chip 201a of a semiconductor laser, a hologram device 201b, and a light-receiving device 201c. A 660-nm light which comes out of the semiconductor laser 201a of this hologram unit 201, passes through the hologram device 201b, and is transformed into a parallel beam by the collimator lens 202. It is then reflected toward the deflection prism 104 by the dichroic prism 203. The even-th aberration correction device 401 is then passed by this beam, which is then deflected in the light path by 90 degrees with the deflection prism 104, passes through the ¼-wavelength plate 105, by which it is transformed into a circular polarization, and then, it is incident on the object lens 106, Thereby, the beam is focused as forming a minute spot on the optical recording medium 107, by which spot information recording, reproduction, or deletion is performed on the optical recording medium 107.

Figure 2A:
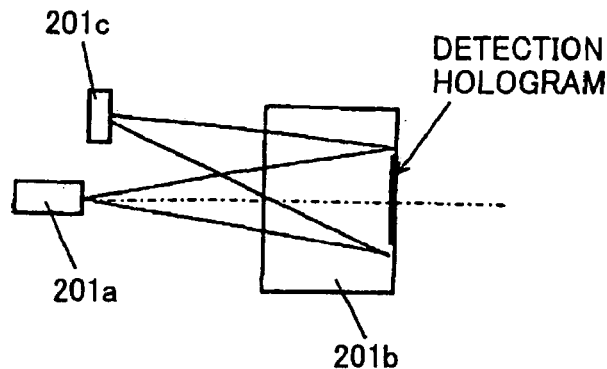
FIGS. 2A through 2C illustrate light-path separation devices employing holograms and even-th aberration detecting devices included in the configuration shown in FIG. 1.
Figure 2B:
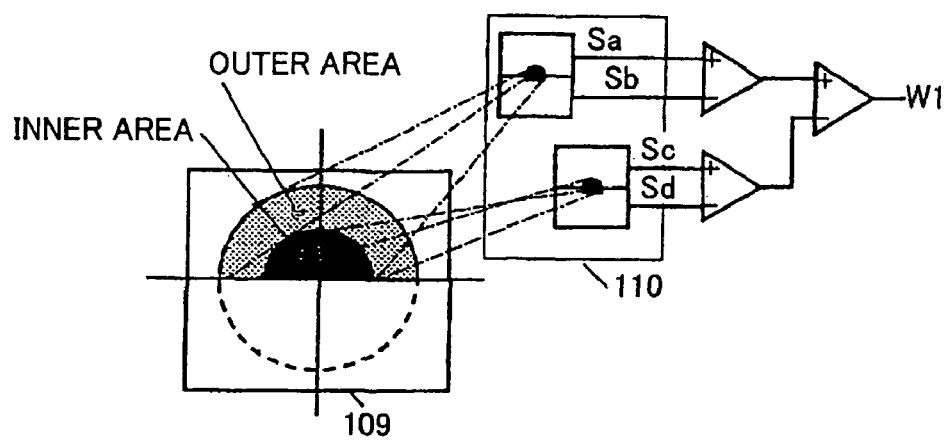

The beam reflected by the optical recording medium 107 is deflected by the deflection prism 104, is reflected by the dichroic prism 203, is condensed by the collimator lens 202, and, as shown in FIG. 2A, the light reflected by the optical recording medium 107 is diffracted by the hologram device 201b toward the light-receiving device 201c which is contained in the same can as the semiconductor laser 201a, and is received by light-receiving device 201c. By the light-receiving device 201c, an aberration signal, an information signal, and a servo signal are detected from the incident light.

Essential features of the first embodiment of the present invention will now be described. First, the even-th aberration detection and operation of the correction device when recording, reproduction, or deletion is performed will be described with respect to the blue-system optical recording medium.

Figure 3A:
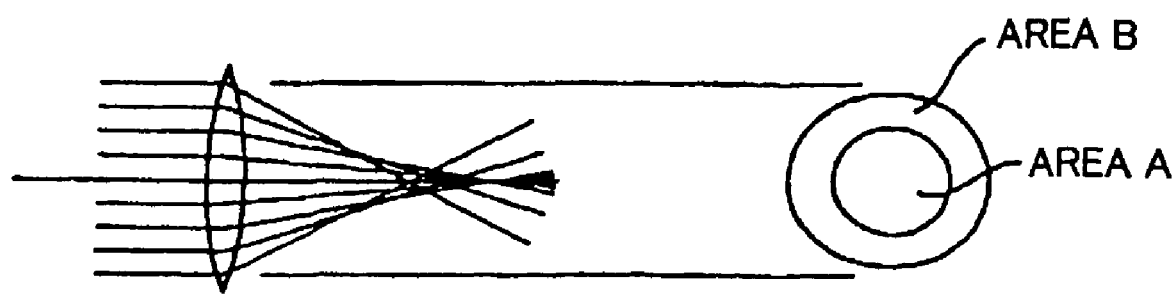
FIGS. 3A through 3F illustrate a principle of wavefront aberration control/correction scheme according to the first embodiment of the present invention.

In FIG. 1, the combination of the beam splitting device 109 and the light-receiving device 110 form 'the even-th aberration detection device'. As above-mentioned, when a lens manufacture error or a thickness error of an optical recording medium occurs, the even-th aberration may occur, and the form of the optical spot formed on the record surface of the optical recording medium may deteriorate. The thus-occurring aberration may distort the wavefront of the reflected beam, and an aberration occurs in the beam reaching the light-receiving device 110 through the detection lens 108. FIG. 3A shows this state. When the even-th aberration occurs in the returning beam incident onto the detection lens 108, with respect to the reference wavefront of the returning beam, 'a delay in the wavefront' occurs concentrically about the optical axis, and thus, a position at which the thus-delayed wavefront which is focused becomes in a defocus state with respect to the position at which the reference wavefront is focused. Accordingly, 'the state of wavefront aberration occurring' can be known by detecting a difference between the delayed wavefront and the advanced wavefront, and thus detecting the focal state.

Thus, since the even-th aberration detected by the aberration detection device originates in various kinds of manufacture errors, the lens manufacture error should have a correspondence relationship with the thus-detected aberration. Accordingly, by detecting the aberration in the returning beam as described above, these errors can also be known.

For example, for the purpose of the above-mentioned aberration detection, as shown in FIG. 2A, the light-receiving device 110 is configured such that the light-receiving area thereof is divided, and a hologram is provided on the beam splitting device, so that each divided beam therefrom can be detected by the divided areas of the light receiving area. The hologram is such that a half area thereof which is obtained on a symmetrically divided plane perpendicular to the optical axis is concentrically divided into an inner area and an outer area. The light-receiving device has two separate areas each detecting a beam diffracted by the hologram.

Then, the amounts of movements in light point images of the hologram diffracted light are detected, and the difference W1 between the detection signals (Sa−Sb) and (Sc−Sd) calculated can be regarded as an even-th aberration signal, as shown in the following formula:

$$W1=(Sa-Sb-Sc+Sd)$$

There, a situation that W1=0 means that no aberration occurs.

The even-th aberration correction device 401 shown in FIG. 1 includes two lenses and an interval adjustment device (not shown) to adjust the interval of these lenses. The two lenses are a positive lens and a negative lens, and, in the example shown, the negative lens is arranged nearer to the light source side. However, it is also possible that rather the positive lens is arranged nearer to the light source. Thereby, the even-th aberration occurring due to the manufacture error of the object lens should be cancelled out with the even-th aberration created in the beam directed towered the object lens as a result of the interval between these two lenses being controlled in the aberration correction device 401.

Figure 3B:
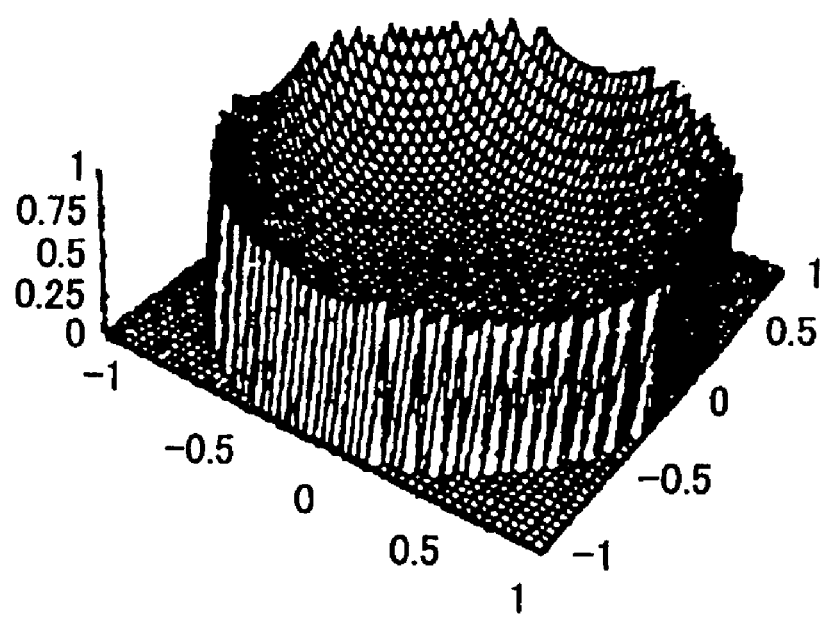
Figure 3C:
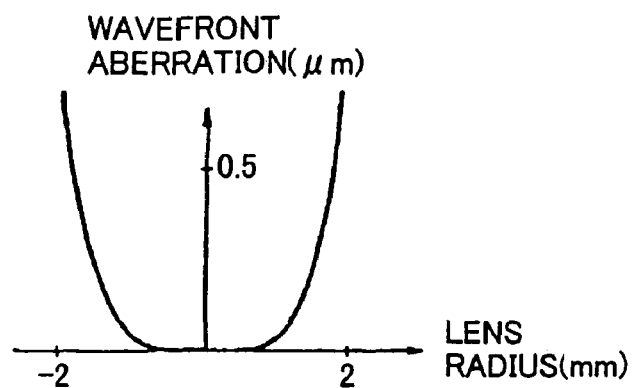
Figure 3D:
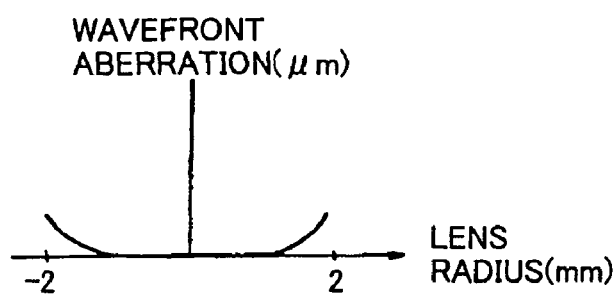

It is assumed that the wavefront aberration which causes the even-th aberration and originates in various kinds of manufacture errors detected by the above-mentioned aberration detection method is such as that shown in FIG. 3B. FIG. 3C shows this wavefront aberration as a 2-dimensional curve. Then, the interval between the above-mentioned positive and negative lenses is controlled so that a wavefront aberration occur in the beam incident onto the object lens 106 coming from the light source side, and thus, the incidence state of the beam applied onto the object lens be changed. Accordingly, the wavefront aberration occurring due to the above-mentioned manufacture errors is cancelled out with the thus-controlled intentionally created wavefront aberration, as shown in FIG. 3D. As shown, the original wavefront aberration shown in FIG. 3C can be remarkably corrected.

Actually, the interval between the two lenses in the aberration correction device 401 is previously set as a reference value at which no aberration occurs and thus the above-mentioned aberration signal be zero assuming that the object lens has an approximately design median. Then, when any aberration occurs after an assembly of the object lens, the above-mentioned lens interval should be controlled so that the above-mentioned aberration detection signal be zero.

In addition, the above-mentioned positive lens and the negative lens in the aberration correction device may be configured such that one or each of both thereof may be made of a combination of a plurality of lenses, or may have aspherical surface on one or each surface thereof. Further, the beam splitter is not limited to the above-mentioned hologram, and any other device which can divide an incident beam into concentric circles according to a phase difference can be instead employed.

The even-th aberration detection when recording, reproduction, or deletion and an operation of the correction device will now be described with respect to the DVD-system optical recording medium. At a time of recording/reproduction onto the DVD, the wavelength of a beam supplied is different from that at the time of recording/reproduction onto the blue-system optical recording medium, and a beam with the wavelength of 660 nm is applied onto the DVD-system optical recording medium.

When the object lens designed as operating with the wavelength of 407 nm mentioned above is used in the 660-nm wavelength zone, a chromatic aberration which is the even-th aberration may occur. However, it is possible, by changing the interval between the positive right lens and negative lens according to the above-mentioned first embodiment of the present invention, to correct or well reduce this chromatic aberration. For example, a device for determining which of the above-mentioned two types of recording media is loaded is provided, and, then, the positions of the positive lens and negative lens should be appropriately controlled in a time of the blue-system optical recording medium being loaded, and in a time of the DVD-system optical recording medium being loaded.

Figure 2C:
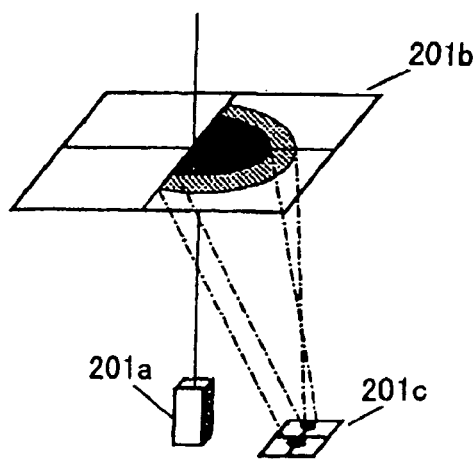

Moreover, as in the above-described configuration, it is also possible to detect a change in the even-th aberration occurring other than the above-mentioned chromatic aberration, due to a substrate thick error or so of the DVD-system optical recording medium, and carry out a feedback control accordingly. The aberration detection method in this case should detect, as in the above-mentioned case of the blue-system optical recording medium, a difference in the focus position between the inner area and outer area of the incident beam reflected by the optical recording medium. Especially, in case the above-mentioned hologram unit 201 is used, as shown in FIG. 2C, a beam splitting device should be formed on the surface of the hologram 201 in the same manner.

Furthermore, according to the first embodiment, the ¼-wavelength plate 105 is provided which transforms each of both an incident light of the wavelength of 407 nm and an incident light of the wavelength of 660 nm into a linear polarization from a circular polarization or from the linear polarization into the circular polarization. This ¼-wavelength plate employs a crystal such that, at a certain thickness 't', a phase difference between the ordinary light (refractive index: no) and extraordinary light (refractive index: new) be ¼ of the wavelength of 407 nm or the wavelength of 660 nm. In other words, this crystal used as the ¼ wavelength plate satisfies the following requirements:

$$\Delta n1 \times t = \{(2p+1)/4\} \times 407 \ (p=0, 1, \ldots)$$

$\Delta n1$: (no−ne) with respect to the light coming from the light source having the wavelength of 407 nm;

$$\Delta n2 \times t = \{(2q+1)/4\} \times 660 \ (q=0, 1, \ldots)$$

Δn2: (no−ne) with respect to the light coming from the light source having the wavelength of 660 nm;

By employing the ¼-wavelength plate with such the characteristics, the polarization separation optical system which is a combination of the polarization beam splitter 103 and the ¼-wavelength plate 105 is provided for the blue-system optical recording medium. Thereby, a sufficient luminous energy can be obtained, and, also, a noise caused by the returning light into the semiconductor laser 101 can also be effectively reduced. Moreover, for the DVD-system optical recording medium, the polarization separation optical system is provided by means of the function of polarization selection of the hologram device 201b.

In addition, the ¼-wavelength plate is not limited to that described above, and, any other device may be applied for the same purpose as long as it has a configuration in which glass plates sandwich a stack of phase difference devices made of organic material, and it provides a ¼ wavelength for both wavelengths.

According to the first embodiment, as described above, divisional deflection of the reflected light beam from the optical recording medium 107 is applied for realizing the aberration detection method. However, another scheme may also be applied, for example, in which the state of the aberration correction device 401 is intentionally changed, while the amplitude level in the read-out signal generated from the reflected light beam from the optical recording medium 107 is measured. Then, the state in which the above-mentioned amplitude level becomes maximum is detected with the light-receiving device 110.

Specifically, the shape of the optical spot formed on the recording surface of the optical recording medium is distorted when the even-th aberration occurs due to manufacture errors, various changes in the optical recording medium and so forth. The thus-occurring aberration is also included in the returning light reflected by the optical recording medium, which is directed to the detection device. As a result, the read-out signal detected by the detection device is reduced in comparison to a case where no aberration occurs. Accordingly, by detecting this amplitude of the read-out signal obtained from the returning light reflected by the optical recording medium, and by providing some device by which the optical spot is made to be formed in a condition such that the amplitude of the above-mentioned read-out signal becomes maximum, the shape of the optical spot on the optical recording medium can be made optimum.

Figure 4A:
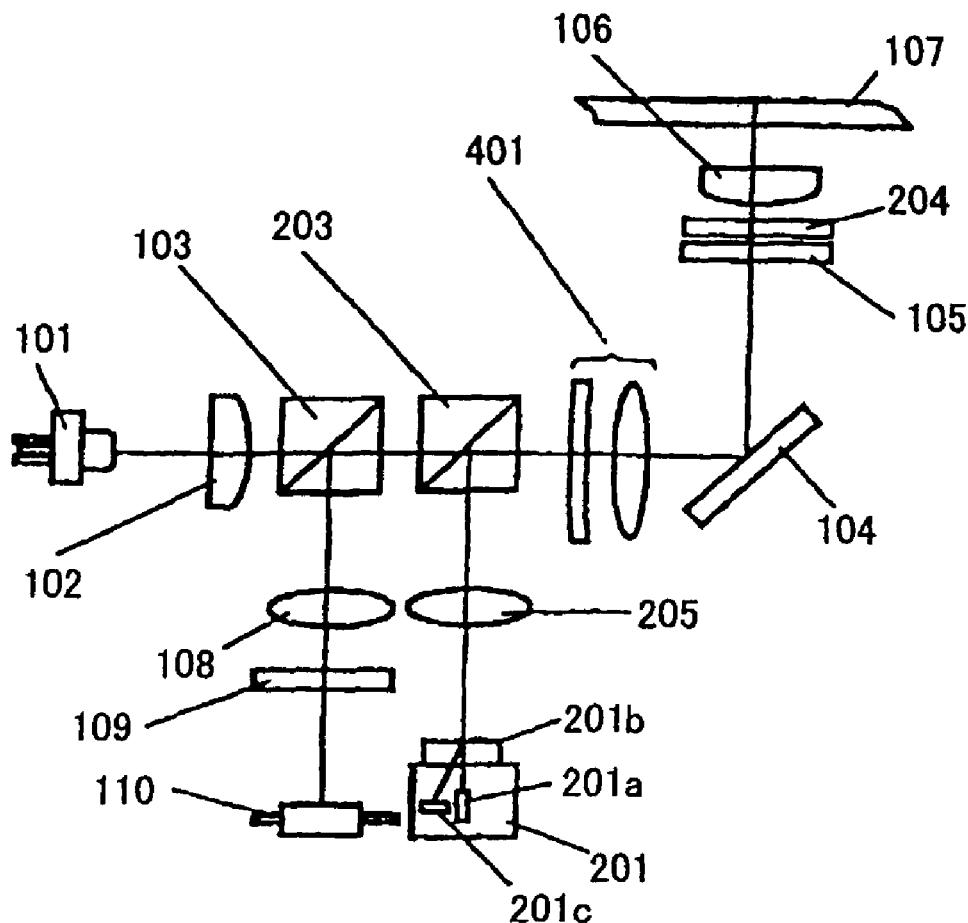
FIG. 4A shows a general configuration of an optical pickup according to a second embodiment of the present invention.

FIG. 4A is a diagram showing a general configuration of an optical pickup according to a second embodiment of the present invention. The same reference numerals as those in the first embodiment described above are given to substantially the same functional components. The same manner is applied to each of the figures which will be described subsequently.

In the optical pickup according to the second embodiment, a light source with an operating wavelength of a blue wavelength zone of 407 nm, and an object lens with NA: 0.85 are applied for a light-incidence-side substrate having a thickness of 0.1 mm of a blue-system (large storage capacity) optical recording medium, while a light source with an operating wavelength of 660 nm and an object lens with NA: 0.65 are applied for a light-incidence-side substrate with a thickness of 0.6 mm of a DVD-system optical recording medium.

Differences from the above-described first embodiment are the following two pints: A wavelength selection aperture 204 is added for the object lens 106 for NA: 0.85, and the light-incidence-side substrate having the thickness of 0.1 mm of the optical recording medium 107; and also, a finite DVD's red-system optical system is applied instead of the infinite system such that the incidence beam to the object lens is made to a divergent beam.

In the second embodiment, when the object lens designed for NA: 0.85, the wavelength of 407 nm, and the light-incidence-side substrate of the thickness of 0.1 mm is applied for the wavelength of 660 nm, and the light-incidence-side substrate of the thickness of 0.6 mm, a chromatic aberration caused by the difference in the wavelength, and a spherical aberration caused by the difference in the substrate thickness may occur. In order to eliminate these aberrations, according to the second embodiment, an even-th aberration of the opposite polarity is intentionally generated as a result of employing a divergent beam for being incident on the object lens, by applying the finite system as the DVD optical system. Then, the thus-generated even-th aberration is used for canceling out the above-mentioned chromatic and spherical aberrations. Furthermore, by providing a coupling lens 205 between the light source for DVD and the object lens, the light path for the red-system optical system is shortened.

Figure 4B:
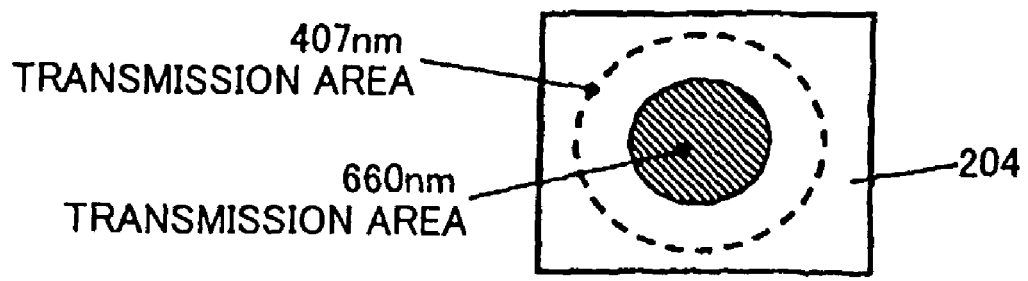
FIG. 4B illustrates transmission areas in a wavelength selection aperture included in the configuration shown in FIG. 4A.

Moreover, the wavelength selection aperture 204 controls the passage beam so that NA: 0.65 be achieved for the light of the wavelength 660 nm while the light of the wavelength of 407 nm is simply transmitted thereby. That is, as shown in FIG. 4B, the wavelength selection aperture 204 is a concentric circular aperture control device that has no function for the light with the wavelength of 407 nm, while it has a function for the light with the wavelength of 660 nm such as to allow passage thereof only through the central part for achieving NA: 0.65. Specifically, a configuration in which a film performing the wavelength selection is deposited onto a glass plate, a configuration by which the peripheral beam part of a light of 660 nm is diffracted outwardly with respect to the optical axis, or the like, may be applied for this purpose.

The above-mentioned aperture control device will now be described. As the optimum NA is different for each of the different types of optical recording media on which information recording, reproduction, or deletion is performed, the NA of the device should be changed for a particular case. For example, for a DVD, allowing a higher-density recording in comparison to a CD, NA: 0.65 of object lens, and the wavelength of 650 nm of light source are required, while, for CD, NA: 0.50 of object lens, and the wavelength of 780 nm of light source are required. Furthermore, for the blue-system optical recording medium, the above-mentioned system of NA: 0.85 and the wavelength of light source set to 407 nm, or another way of controlling NA into that for DVD with taking a large margin, and so forth, may be applied.

By applying such a configuration of aperture control device having the function of controlling the NA according to the wavelength of the incident light, it becomes possible to adapt the optical pickup for various wavelengths by appropriately switching the NA by means of the aperture control device, with a single object lens. That is, NA of the object lens is expressed by the following formula:

$$NA = \phi OL/(2 \times fOL)$$

where fOL denotes the focal length of the lens, while φOL denotes the beam diameter of the incident beam onto the lens. Accordingly, change of NA is attained by switching the φOL according to the wavelength applied.

For example, a case is assumed that the lens of fOL (focal length)=2.35 mm, φOL (effective diameter)=4 mm, and NA=0.85 on the wavelength applied is 407 nm is used for the wavelength of 660 nm for a DVD. In this case, the aperture control device sets to φOL (DVD)=3.06 mm for the light with the wavelength of 660 nm, and, thereby, NA (DVD) can be apparently made to 0.65. A case is assumed that the same lens is applied for a CD of the wavelength of 780 nm. In this case, as the aperture control device sets to φOL (CD)=2.35 mm for the light with the wavelength of 780 nm, NA (CD) can thus be apparently made to 0.5. Accordingly, by applying the same lens, and configuring the aperture control device to set φOL (CD)=2.35 mm for the light with the wavelength of 780 nm, and, also set φOL(DVD)=3.06 mm for the light with the wavelength of 660 nm, it becomes possible to adapt the optical pickup for each of the three types of optical recording media which require the different NAs, respectively, and to enable formation of the optimum beam spot thereon in each case.

Moreover, also in the second embodiment, the aberration correction device and the aberration detection method applied to the first embodiment may also be applied. However, according to the second embodiment, aberration detection with higher sensitivity is required compared with the first embodiment. This is because aberration caused by a thickness error of the optical recording medium is proportional to the 4th power of NA, and, thus, the higher sensitivity is needed accordingly.

Figure 5A:
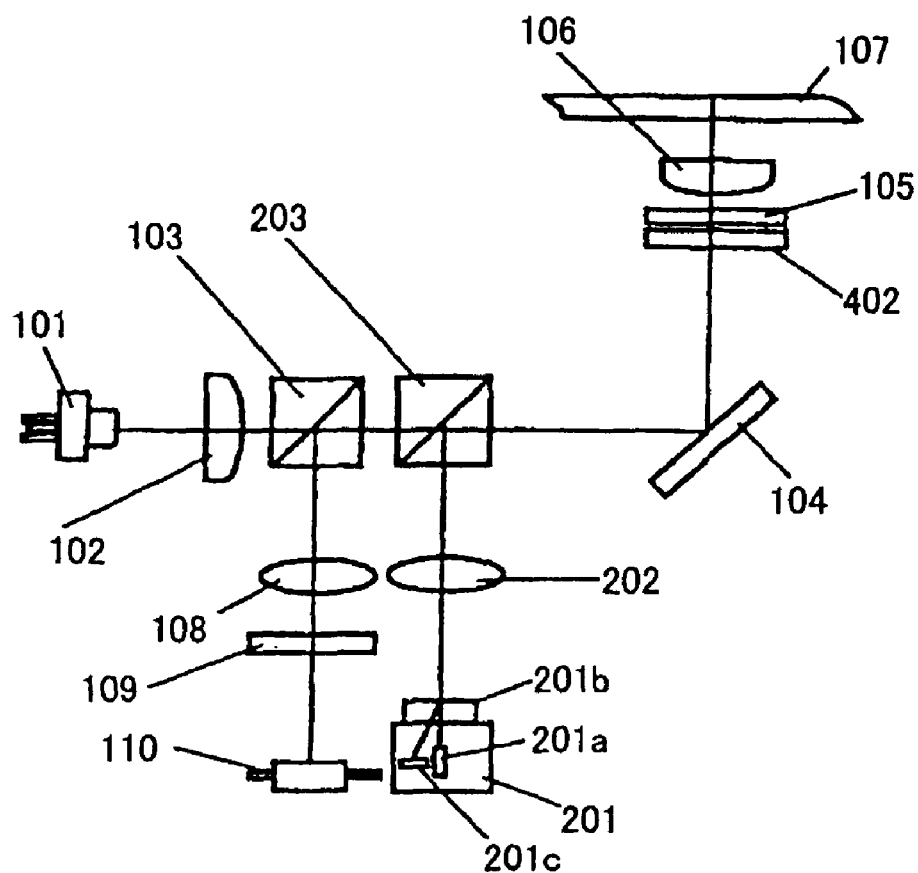
FIG. 5A shows a general configuration of an optical pickup according to a third embodiment of the present invention.

FIG. 5A is a block diagram showing a general configuration of an optical pickup according to a third embodiment of the present invention. In this third embodiment, as in the first embodiment described above, a light source with an operating wavelength of 407 nm and an object lens of NA: 0.65 are applied for a light-incidence-side substrate having a thickness of 0.6 mm of blue-system (large storage capacity) optical recording medium, a light source with an operating wavelength of 660 nm and an object lens of NA: 0.65 are applied for a light-incidence-side substrate having a thickness 0.6 mm of DVD-system optical recording medium.

Figure 5B:
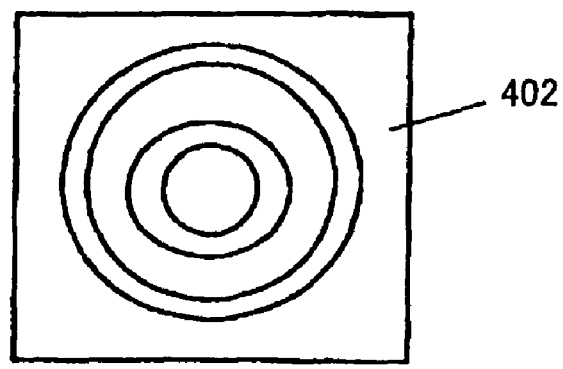
FIG. 5B illustrates an electrode pattern in a liquid crystal device used as an aberration correction device included in the configuration shown in FIG. 5A.

A different point from the above-mentioned third embodiment is that a liquid crystal device is employed as the even-th aberration correction device. The even-th aberration correction device 402 according to the third embodiment includes the liquid crystal device and a voltage control device (not shown) to drive the liquid crystal device. As shown in FIG. 5B, in the liquid crystal device, at least one side of a transparent electrode is divided into concentric circles, and this liquid crystal device is configured so that a voltage can be applied independently between the electrode portion of each concentric circular ring and a common electrode. Thereby, each circular part of the liquid crystal device can be freely controlled to have a refractive index n through a range between n1 and n2 by controlling the above-mentioned voltage.

By controlling the refractive index n, the phase difference $\Delta n \cdot d \, (2\pi/\lambda)$ can be given to the incident light which passes through each circular area, or light-path difference $\Delta n \cdot d$ can be given to the same, where $\Delta n$ denotes the refractive-index difference, and 'd' denotes the cell thickness of the liquid crystal, where the wavelength is referred to as $\lambda$.

Figure 3E:
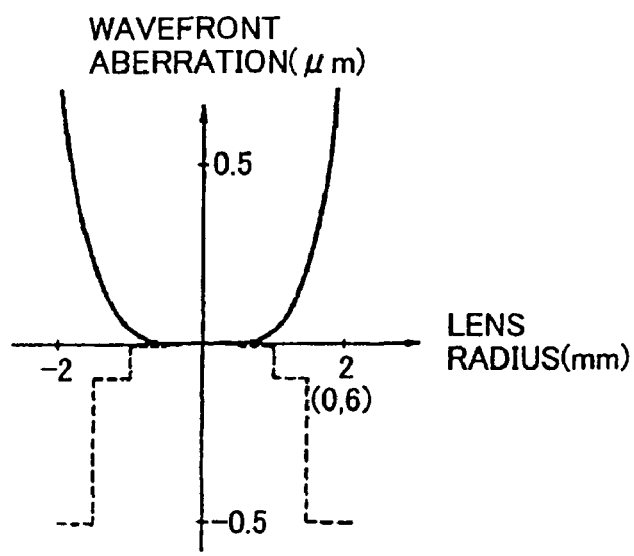

It is assumed that the wavefront aberration which gives the even-th aberration originating in various kinds of manufacture errors detected is that shown in FIG. 3B. The solid line portion of the upper part of FIG. 3E shows this wavefront aberration expressed as a 2-dimensional curve. When the voltage applied to each concentric circular electrode of the liquid crystal device is adjusted according to the detected wavefront aberration so that phase difference as shown in the broken line portion of the lower part of FIG. 3E may be given to the beam incident onto the object lens 106 from the light source side, the above-mentioned wavefront aberration can be cancelled out by the delay of the wavefront given in each part of the beam which passes through the liquid crystal device.

Figure 3F:
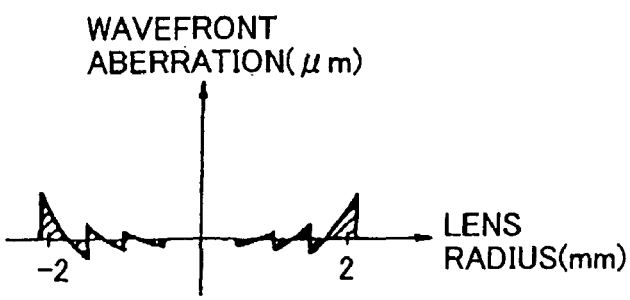

FIG. 3F shows the sum of the solid line (wavefront aberration) in FIG. 3E, and the broken line (delay of the wavefront caused by the liquid crystal device), i.e., the wavefront aberration after the aberration correction. As can be seen clearly, the original wavefront aberration (solid line portion of the upper part of FIG. 3E) can be remarkably reduced.

Figure 6A:
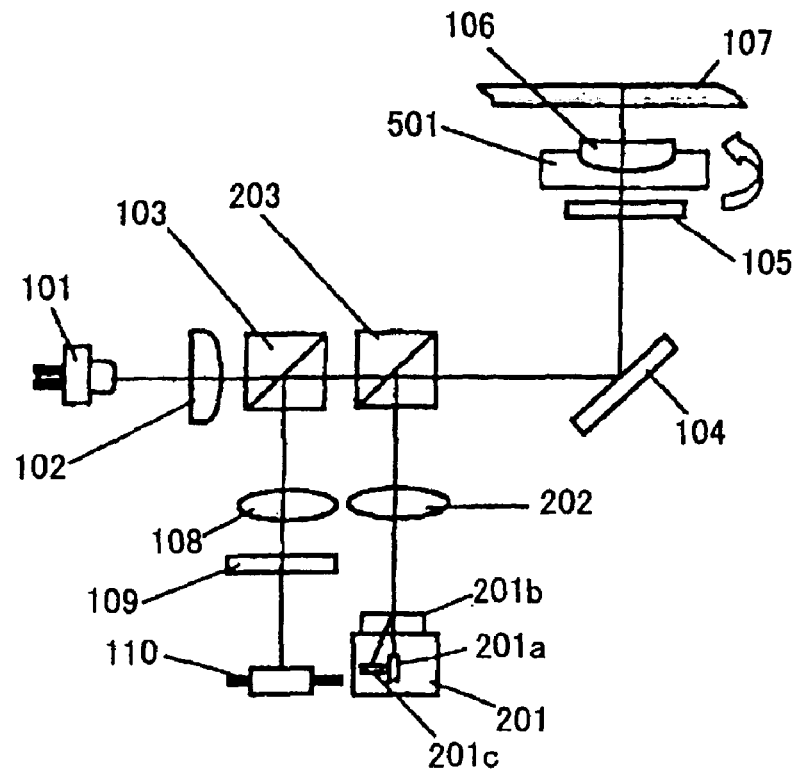
FIG. 6A shows a general configuration of an optical pickup according to a fourth embodiment of the present invention.

FIG. 6A is a diagram showing a general configuration of an optical pickup according to a fourth embodiment of the present invention. In the fourth embodiment, same as in the first embodiment, a light source with an operating wavelength of 407 nm and an object lens of NA: 0.65 are applied for a light-incidence-side substrate having a thickness of 0.6 mm of a blue-system (large storage capacity) optical recording medium; and a light source with an operating wavelength of 660 nm and an object lens of NA: 0.65 are applied for a light-incidence-side substrate having a thickness of 0.6 mm of a DVD-system optical recording medium.

Different points from the first and third embodiments are that a 4-axis actuator which is not the even-th aberration correction device but an odd-th aberration correction device 501 is provided, and, also, a red-system optical system which is a DVD system is made of a finite system instead of an infinite system.

Figure 7A:
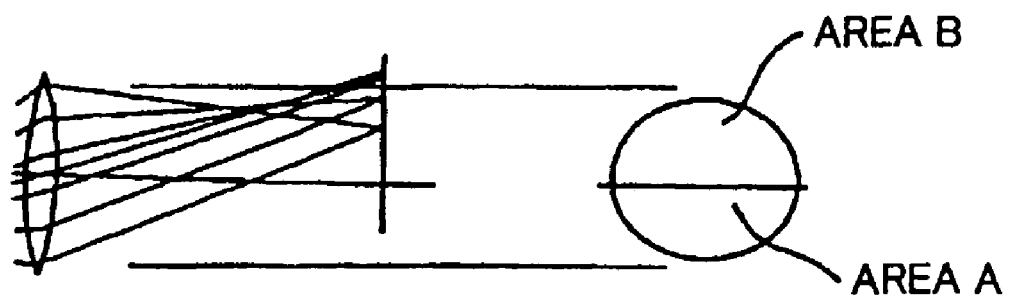
FIGS. 7A through 7F illustrate a principle of an odd-th aberration control scheme according to the present invention.

When various kinds of manufacture errors exist, the odd-th aberration may occur, and the form of the optical spot formed on a recording surface deteriorates. Thereby, the wavefront of beam reflected thereby is also distorted, and an aberration occurs on the light-receiving device 110 through the detection lens 108. FIG. 7A shows this state. When the odd-th aberration occurs in the returning beam which is incident onto the detection lens 108, with respect to the reference wavefront of the returning beam, "delay of wavefront" occurs symmetrically about the optical axis. Thereby, the position which the wavefront delayed with respect to the focus point at which the reference wavefront focuses becomes in a defocus state which forms an imbalanced side robe. Then, "the situation of wavefront aberration" can be known by taking out the difference of the delayed wavefront and the advanced wavefront, and thus, detecting the focal state.

The odd-th aberration detected by this aberration detection device originates in a tilt of the optical recording medium, various kinds of manufacture errors etc. Accordingly, the detected aberration has a corresponding relationship with these various kinds of manufacture errors, a tilt of the optical recording medium, etc. Therefore, by detecting the aberration in the returning beam as mentioned above, these errors can be known.

Figure 6B:
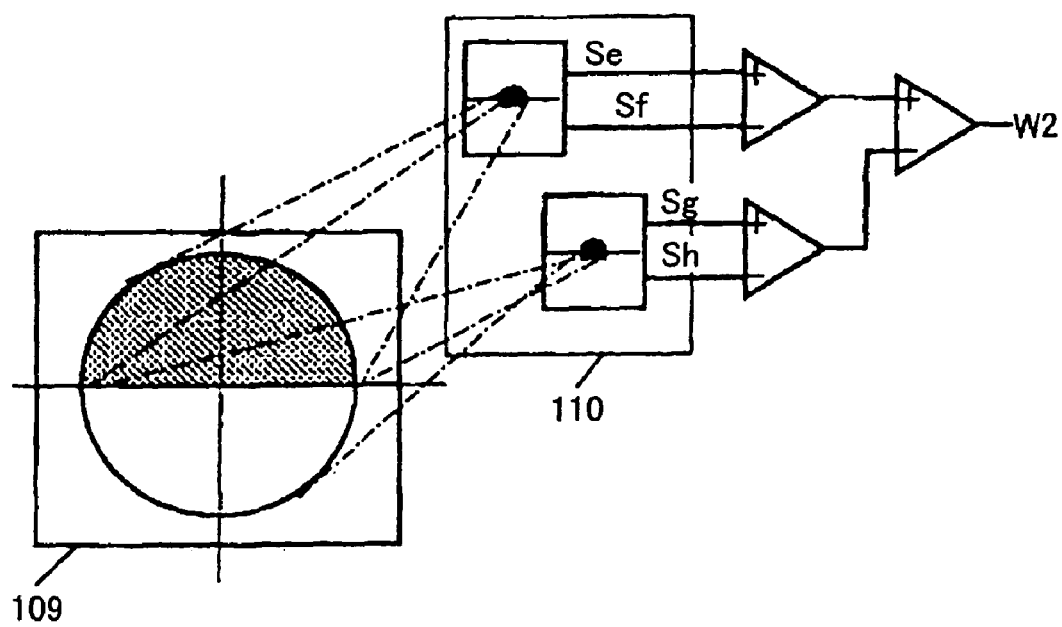
FIGS. 6B through 6D illustrate a light-path separation device employing a hologram and an odd-th aberration detecting device included in the configuration shown in FIG. 6A.
Figure 6C:
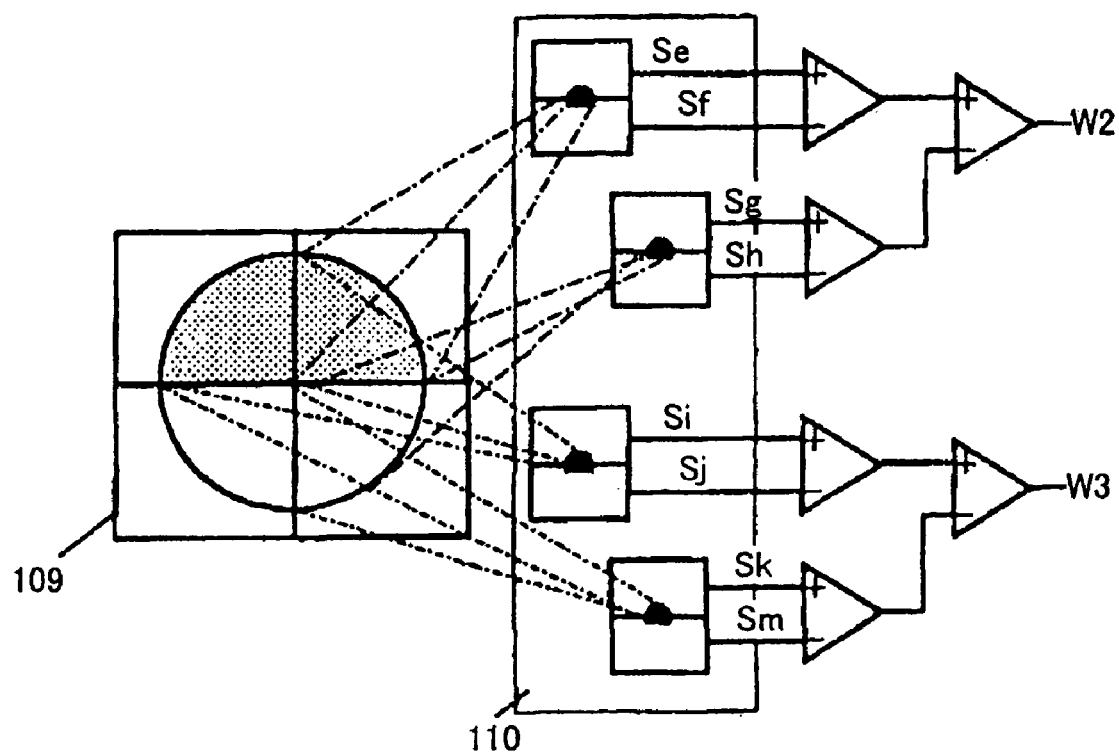

For example, the light-receiving device 110 is configured such as to have separate light-receiving areas, a hologram device is disposed as a beam splitting device, and each beam divided by the hologram device can be detected by the respective separate light-receiving areas as shown in FIG. 6B. The hologram device may have a hologram symmetrically divided in the jitter direction or the tangential direction of the disk-shaped optical recording medium on the plane perpendicular to the optical axis. The light-receiving device 110 includes 2-divided light-receiving devices which detect beams diffracted by the hologram, as shown. The amount of movement of light point images of hologram-diffracted light are detected thereby, and the difference W2 between the difference (Se−Sf) and the difference (Sg−Sh) detected by the respective light-receiving devices is regarded as the odd-th aberration signal, as follows:

$$W2=(Se-Sf-Sg+Sh)$$

where the situation that (W2=0) means that no aberration occurs. Furthermore, as shown in FIG. 6C, in case the hologram is divided symmetrically in the jitter direction and also the tangential direction on the plane perpendicular to the optical axis into four divisions, the odd-th aberration on each direction is detectable. In this case, the odd-th aberration signal occurring in the jitter direction is expressed by the following formula:

$$W2=(Se-Sf-Sg+Sh)$$

The odd-th aberration signal occurring in the radial direction is expressed by the following formula:

$$W3=(Si-Sj-Sk+Sm)$$

where (W2=W3=0) means that no aberration occurs.

The aberration correction device 501 according to the fourth embodiment shown in FIG. 6A is realized by the four-axis actuator which controls the optical axis of an object lens 106 not only in the two directions for focus and tracking, but also on other two directions of tilt control. Thereby, the optical axis of the object lens is controlled in an inclination control manner with respect to the general optical axis of the optical system.

When the inclination of the object lens 106 is changed by this 4-axis actuator as the aberration correction device 501, since the odd-th aberration thus occurs in the beam passing through the aberration correction device 501, the thus-occurring aberration can be used for canceling out the original odd-th aberration to be eliminated. It is assumed that the wavefront aberration which causes the odd-th aberration originating in various kinds of manufacture errors detected by the above-mentioned aberration detection method is such as that shown in FIG. 7B. FIG. 7C shows this wavefront aberration as a 2-dimensional curve. When the inclination of the object lens 106 is thus changed, the wavefront aberration occurs in the beam incident on the object lens accordingly. This wavefront aberration cancels out the original wavefront aberration so that a wavefront aberration as shown in FIG. 7D is obtained as that after the aberration correction. As can be clearly seen therefrom, the original aberration can be remarkably reduced.

Actually, the inclination of the object lens in the aberration correction device 501 is previously set as a reference value at which no aberration occurs and thus the above-mentioned aberration signal can be zero assuming that the object lens has an approximately design median. Then, when any aberration occurs after an actual assembly of the object lens, the above-mentioned object lens inclination should be controlled so that the above-mentioned aberration signal be zero.

Other than the above-mentioned four-axis actuator, a three-axis actuator may be applied instead, i.e., which enables control in inclination on the two directions of focus and tracking, and also, one tilt direction. In this case, correcting performance may be degraded in comparison to the case of employing the four-axis actuator.

Further, according to the fourth embodiment, as the incident beam onto the object lens, a finite system is applied as the red (DVD system) optical system in which the above-mentioned incident beam becomes a divergent beam. As mentioned above, a chromatic aberration may occur when the object lens designed for NA: 0.65 and wavelength of 407 nm is used in a 660 nm wavelength zone. For the purpose of eliminating such a chromatic aberration, there is a method of applying the above-mentioned finite system as the red-system optical system (for DVD) in which the object lens incident beam becomes a divergent beam, whereby the chromatic aberration can be cancelled out.

Moreover, by inserting the coupling lens between the object lens and the light source used in the DVD system according to the fourth embodiment, it becomes possible to shorten the light path of the red-system optical system, as in the second embodiment.

Figure 6D:
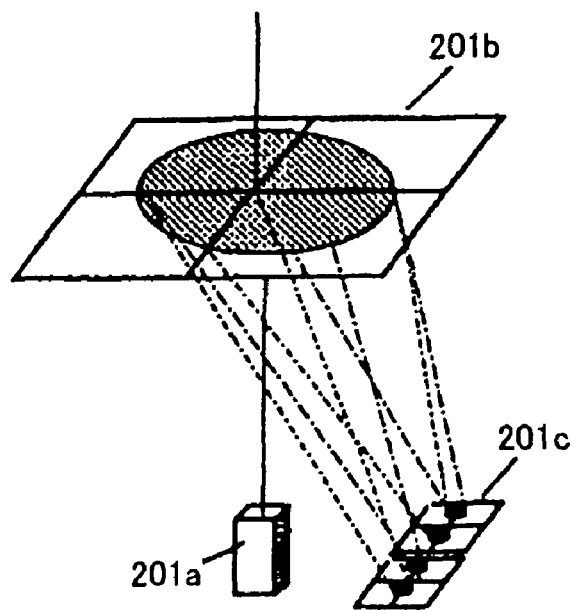

Furthermore, it is possible to detect the odd-th aberration change which originates in an inclination of the DVD-system optical recording medium, etc., and, then, based thereon, a feedback aberration correcting control may be achieved as in the above-mentioned case. The aberration detection method in this case should detect a difference in focus position for the reflected light beam from the optical recording medium as in the blue system. Especially, a beam splitting device on the surface of the hologram 201 as shown in FIG. 6D may be used, in case the hologram unit 201 is used according to the fourth embodiment.

Figure 8A:
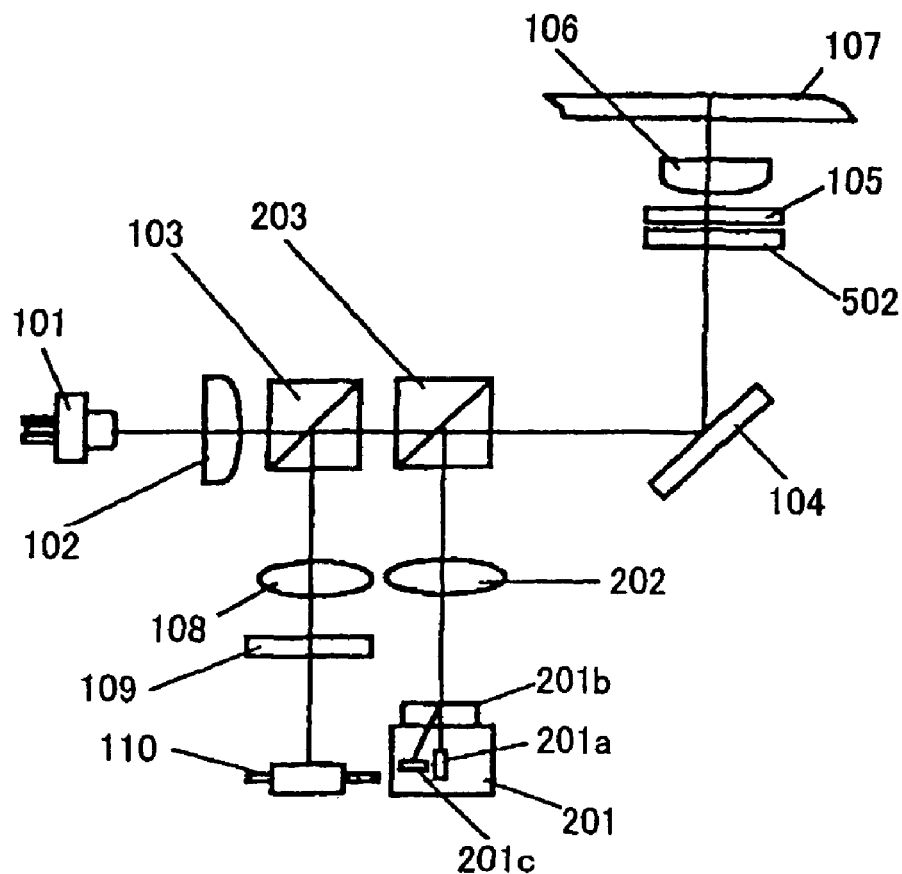
FIG. 8A shows a general configuration of an optical pickup according to a fifth embodiment of the present invention.

FIG. 8A is a diagram showing a general configuration of an optical pickup according to a fifth embodiment of the present invention. In this fifth embodiment, as in the first, third and fourth embodiments described above, a light source with an operating wavelength of 407 nm and an object lens of NA: 0.65 are applied for a light-incidence-side substrate having a thickness of 0.6 mm of blue-system (large storage capacity) optical recording medium, a light source with an operating wavelength of 660 nm and an object lens of NA: 0.65 are applied for a light-incidence-side substrate having a thickness 0.6 mm of DVD-system optical recording medium.

Figure 8B:
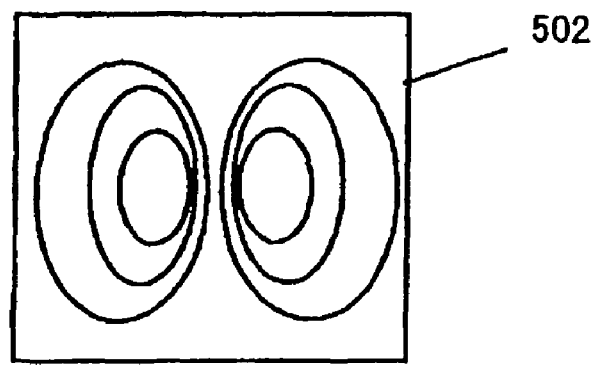
FIG. 8B illustrates an electrode pattern in a liquid crystal device used as an aberration correction device included in the configuration shown in FIG. 8A.

A different point from the above-mentioned fourth embodiment is that a liquid crystal device is employed as the odd-th aberration correction device 502. The odd-th aberration correction device 502 according to the fifth embodiment includes the liquid crystal device and a voltage control device (not shown) to drive the liquid crystal device. As shown in FIG. 8B, the liquid crystal device is divided symmetrically in the horizontal direction in the figure at least one side of transparent electrode, and this liquid crystal device is configured so that a voltage can be applied independently between the electrode portion of each division of electrode, and a common electrode. Thereby, each division of the liquid crystal device can be freely controlled to have the refractive index n through a range between n1 and n2 by controlling the above-mentioned voltage.

By controlling the refractive index n, the phase difference $\Delta n d (2\pi/\lambda)$ can be given to the incident light which passes through each division or light-path difference $\Delta n d$ can be given to the same, where $\Delta n$ denotes the refractive-index difference, and 'd' denotes the cell thickness of the liquid crystal, where the wavelength is referred to as $\lambda$.

Figure 7B:
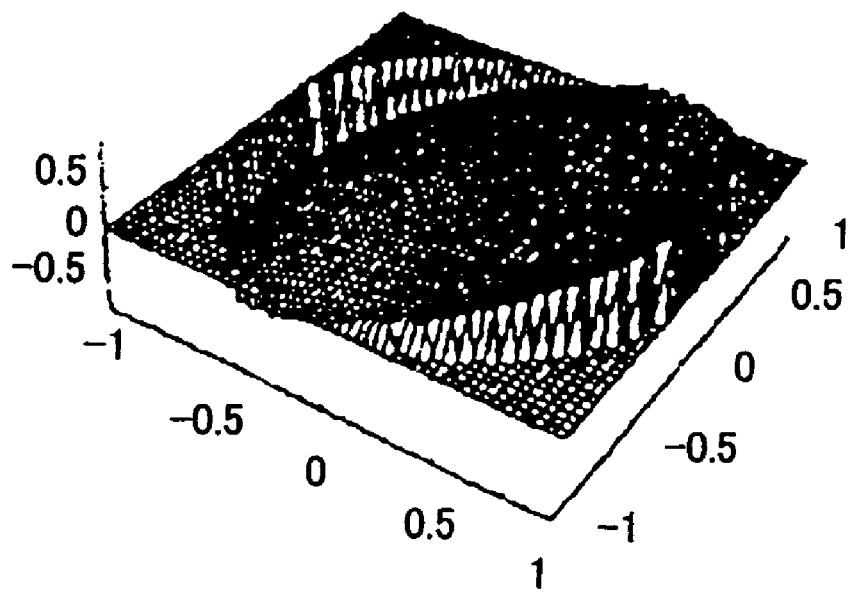
Figure 7C:
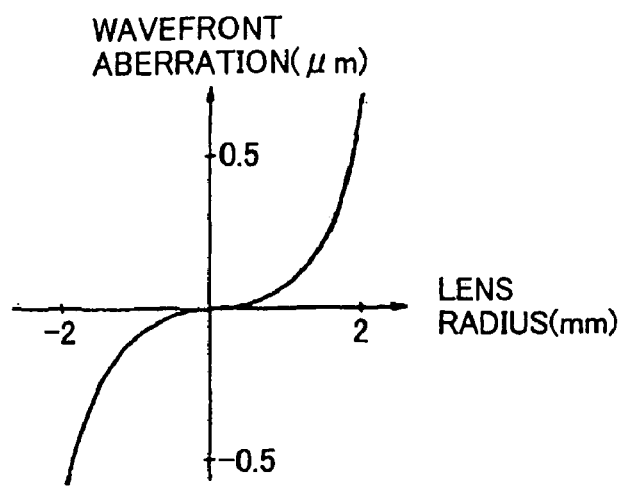
Figure 7D:
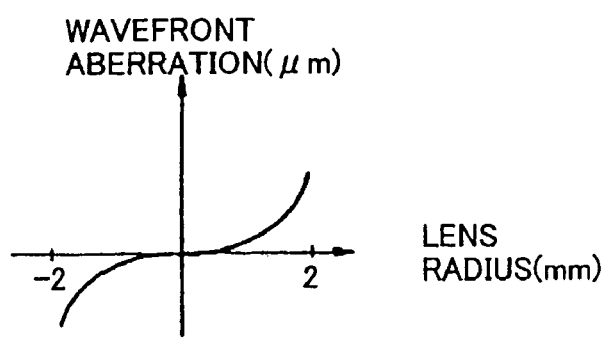
Figure 7E:
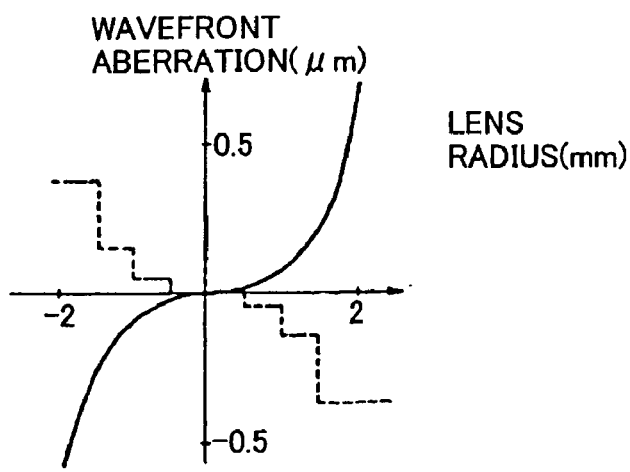
Figure 7F:
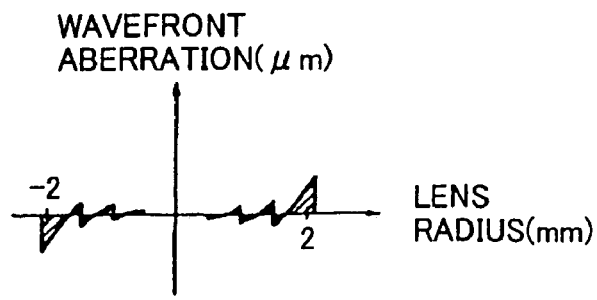

It is assumed that the wavefront aberration, which gives the odd-th aberration originating in various kinds of manufacture errors detected, is that shown in FIG. 7B. The solid line portion of FIG. 7E shows this wavefront aberration expressed as a 2-dimensional curve. When the voltage applied to each divisional electrode of the liquid crystal device is adjusted according to the detected wavefront aberration so that phase difference as shown in the broken line portion of FIG. 7E may be given to the beam incident onto the object lens 106 from the light source side, the above-mentioned wavefront aberration can be cancelled out by the delay of the wavefront thus given to each part of the beam which passes through the liquid crystal device. FIG. 7F shows the sum of the solid line (wavefront aberration) in FIG. 7E, and the broken line of the same (delay of the wavefront caused by the liquid crystal device), i.e., the wavefront aberration after the aberration correction. As can be seen clearly, the original wavefront aberration (solid line portion of FIG. 7E) can be remarkably reduced.

Figure 9A:
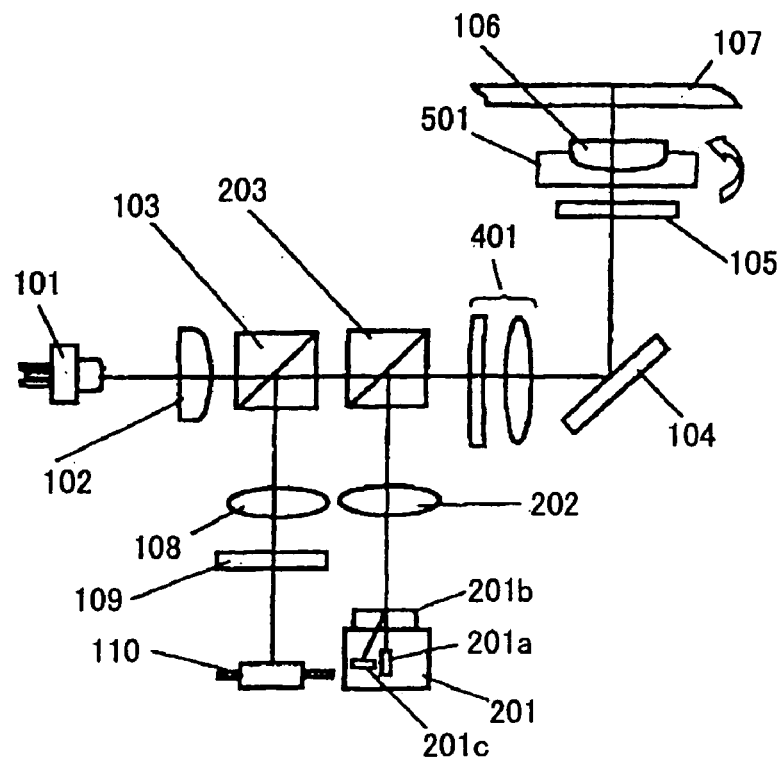
FIG. 9A shows a general configuration of an optical pickup according to a sixth embodiment of the present invention.

FIG. 9A is a diagram showing a general configuration of an optical pickup according to a sixth embodiment of the present invention. According to this embodiment, same as in the above-mentioned first, third through fifth embodiments, a light source with an operating wavelength of 407 nm, and an object lens of NA: 0.65 are applied for a light-incidence-side substrate having a thickness of 0.6 mm of a blue-system (large storage capacity) optical recording medium; and a light source with an operating wavelength of 660 nm and an object lens of NA: 0.65 are applied for a light-incidence-side substrate having a thickness of 0.6 mm of a DVD-system optical recording medium boils, respectively.

However, in the sixth embodiment, different from the first, and third through fifth embodiment, both even-th aberration correction device 401 and odd-th aberration correction device 501 are provided as an aberration correction device. Accordingly, aberrations on both the symmetrical and asymmetrical with the optical axis can be corrected or effectively reduced so that a satisfactory beam spot is formed even when various types of shifts/variations in conditions occur.

Figure 9B:
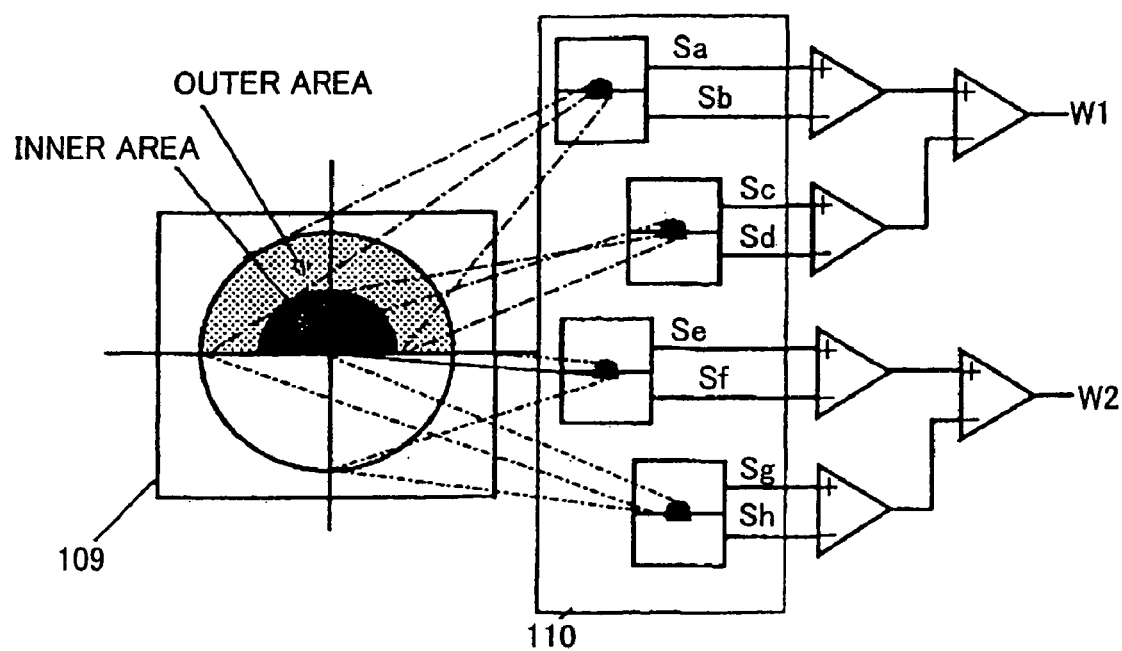
FIG. 9B illustrates a light-path separation device employing a hologram and an even-th aberration detecting device included in the configuration shown in FIG. 9A.

Moreover, the even-th aberration and the odd-th aberration are simultaneously detectable by using a configuration shown in FIG. 9B, as a form of hologram is applied in the beam splitting device 109. Namely, the even-th aberration can be obtained by detecting the difference in the focus position of the reflected beam between the inner and outer cross-sectional areas while the odd-th aberration is obtained by detecting the difference in the focus position of the reflected beam in respective cross-sectional areas obtained through symmetrical division in the jitter direction or the radial direction. Furthermore, by comparing the detection results on the cross-sectional areas obtained by the symmetrical division in the jitter direction and the radial direction, respectively, the aberrations in the jitter direction and radial direction are simultaneously detectable (not shown).

In the sixth embodiment, instead of applying the configuration in which the reflected beam is detected in a cross-sectionally dividing manner, the following configuration may be applied. That is, by changing in a trial basis the state of the aberration correction device, the state in which the magnitude in the read-out signal generated from the beam reflected by the optical recording medium 107 becomes maximum is sought. In this case, the even-th aberration correction device and the odd-th aberration correction device are altered in trail basis in the states thereof in sequence, and, thus, the above-mentioned states should be sought gradually in a trial and error manner or the like.

Figure 10A:
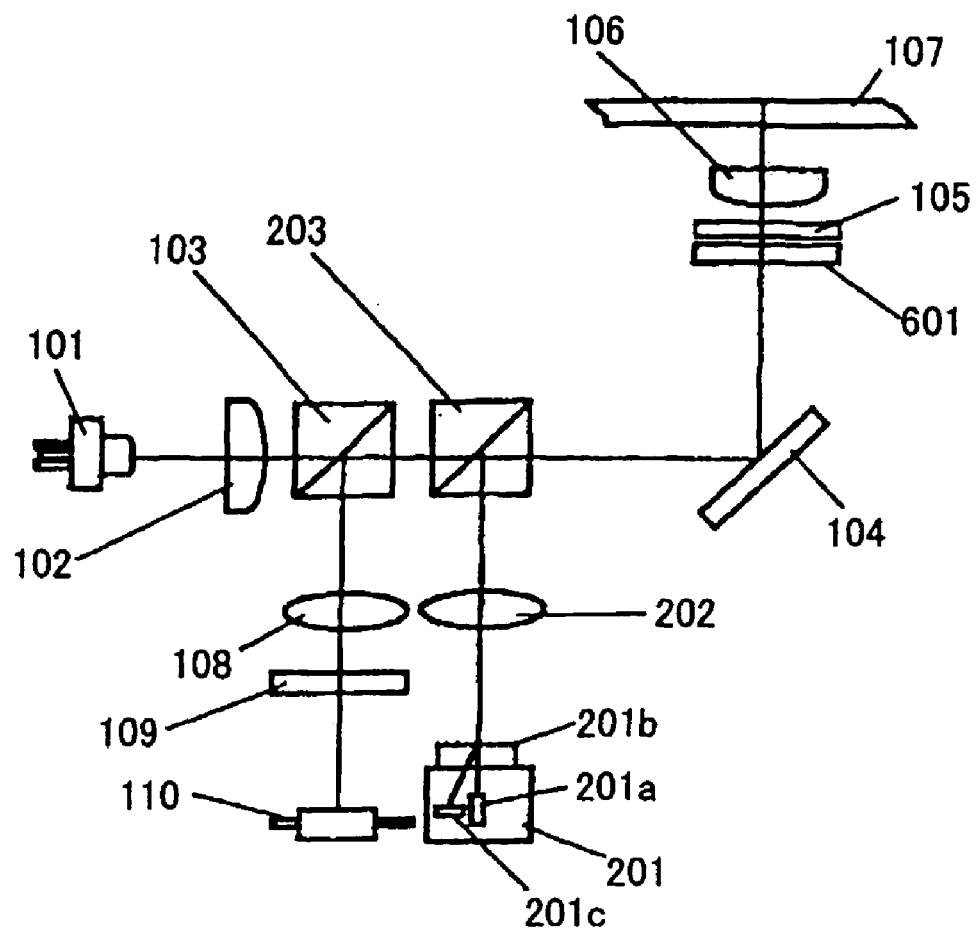
FIG. 10A shows a general configuration of an optical pickup according to a seventh embodiment of the present invention.

FIG. 10A is a diagram showing a general configuration of an optical pickup according to a seventh embodiment of the present invention. In the seventh embodiment, same as in the above-mentioned sixth embodiment, a light source with an operating wavelength of 407 nm and an object lens of NA: 0.65 are applied for a light-incidence-side substrate having a thickness of 0.6 mm of a blue-system (large storage capacity) optical recording medium; and a light source with an operating wavelength of 660 nm and an object lens of NA: 0.65 are applied for a light-incidence-side substrate having a thickness of 0.6 mm of a DVD-system optical recording medium.

Furthermore, both the even-th aberration correction device and the odd-th aberration correction device are provided as an aberration correction device 601. A different point from the sixth embodiment is a point that the even-th aberration correction device and the odd-th aberration correction device are realized by a common single device.

Figure 10B:
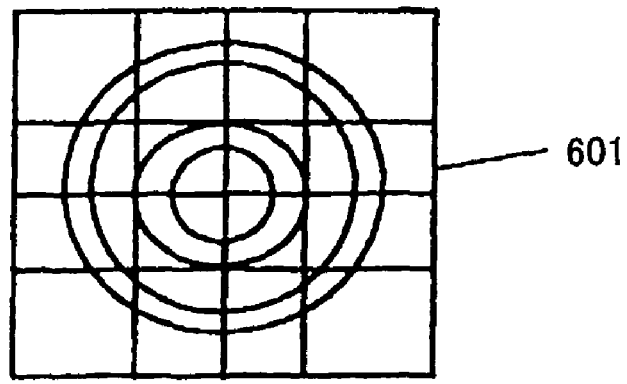
FIG. 10B illustrates an electrode pattern in a liquid crystal device used as an aberration correction device included in the configuration shown in FIG. 10A.

For example, a liquid crystal device may be used as the aberration correction device 601 as shown in FIG. 10B, in which at least one transparent electrode is divided in a horizontally and vertically symmetric manner, and, also, is divided concentrically. In this configuration, a voltage is applied independently among these divisional of electrode portion and a common electrode. Thereby, it is possible to give a phase shift which cancels out the aberration which is a sum total of the even-th aberration and the odd-th aberration which currently occur originally, as in the above-mentioned descriptions of the third and fifth embodiments.

Figure 11:
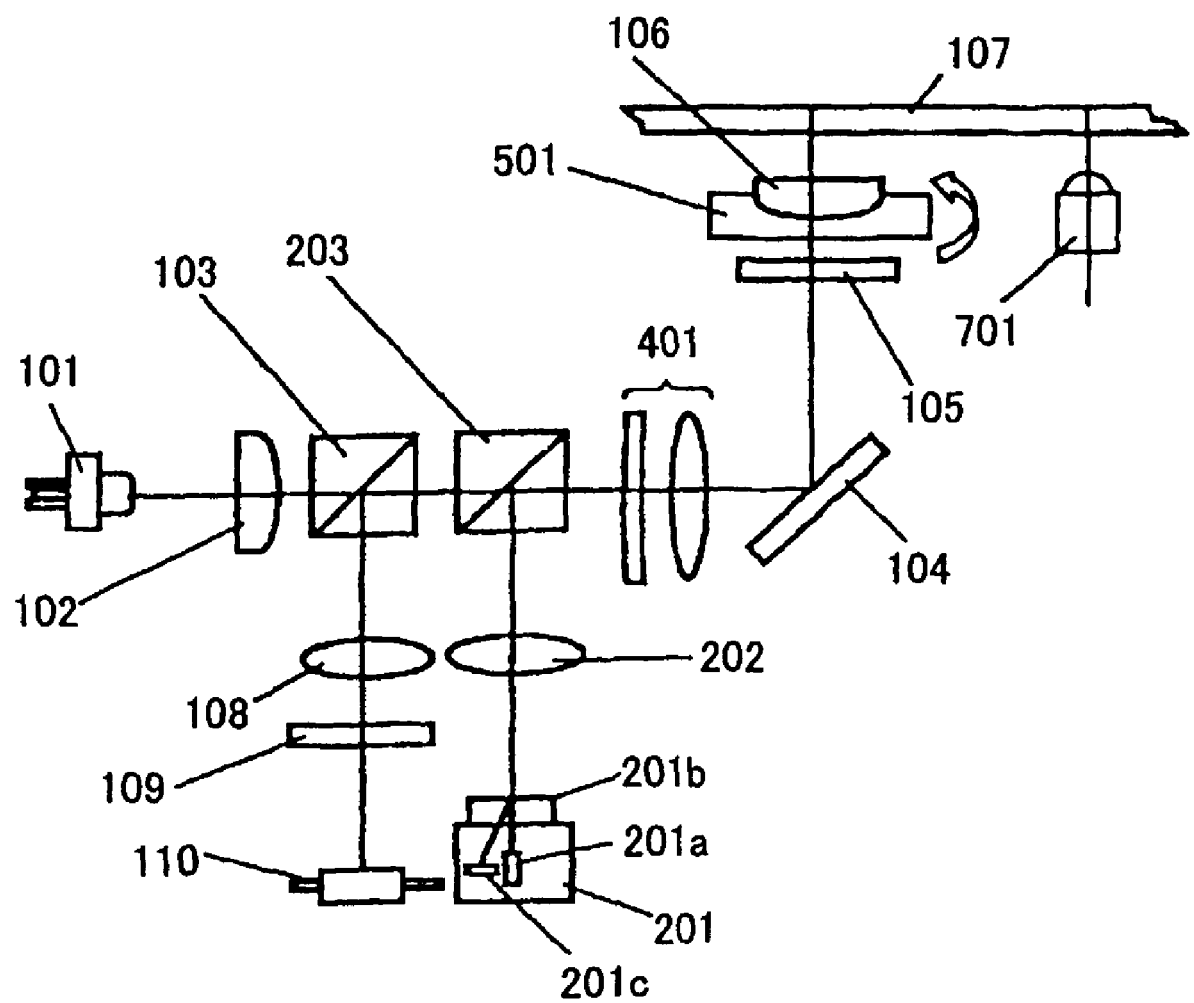
FIG. 11 shows a general configuration of an optical pickup according to an eighth embodiment of the present invention.

FIG. 11 is a diagram showing a general configuration of an optical pickup according to an eighth embodiment of the present invention. In this eighth embodiment, same as in the above-mentioned fifth embodiment, a light source with an operating wavelength of 407 nm and an object lens of NA: 0.65 are applied for a light-incidence-side substrate having a thickness of 0.6 mm of a blue-system (large storage capacity) optical recording medium; and a light source with an operating wavelength of 660 nm and an object lens of NA: 0.65 are applied for a light-incidence-side substrate having a thickness of 0.6 mm of a DVD-system optical recording medium.

Furthermore, both the even-th aberration correction device 401 and the odd-th aberration correction device 501, same as those described above, are provided as an aberration correction device. A different point from the fifth embodiment is that a further odd-th aberration detection device 701 is provided as a separate device, while, as the even-th aberration detection device, a hologram is provided on the beam splitting device 109 having a shape of concentric circles as in the first embodiment.

The odd-th aberration detection device 701 according to the eighth embodiment acquires a feedback signal for correcting/effectively reducing a coma aberration occurring mainly due to a tilt of the optical recording medium 107, and, for this purpose, measures a relative angle of inclination between the optical pickup and the optical recording medium 107. As a configuration of the odd-th aberration detection device 701, an LED light-emitting device and a light-receiving device are formed into a single package, for example, a beam from the LED light-emitting device is applied to the optical recording medium 107, and the inclination of the reflected beam is detected by the light-receiving device.

Moreover, similarly, as the even-th aberration detection device, a sensor which detects the substrate thickness of the optical recording medium 107 may be provided, and, also, the odd-th aberration detection may have a configuration of using the above-mentioned beam splitting device. Furthermore, it is also possible to provide both the even-th aberration detection device and the odd-th aberration detection device on light paths separate from the optical pickup itself (not shown).

Figure 12:
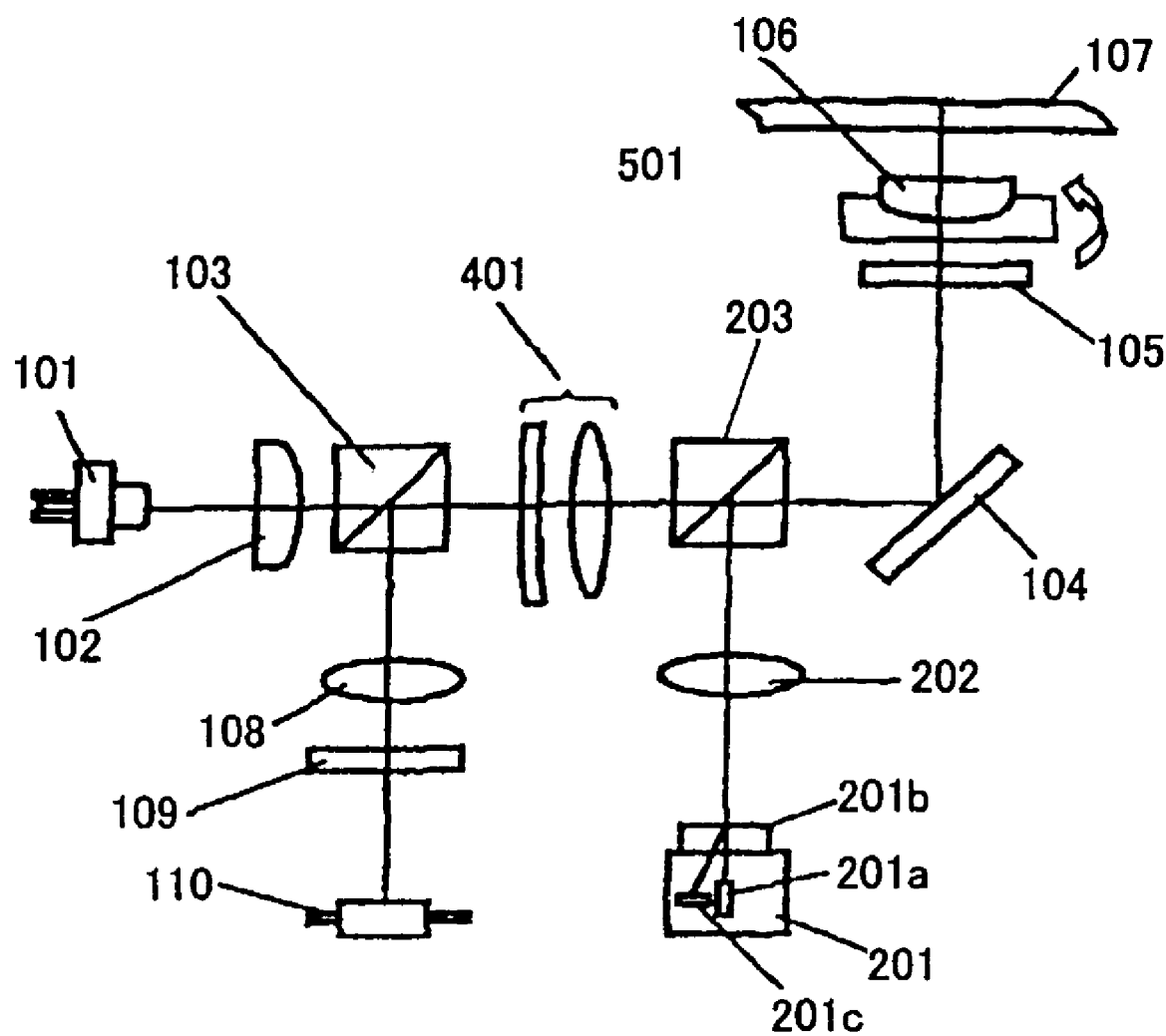
FIG. 12 shows a general configuration of an optical pickup according to a ninth embodiment of the present invention.

FIG. 12 is a diagram showing a general configuration of an optical pickup according to a ninth embodiment of the present invention. In this embodiment, as in the above-mentioned fifth embodiment, a light source with an operating wavelength of 407 nm and an object lens of NA: 0.65 are applied for a light-incidence-side substrate having a thickness of 0.6 mm of a blue-system (large storage capacity) optical recording medium; and a light source with an operating wavelength of 660 nm and an object lens of NA: 0.65 are applied for a light-incidence-side substrate having a thickness 0.6 mm of a DVD-system optical recording medium.

Furthermore, both the even-th aberration correction device 401 and the odd-th aberration correction device 501, same as those described above, are provided as an aberration correction device. Different from the fifth embodiment, the odd-th aberration correction device 501 is disposed on a common light path with the blue-system optical system and red (DVD) optical system, while the even-th aberration correction device 401 is disposed at a position such that it performs a correction effect only on the light of blue wavelength zone. Moreover, similarly, it is also possible that the even-th aberration correction device may be arranged in a common light path with the blue-system optical system and red (DVD) optical system, while only the light of blue wavelength zone be corrected by the odd-th aberration correction device.

Figure 13:
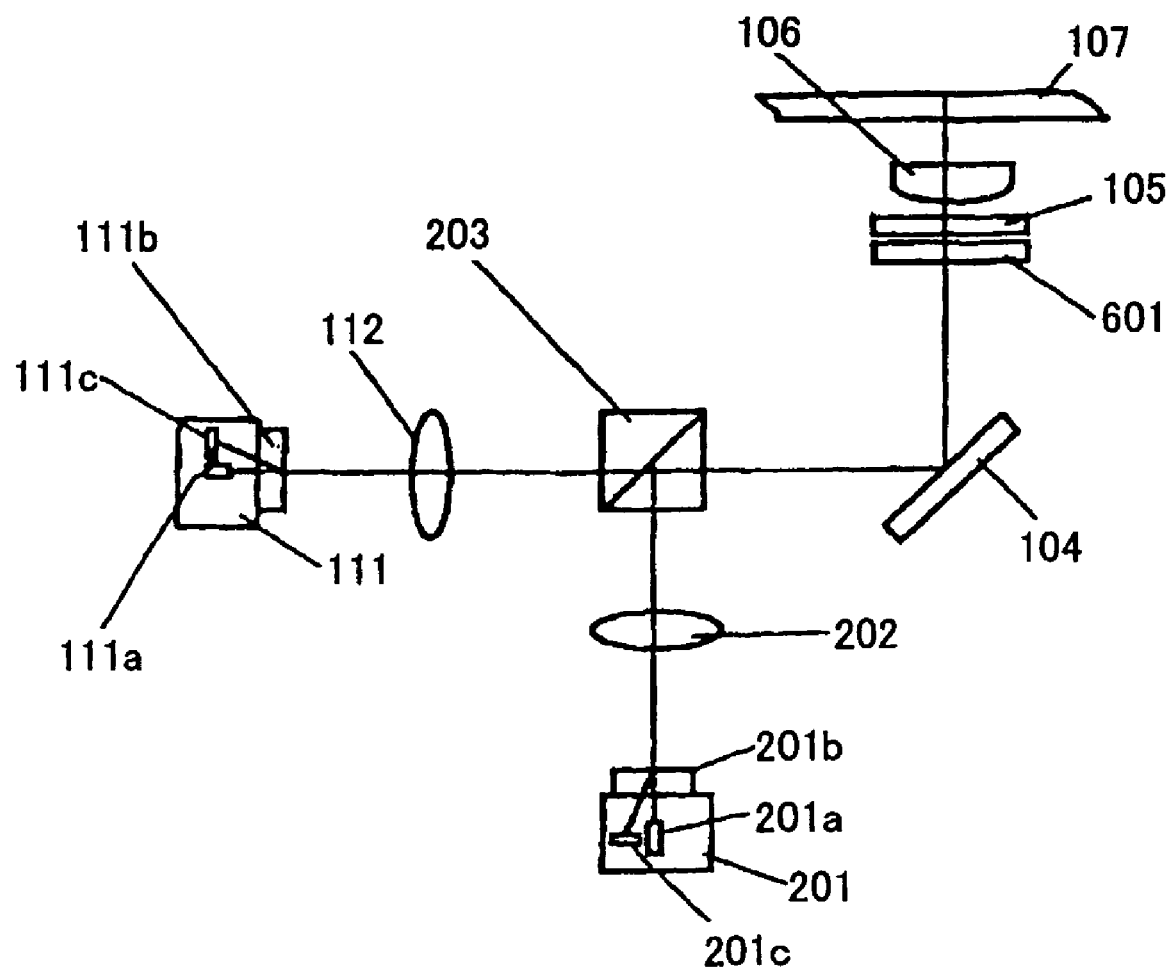
FIG. 13 shows a general configuration of an optical pickup according to a tenth embodiment of the present invention.

FIG. 13 is a diagram showing a general configuration of an optical pickup according to a tenth embodiment of the present invention. In this embodiment, as in the above-mentioned seventh embodiment, a light source with an operating wavelength of 407 nm and an object lens of NA: 0.65 are applied for a light-incidence-side substrate having a thickness of 0.6 mm of a blue-system (large storage capacity) optical recording medium, while a light source with an operating wavelength of 660 nm and an object lens of NA0.65 are applied for a light-incidence-side substrate having a thickness 0.6 mm of a DVD-system optical recording medium.

Furthermore, a liquid crystal device which corrects or effectively reduce the even-th aberration and the odd-th aberration is provided as an aberration correction device 601. A different point from the seventh embodiment is a point that a hologram unit 111 is used also for the blue-system optical system including a light source (semiconductor laser 111*a*), a light-receiving device 111*c*, and a light-path splitting device (hologram 111*b*) in a single package. Thereby, miniaturization of the optical system and simplification in assembly can be attained.

Figure 14A:
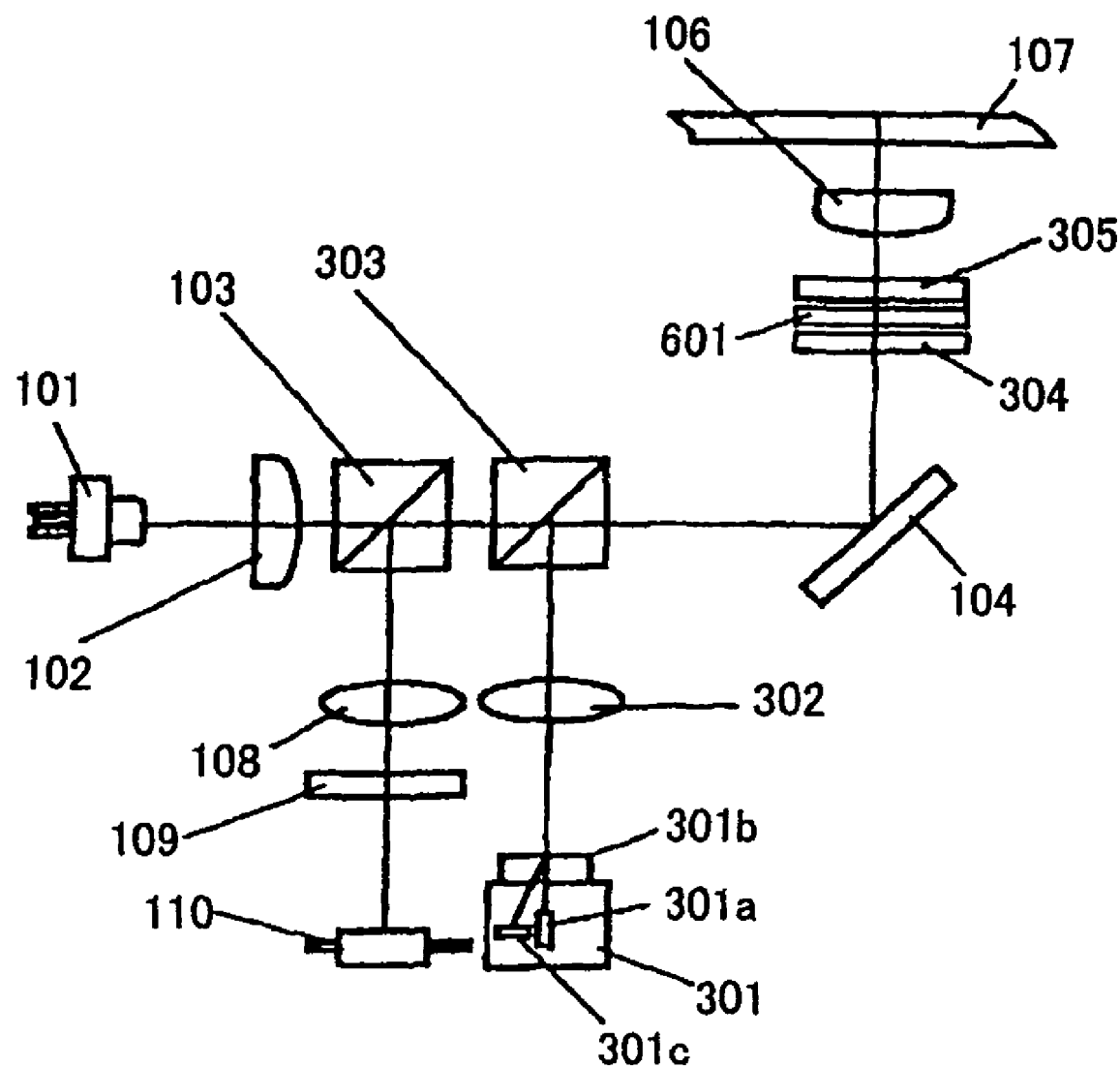
FIG. 14A shows a general configuration of an optical pickup according to an eleventh embodiment of the present invention.

FIG. 14A is a diagram showing a general configuration of an optical pickup according to an eleventh embodiment of the present invention. In the eleventh embodiment, an infrared-system optical system for CD system is provided instead of the red-system optical system of DVD system in each of the above-mentioned first through tenth embodiments of the present invention. Specifically, in the eleventh embodiment, a light source with an operating wavelength of a blue wavelength zone of 407 nm and an object lens of NA: 0.65 are applied for a light-incident side substrate having a thickness of 0.6 mm of a blue-system (large storage capacity) optical recording medium, while a light source with an operating wavelength of an infrared wavelength zone of 780 nm and an object lens of NA: 0.50 are applied for a light-incident side substrate having a thickness of 1.2 mm of a CD-system optical recording medium.

A liquid crystal device which corrects or effectively reduces the even-th aberration and the odd-th aberration as an aberration correction device 601 is provided same as in the above-mentioned seventh through tenth embodiments. Moreover, NA is appropriately switched by using a wavelength selection aperture 304 similar to the same described for the above-mentioned second embodiment. That is, for a light with a wavelength of 407 nm, the aperture 304 provides no effect, while the aperture 304 controls the incident beam directed toward the object lens so that NA: 0.50 can be achieved in the object lens for a light with a wavelength of 780 nm.

Since the even-th and odd-th aberration correction device of the liquid crystal device 601, wavelength selection aperture 304, and the ¼-wavelength plate 305 are all plate-shaped devices, they can be combined integrally. Instead, any two thereof may be combined integrally. Thereby, simplification of an assembly process can be attained. Moreover, since wavelength selection aperture 304 can be created by a thin film which performs wavelength selection as above-mentioned, it can be formed on the surface of the liquid crystal device (aberration correction device 601) or the surface of the ¼-wavelength plate 305 through a well-known deposition process, or so. Thereby, it is possible to achieve an effective reduction in the thickness of the total optical pickup.

Figure 14B:
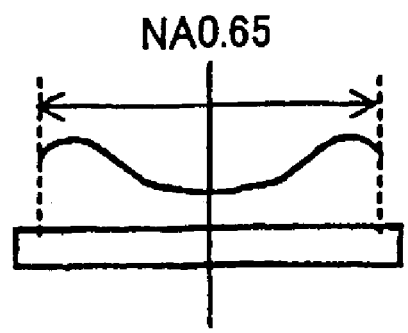
FIGS. 14B through 14E illustrate a state of aberration correction/control/reduction according to the eleventh embodiment for controlling an aberration occurring due to substrate thickness error.
Figure 14C:
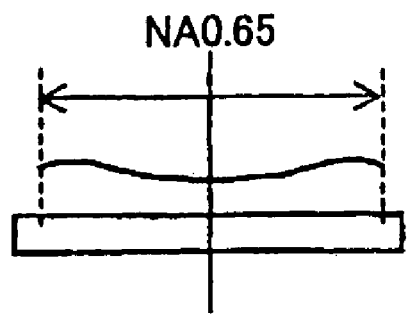
Figure 14D:
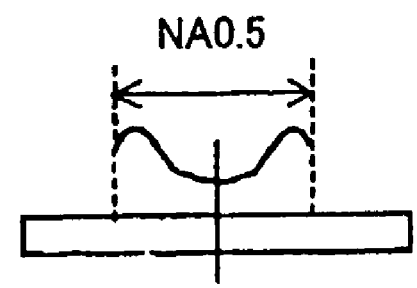
Figure 14E:
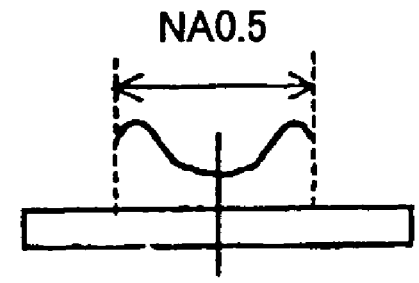

When the object lens designed for the wavelength of 407 nm and the light-incidence-side substrate having thickness 0.6 mm is applied for the wavelength of 780 nm and the light-incidence-side substrate having the thickness of 1.2 mm, a chromatic aberration caused by the difference of wavelength and a spherical aberration caused by the difference in the substrate thickness may occur. However, it is possible, by changing the phase difference in the liquid crystal device, to correct or effectively reduce these even-th aberrations as mentioned above. For example, a wavefront (sectional area) shown in FIG. 14B occurring due to a thickness error of a blue-system optical recording medium is corrected into a wavefront as shown in FIG. 14C. Further, when a CD-system optical recording medium is loaded, a wavefront (sectional area) shown in FIG. 14D when a beam is focused by the object lens for the blue-system optical system after being controlled into NA: 0.50 by the aperture control device is corrected into a wavefront, as shown in FIG. 14E.

Further, according to the eleventh embodiment, a ¼-wavelength plate 305 which transforms each of a light with a wavelength of 407 nm and a light with a wavelength of 780 nm into a linear polarization from a circular polarization, or from a linear polarization into a circular polarization. This ¼-wavelength plate 305 is made of such a crystal that at a certain thickness 't', the phase difference between the ordinary light (refractive index: no) and the extraordinary light (refractive index: ne) become ¼ of the wavelength 407 nm and, also, ¼ of the wavelength of 780 nm. In other words, this crystal satisfies the following formulas:

$$\Delta n1 \times t = \{(2p+1)/4\} \times 407 \ (p=0, 1, \ldots )$$

$\Delta n1$: (no−ne) with respect to the light coming from the light source having the wavelength of 407 nm;

$$\Delta n2 \times t = \{(2q+1)/4\} \times 780 \ (q=0, 1, \ldots )$$

$\Delta n2$: (no−ne) with respect to the light coming from the light source having the wavelength of 780 nm;

By disposing this ¼ wavelength plate 305, the polarization direction of a light exiting the hologram unit 301 for the CD system optical recording medium and a reflected light directed toward the hologram unit 301 from the optical recording medium 107 can be made to intersect perpendicularly. Thus, it becomes possible, by making the polarization directions of the going light and returning light perpendicular, to prevent a noise occurrence due to the returning light directed toward the semiconductor laser 301*a*.

Moreover, in the blue-system optical system of the eleventh embodiment, a sufficient luminous energy can be obtained, and, also, a noise occurrence due to the returning light toward the semiconductor laser 101 can also be reduced, as a polarization splitting optical system is formed by a combination of the polarization beam splitter 103 and the ¼-wavelength plate 305.

Thus, by disposing the ¼-wavelength plate 305 between the dichroic prism 303 which acts as a light-path combining device for combining a light coming from a light source light of a blue wavelength zone, and a light coming from a light source of an infrared wavelength zone, and an object lens 106, it becomes possible that, without increasing the number of components/parts in the whole device, the blue-system optical system has a sufficient luminous energy, and an occurrence of a noise in the semiconductor laser 101 is avoided, while, a noise occurrence due to the returning light directed toward the semiconductor laser 301a can be prevented in the infrared-system optical system for CD system which is a non-polarized optical system.

Figure 15A:
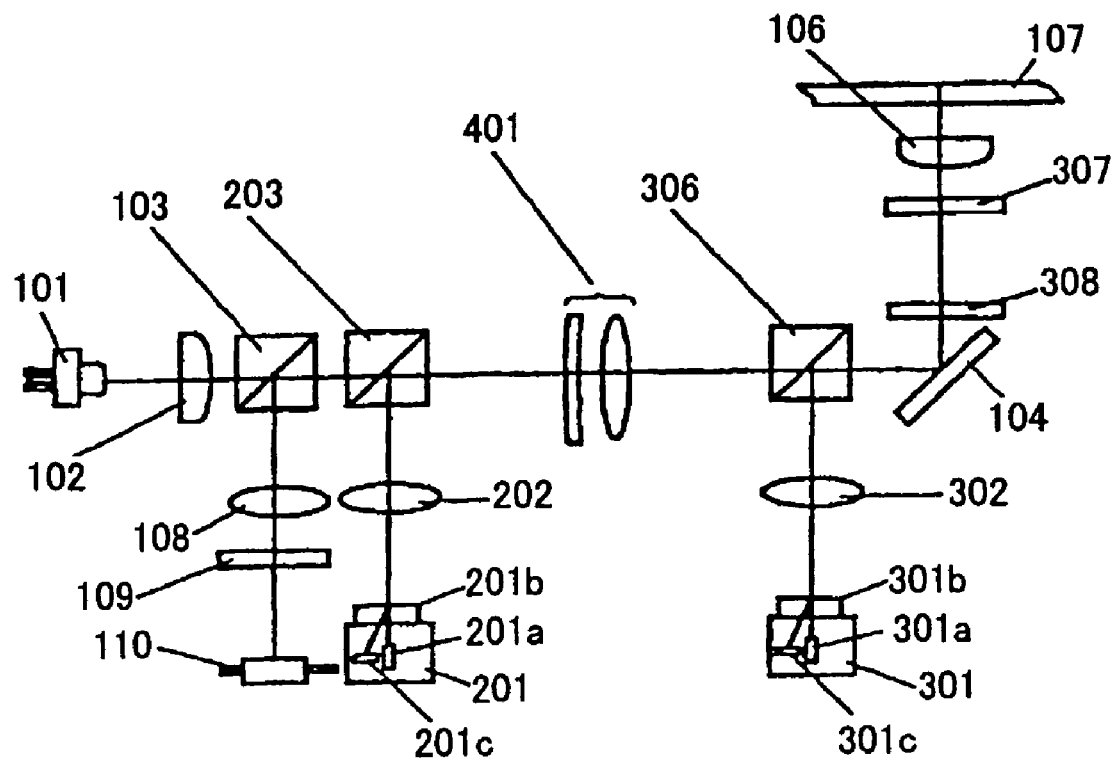
FIG. 15A shows a general configuration of an optical pickup according to a twelfth embodiment of the present invention.

FIG. 15A is a diagram showing a general configuration of an optical pickup in a twelfth embodiment of the present invention. In this embodiment, a light source with an operating wavelength of a blue wavelength zone of 407 nm and an object lens of NA: 0.65 are applied for a light-incident side substrate of a thickness of 0.6 mm for a blue-system (large storage capacity) optical recording medium; a light source with an operating wavelength of a red wavelength zone of 660 nm and an object lens of NA: 0.65 are applied for a DVD-system optical recording medium having a light-incident side substrate with a thickness of 0.6 mm; and a light source with an operating wavelength of an infrared wavelength zone of 780 nm and an object lens of NA:0.50 for a CD-system optical recording medium having a light-incident side substrate with a thickness of 1.2 mm.

The twelfth embodiment provides an optical system compatible among a blue/red (DVD-system) and infrared (CD-system) systems, as a result of connecting the blue-system optical system and red-system (DVD-system) optical system according to the above-mentioned first embodiment with an infrared (CD-system) optical system made of a hologram unit 301 and a collimator lens 302 by means of a dichroic prism 306, and also, using a ¼-wavelength plate 308 dealing with the three wavelengths, and a wavelength selection aperture 307.

Moreover, the dichroic prism 306 has a configuration such that a film performing wavelength selection of transmitting lights of the wavelength of 407 nm and 660 nm to pass therethrough, and reflecting a light with a wavelength of 780 nm, is deposited onto an oblique surface of a triangular prism, and then, is bonded with another triangle prism with the oblique surfaces thereof.

Figure 15B:
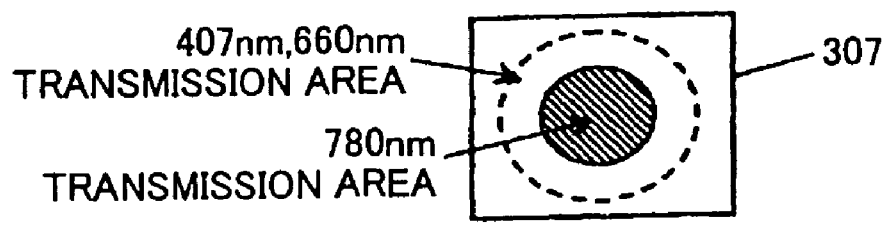
FIG. 15B illustrates transmission areas in a wavelength selection aperture included in the configuration shown in FIG. 15A.

The wavelength selection aperture 307 has a thin film, as shown in FIG. 15B, which provides no effect on lights of wavelengths of 407 nm and 660 nm, while performs aperture control on a light of a wavelength of 780 nm so that it is focused onto the optical recording medium 107 with NA: 0.50. Actually, it is made of a wavelength selection film described for the above-mentioned second embodiment, a transmitting diffraction device, or the like.

Further, according to the twelfth embodiment, the ¼-wavelength plate 308 which transforms all light with a wavelength of 407 nm, light with a wavelength of 660 nm and light with a wavelength of 780 nm into a linear polarization from a circular polarization, or from a linear polarization into a circular polarization. This ¼-wavelength plate 308 is made of such a crystal that at a certain thickness 't', the phase difference between the ordinary light (refractive index: no) and the extraordinary light (refractive index: ne) become ¼ of the wavelength 407 nm, ¼ of the wavelength of 660 nm and, also, ¼ of the wavelength of 780 nm. In other words, this crystal satisfies the following formulas:

$$\Delta n1 \times t = \{(2p+1)/4\} \times 407 \ (p=0, 1, \ldots)$$

$\Delta n1$: (no−ne) with respect to the light coming from the light source having the wavelength of 407 nm;

$$\Delta n2 \times t = \{(2q+1)/4\} \times 660 \ (q=0, 1, \ldots)$$

$\Delta n2$: (no−ne) with respect to the light coming from the light source having the wavelength of 660 nm; and $$\Delta n3 \times t = \{(2r+1)/4\} \times 780 \ (r=0, 1, \ldots)$$

$\Delta n3$: (no−ne) with respect to the light coming from the light source having the wavelength of 780 nm.

By disposing this ¼ wavelength plate 308, the polarization direction of a light exiting the hologram unit 301 for the CD system optical recording medium and a reflected light directed toward the hologram unit 301 from the optical memory medium 107 can be made to intersect perpendicularly. Thus, it becomes possible, by making the polarization directions of the going light and returning light perpendicular, to prevent a noise occurrence due to the returning light toward the semiconductor laser 301a.

Moreover, in the blue-system optical system of the twelfth embodiment, a sufficient luminous energy can be obtained, and, also, a noise occurrence due to the returning light toward the semiconductor laser 101 can also be reduced, as a polarization splitting optical system is formed by a combination of the polarization beam splitter 103 and the ¼-wavelength plate 308.

Moreover, the red (DVD system) optical system provides a polarization splitting optical system by employing a polarization selection hologram in a hologram device 201b. Accordingly, a sufficient luminous energy can be obtained, and, also, a noise occurrence due to the retuning light to the semiconductor laser 201a can be effectively reduced.

In addition, although blue/red (DVD system) optical system has the even-th aberration correction device 401 inserted as shown in FIG. 15A according to the twelfth embodiment, it is also possible that also the odd-th aberration correction device is inserted, or, both of the even-th correction device and the odd-th aberration correction device are inserted therein.

Figure 16:
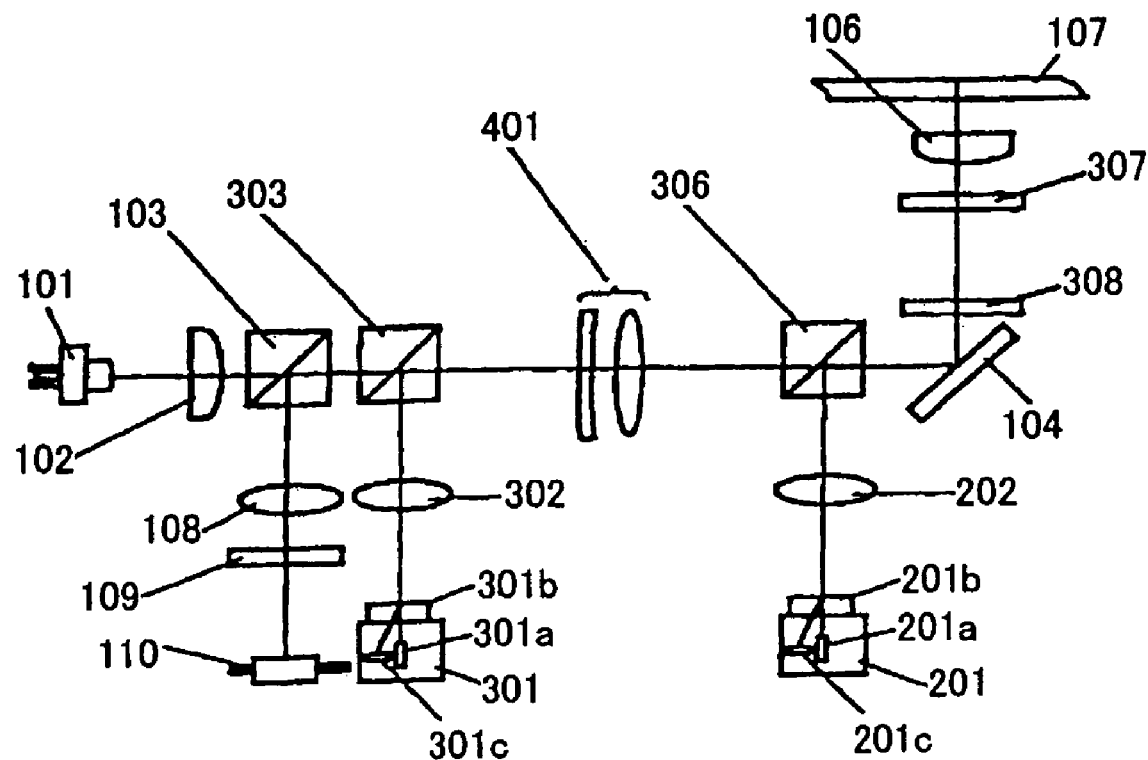
FIG. 16 shows a general configuration of an optical pickup according to a thirteenth embodiment of the present invention.

FIG. 16 is a diagram showing a general configuration of an optical pickup in a thirteenth embodiment of the present invention. In this embodiment, as in the above-mentioned twelfth embodiment, a light source with an operating wavelength of a blue wavelength zone of 407 nm and an object lens of NA: 0.65 are provided for a blue-system (large storage capacity) optical recording medium having 0.6 mm in the thickness of a light-incident side substrate thereof; a light source with an operating wavelength of a red wavelength zone of 660 nm and an object lens of NA:0.65 are provided for a DVD-system optical recording medium having 0.6 mm in the thickness of a light-incident side substrate thereof; and a light source with an operating wavelength of an infrared wavelength zone of 780 nm and an object lens of NA:0.50 are provided for a CD-system optical recording medium having 1.2 mm in the thickness of a light-incident side substrate thereof.

A different point from the twelfth embodiment is that the position is exchanged between the red-system optical system for DVD system and the infrared-system optical system for CD system, as shown in FIG. 16. That is, the blue/infrared (CD system) optical system has the even-th aberration correction device 401 inserted therein. The dichroic prism 206 transmits lights of the wavelengths of 407 nm and 780 nm, while reflects a light with a wavelength of 660 nm.

Figure 17A:
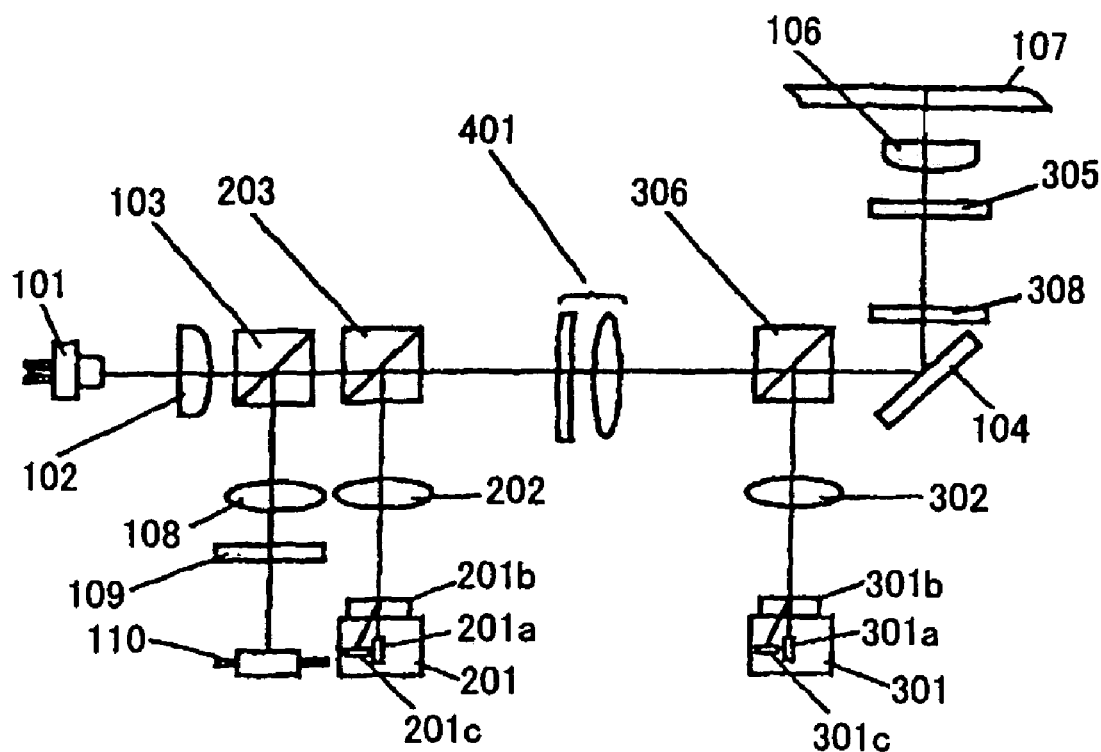
FIG. 17A shows a general configuration of an optical pickup according to a fourteenth embodiment of the present invention.

FIG. 17A is a diagram showing a general configuration of an optical pickup in fourteenth embodiment of the present invention. In this embodiment, a light source with an operating wavelength of a blue wavelength zone of 407 nm and an object lens of NA: 0.85 are provided for a blue-system (large storage capacity) optical recording medium having 0.1 mm in the thickness of a light-incident side substrate thereof; a light source with an operating wavelength of a red wavelength zone of 660 nm and an object lens of NA: 0.65 are provided for a DVD-system optical recording medium having 0.6 mm in the thickness of light-incident side substrate thereof; and a light source with an operating wavelength of an infrared wavelength zone of 780 nm and an object lens of NA: 0.50 are provided for a CD-system optical recording medium having 1.2 mm in the thickness of a light-incident side substrate thereof. The optical pickup in this embodiment can perform information recording, reproduction and deletion on each of the above-mentioned three-types of optical recording media.

Figure 17B:
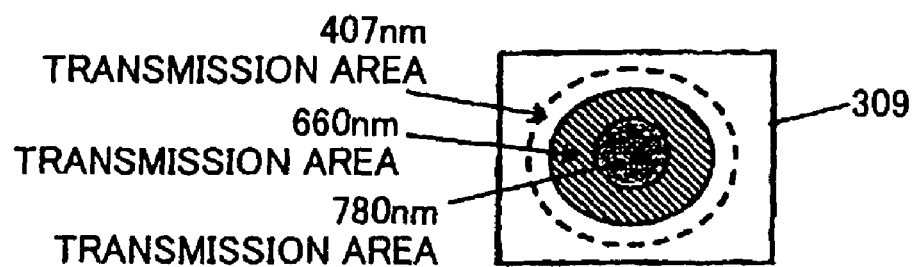
FIG. 17B illustrates transmission areas in a wavelength selection aperture included in the configuration shown in FIG. 17A.

In the fourteenth embodiment, which is the same as the above-mentioned twelfth embodiment described above with reference to FIGS. 15A and 15B, except that as an object lens 106, an object lens for an operating wavelength of 407 nm and NA: 0.85, suitable for 0.1 mm in the thickness of the light-incident side substrate, is applied, and, as a wavelength selection aperture 309, a wavelength selection aperture switchable in NA among 0.85, 0.65, and 0.50 according to the operating wavelength of 407 nm, 660 nm, and 780 nm, respectively, as shown in FIG. 17B, is applied.

Figure 18:
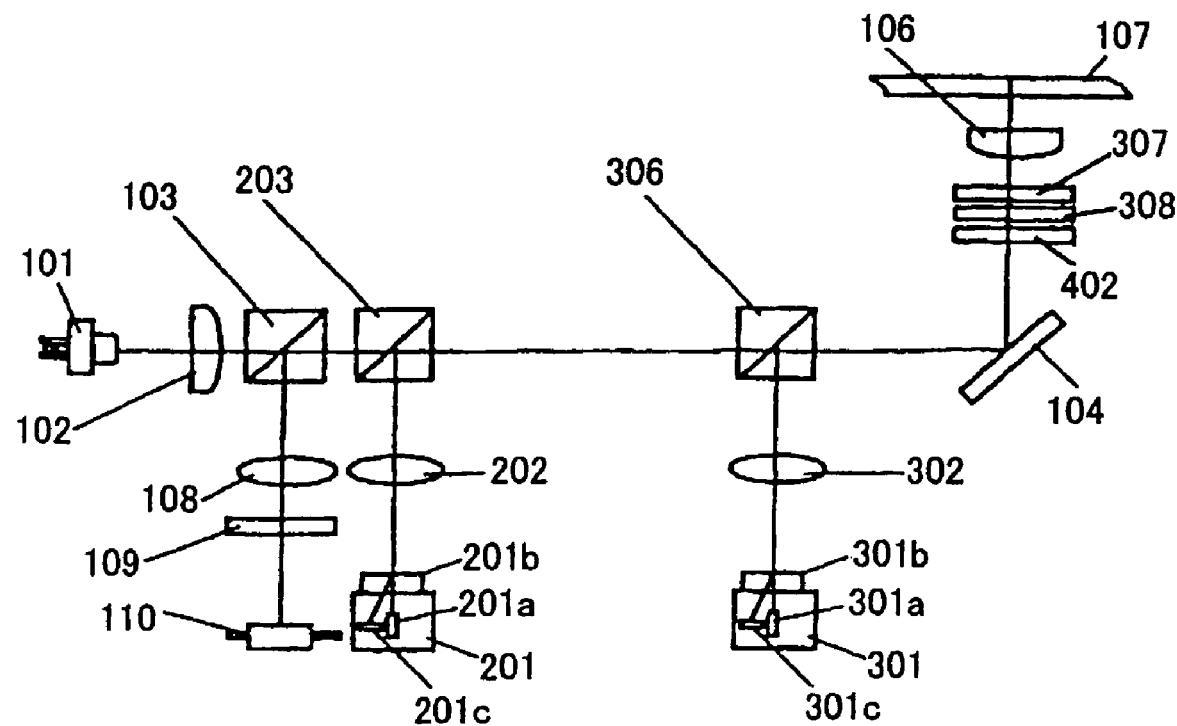
FIG. 18 shows a general configuration of an optical pickup according to a fifteenth embodiment of the present invention.

FIG. 18 is a diagram showing a general configuration of an optical pickup in a fifteenth embodiment of the present invention. In this embodiment, same as in the above-mentioned twelfth embodiment, a light source with an operating wavelength of a blue wavelength zone of 407 nm and an object lens of NA: 0.65 are provided for a the blue-system (large storage capacity) optical recording medium having 0.6 mm in the thickness of a light-incident side substrate thereof; a light source with an operating wavelength of a red wavelength zone of 660 nm and an object lens of NA: 0.65 are provided for a DVD-system optical recording medium having 0.6 mm in the thickness of a light-incident side substrate thereof; and a light source with an operating wavelength of an infrared wavelength zone of 780 nm and an object lens of NA: 0.50 are provided for a CD-system optical recording medium having 1.2 mm in the thickness of a light-incident side substrate thereof. This optical pickup can perform information recording, reproduction and deletion on each of these three types of optical recording media.

A different point from the twelfth embodiment is that the even-th aberration correction device 402 is provided onto a common light path of the three wavelengths of optical systems of blue, red (DVD system) and infrared (CD system), thus, a satisfactory beam spot can be obtained after aberrations are effectively reduced, for each of the three types of optical recording media.

Figure 19:
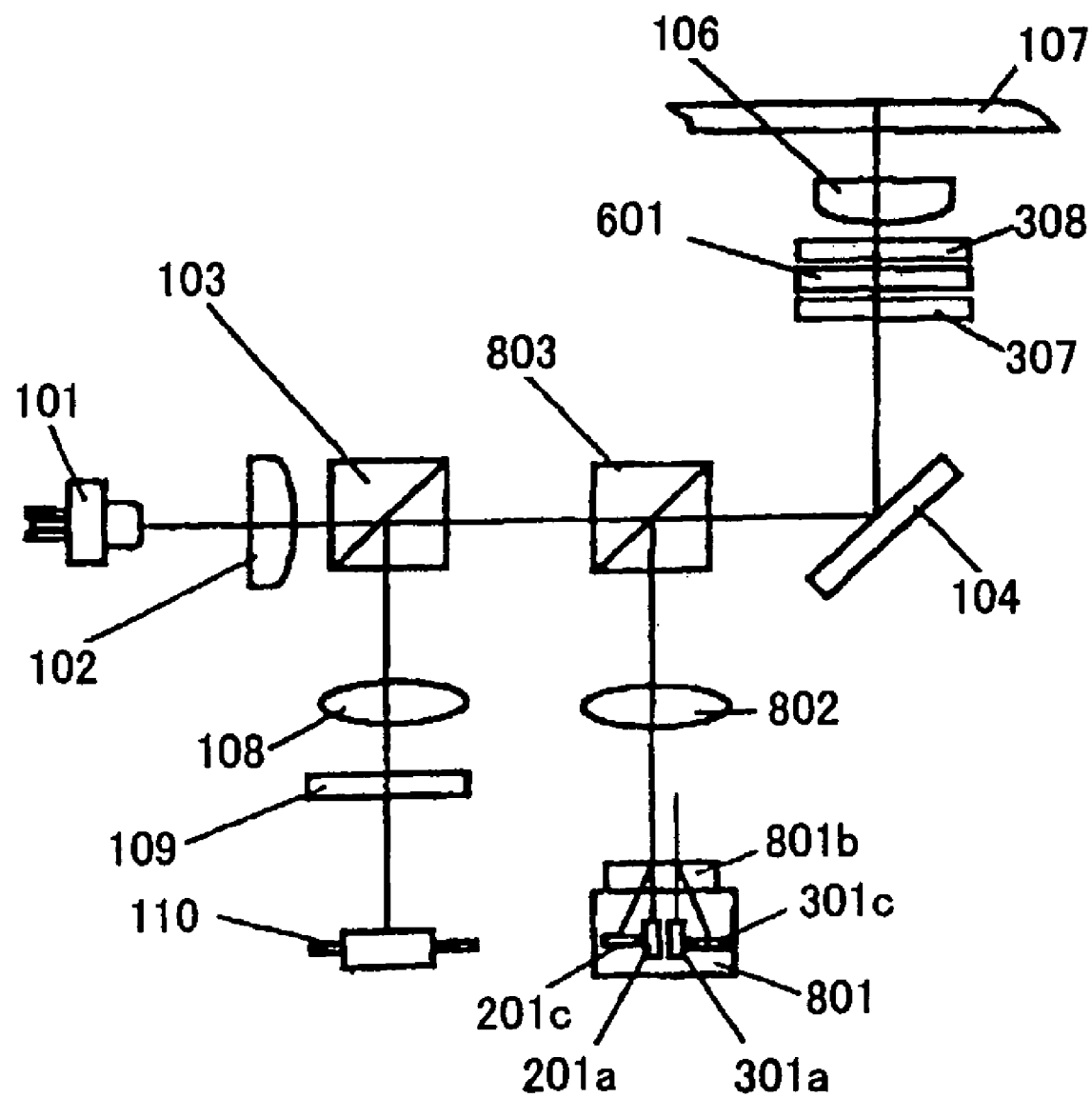
FIG. 19 shows a general configuration of an optical pickup according to a sixteenth embodiment of the present invention.

FIG. 19 is a diagram showing a general configuration of an optical pickup in a sixteenth embodiment of the present invention. In this embodiment, same as in the above-mentioned fifteenth embodiment, a light source with an operating wavelength of a blue wavelength zone of 407 nm and an object lens of NA: 0.65 are provided for a blue-system (large storage capacity) optical recording medium having 0.6 mm in the thickness of a light-incident side substrate thereof; a light source with an operating wavelength of a red wavelength zone of 660 nm and an object lens of NA: 0.65 are provided for a DVD-system optical recording medium having 0.6 mm in the thickness of a light-incident side substrate thereof; and a light source with an operating wavelength of an infrared wavelength zone of 780 nm and an object lens of NA: 0.50 are provided for a CD-system optical recording medium having 1.2 mm in the thickness of a light-incident side substrate thereof. This optical pickup can perform information recording, reproduction and deletion on each of these three types of optical recording media.

As shown in FIG. 19, in this embodiment, an aberration correction device 601 can perform both even-th and odd-th aberration correction operation on each of all the three types of optical recording media. Moreover, a different point from the fifteenth embodiment is that light sources (semiconductor lasers 201a and 301a) and light-receiving devices 201c and 301c for DVD system and CD system, and a hologram unit 801 that contains a hologram 801b as a light-path splitting device are collectively provided in a single package. Thereby, it is possible to realize an optical system for the three different wavelengths in a size-reduced optical pickup. In addition, as the hologram 801b should have a layer having a hologram shape for DVD and another layer having a hologram shape for CD.

Figure 20A:
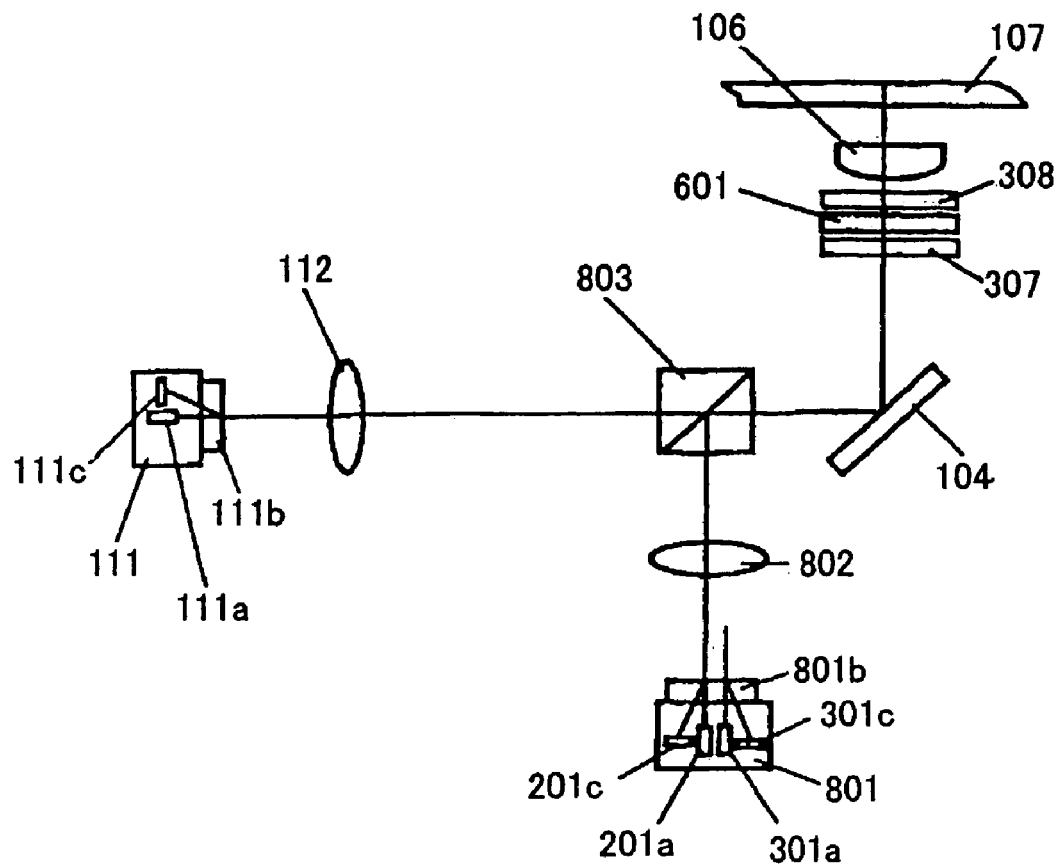
FIG. 20A shows a general configuration of an optical pickup according to a seventeenth embodiment of the present invention.

FIG. 20A is a diagram showing a general configuration of an optical pickup in a seventeenth embodiment of the present invention. In this embodiment, same as in the above-mentioned sixteenth embodiment, a light source with an operating wavelength of a blue wavelength zone of 407 nm and an object lens of NA: 0.65 are provided for a blue-system (large storage capacity) optical recording medium having 0.6 mm in the thickness of a light-incident side substrate thereof; a light source with an operating wavelength of a red wavelength zone of 660 nm and an object lens of NA: 0.65 are provided for a DVD-system optical recording medium having 0.6 mm in the thickness of a light-incident side substrate thereof; and a light source with an operating wavelength of an infrared wavelength zone of 780 nm and an object lens of NA: 0.50 are provided for a CD-system optical recording medium having 1.2 mm of a light-incident side substrate thereof. This optical pickup can perform information recording, reproduction and deletion on each of these three-types of optical recording media.

Figure 20B:
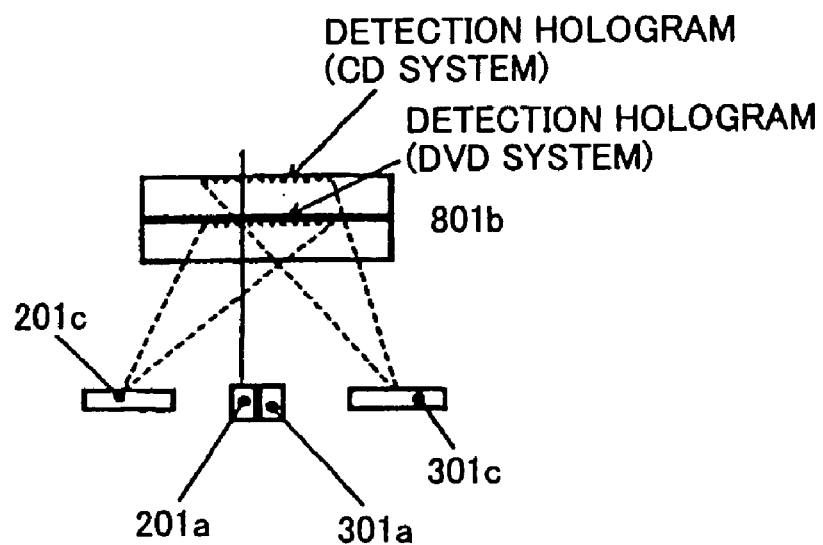
FIG. 20B illustrates a hologram unit shown in FIG. 20A.

In this embodiment, the aberration correction device 601 can perform aberration correction operation on each of the above-mentioned three different wavelengths. Different from the above-mentioned sixteenth embodiment, a hologram unit 801 is used in which the light sources, light-receiving devices, and light-path splitting device for DVD system and CD system are collectively provided in a single package (see FIG. 20B), and, also, as for a blue-system optical system, a light source (semiconductor laser 111a), a light-receiving device 111c, and a hologram 111b are collectively provided in a single package as a hologram unit 111. Thereby, an optical system for these three different wavelengths can be realized in a further size-reduced configuration.

Figure 21:
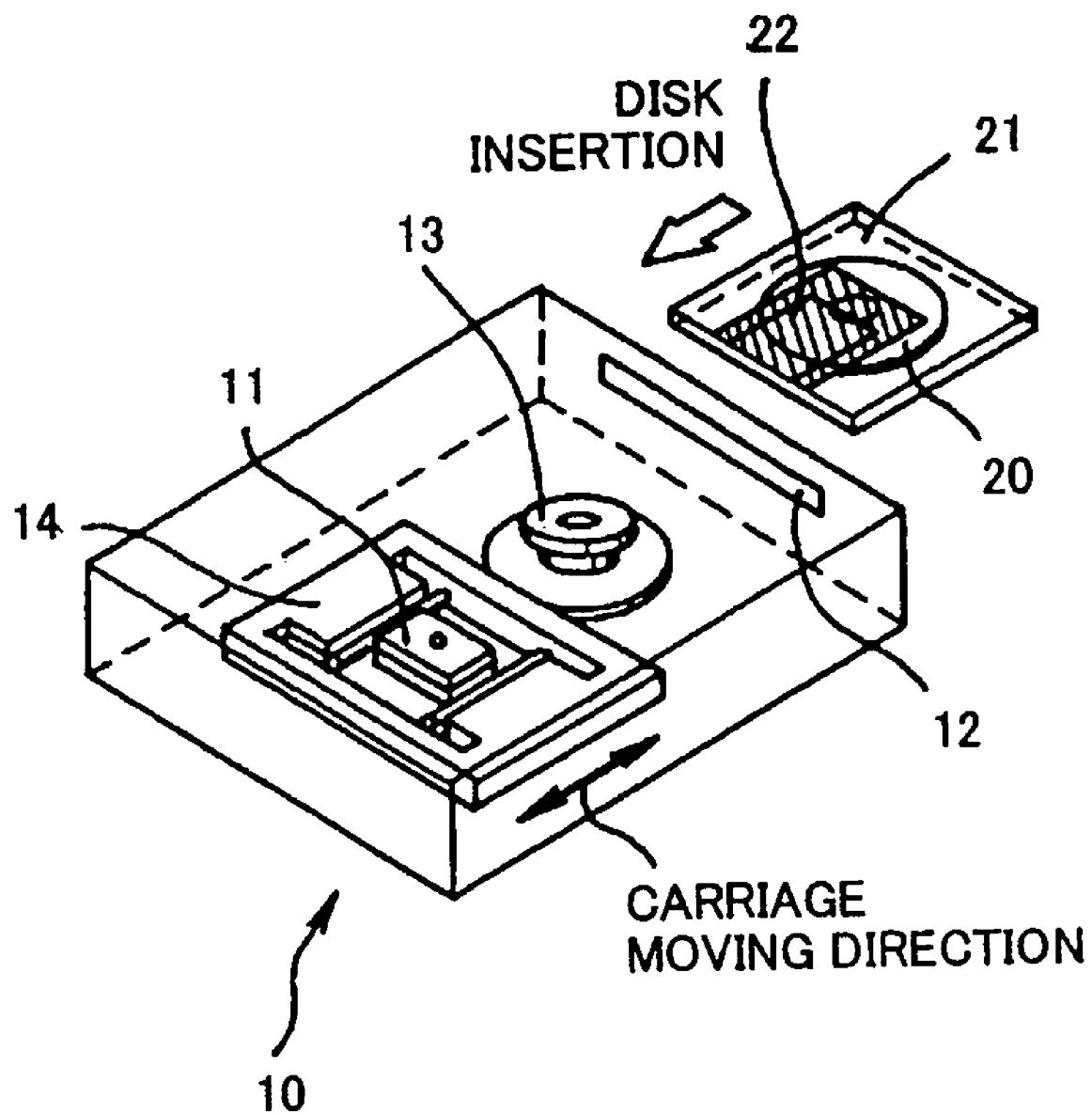
FIG. 21 illustrates an information recording/reproduction apparatus according to each of eighteenth, twenty-fourth, thirty-second and thirty-seventh embodiments of the present invention.

FIG. 21 is an internal perspective view showing a general configuration of an information recording/reproduction apparatus according to an eighteenth embodiment of the present invention. This information recording/reproducing apparatus 10 performs at least one of informational recording, reproduction, and deletion with an optical pickup 11 onto an optical recording medium 20. The optical recording medium 20 is disk-like, and is contained in a cartridge 21 as a protection case. Insertion of the optical recording medium 20 is carried out in a direction of an arrow indicated as "disk insertion" in the figure through an insertion opening 12 in the information recording/reproducing apparatus 10, the disk-like optical recording medium 20 is then rotated by a spindle motor 13, and informational recording, reproduction, or deletion is performed thereon by the optical pickup 11.

As this optical pickup 11, the optical pickup in each of the above-mentioned first through seventeenth embodiments of the present invention may be applied.

An optical information recording/reproduction apparatus according to the present invention such as that shown in FIG. 21 may perform multi-level recording on an optical recording medium with an information recording density multiplication rate of P1 by applying the usage wavelength of 407 nm±10 nm in the blue wavelength zone and NA: 0.6 through 0.7, by applying a multilevel recording technology, where P1>1.8.

Thereby, an optical information processing apparatus having a recording capacity of 22 GB or more can be realized, without using an object lens of as high as NA: 0.85. That is, generally, the storage capacity to an optical recording medium is determined by the diameter of beam spot applied. In case the blue-system optical recording medium of a blue wavelength zone is used, compared with a DVD-system optical recording medium (4.7 GB), the capacity can be raised by the spot diameter ratio (wavelength/NA)$^2$, and thus, 12 GB is achievable. Then, 22 GB is achievable by further applying multi-level recording in the above-mentioned conditions. Consequently, the margin against a possible shift/variation can be increased. Since the depth of focus of an object lens should be managed seriously in proportion to the 2nd power of NA, application of the lens of NA: 0.65 can increase the margin by 1.7 times, compared with the object lens of NA: 0.85.

Alternatively, it is also possible that an optical information processing apparatus according to the present invention performs multi-level recording with the information recording density multiplication rate P2 on an optical recording medium at an operating wavelength 407 nm±10 nm of a blue wavelength zone, with NA: 0.85, where P2>1.8. Thereby, a recording capacity of 40 GB or more is realizable in optical information processing apparatus, without using an object lens of as high as NA: more than 0.85. For example, compared with the case where 40 GB or more is attained using NA>0.9, as mentioned above, a margin can be effectively increased.

As the above-mentioned multi-level recording technology, there is a method of controlling the size of a record mark by controlling the luminous energy of a writing laser beam as disclosed by 'Optoronics (2001)', No. 11, pages 149-154, for example. In addition, generally, by such a multi-level recording technology, although the margin against a change in tilt, defocus, etc. should be reduced'otherwise in order to perform fine control of the size of a record mark, a sufficient margin can be created while recording, reproduction, or deletion is performed, by using the even-th aberration correction device and the odd-th aberration correction device according to the present invention described above.

Furthermore, as the optical recording medium applicable to the present invention may be of one having many recording layers collectively, i.e., a multi-layer optical recording medium. The storage/recording capacity increases according to the number of layers in this case. Moreover, an optical recording medium having the information recording surface on both sides thereof may also be applied. Thereby, the capacity is able to be doubled.

In addition, in the description made above for each of the embodiments of the present invention, only the main wavelength is described. However, approximately ±15 nm variation or change therefrom should be allowed in fact. Moreover, there may be an approximately ±0.03 mm error on the substrate thickness on the side of light incidence of the optical recording medium, and, also, a variation of an approximately ±0.05 range should be allowed for NA.

As to a combination of components/parts into a single package as a unit which has been described in the embodiments above, various combinations other than the described ones may be applied. For example, a so-called bulk optical system may be applied in which light path splitting is made for red (DVD system) or infrared (CD system) optical system by a polarization beam splitter, etc. with a blue-system optical system configured into a single unit. Alternatively, an optical system which collectively includes 3 systems of a blue system, a DVD system, and a CD system into one unit may also be applied.

As explained above, according to the present invention an optical device/part, such as a aberration correction device is used in common so that the number of parts/components is effectively reduced, while a satisfactory beam spot can be formed on the information recording surface of each of a blue-system optical recording medium, a DVD-system optical recording medium, and a CD-system optical recording medium, i.e., in three generations. Further, effective correction/reduction in aberration, otherwise occurring at a serious level due to manufacture error or so, according to the present invention enables achievement of a high-reliable, size-reduced optical pickup.

Figure 22:
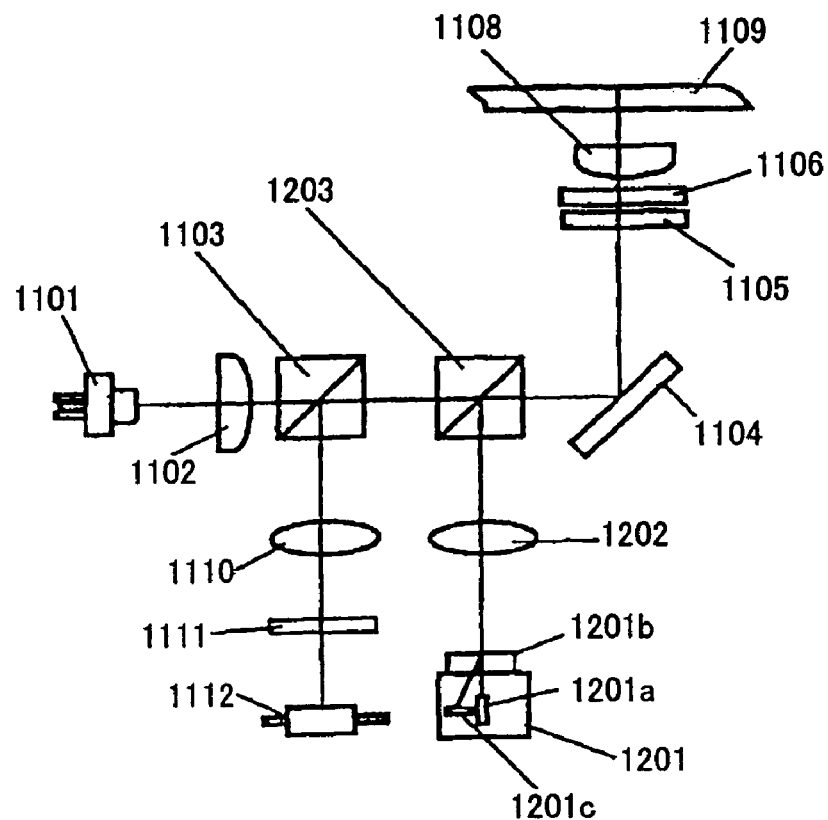
FIG. 22 shows a general configuration of an optical pickup according to a nineteenth embodiment of the present invention.

FIG. 22 is a diagram showing a general configuration of an optical pickup in a nineteenth embodiment of the present invention. In this embodiment, information recording, reproduction or deletion is performed on each of the following two types of optical recording media: one type in which a light source with an operating wavelength of a blue wavelength zone of 407 nm and NA: 0.67 are applied to a light-incident-side substrate having a thickness of 0.6 mm of a blue-system (large scale) optical recording medium; and the other type in which a light source with an operating wavelength of 660 nm and NA: 0.65 are applied to a light-incident-side substrate having a thickness of 0.6 mm of DVD-system optical recording medium.

As shown in FIG. 22, essential parts of this optical pickup includes a blue optical system through which a light in a blue wavelength zone passes including a semiconductor laser 1101 which is a light source of the blue wavelength zone, a collimator lens 1102, a polarization beam splitter 1103, dichroic prisms 1203 and 1303, a deflection prism 1104, a phase correction device 1105, a ¼-wavelength plate 1106, an object lens 1108, a detection lens 1110, a beam splitting device 1111 and a light-receiving device 1112; and a red optical system for DVD system through which a light in a red wavelength zone passes including a hologram unit 1201, a collimator lens 1202, the dichroic prism 1203, the deflection prism 1104, the phase correction device 1105, the ¼-wavelength plate 1106, and the object lens 1108. That is, the dichroic prism 1203, the deflection prism 1104, the phase correction device 1105, the ¼-wavelength plate 1106, and the object lens 108 are the common parts between these two optical systems.

The above-mentioned object lens 1108 is designed in a manner such as to form a wavefront having the minimum aberration on the blue-system optical recording medium expecting a light source with an operating wavelength of a blue wavelength zone of 407 nm, NA: 0.67, and having a light-incident-side substrate having a thickness of 0.6 mm.

First, a case where information recording, reproduction or deletion is performed on a blue-system optical recording medium expecting a light source with an operating wavelength of a blue wavelength zone of 407 nm and NA: 0.67, and having 0.6 mm in the thickness of the light-incident-side substrate thereof will now be described. A divergent beam in a linear polarization emitted from the semiconductor laser 1101 with wavelength of 407 nm is transformed into an approximately parallel beam by means of the collimator lens 1102, passes through the polarization beam splitter 1103 and the dichroic prism 1203, the light path thereof is deflected 90 degrees by the deflection prism 1104, and it passes through the phase correction device 1105. Then, the beam passes through the ¼-wavelength plate 1106, thus is transformed into a circular polarization, and, then, is focused by the object lens 1108 onto the optical recording medium 1109 as a minute beam spot. Information recording, reproduction or deletion is performed by this spot on the optical recording medium 1109.

The beam reflected by the optical recording medium 1109 has a circular polarization in the direction opposite to the direction of the same in the above-mentioned going path, and a form of an approximately parallel beam, becomes a linear polarization which intersects perpendicularly with the same in the above-mentioned going path as passing through the ¼-wavelength plate 1106, is reflected by the polarization beam splitter 1103, is transformed into a convergent beam with the detection lens 1110, undergoes deflection splitting by the beam splitting device 1111 into a plurality of beams, and, thus, is incident onto the light-receiving device 1112. Through the light-receiving device 1112, an aberration signal, an information signal, and a servo signal are detected from the incident beam.

Next, a case of recording, reproduction, or deletion of information with the light source with the operating wavelength of a red wavelength zone of 660 nm, the object lens of NA: 0.65, onto the DVD optical recording medium of 0.6 mm in thickness of the light-incident side substrate thickness will now be described. In recent years, generally, a scheme has been employed in which light receiving/emitting devices are installed into a single can (container) in an optical pickup for DVD, and, a hologram unit which splits a beam using a well-known hologram technology.

In FIG. 22, the hologram unit 1201 integrally includes a chip 1201a of a semiconductor laser, a hologram device 1201b, and a light-receiving device 1201c. A 660-nm light which comes out of the semiconductor laser 1201a of this hologram unit 1201 passes through the hologram device 1201b, and is transformed into a parallel beam by the collimator lens 1202. It is then reflected toward the deflection prism 1104 by the dichroic prism 1203, is deflected in the light path by 90 degrees with the deflection prism 1104, has a predetermined phase added thereto by the phase correction device 1104, passes through the ¼-wavelength plate 1106 by which it is transformed into a circular polarization, and then, it is incident on the object lens 1108. Thereby, the beam is focused as forming a minute spot on the optical recording medium 1109, by which spot information recording, reproduction, or deletion is performed on the optical recording medium 1109.

Figure 23:
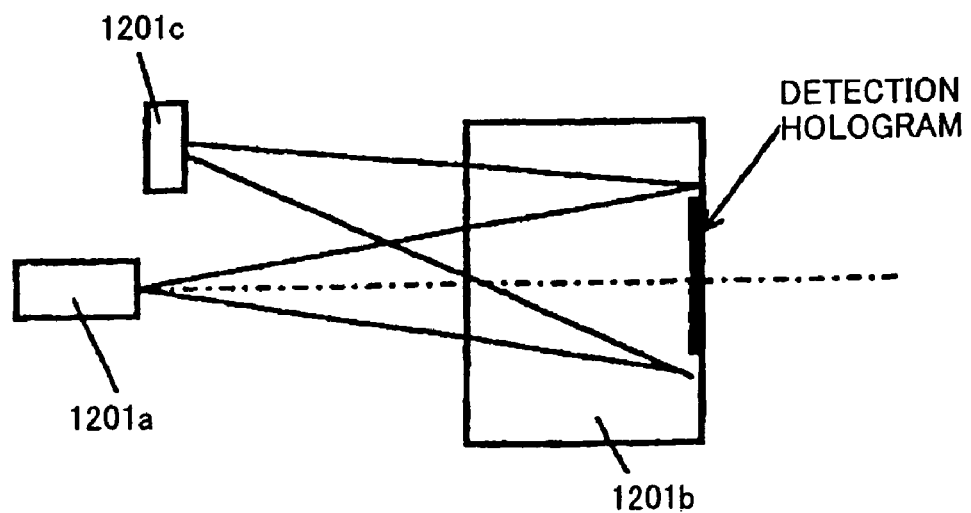
FIG. 23 illustrates a hologram unit shown in FIG. 22.

The beam reflected by the optical recording medium 1109 is deflected by the deflection prism 1104, is reflected by the dichroic prism 1203, is condensed by the collimator lens 1202, and, as shown in FIG. 23, the light reflected by the optical recording medium 1109 is diffracted toward the light-receiving device 1201c which is contained in the same can as the semiconductor laser 1201a, by the hologram device 1201b, and is received by light-receiving device 1201c. By the light-receiving device 1201c, an aberration signal, an information signal, and a servo signal are detected from the incident light.

In case the configuration of the optical pickup in the nineteenth embodiment is a so-called two-generation-compatible-type optical pickup equipped with the two light sources, i.e., the light of blue wavelength zone and the light of the red wavelength zone for DVD, and achieves this compatibility between the two generations while it does not use an aperture switching device in this case.

Figure 24:
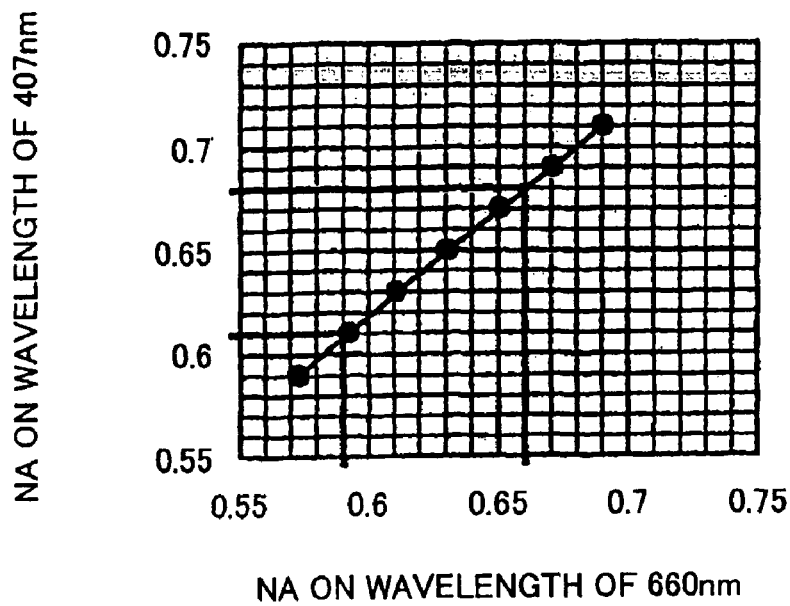
FIG. 24 shows NA correlation occurring when blue wavelength and red wavelength are applied to an object lens with a same incident beam diameter.

Generally, when a beam in an infinite system of the red wavelength zone of the same beam diameter is incident on an object lens which has the best wavefront in the blue wavelength zone, a refraction power decreases and the numerical aperture decreases. In the contrary, compared with the case where the light of red wavelength zone passes through, NA is increased, in addition to the shortening of the wavelength, and, thus, increase in the recording capacity is achieved in the pickup when the light of a blue wavelength zone is applied. On the other hand, as for the DVD generation, NA is set within the range between 0.59 and 0.66 with the same specification in the object lens. FIG. 24 shows, on an example of an object lens which has the following characteristics:

Incidence beam diameter φ: 3.9 mm;
Glass type: BaCD5 (made by Hoya Corp.); and
Optical recording-medium substrate thickness: 0.6 mm, a relationship in NA when lights with a blue wavelength of 407 nm and a red wavelength of 660 nm are made to pass therethrough. From the figure, it is seen that, for example, a light of the red wavelength of a DVD system obtains NA: 0.59 through 0.66, while a light of the blue wavelength of the same incidence beam diameter obtains approximately NA: 0.61 through 0.68.

Accordingly, a blue optical system of the same aperture is provided with in the wavelength of 407 nm NA: 0.67, compared with an optical recording medium of the wavelength of 660 nm for DVD system provided with NA: 0.65. As the recording capacity is proportional to $(NA/\lambda)^2$, where $\lambda$, denotes the wavelength, 2.8 times as large recording capacity can be obtained compared with the DVD-system optical recording medium.

In addition, as for the glass type, not only BaCD5 but also, any one of BaCD12, LaC130, BaF41, NbF1 and so forth may be applied. It is preferable that a glass material for which an aspherical mold formation is allowed. NA with respect to the light of blue wavelength can be controlled also by selection of this glass material.

Figure 25:
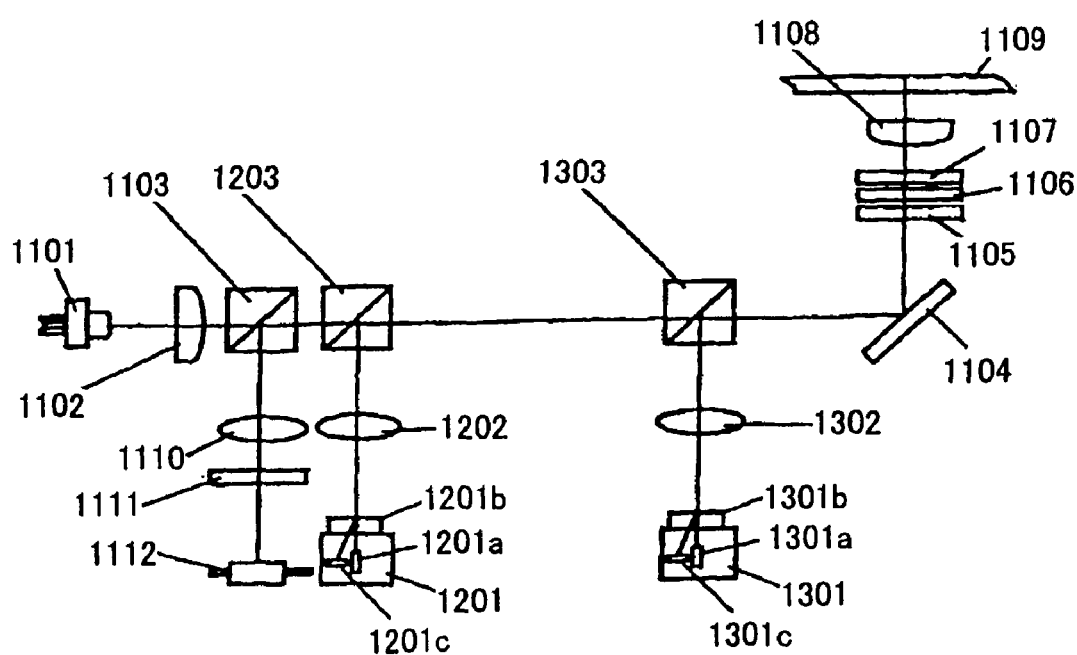
FIG. 25 shows a general configuration of an optical pickup according to a twentieth embodiment of the present invention.

Next, FIG. 25 is a diagram showing a general configuration of an optical pickup in a twentieth embodiment of the present invention. This embodiment can perform information recording, reproduction or deletion on each of the three types of recording media such as: a first type expecting a light source with an operating wavelength of a blue wavelength zone of 407 nm and NA: 0.65, and having a light-incident-side substrate having a thickness of 0.6 mm in a blue-system optical recording medium; a second type expecting a light source with an operating wavelength of a red wavelength zone of 660 nm and NA: 0.65, and having a light-incident-side substrate having a thickness of 0.6 mm in a DVD system optical recording medium; and a third type expecting a light source with an operating wavelength of an infrared wavelength zone of 780 nm and NA: 0.50, and having 1.2 mm in thickness of a light-incident-side substrate in a CD-type optical recording medium.

As shown in FIG. 25, essential parts of this optical pickup includes a blue optical system through which a light in a blue wavelength zone passes including a semiconductor laser 1101 which is a light source of the blue wavelength zone, a collimator lens 1102, a polarization beam splitter 1103, a dichroic prism 1203, a deflection prism 1104, a phase correction device 1105, a ¼-wavelength plate 1106, an aperture switching device 1107, an object lens 1108, a detection lens 1110, a beam splitting device 1111 and a light-receiving device 1112; a red optical system for DVD system through which a light in a red wavelength zone passes including a hologram unit 1201, a collimator lens 1202, the dichroic prisms 1203, and 1303, the deflection prism 1104, the phase correction device 1105, the ¼-wavelength plate 1106, the aperture switching device 1107 and the object lens 1108; and an infrared optical system for CD system through which a light in an infrared wavelength zone passes including a hologram unit 1301, a collimator lens 1302, the dichroic prism 1303, the deflection prism 1104, the phase correction device 1105, the ¼-wavelength plate 1106, the aperture switching device 1107 and the object lens 1108.

That is, the dichroic prisms 1203 and 1303, the deflection prism 1104, phase correction device 1105, ¼-wavelength plate 1106, aperture switching device 1107 and object lenses 108 are the common parts between these two or three optical systems.

First, a case where information recording, reproduction or deletion is performed on a blue-system optical recording medium expecting a light source with an operating wavelength of a blue wavelength zone of 407 nm and NA: 0.67, and having 0.6 mm in the thickness of the light-incident-side substrate thereof will now be described. A divergent beam in a linear polarization emitted from the semiconductor laser 1101 with wavelength of 407 nm is transformed into an approximately parallel beam by means of the collimator lens 1102, passes through the polarization beam splitter 1103 and the dichroic prisms 1203 and 1303, the light path thereof is deflected 90 degrees by the deflection prism 1104, and the beam passes through the phase correction device 1105. Then, the beam passes through the ¼-wavelength plate 1106, thus is transformed into a circular polarization, undergoes aperture control by the aperture switching device 1107 into NA: 0.65, and, then, is focused by the object lens 1108 onto the optical recording medium 1109 as a minute beam spot. Information recording, reproduction or deletion is performed by this spot on the optical recording medium 1109.

The beam reflected by the optical recording medium 1109 has a circular polarization in the direction opposite to the direction of the same in the above-mentioned going path, and a form of an approximately parallel beam, becomes a linear polarization which intersects perpendicularly with the same in the above-mentioned going path as passing through the ¼-wavelength plate 1106, is reflected by the polarization beam splitter 1103, is transformed into a convergent beam with the detection lens 1110, undergoes deflection splitting by the beam division device 1111 into a plurality of beams, and, thus, are incident onto the light-receiving device 1112. Through the light-receiving device 1112, an aberration signal, an information signal, and a servo signal are detected from the incident beam.

Next, a case of recording, reproduction, or deletion of information with the light source with the operating wavelength of a red wavelength zone of 660 nm, the object lens of NA: 0.65, onto the DVD optical recording medium of 0.6 mm in thickness of the light-incident side substrate thickness will now be described. The hologram unit 1201 having the configuration same as that described above for the nineteenth embodiment is used. As shown in FIG. 25, the hologram unit 1201 integrally includes a chip 1201a of a semiconductor laser, a hologram device 1201b, and a light-receiving device 1201c. A 660-nm light which comes out of the semiconductor laser 1201a of this hologram unit 1201, passes through the hologram device 1201b, and is transformed into a parallel beam by the collimator lens 1202. It is then reflected toward the deflection prism 1104 by the dichroic prism 1203 which transmits a blue-wavelength-zone light while reflects a red-wavelength-zone light, is deflected in the light path by 90 degrees with the deflection prism 1104, has a predetermined phase added thereto by the phase correction device 1104, passes through the ¼-wavelength plate 1106 by which it is transformed into a circular polarization, undergoes aperture control by the aperture switching device 1107 into NA: 0.65, and then, it is incident on the object lens 1108. Thereby, the beam is focused as forming a minute spot on the optical recording medium 1109, by which spot information recording, reproduction, or deletion is performed on the optical recording medium 1109. In this case, the effective numerical aperture is on the order of 0.65 with respect to the optical recording medium 1109.

The beam reflected by the optical recording medium 1109 is deflected by the deflection prism 1104, is reflected by the dichroic prism 1203, is condensed by the collimator lens 1202, and, the light reflected by the optical recording medium 1109 is diffracted toward the light-receiving device 1201c which is contained in the same can as the semiconductor laser 1201a, by the hologram device 1201b, and is received by light-receiving device 1201c. By the light-receiving device 1201c, an aberration signal, an information signal, and a servo signal are detected from the incident light.

Next, a case of recording, reproduction, or deletion of information with the light source with the operating wavelength of an infrared wavelength zone of 780 nm, the object lens of NA: 0.50, onto the CD optical recording medium of 1.2 mm in thickness of the light-incident side substrate thickness will now be described. Also in this case, same as in the case for DVD system, a hologram unit 1301 is used for CD system in which light receiving and emitting devices are contained in a single can, and, by using a hologram technology, beam splitting is performed as a common way. As shown in FIG. 25, the hologram unit 1301 integrally includes a semiconductor laser, a hologram device 1301b, and a light-receiving device 1301c. A 780-nm light which comes out of the semiconductor laser 1301a of this hologram unit 1301, passes through the hologram device 1301b, and is transformed into a parallel beam by the collimator lens 1302. It is then reflected toward the deflection prism 1104 by the dichroic prism 1203 which transmits blue-wavelength zone and red-wavelength zone lights while reflects an infrared-wavelength-zone light, is deflected in the light path by 90 degrees with the deflection prism 1104, has a predetermined phase added thereto by the phase correction device 1104, passes through the ¼-wavelength plate 1106 by which it is transformed into a circular polarization, undergoes aperture control by the aperture switching device 1107 into NA: 0.50, and then, it is incident on the object lens 1108. Thereby, the beam is focused as forming a minute spot on the optical recording medium 1109, by which spot information recording, reproduction, or deletion is performed on the optical recording medium 1109.

The beam reflected by the optical recording medium 1109 is deflected by the deflection prism 1104, is reflected by the dichroic prism 1303, is condensed by the collimator lens 1302, and, the light is then diffracted toward the light-receiving device 1301c which is contained in the same can as the semiconductor laser 1201a, by the hologram device 1301b, and is received by light-receiving device 1301c. Using the light-receiving device 1301c, an aberration signal, an information signal, and a servo signal are detected from the incident light.

Figure 26:
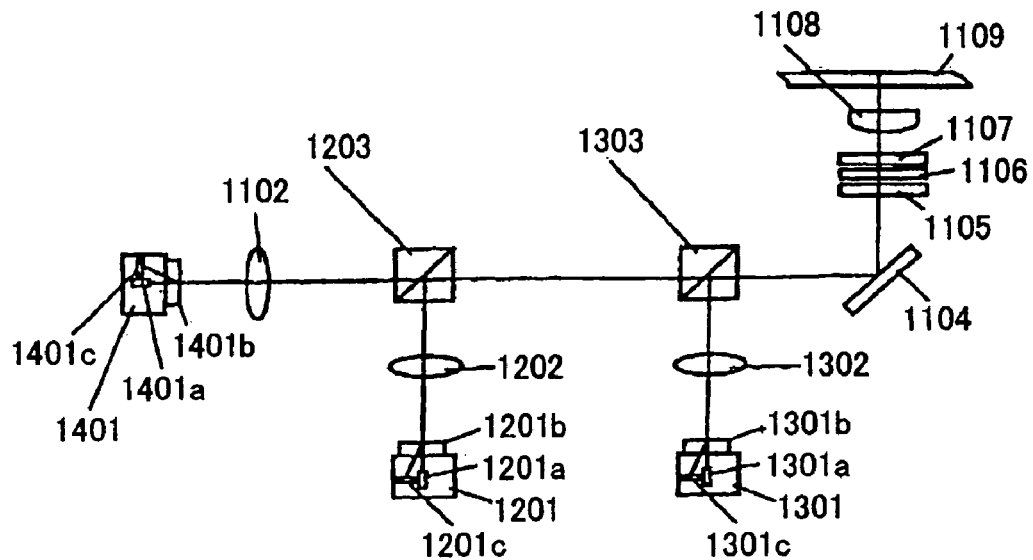
FIG. 26 shows a general configuration of an optical pickup according to a twenty-first embodiment of the present invention.

FIG. 26 is a diagram showing a general configuration of an optical pickup in a twenty-first embodiment of the present invention. In this embodiment, same as in the above-mentioned twentieth embodiment, information recording, reproduction or deletion is performed on each of the three types of optical recording media expecting a light source with an operating wavelength of a blue wavelength zone of 407 nm and NA: 0.65 in a blue-system optical recording medium with 0.6 mm in thickness of light-incident-side substrate thereof; a light source with an operating wavelength of a red wavelength zone of 660 nm and NA: 0.65 in a DVD-system optical recording medium of 0.6 mm in thickness of light-incident-side substrate thereof; and a light source with an operating wavelength of an infrared wavelength zone of 780 nm and NA: 0.50 in a CD-system optical recording medium of 1.2 mm in thickness of light-incident-side substrate thereof.

A different point from the configuration of the optical pickup shown in FIG. 25 is a point that a hologram unit 1401 is used in which a blue optical system is contained, i.e., a light source (semiconductor laser 1401a), a light-receiving device 1401c, and a light-path splitting device (hologram 1401b) in a single package. Thereby, miniaturization of the optical system and simplification in assembly thereof can be attained.

Figure 27:
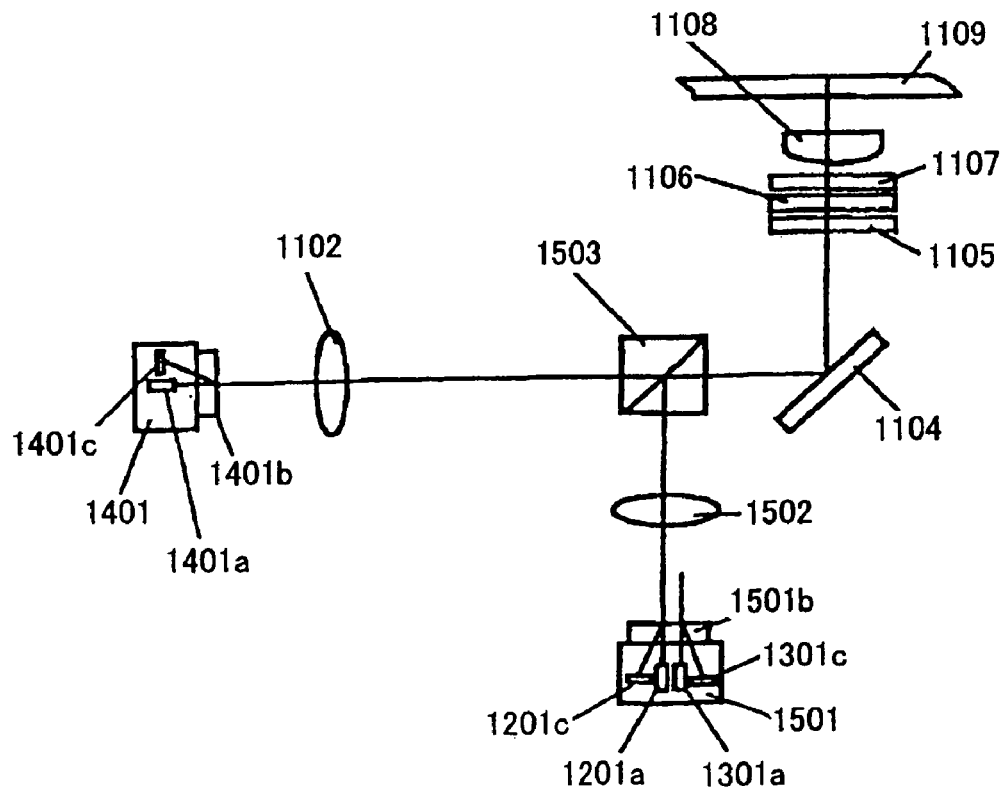
FIG. 27 shows a general configuration of an optical pickup according to a twenty-second embodiment of the present invention.

FIG. 27 is a diagram showing a general configuration of an optical pickup in a twenty-second embodiment of the present invention. In this embodiment, same as in the above-mentioned twenty-first embodiment, information recording, reproduction or deletion is performed on each of the three types of optical recording media. The first type is such that a light source with an operating wavelength of a blue wavelength zone of 407 nm and NA 0.65 are expected, i.e., a blue-system optical recording medium of 0.6 mm in thickness of light-incident-side substrate. The second type is such that a light source with an operating wavelength of a red wavelength zone of 660 nm and NA 0.65 are expected, i.e., a DVD-system optical recording medium of 0.6 mm in thickness of light-incident-side substrate. The third type is a CD-system optical recording medium expecting a light source with an operating wavelength of an infrared wavelength zone of 780 nm and NA: 0.50, and having 1.2 mm in thickness of light-incident-side substrate.

Figure 28:
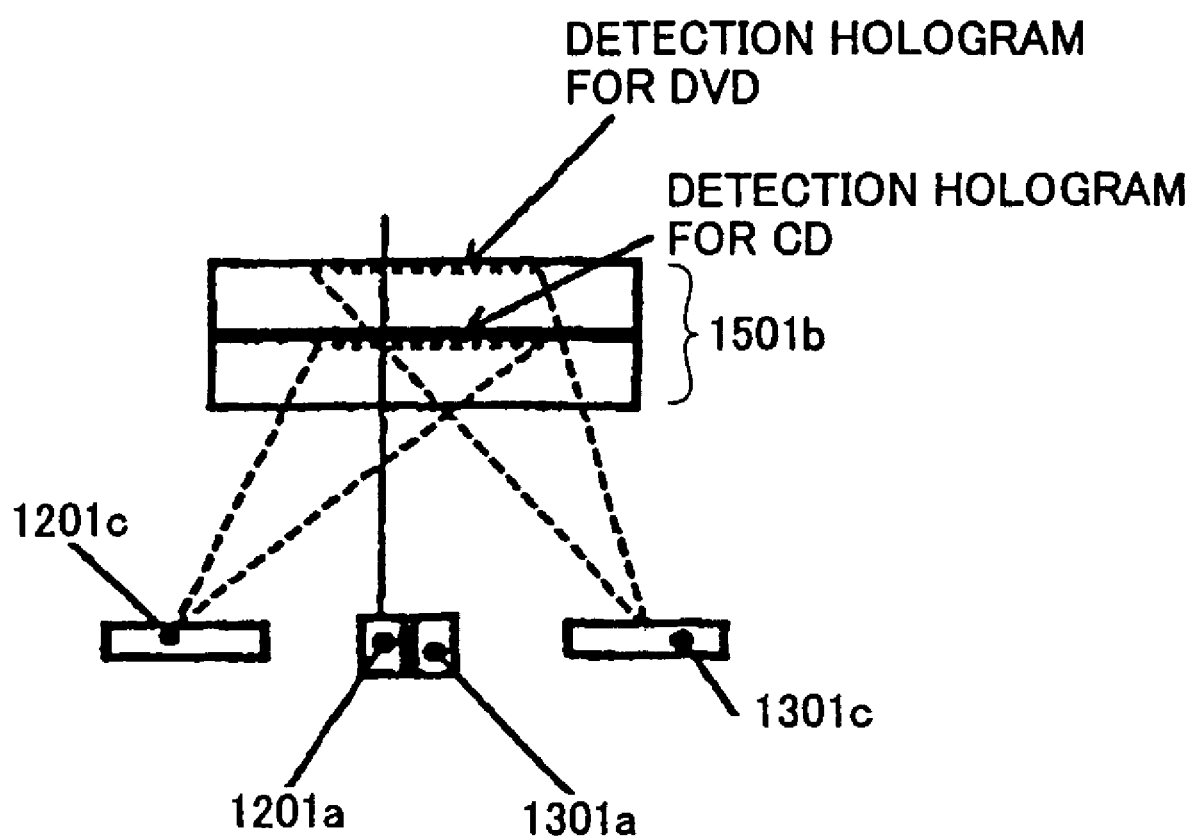
FIG. 28 illustrates a hologram unit shown in FIG. 27.

A different point from the configuration of the optical pickup shown in FIG. 26 is a point in which light sources (semiconductor lasers 1201a and 1301a), light-receiving devices 1201c and 1301c, and a light-path splitting device (hologram 1501b) are collectively provided in a single package as a hologram unit 1501. Thereby, it is possible to realize the optical system compatible for of three wavelength zones as a size-reduced configuration. In addition, a configuration including both a layer for DVD and a layer for CD should be used as the hologram device 1501b as shown in FIG. 28.

As described above for the nineteenth embodiment, when a beam in an infinite system of the red wavelength zone of the same beam diameter is incident on an object lens which has the best wavefront in the blue wavelength zone, a refraction power decreases and the numerical aperture decreases. Accordingly, in each of the twentieth through twenty-second embodiments, for the red wavelength zone, beam incidence should be made with a beam diameter $\phi 2$ larger than the incidence beam diameter $\phi 1$ applied for the blue wavelength zone.

Figure 29A:
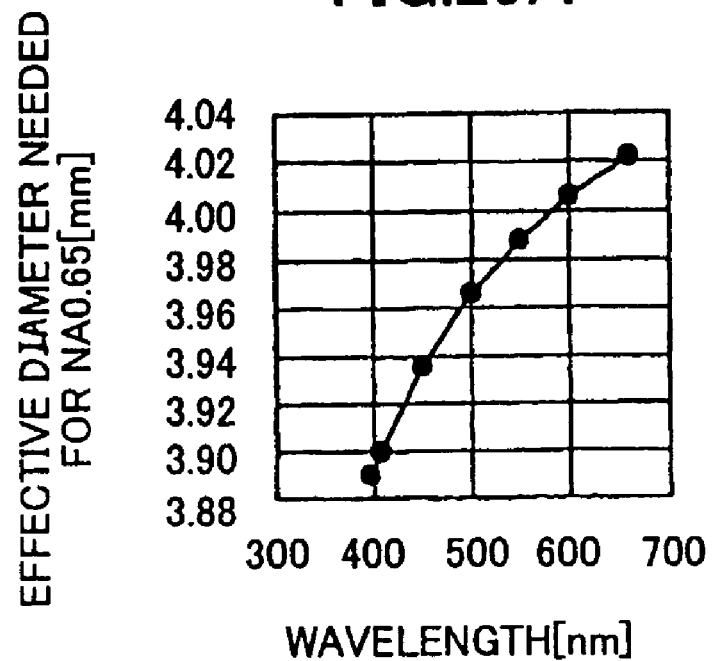
FIG. 29A shows a relation between a beam diameter and a wavelength for NA: 0.65.

FIG. 29A shows a relationship between the effective diameters needed for achieving NA: 0.65 and the wavelength applied in the following conditions:

Incidence beam diameter $\phi$: 3.9 mm
Numeral aperture (NA): 0.65
Focal length (f): 1.7 mm
Glass type: BaCD5

Figure 29B:
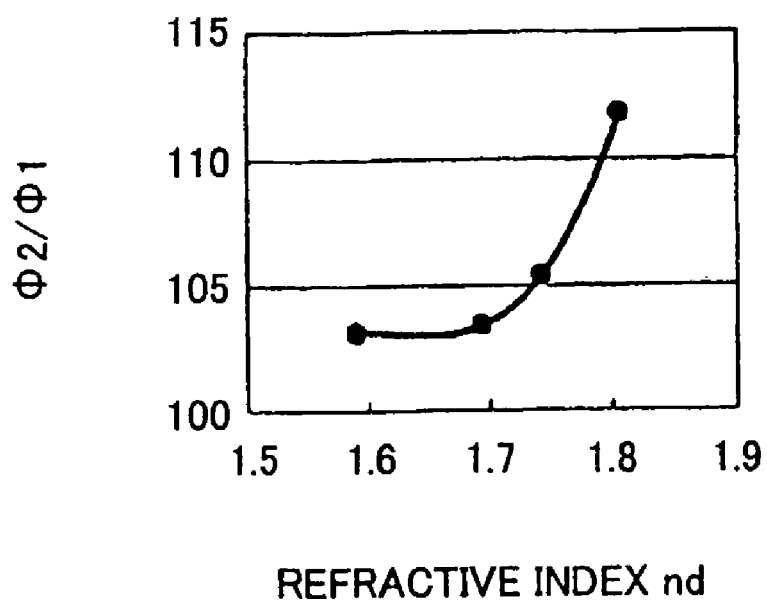
FIG. 29B shows a relation of $\phi2/\phi1$ and a refractive index on d-line when a glass type is varied.

From FIG. 29A, it is seen that it is necessary to set the beam diameter $\phi 2$ in approximately 4.02 mm at a time of information recording, reproduction or deletion is performed on a DVD-system optical recording medium for which the wavelength of 660 nm is applied. Moreover, the required relation between the beam diameters $\phi 1$ and $\phi 2$ changes also according to the glass type of the object lens. FIG. 29B shows a relationship between the required ratio $\phi 2/\phi 1$ and the refractive index nd on the d line in the glass type applied when various glass types are applied for an object lens having the same $\phi 1$, focal length, and numerical aperture as those of the above-mentioned object lens applied for FIG. 29A. Thereby, the appropriate $\phi 2$ should be selected according to the glass type of the object lens applied.

On the other hand, by the same method as in FIG. 29A, where the optimal NA in case of information recording onto a CD-system optical recording medium is approximately 0.5, the optimal effective diameter $\phi 3$ can be calculated as $\phi 3=3$ mm approximately.

Figure 30:
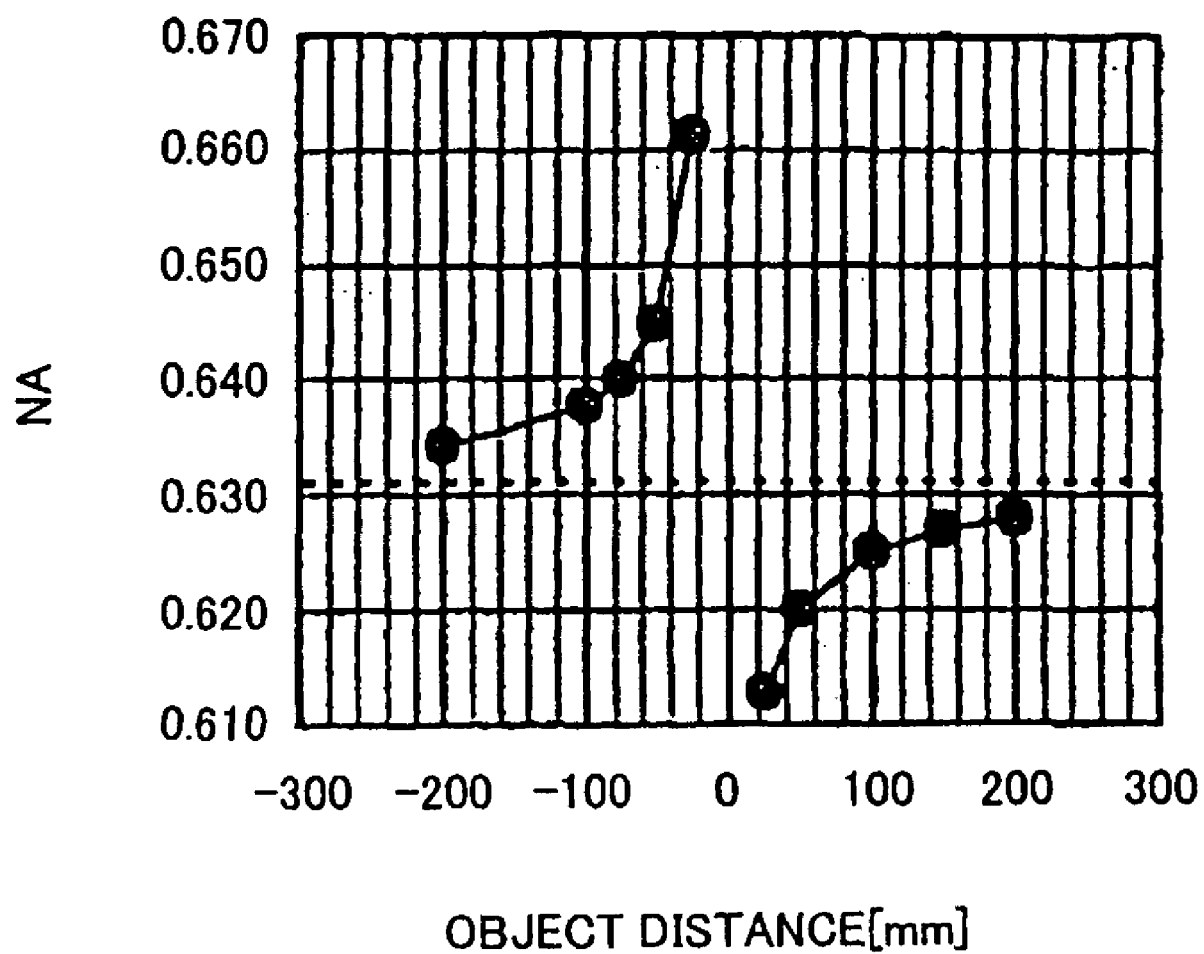
FIG. 30 shows a relation of a NA with an object distance.

Moreover, FIG. 30 shows a change in the NA value according to a change in the object distance in the incident beam of the wavelength of 660 nm in a system in which the object lens same as in FIG. 29A is used with the same beam diameter $\phi 1=\phi 2=3.9$ mm as the blue system in the operating wavelength of 660 nm. From the figure, it is seen that this object lens should be used in the object distance of on the order of −40 mm for NA: 0.65 in the wavelength of 660 nm.

As the above-mentioned device to be applied for switching the beam diameter according to the wavelength of the light source, for example, an aperture switching device may be applied. The aperture switching device according to the present invention has a function of switching the beam diameter by using the optical characteristics of reflection, diffraction, or absorption according to the wavelength zone or to the polarization direction applied.

For this purpose, as shown in FIGS. 31A, 31B and 31C, each illustrating the states when a beam of the blue wavelength zone, a beam of the red wavelength zone, or a beam of the infrared wavelength zone is incident on an example of the aperture switching device 1107, respectively, a dielectric optical multilayer film 1120 may be used, which has a function of reflecting a beam according to the wavelength thereof selectively, thereby, defining the diameter of a beam which can transmit it. Thus, switching of beam diameter according to the wavelength of an incident beam can be achieved.

Specifically, the optical transmission characteristic of this dielectric optical multilayer film 1120 has a high transmissivity with respect to any of lights of the blue wavelength zone, red wavelength zone, and infrared wavelength zone within the incident beam diameter $\phi 3$ at the central area; has a high transmissivity with respect to any of lights of the blue wavelength zone and red wavelength zone, while a low transmissivity with respect to a light of the infrared wavelength zone in a peripheral area in a range in the incident beam diameter between $\phi 3$ and $\phi 1$; and has a high transmissivity with respect to a light of only the red wavelength zone, while a low transmissivity with respect to any of lights of the red wavelength zone and infrared wavelength zone in a further peripheral area in a range in the incident beam diameter between $\phi 1$ and $\phi 2$.

Alternatively, for the same purpose, as shown in FIGS. 32A, 32B and 32C, each illustrating the states when a beam of the blue wavelength zone, a beam of the red wavelength zone, or a beam of the infrared wavelength zone is incident on another example of the aperture switching device 1107, respectively, a wavelength selection diffraction grating 1121 may be used, which has a function of diffracting an incident beam according to the wavelength thereof selectively, thereby, defining the diameter of a beam which can be transmitted thereby. Thus, switching of beam diameter according to the wavelength of an incident beam can be achieved.

Specifically, the optical transmission characteristic of this diffracting grating 1121 transmits any of the lights of the blue wavelength zone, red wavelength zone, and infrared wavelength zone within the incident beam diameter $\phi 3$ at the central area; transmits any of the lights of the blue wavelength zone and red wavelength zone, while diffracts a light of the infrared wavelength zone in a peripheral area in a range in the incident beam diameter between $\phi 3$ and $\phi 1$; and transmits a light of only the red wavelength zone, while diffracting any of the lights of the blue wavelength zone and infrared wavelength zone in a further peripheral area in a range in the incident beam diameter between φ1 and φ2.

Figure 33A:
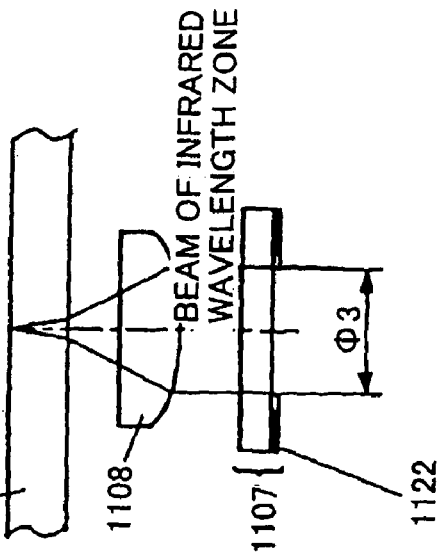
FIGS. 33A through 33C illustrate an absorbing-type aperture switching device.
Figure 33B:
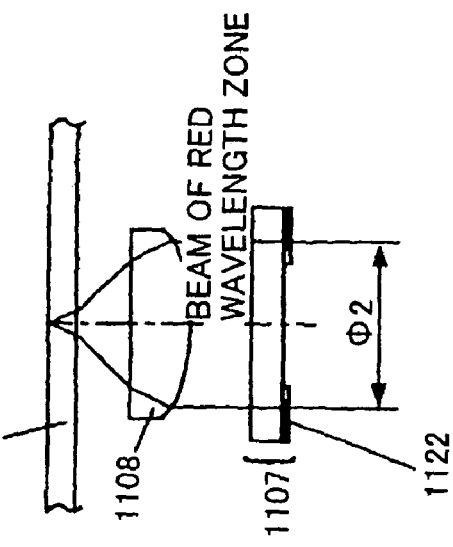
Figure 33C:
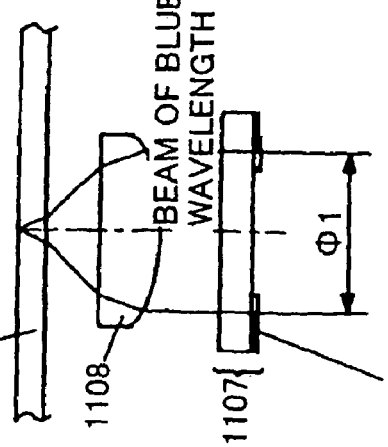

Furthermore, for the same purpose, as the aperture switching device 1107, a wavelength selection absorption film 1122 as shown in FIGS. 33A through 33C may be instead applied which switches a transmitting beam diameter by selectively absorbing an incident light according to the wavelength thereof.

NA (λ1) for the blue wavelength zone in each of the twentieth through twenty-second embodiment described above should be approximately the same as that for the DVD generation (red wavelength zone), satisfies the requirement of the range of NA (λ2) between 0.59 and 0.66 required for DVD+ RW, for example, and, also, may have a slight shift/variation in the actual values occurring due to various sorts of manufacture error. Actually, the requirement of (NA (λ1)–NA (λ2))<0.04 approximately should be satisfied.

Thus, according to the twentieth through twenty-second embodiments of the present invention, it becomes possible to achieve an effective increase in recording capacity with a reduced aberration even occurring due to variations with the light source of the blue wavelength zone, while keeping a sufficient working distance, by utilizing the pickup originally designed for DVD without needing a drastic design change, as a result of applying NA which is approximately same as in the conventional DVD generation.

Twenty-third through twenty-fifth embodiments of the present invention will now be described. In each of these embodiments, same as in each of the above-mentioned twentieth through twenty-second embodiments shown in FIGS. 25 through 27, each pickup can perform information recording, reproduction or deletion on each of the three types of optical recording media, i.e., in the first type, a light source with an operating wavelength of a blue wavelength zone of 407 nm and NA 0.67 are substantially provided for a blue-system optical recording medium with 0.6 mm in thickness of a light-incident-side substrate thereof; in the second type, a light source with an operating wavelength of a red wavelength zone of 660 nm and NA 0.65 are substantially provided for a DVD-system optical recording medium with 0.6 mm in thickness of a light-incident-side substrate thereof; and in the third type, a light source with an operating wavelength of an infrared wavelength zone of 780 nm and NA 0.50 are substantially provided for a CD-system optical recording medium with 1.2 mm in thickness of a light-incident-side substrate thereof.

In these embodiments, the object lens 1108 is designed in a manner such that the aberration becomes minimum for a blue-system optical recording medium having 0.6 mm in thickness of a light-incident-side substrate for which a light source of operating wavelength of 407 nm (blue wavelength zone) and NA: 0.67 are substantially provided.

First, a case where, in the optical pickup configure as shown in FIG. 25, information recording, reproduction or deletion is performed on a blue-system optical recording medium expecting a light source with an operating wavelength of a blue wavelength zone of 407 nm and NA: 0.67, and having 0.6 mm in the thickness of the light-incident-side substrate thereof will now be described. A divergent beam in a linear polarization emitted from the semiconductor laser 1101 with wavelength of 407 nm is transformed into an approximately parallel beam by means of the collimator lens 1102, passes through the polarization beam splitter 1103 and the dichroic prisms 1203 and 1303, the light path thereof is deflected 90 degrees by the deflection prism 1104, and the beam passes through the phase correction device 1105. Then, the beam passes through the ¼-wavelength plate 1106, thus is transformed into a circular polarization, is subject to no effect by the aperture switching device 1107, and, then, is focused by the object lens 1108 onto the optical recording medium 1109 as a minute beam spot. Information recording, reproduction or deletion is performed by this spot on the optical recording medium 1109. The beam reflected by the optical recording medium 1109 reaches the light-receiving device 1112 as in the twentieth embodiment described above, and, thereby, respective signals are detected.

Next, a case of recording, reproduction, or deletion of information with the light source with the operating wavelength of a red wavelength zone of 660 nm, the object lens of NA: 0.65, onto the DVD optical recording medium of 0.6 mm in thickness of the light-incident side substrate will now be described. A 660-nm light which comes out of the semiconductor laser 1201a of this hologram unit 1201, passes through the hologram device 1201b, and is transformed into a parallel beam by the collimator lens 1202. It is then reflected toward the deflection prism 1104 by the dichroic prism 1203 which transmits a blue-wavelength-zone light while reflects a red-wavelength-zone light, is deflected in the light path by 90 degrees with the deflection prism 1104, has a predetermined phase added thereto by the phase correction device 1104, passes through the ¼-wavelength plate 1106 by which it is transformed into a circular polarization, is subject to no effect by the aperture switching device 1107, and then, it is incident on the object lens 1108. Thereby, the beam is focused as forming a minute spot on the optical recording medium 1109, by which spot information recording, reproduction, or deletion is performed on the optical recording medium 1109. In this case, the effective numeral aperture is on the order of 0.65 with respect to the optical recording medium 1109. The beam reflected by the optical recording medium 1109 reaches the light-receiving device 1112, and, thereby, respective signals are detected.

Next, a case of recording, reproduction, or deletion of information with the light source with the operating wavelength of an infrared wavelength zone of 780 nm, the object lens of NA: 0.50, onto the CD optical recording medium of 1.2 mm in thickness of the light-incident side substrate thickness will now be described. Also in this case, same as in the above-mentioned twentieth embodiment, aperture control is performed by the aperture switching device 1107 into NA: 0.50, and then, the thus-obtained beam is used for information recording, reproduction, or deletion is performed on the optical recording medium 1109. Also in this case, the beam reflected by the optical recording medium 1109 reaches the light-receiving device 1112, and, thereby, the respective signals are detected. Similar operations are performed in each of the twenty-fourth and twenty-fifth embodiments shown in FIGS. 26 and 27, respectively.

In each of these twenty-third through twenty-fifth embodiments, even the optical pickup is of three-generation compatible optical pickup including the three-types of light sources for blue, red and infrared wavelength zones, not a three-step aperture switching device but a two-step aperture switching device, which is conventionally applied, is applied As described above for the nineteenth embodiment, it is possible that, by a single common numerical aperture, a blue-system optical recording medium of NA: 0.59 through 0.70 and the blue wavelength zone, and a DVD-system optical recording medium of NA: 0.59 through 0.66 and the red wavelength zone can be compatibly handled. Furthermore, compatibility also with a CD-system optical recording medium of NA: 0.44 through 0.51 and the infrared wavelength zone can be also achieved according to the twenty-third through twenty-fifth embodiments, by employing an aperture switching device.

Figure 34:
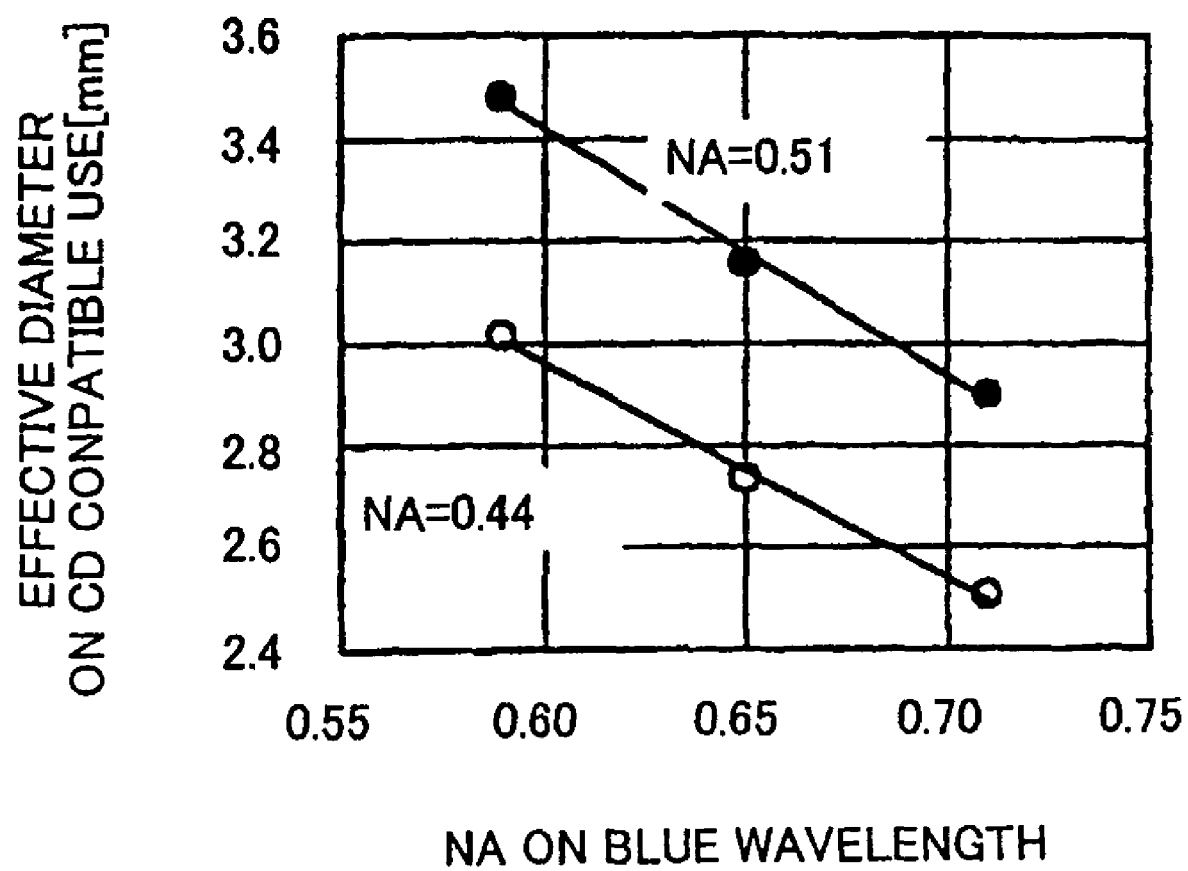
FIG. 34 shows an effective diameter of incident beam for NA: 0.44 and 0.51.

FIG. 34 shows, in the case of applying the object lens similar to FIG. 24, a range of effective diameter (incident beam diameter) $\phi 3$ providing NA: 0.44 through 0.51 when a beam of infrared wavelength of 780 nm is incident onto an optical recording medium having the substrate thickness of 1.2 mm. From this figure, it is seen that the effective diameter (incident beam diameter) $\phi 3$ should fall within the range between 2.78 and 3.18 mm for the object lens having NA: 0.65.

Similar to the above-mentioned twentieth through twenty-second embodiments, as the aperture switching device 1107, which switches the transmitting beam diameter, optical characteristic of reflection, diffraction, or absorption may be utilized and, thus, according to the wavelength zone or the polarization direction of an incident optical beam, the transmission beam diameter is controlled.

FIGS. 35A through 35C illustrate states in which a beam of the blue wavelength zone, a beam of the red wavelength zone, and a beam of the infrared wavelength zone are applied to the aperture switching device. For this purpose, a dielectric optical multilayer film which has a wavelength selection property is used in that a wavelength selection property reflective film 1120' which switches a beam diameter to allow a passage therethrough by controlling a reflection according to the wavelength of each beam which is incident thereon from the light source. Specifically, the transmission characteristic of the incident beam is high transmissivity to a light of the blue wavelength zone, the red wavelength zone, and the infrared wavelength zone within a beam diameter $\phi 3$, a central area. In an area of beam diameter in a range between $\phi 1$ ($\phi 1 = \phi 2$) and the above-mentioned outside $\phi 3$, it has a high transmissivity with respect to a light of the blue wavelength zone and the red wavelength zone but has a low transmissivity with respect to a light of the infrared wavelength zone.

Figure 36A:
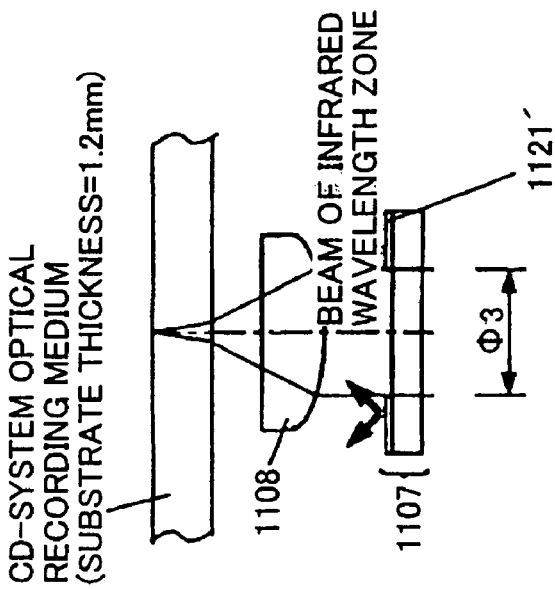
FIGS. 36A through 36C illustrate a diffraction-type aperture switching device.
Figure 36B:
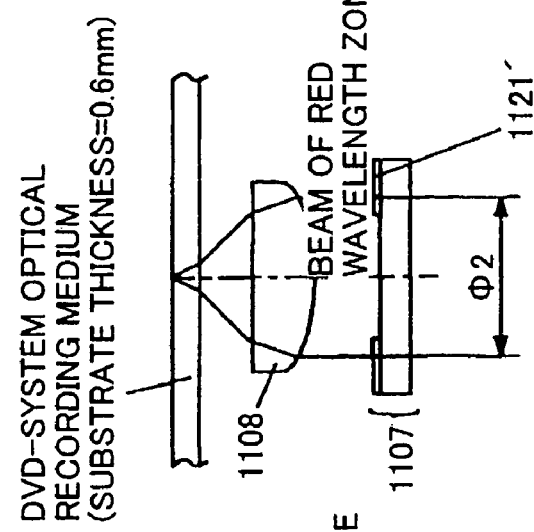
Figure 36C:
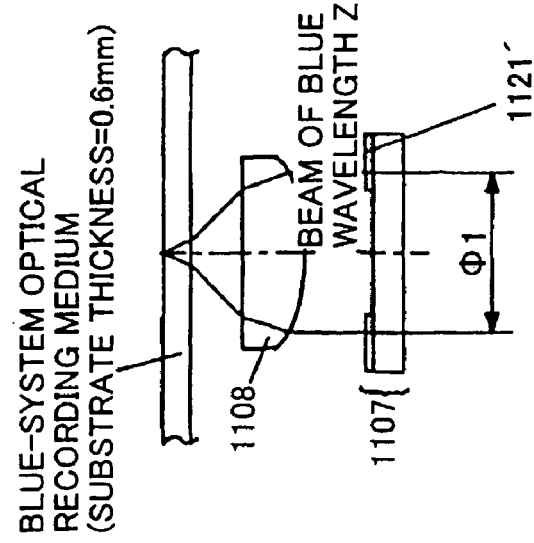

FIGS. 36A through 36C illustrate states in which a beam of the blue wavelength zone, a beam of the red wavelength zone, and a beam of the infrared wavelength zone are applied to another example of the aperture switching device. In this case, a wavelength switching diffraction grating 1121' which has a wavelength selection property is used which switches a beam diameter to allow a passage therethrough by controlling a diffraction according to the wavelength of each beam which is incident thereon from the light source. Specifically, the incident beam has no effected applied thereby for each of lights of the blue wavelength zone, the red wavelength zone, and the infrared wavelength zone within a beam diameter $\phi 3$, a central area in which no diffraction grating is provided. In an area of beam diameter in a range between $\phi 1$ ($\phi 1 = \phi 2$) and the above-mentioned outside $\phi 3$, it has no effect on a light of the blue wavelength zone and the red wavelength zone but diffracts a light of the infrared wavelength zone.

Furthermore, for the same purpose, as the aperture switching device, a wavelength selection absorption film 1122' shown in FIGS. 37A through 37C may be instead applied which switches a transmitting beam diameter by selectively absorbing an incident light according to the wavelength thereof.

Although the aperture switching device which switches beam diameter according to each wavelength that has been described so far, switching of beam diameter may be achieved by another method employing a polarization property. That is, a light source may be arranged so that the polarization direction of the light of a red wavelength zone and an infrared wavelength zone may intersect perpendicularly, and then, a device may be provided by which, according to the polarization direction of a beam incident, the aperture is switched.

Moreover, the aperture switching device may be configured such that any one of beams having beam diameters $\phi 1$, $\phi 2$ and $\phi 3$ incident onto the object lens from the aperture switching device may have an ellipse cross-sectional shape. The ellipse shape may be one having a minor axis thereof corresponding to the tangential direction (in a disk-shaped optical recording medium). The diameter of optical spot is made smaller as the edge strength should be increased generally in a beam condensed by the object lens. Especially, when performing multi-level recording which will be described later, improvement in S/N is attained by reducing the diameter of beam spot rather in the tangential direction than in the radial direction.

Figure 38:
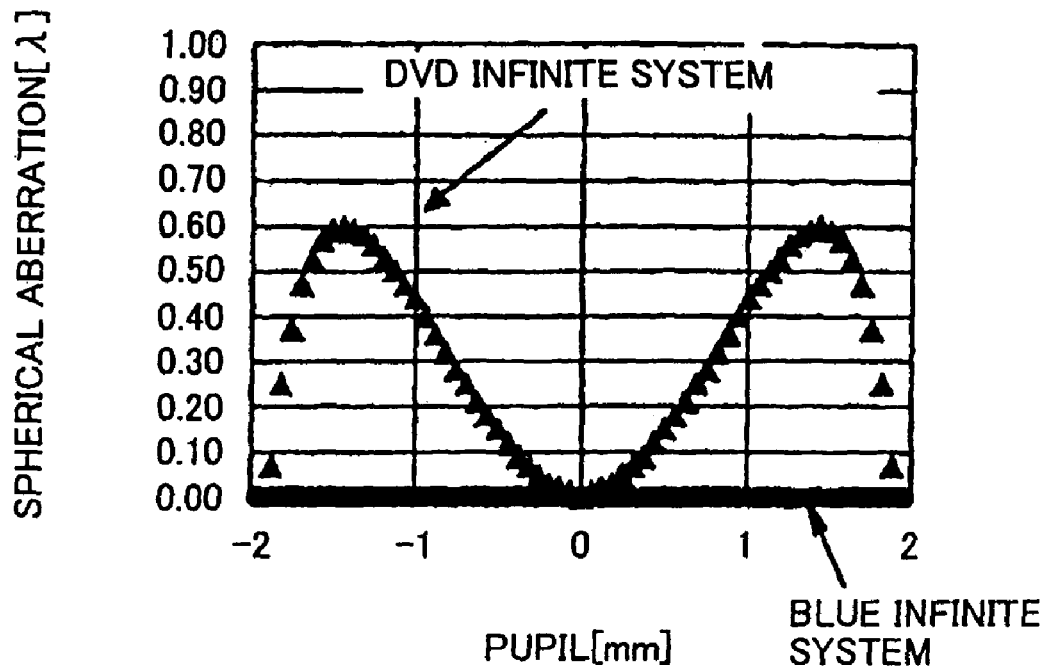
FIGS. 38 and 39 show spherical aberrations on various types of optical recording media.
Figure 39:
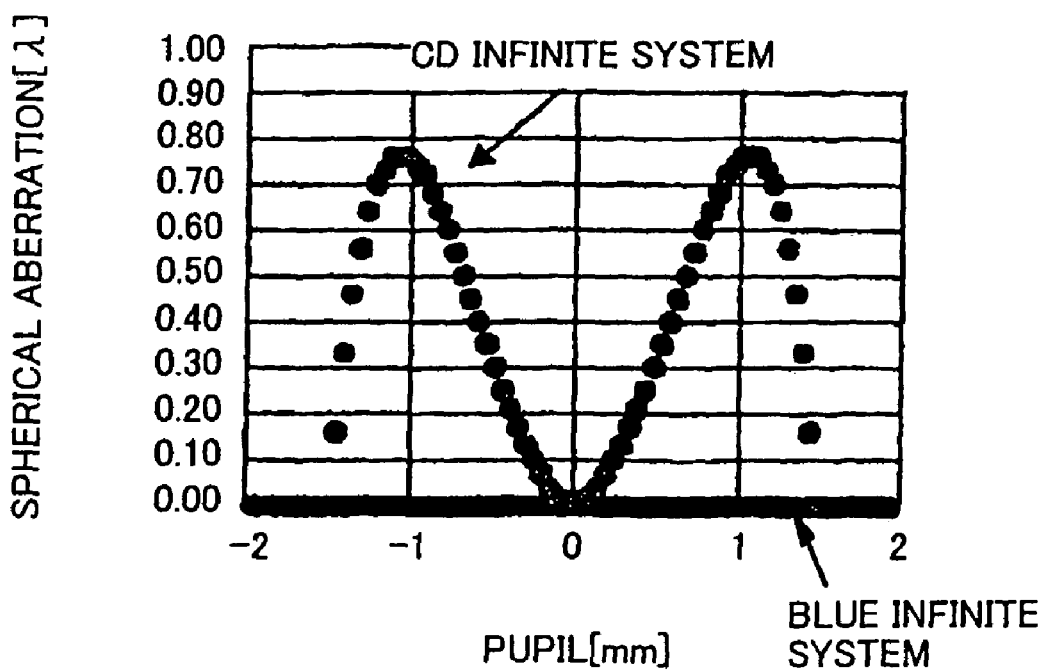

In case a single object lens is used such that the spherical aberration becomes minimal in the blue wavelength zone for forming a beam spot on a DVD-system optical recording medium with a light in the red wavelength zone applied with an infinite system or forming a beam spot on a CD-system optical recording medium with a light in the infrared wavelength zone applied with an infinite system, a spherical aberration occurs due to a difference in the thickness of the light-side substrate of the optical recording medium, as shown in FIG. 38 or 39. In order to correct or effectively reduce this aberration, a phase correction device to generate a spherical aberration in the opposite polarity is applied.

For example, a finite system may be applied by which a beam incident onto the object lens is made divergent or convergent as a red (DVD) optical system or an infrared (CD) optical system. Thereby, the divergence in a beam incident onto the object lens is changed, and, thus, equivalently, generally, the spherical aberration can be controlled. Accordingly, thus, a spherical aberration in the opposite polarity can be provided thereby.

Figure 40A:
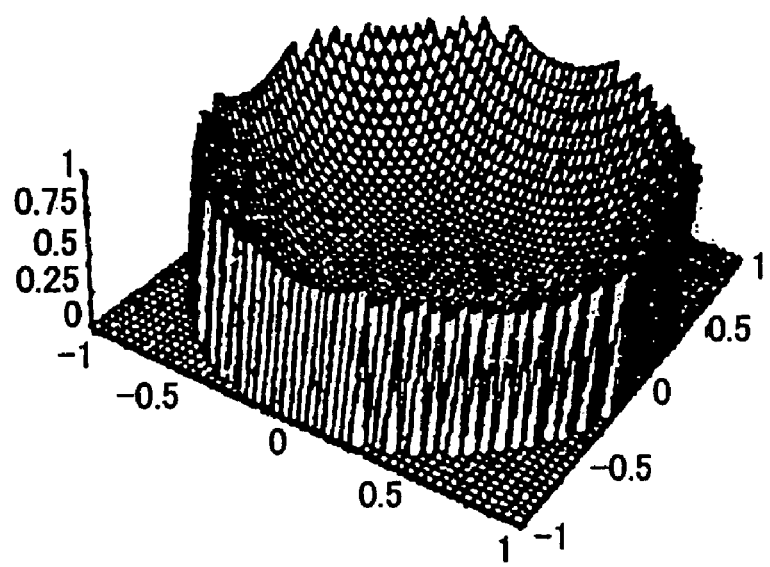
FIGS. 40A through 40C, 41A, 41B, 42A through 42C illustrate a principle of phase correction or spherical aberration control scheme according to the present invention.
Figure 40B:
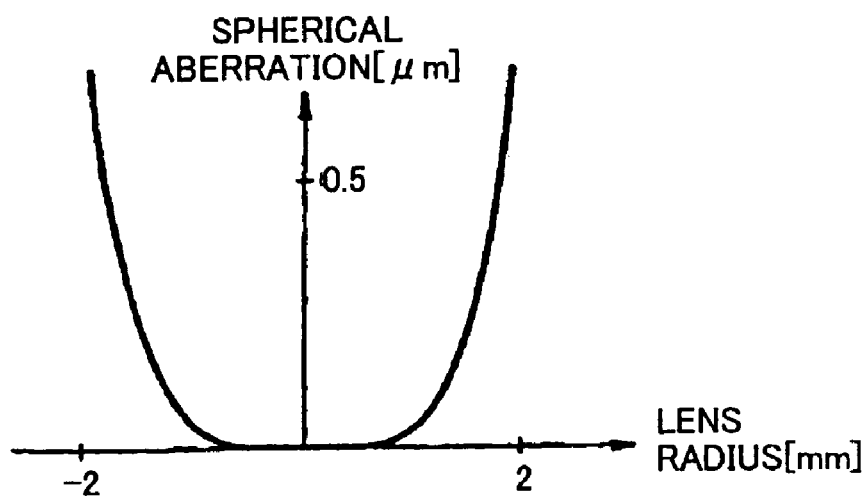
Figure 40C:
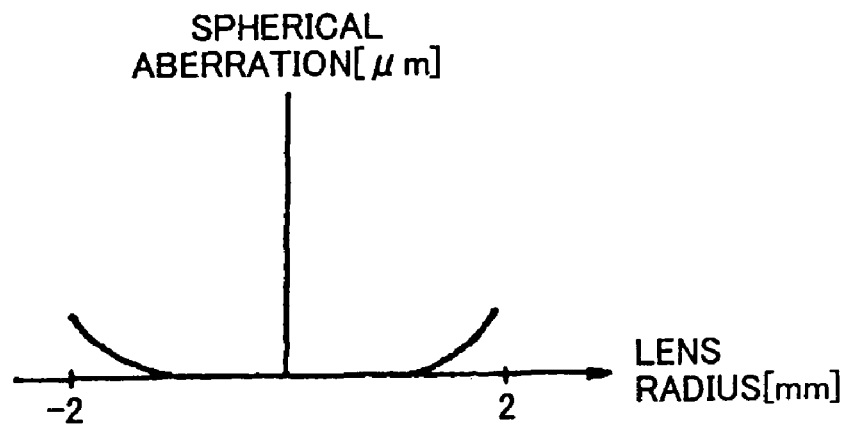

For example, a case is assumed in that a spherical aberration generated when a light in the infrared wavelength zone is incident onto a CD-system optical recording medium with an infinite system is such as that shown in FIG. 40A. FIG. 40B shows this spherical aberration as a 2-dimensional curve. Then, when the divergence of the incident light onto the object lens is changed, a spherical aberration as shown in FIG. 40C is obtained as a spherical aberration after the correction. Thus, it is possible to effectively reduce the spherical aberration in this manner, basically. To choose the divergence in the incident light with which the spherical aberration can be reduced effectively is needed. Moreover, disposing a coupling lens for shortening the light path length instead of a collimator lens shows in FIGS. 22, 25 and 26 between the object lens and the light source is effective for shortening the light path.

A configuration may be provided in which the phase correction device does not have an effect for an incident light applied with a finite system. For example, in case an infinite system is applied for the blue wavelength zone and red wavelength zone, while a finite system is applied for the infrared wavelength zone, the phase correction device is configured such that a predetermined phase correction be performed only onto a light of each of the blue and red wavelength zones thereby.

Furthermore, any of a static device and a dynamic device may be applied as long as it adds a predetermined amount of phase to an incident light according to each type of optical recording medium on which information recording, reproduction or deletion is performed. Then, the predetermined phase to be added may be controlled according to an output signal of a medium identification device for optical recording media, which will be described later, a spherical aberration detection device, or a substrate thickness detection device, in a case where a dynamic device is provided for the purpose.

Figure 41A:
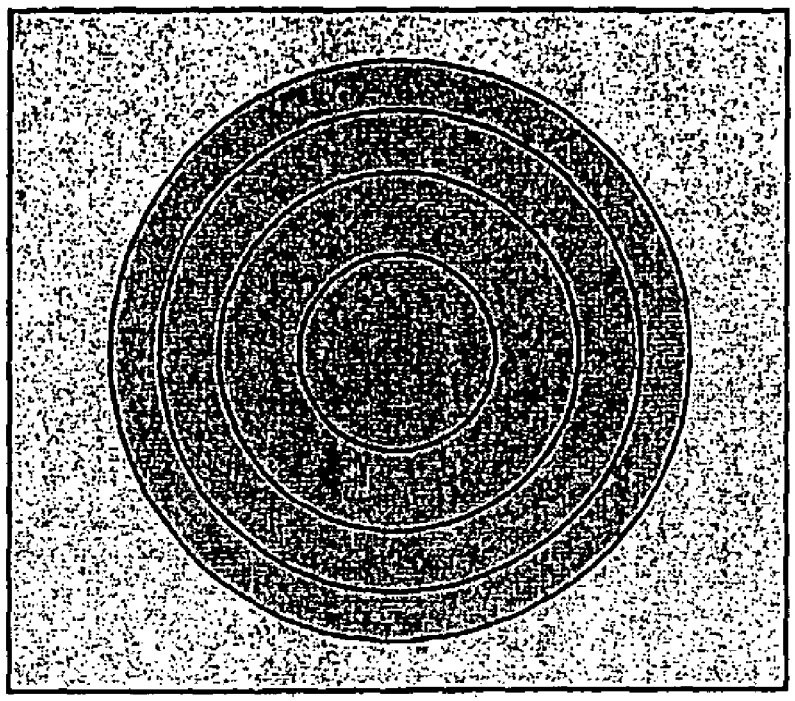

First, a static type of the phase correction device will now be described. For example, a concentric circular phase shifter is formed on a glass substrate as a static phase correction device, as shown in FIG. 41A. The concentric circular phase shifter should be configured such that a predetermined phase should be provided according to the wavelength zone of a light source applied, and also, according to the beam diameters φ1, φ2, or φ3 of the above-mentioned aperture switching device applied. Namely, the phase shifter has no effect on a light of the blue wavelength zone, but gives a spherical aberration opposite in the polarity to that shown in FIG. 38 in the range of beam diameter φ2 to a light of the red wavelength zone, and gives a spherical aberration opposite in the polarity to that shown in FIG. 39 in the range of beam diameter φ3 to a light of the infrared wavelength zone.

Figure 41B:

The phase shifter has a configuration as shown in FIG. 41B having a stair-step shaped section taken along the optical axis, and is configured such that, assuming that the wavelength of a light source applied is denoted by $\lambda i$, the difference in the height between adjacent steps of the stair-step shape is denoted by hi, and the refractive index of the glass substrate is denoted by ni, the phase difference occurring between each adjacent steps is given by the following formula:

$$\delta i = 2\pi(ni-1)hi/\lambda i$$

Thus, hi should be determined appropriately such that $\delta 1 = 2\pi$ for the blue wavelength zone while predetermined values of δ2 and δ3 be provided for the red and infrared wavelength zones.

Figure 42A:
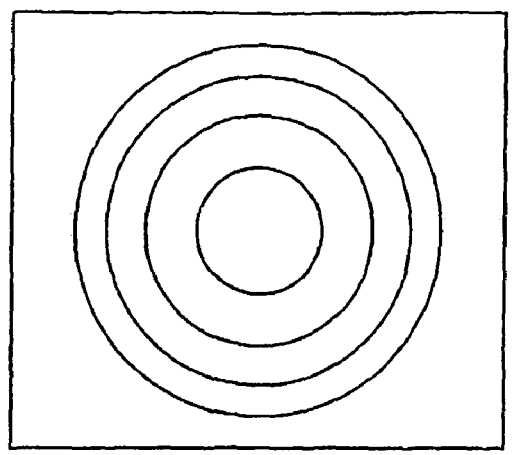

Next, a dynamic type of the phase correction device will now be described. For example, an electro-optic device, such as a liquid crystal device may be employed as a dynamic phase correction device. As shown in FIG. 42A, a liquid crystal device can change the refractive index 'n' of the liquid crystal at each electrode division free in a range between n1 and n2, as a transparent electrode at least one side is divided in a shape of concentric circles, to which applied is a voltage independently for each electrode division (with respect to a common electrode) of each concentric circular zone, and controls the above-mentioned voltage. When the refractive index 'n' is controlled, an arbitrary phase difference $\Delta n \cdot d$ $(2\pi/\lambda)$ can be given to an incident light which passes through each zone, as a result of a light path difference $\Delta n \cdot d$ ($\Delta n$ denoting a difference in the refractive index, and d denoting the cell thickness of liquid crystal) being controlled, where the wavelength is denoted as $\lambda$.

It is assumed that a spherical aberration occurring due to difference in wavelength or substrate thickness which is detected by a medium identification device, a spherical aberration detection device or a substrate thickness detection device or so, is as shown in FIG. 40A. A solid curve shown in FIG. 42A shows this spherical aberration as a 2-dimensional curve. When a voltage applied to each concentric circular electrode of the liquid crystal device is adjusted so that a phase difference as shown by a broken curve shown in FIG. 42B be given to a beam which is incident onto an object lens from a light source side, the spherical aberration can be cancelled out thanks to a delay of the wavefront created in each concentric cross-sectional part of the beam which passes through the liquid crystal device.

Figure 42B:
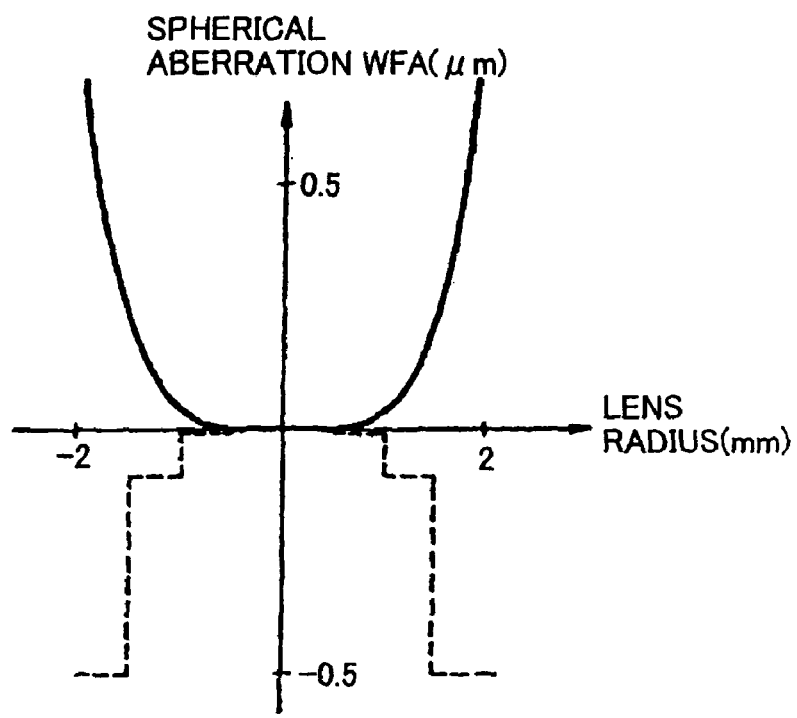
Figure 42C:
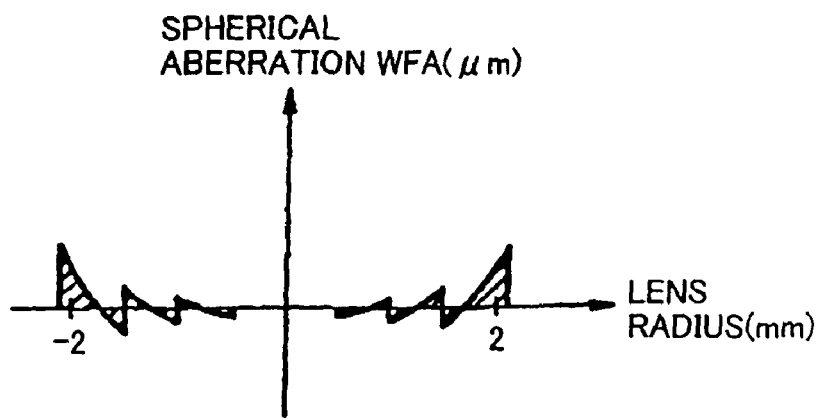

FIG. 42C shows the sum total of the solid curve (spherical aberration) in FIG. 42B, and the broken curve (delay of the wavefront cause by the liquid crystal device), i.e., the spherical aberration after correction. Thus, the spherical aberration can be remarkably corrected or reduced. Moreover, such a phase correction device can also correct or effectively reduce a spherical aberration resulting from a layer gap in a double-layer optical recording medium, or a substrate thickness error of a blue-system optical recording medium, or the like, at the same time.

As a control signal for this type of dynamic phase correction device, an output signal of a medium identification device may be used. As described above, as a beam from a light source of this device is applied to an object lens at a time of information recording or reproduction of DVD or CD as above-mentioned, a spherical aberration caused by a difference in wavelength or substrate thickness occurs, and the shape of the optical spot formed on a recording surface deteriorates. By detecting this state in the optical spot, it is possible to identify which type of optical recording medium is currently applied. On the other hand, a spherical aberration amount of opposite polarity for canceling out a spherical aberration to generate is stored beforehand for every type of optical recording medium, and, the spherical aberration of opposite polarity is provided according to the type of optical recording medium detected by means of the above-mentioned medium identification device. The medium identification device should have a configuration such that the reflected beam's luminous energy level obtained when blue, red, or infrared light source is turned on, and a focus search is carried out as an optical recording medium is loaded is used for the medium identification.

As another example of a control signal for such a type of phase correction device, an output signal of a spherical aberration detection device may be used. As described above, a beam from a light source of this device is applied to an object lens with an infinite system, at a time of information recording or reproduction of DVD or CD, a spherical aberration caused by difference in wavelength or substrate thickness occurs, and the shape of optical spot formed on a recording surface deteriorates. The aberration thus occurring also distorts the wavefront of a beam reflected, and thus, an aberration occurs in a beam returning to the light-receiving device 1201c via the collimator lens 1202 shown in FIG. 25, for example.

Figure 43A:
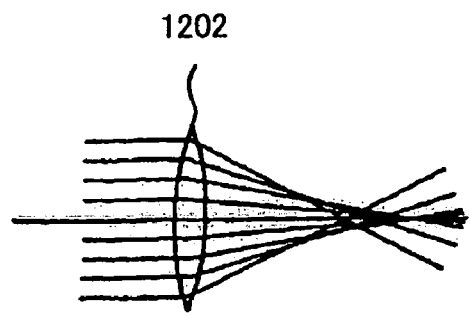
FIGS. 43A through 43C illustrate a principle of spherical aberration detection scheme according to the present invention.

FIG. 43A shows this state. When a spherical aberration occurs in the returning beam, with respect to a standard wavefront of the returning beam, a delay in wavefront occurs concentrically about the optical axis, and a position at which the wavefront delayed with respect to the focus point at which the standard wavefront focuses is in a defocus state. Then, the state of spherical aberration can be seen by taking out the difference of the delayed wavefront and the standard wavefront, and thus, the focus state can be detected.

Figure 43B:
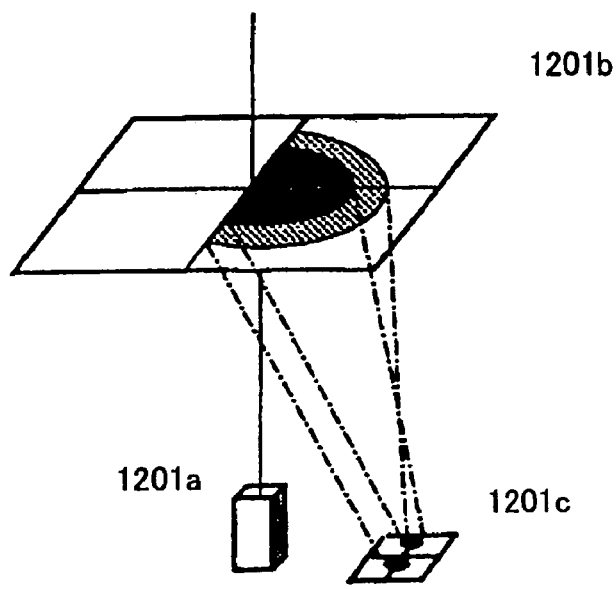
Figure 43C:
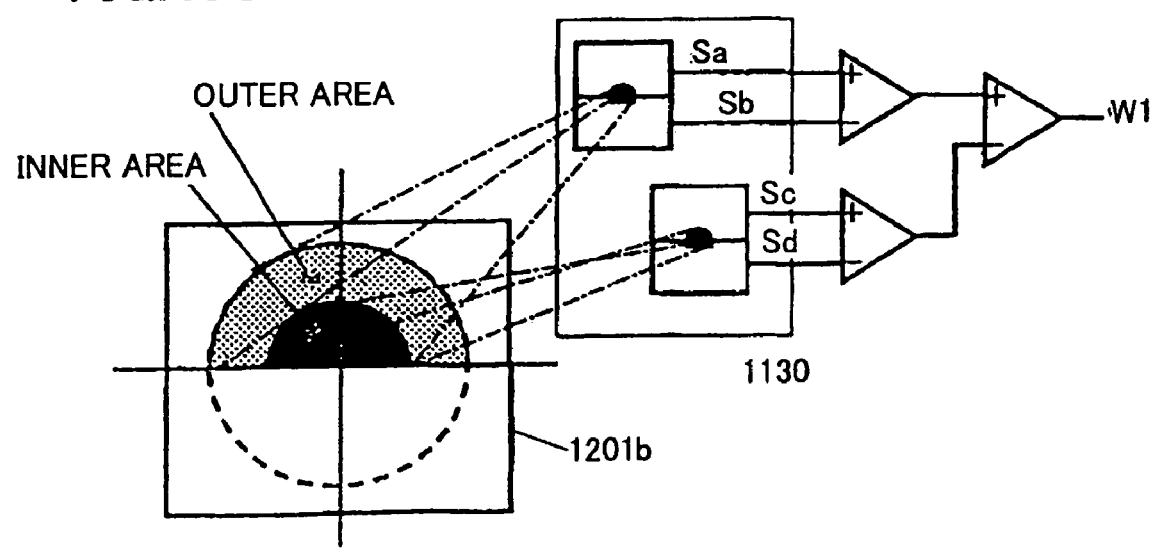

For example, as shown in FIG. 43B, a light-receiving device 1201c is provided in which a light-receiving area is divided, while a concentric division pattern of a hologram 1201b is provided, whereby each concentric cross-sectional zone of an incident beam can be detected. As shown in FIG. 43C, the hologram 1201b has a configuration such that symmetrical dividing in the jitter direction on the plane perpendicular to the optical axis is made, and, one division is further divided concentrically, and, thus, a hologram is formed. A light-receiving device 1130 includes 2-divided light-receiving devices which detect beams diffracted by the hologram, as shown. The amounts of movements of light-point images of a hologram-diffracted light are detected thereby, and a difference W1 between a difference (Sa−Sb) and a difference (Sc−Sd) detected by the respective light-receiving devices is regarded as the spherical aberration, as follows:

$$W1 = (Sa-Sb-Sc+Sd)$$

The state of W1=0 indicates that no aberration occurs.

Moreover, since a spherical aberration occurring in connection with a manufacture error of an optical recording medium or various optical components/parts of an optical information recording/reproduction system is also detectable according to this method, it is possible to also correct or effectively reduce the spherical aberration occurring in connection with the manufacture error together at the same time.

As another example of a control signal for the dynamic phase correction signal, a substrate thickness detection device and a device for determining a difference between a blue-system optical recording medium and the other types of optical recording medium. This enables a check of difference between a blue-system optical recording medium and a CD-system optical recording medium or a difference between a DVD-system optical recording medium, and a CD-system optical recording medium. As a method of detecting the thickness (light-incident-side substrate thickness) of an optical transmission layer of an optical recording medium as in the substrate thickness detection device, a method may be applied in which a beam from a light source is applied to an optical recording medium via an object lens, the reflected beam is detected by a light-receiving device, by which a focus error signal is obtained, while, by using this focus error detection system, a signal according to a light reflected by a recording surface of the optical recording medium and a signal according to a light reflected by an optical transmission layer of the same optical recording medium are extracted, and, therefrom, a time difference therebetween is detected, and, thus, the substrate thickness (thickness of the optical transmission layer) is detected. According to this method, since a manufacture error in the optical recording medium is also detectable, it becomes possible to correct or effectively reduce the spherical aberration occurring in connection with the manufacture error together at a same time.

In addition, the above-described dynamic phase correction device may have a function of also performing a phase correction other than correcting a spherical aberration. For example, a beam spot degradation caused by a tilt in an optical recording medium may be corrected through a function of correcting or effectively reducing a coma aberration occurring due to a relative inclination between the optical recording medium and object lens.

Furthermore, in each of the optical pickups in the nineteenth, through twenty-third embodiments described above, the ¼ wavelength plate 1106 is provided such that, thereby, while a light (blue system) with a wavelength of 407 nm and a light (DVD system) with a wavelength of 660 nm are transformed into a linear polarization from a circular polarization, or from a linear polarization to a circular polarization; for a light (CD system) with a wavelength of 780 nm, transformation into a circular polarization or an ellipse polarization from a linear polarization is performed.

As a configuration of the ¼ wavelength plate by which any of a light with a wavelength of 407 nm, a light with a wavelength of 660 nm, and a light with a wavelength of 780 nm can be transformed into a linear polarization from a circular polarization, or from a linear polarization into a circular polarization, a crystal having a thickness 't', a phase difference between the ordinary light (refractive index: no) and extraordinary light (refractive index: new) be ¼ of the wavelength of 407 nm, the wavelength of 660 nm, or the wavelength of 780 nm. In other words, this crystal used as the ¼ wavelength plate satisfies the following requirements:

$$\Delta n1 \times t = \{(2p+1)/4\} \times 407 \ (p=0, 1, \ldots)$$

$\Delta n1$: (no−ne) with respect to the light coming from the light source having the wavelength of 407 nm;

$$\Delta n2 \times t = \{(2q+1)/4\} \times 660 \ (q=0, 1, \ldots)$$

$\Delta n2$: (no−ne) with respect to the light coming from the light source having the wavelength of 660 nm;

$$\Delta n3 \times t = \{(2r+1)/4\} \times 780 \ (r=0, 1, \ldots)$$

$\Delta n3$: (no−ne) with respect to the light coming from the light source having the wavelength of 780 nm;

Similarly, as a configuration of the ¼ wavelength plate by which any of a light with a wavelength of 407 nm, and a light with a wavelength of 660 nm, can be transformed into a linear polarization from a circular polarization, or from a linear polarization into a circular polarization, a crystal having a thickness 't', a phase difference between the ordinary light (refractive index: no) and extraordinary light (refractive index: new) be ¼ of the wavelength of 407 nm, or the wavelength of 660 nm. In other words, this crystal used as the ¼ wavelength plate satisfies the following requirements:

$$\Delta n1 \times t = \{(2p+1)/4\} \times 407 \ (p=0, 1, \ldots)$$

$\Delta n1$: (no−ne) with respect to the light coming from the light source having the wavelength of 407 nm;

$$\Delta n2 \times t = \{(2q+1)/4\} \times 660 \ (q=0, 1, \ldots)$$

$\Delta n2$: (no−ne) with respect to the light coming from the light source having the wavelength of 660 nm;

By arranging the ¼-wavelength plate with such a characteristic, it is possible to cause the polarization direction of the light exiting the hologram unit 1301 for CD-system optical recording medium shown in FIG. 25, and the light which is incident onto the hologram unit 1301 from the optical recording medium 1109 to intersect perpendicularly. Thus, it becomes possible by making the polarization direction of the light in the going path and the light in the returning path, intersect perpendicularly to prevent a noise from occurring due to the returning light directed to the semiconductor laser 1301*a*.

Moreover, by arranging the ¼-wavelength plate with such a characteristic, a polarization separation optical system is achieved by a combination of the polarization beam splitter 1103 and the ¼-wavelength plate 1106 for a blue-system optical recording medium, thus, a sufficient luminous energy is obtained, and, also, a noise occurring due to a returning light directed to the semiconductor laser 1101 is also effectively reduced.

Moreover, such a polarization separation optical system may also be achieved for a DVD-system optical recording medium by using the hologram device of polarization selection property with the hologram 1201*b* shown in FIG. 22.

In addition, the ¼-wavelength plate is not limited to those made of a crystal which satisfies the requirements of the above-mentioned formulas, but other configurations may also be applied. For example, a configuration in which phase difference devices of an organic material are stacked, and then, are sandwiched by glass substrates, or a configuration of an electro-optic device, such as a liquid crystal device, may be used.

In each of the above-mentioned twentieth through twenty-third embodiments compatible among the three-types of optical recording media, as shown in FIG. 44A, the phase correction device 1105, the ¼-wavelength plate 1106, and the aperture switching device 1107 may be combined integrally. Thereby, simplification of assembly process can be attained. Moreover, as shown in FIG. 44B, one of the glass substrates which sandwich the liquid crystal layer which forms the phase correction device 1105 is formed as the ¼-wavelength plate 1106, while the aperture switching device 1107 is formed by a dielectric multilayer film formed on a side of the other glass substrate opposite to the liquid crystal layer. Alternatively, it is also possible that, in the configuration shown in FIG. 44B, a dielectric multilayer film is formed rather on a side of the ¼-wavelength plate 1106 opposite to the liquid crystal layer. Thereby, with the thickness and weight equivalent to those of the conventional configuration of the glass substrate, the liquid crystal layer and the glass substrate stuck together in the stated order, the phase correction device 1105, the ¼-wavelength plate 1106, and the aperture switching device 1107 can be provided integrally.

Furthermore, the above-mentioned phase correction device 1105, the ¼-wavelength plate 1106, and the aperture switching device 1107 may be provided on an actuator together with the object lens, and, may be moved integrally. Thereby, a wavefront degradation caused by a relative shift and relative tilt among these components/parts can be effectively reduced compared with the case where these components/parts are provided separately. In addition, the actuator according to the embodiment of the present invention may have any of two through four axes of moving dimensions. In other words, in addition to two-directional control for focus and tracking control operations, one-directional tilt control for the radial direction or the jitter direction, and, thus, total three-axis actuator may be provided. Alternatively, by adding two-direction tilt control for both the radial and jitter directions, and, thus, total four-axis actuator may be provided. When the inclination of the object lens is changed by such a three-axis or four-axis actuator, coma aberration may occur in a beam passing through the object lens. Accordingly, this coma aberration may be utilized to cancel out the coma aberration occurring due to an inclination of an optical recording medium.

FIG. 21 is an internal perspective view showing a general configuration of an information recording/reproduction apparatus according to the eighteenth embodiment of the present invention described above. The same figure is also used for illustrating a twenty-fourth embodiment of the present invention. The information recording/reproducing apparatus 10, according to the twenty-fourth embodiment also performs at least one of informational recording, reproduction, and deletion with an optical pickup 11 onto an optical recording medium 20. The optical recording medium 20 is disk-like, and is contained in a cartridge 21 as a protection case. Insertion of the optical recording medium 20 is carried out in a direction of an arrow indicated as "disk insertion" through an insertion opening 12 in the information recording/reproducing apparatus 10, the disk-like optical recording medium 20 is then rotated by a spindle motor 13, and informational recording, reproduction, or deletion is performed thereon by the optical pickup 11.

As this optical pickup 11, the optical pickup in each of the above-mentioned nineteenth through twenty-third embodiments of the present invention may be applied.

As mentioned above, increase in NA and reduction in wavelength applied for the purpose of increase in recording capacity of the information recording and reproduction device 10 is difficult in terms of reliability. Especially, as a spherical aberration increases by the 4th power of NA, an influence thereof becomes larger accordingly. However, according to the twenty-fourth embodiment of the present invention, the optical pickup according to any of the above-mentioned nineteenth and twenty-third embodiment of the present invention is applied, and, therefore, the wavelength can be reduced as compared with a conventional DVD system and also NA can be selected which is near that in the conventional DVD system. Accordingly, the reliability can be easily maintained.

Furthermore, the optical information recording/reproduction apparatus according to the present invention performs multi-level recording on an optical recording medium with an information recording density multiplication rate of P1 by applying the usage wavelength of 407 nm±10 nm in the blue wavelength zone and NA: 0.59 through 0.70, by applying a multilevel recording technology, where P1>1.8.

Thereby, the optical information processing apparatus having a recording capacity of 22 GB or more can be realized, without using an object lens of as high as NA: 0.85. That is, generally, the storage capacity to an optical recording medium is determined by the diameter of beam spot applied. In case the blue-system optical recording medium of a blue wavelength zone is used, compared with a DVD-system optical recording medium (4.7 GB), the capacity can be raised by the spot diameter ratio (wavelength/NA)$^2$, and thus, 12 GB is achievable. Then, 22 GB is achievable by further applying multi-level recording in the above-mentioned conditions. Consequently, the margin against a possible shift/variation can be increased. Since the depth of focus of an object lens should be managed seriously in proportion to the 2nd power of NA, application of the lens of NA: 0.65 can increase the margin by 1.7 times, compared with the object lens of NA: 0.85.

As the above-mentioned multi-level recording technology, there is a method of controlling the size of a record mark by controlling the luminous energy of a writing laser beam as disclosed by 'Optoronics (2001)', No. 11, pages 149-154, for example. Generally, by such a multi-level technology, the margin against a change in tilt, defocus, etc. should be reduced by the reason of performing fine control of the size of a record mark. However, according to the present invention, by forming an ellipse shape of a beam's cross section to be incident on the object lens as mentioned above, further, by making the miner axis of the ellipse to be coincident with the tangential direction of an optical recording medium, the edge strength of the beam focused by the object lens becomes larger, and the diameter of the optical spot is controlled smaller. By reducing the diameter of optical spot in the tangential direction rather than the radial direction, improvement in S/N is attained, and also, a sufficient margin is secured, while information recording or reproduction, or deletion can be performed in such a superior condition.

Furthermore, in the optical pickup in any of the above-mentioned nineteenth through twenty-third embodiments, as a spherical aberration which originates from distance between layers in an optical recording medium can also be effectively reduced, an optical recording medium having a plurality of recording layers can be applied, where the recording capacity increases according to the number of the layers. Moreover, an optical recording medium having recording surfaces on both sides thereof can also be applied. Thereby, it is possible to double the recording capacity.

Thus, according to the nineteenth through twenty-fourth embodiments of the present invention, it is possible to provide an optical pickup compatible between two generations, i.e., blue system and DVD system or among three generations, i.e., blue system, DVD system and CD system, without employing any aperture switching device, or merely with employing an aperture switching device only for two phases not for three phases, and, also, without drastically altering a design configuration of a conventional DVD-system pickup. Accordingly, a compatible machine can be provided with a simple configuration. Furthermore, by providing a static or dynamic phase correction device, even when, with an object lens for blue system, recording or reproduction on DVD or CD is performed, a satisfactory optical spot performance is secured. Accordingly, a high-S/N multi-generation-compatible optical pickup can be achieved with a reduced weight, a reduced cost, and simplified design and manufacture processes. Further, by employing a blue wavelength zone in a light source, and multi-level recording technology, increase in recording capacity more than 22 GB is feasible in an optical information process apparatus.

In the above-mentioned system employing a short wavelength semiconductor laser has a problem that a chromatic aberration produced in the object lens by a wavelength change is nonpermissible. Two causes can be considered for the chromatic aberration. A first cause is that an amount of defocus which is a shift in focal point increases as a refractive index changes remarkably in the object lens due to a slight change in wavelength, in case of applying a short wavelength. A second cause is that, as mentioned above, an optical spot to be formed on an optical recording medium should be reduced for the purpose of increase in recording capacity, and, in such a situation, even a slight defocus is not permitted as a depth of focal point 'd' becomes reduced as the wavelength applied is reduced, as shown in the following formula:

$$D=\lambda/(NA)^2$$

where $\lambda$ denotes the wavelength of a light source, and NA denotes the numerical aperture of the object lens.

The following four main factors causing the above-mentioned chromatic aberration will now be discussed:

(1) variation in the central wavelength of light source;

(2) wavelength change of light source caused by temperature change;

(3) wavelength variation caused by light-emission intensity of light source at a time of information recording/reproduction, or so; and (4) wavelength distribution for multimode light emission.

Each of the above items will now be described.

Generally, the central wavelength of the light source has variations on the order of ±10 nm among product lots. This is based on variations in configuration ratio of activity layer of the semiconductor laser.

(2) When the temperature rises, a shift occurs toward a long wavelength side in connection with reduction in the required energy between bands. In the semiconductor laser of the blue wavelength zone of a GaN (gallium nitrogen) system, it has a temperature dependability on the order of 0.05 nm/degrees C.

(3) When the power of the light source increases from reproduction/deletion power to the recording power, the wavelength shifts on the order of 0.5 nm in the semiconductor laser of the blue wavelength zone of a GaN system.

(4) A technique is employed for applying a spread in spectrum, i.e., a multimode manner in a light emitted by the light source for the purpose of noise reduction, generally. Such a wavelength distribution also causes a chromatic aberration. When the semiconductor laser of the blue wavelength zone of a GaN system is modulated by hundreds of MHz, it has a wavelength distribution on the order of 0.8 nm.

These factors of chromatic aberration can be classified in terms of whether or not a focus servo control can follow up or not. The focus servo control adjusts the position of the object lens in the optical-axis direction. That is, a defocus arises and a fault such as information writing error, poor information reproduction, and poor tracking servo control or so arises until the focal servo control can properly follow up a fluctuation in the wavelength. The factors (1) and (2) are those which the focus servo control can follow up while the factors (3) and (4) are those which it cannot.

Japanese patent No. 3108695, Japanese laid-open patent applications Nos. 9-318873 and 2001-337269 discloses arts addressing these problems. In the art, a group of lenses including positive and negative lenses which are stuck together in front of an object lens are applied. However, such a configuration may increase a weight of an optical pickup, a complicated assembly process thereof, a cost rise, and so forth may arise.

Japanese laid-open patent applications Nos. 7-311337, 8-62496, 9-311271 and 2001-13406 disclose ideas in which an object lens itself has a function of effectively reducing a chromatic aberration. However, in one of these ideas in which a diffraction surface is provided on the object lens, the transmissivity may degrade. In another idea in which a combined lens is used, according to an experiment performed by the inventor of the present invention and so forth, the increase in the weight thereby is too large to be permitted. Japanese laid-open patent application No. 2001-13406 discloses a method of reducing the weight of the object lens. However, by this method in which the diameter of the object lens is reduced, the system may become not sufficiently robust against a fluctuation in eccentricity of the lens, and, also the working distance between the object lens and the optical recording medium may become reduced too much. Accordingly, as the necessary effective diameter of 3.5 through 4.5 mm is needed, this method may not be effective in actual reduction in the weight actually.

The twenty-fifth through thirtieth embodiments of the present invention which will now be described address the above-mentioned problems concerning chromatic aberration and so forth.

Figure 45:
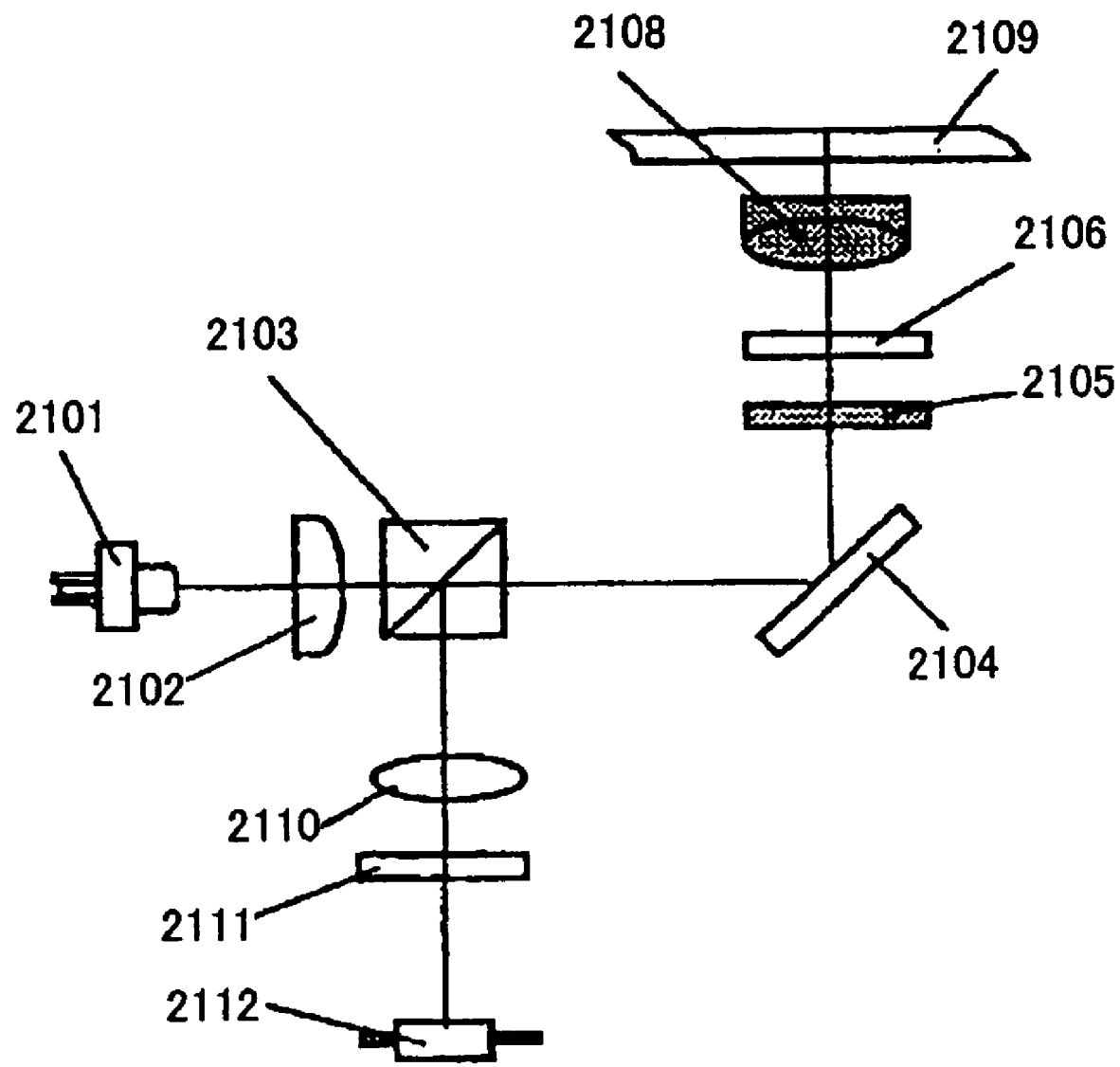
FIG. 45 shows a general configuration of an optical pickup according to a twenty-fifth embodiment of the present invention.

FIG. 45 illustrates an optical pickup in the twenty-fifth embodiment of the present invention for performing information recording, reproduction or deletion on an optical recording medium with an operating wavelength of 407 nm, NA: 0.65 and 0.6 mm in thickness of light-incident side substrate. Essential parts/components of this optical pickup include a semiconductor laser 2101 of a blue wavelength zone, a collimator lens 2102, a polarization beam splitter 2103, a deflection prism 2104, a phase correction device 2105, a ¼-wavelength plate 2106, an object lens 2108, a detection lens 2110, a beam splitting device 2111, and a light-receiving device 2112, as shown.

In this configuration, a beam in a linear polarization emitted from the semiconductor laser 2101 with a wavelength of 407 nm is transformed into an approximately parallel beam by the collimator lens 2102, passes through the polarization beam splitter 2103, is deflected 90 degrees by the deflection prism 2104, and then passes through the phase correction device 2105. After that, the beam passes through the ¼-wavelength plate 2106, by which it is transformed into a circular polarization, is incident onto the object lens 2108, and thereby, it is focused onto the optical recording medium 2109 as a minute beam spot. Informational recording, reproduction, or deletion is performed on the optical recording medium 2109 by this spot.

The light reflected by the optical recording medium 2109 has a circular polarization in the direction opposite to the above-mentioned case of coming toward the optical recording medium 2109 and of an approximately parallel beam, becomes a linear polarization perpendicular to the above-mentioned case of coming toward the optical recording medium by passing through the ¼-wavelength plate 2106, and is reflected by the polarization beam splitter 2103. Then, the beam is focused by the condenser 2110, is deflected in a splitting manner by the beam splitting device 2111 into a plurality of beams, which are then incident on the light-receiving device 2112. From the light-receiving device 2112, an aberration signal, an information signal, and a servo signal are detected.

Figure 46:
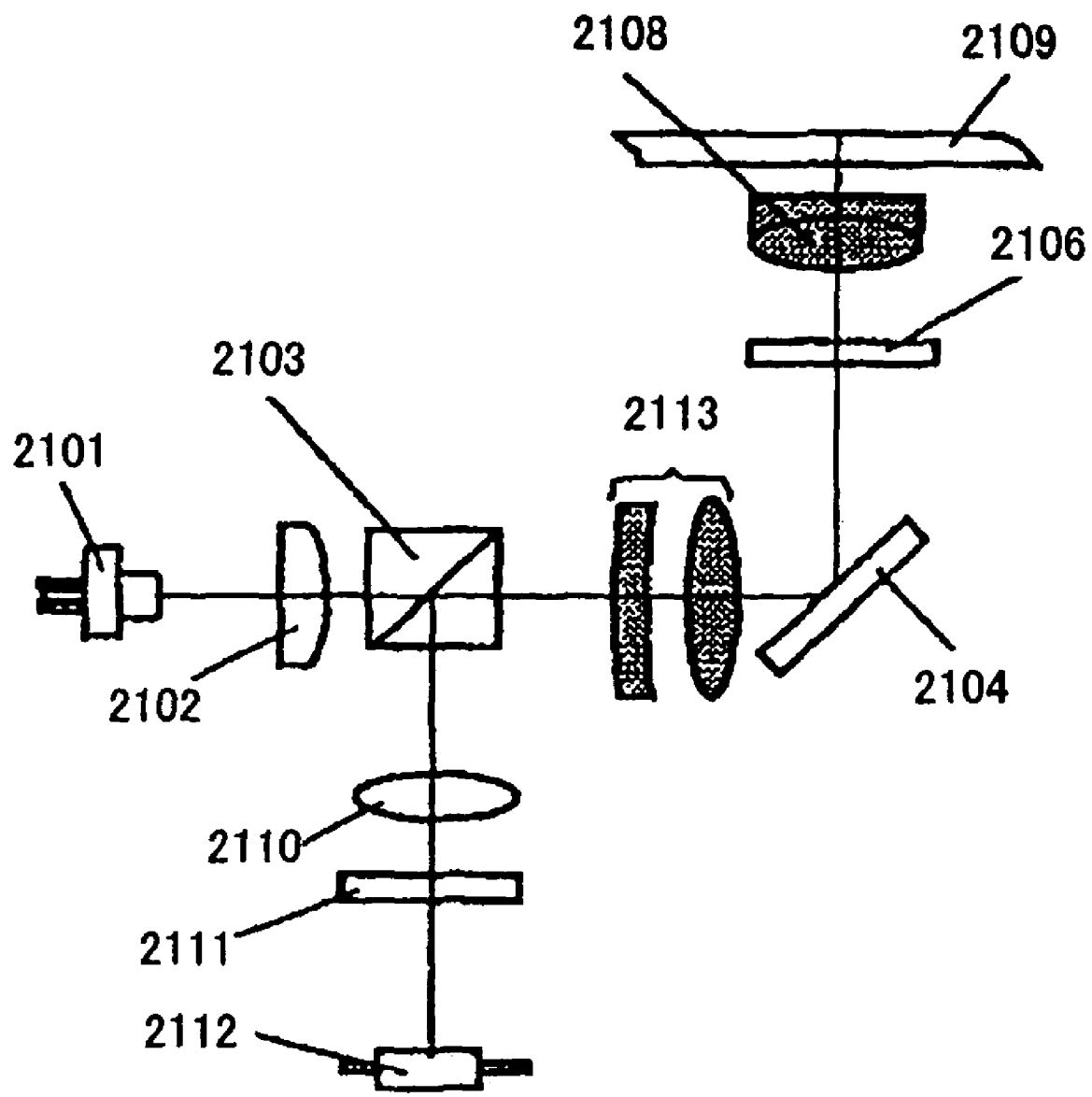
FIG. 46 shows a general configuration of an optical pickup according to a twenty-sixth embodiment of the present invention.

FIG. 46 shows an outline configuration of an optical pickup in the twenty-sixth embodiment of the present invention. This embodiment is the same as the above-described twenty-fifth embodiment except that, instead of the phase correction device 2105, an expander 2113 is used.

Figure 47:
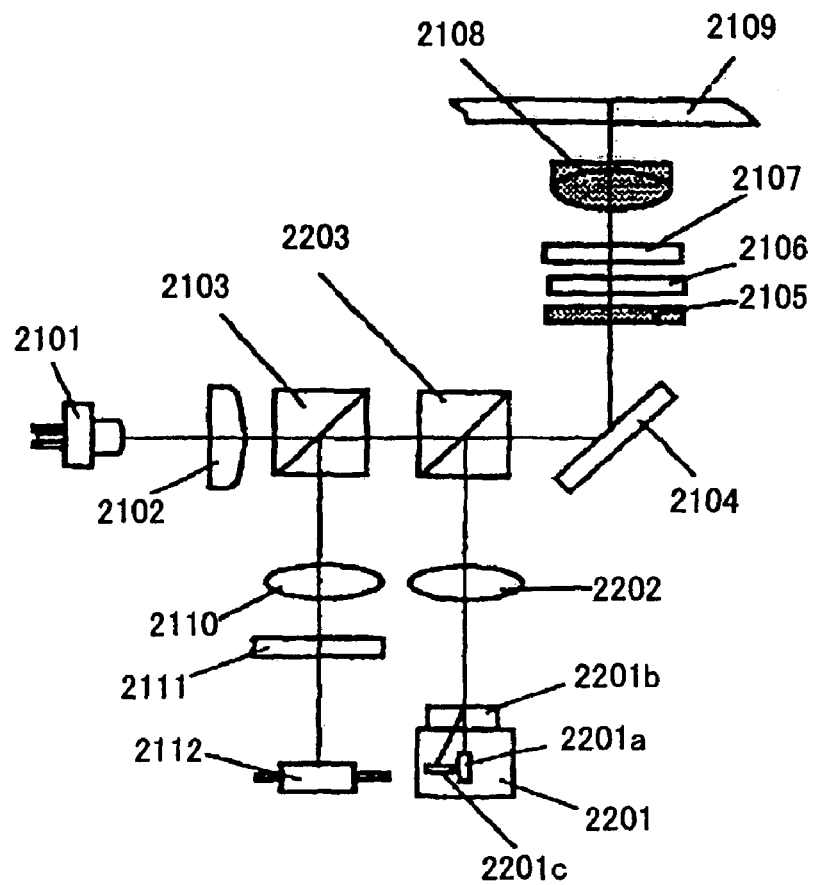
FIG. 47 shows a general configuration of an optical pickup according to a twenty-seventh embodiment of the present invention.

FIG. 47 shows an optical pickup according to the twenty-seventh embodiment of the present invention for performing information recording, reproduction or deletion on a blue-system optical recording medium with an operating wavelength of 407 nm and NA: 0.65, having a light-incident side substrate with a thickness of 0.6 mm, and, also, a DVD-system optical recording medium with an operating wavelength of 660 nm and NA: 0.65, having a light-incident side substrate with a thickness of 0.6 mm. This embodiment is provided with, as shown in FIG. 47, a semiconductor laser 2101 of a blue wavelength zone, a collimator lens 2102, a polarization beam splitter 2103, a dichroic prism 2203, a deflection prism 2104, a phase correction device 2105, a ¼-wavelength plate 2106, an aperture switching device 2107, an object lens 2108, a detection lens 2110, a beam splitting device 2111 and a light-receiving devices 2112, which form a blue optical system provided for a light of the blue wavelength zone. Further, the embodiment also includes a DVD-system optical system provided for a light of a red wavelength zone which includes a hologram unit 2201, a collimator lens 2202, the dichroic prism 2203, the deflection prism 2104, the phase correction device 2105, the ¼-wavelength plate 2106, and the object lens 2108. That is, the dichroic prism 2203, the deflection prism 2104, the phase correction device 2105, the ¼-wavelength plate 2106, and the object lens 2108 are the common parts between the two optical systems. Furthermore, the object lens 2108 is designed so that the optimum wavefront best be provided for the blue-system optical recording medium with the operating wavelength of 407 nm and NA 0.65 having 0.6 mm in thickness of the light-incident side substrate thickness.

In the twenty-seventh embodiment, a case will now be described where information recording, reproduction or deletion is performed on the blue-system optical recording medium with the operating wavelength of 407 nm and NA: 0.65, having 0.6 mm in thickness of light-incident side substrate of the optical recording medium. A light emitted in a linear polarization from the semiconductor laser 2101 with a wavelength of 407 nm is transformed into an approximately parallel beam by the collimator lens 2102, and then, it passes through the polarization beam splitter 2103 and the dichroic prism 2203. Then, the beam is deflected in its light path 90 degrees by the deflection prism 2104, passes through the phase correction device 2105, passes through the ¼-wavelength plate 2106 by which the light is transformed into a circular polarization. After that, the beam passes through the aperture switching device 2107, then, is incident onto the object lens 2108, and, thus, is focused into a minute beam spot on the optical recording medium 2109. Informational recording, reproduction, or deletion is performed by this spot onto the optical recording medium 2109.

Then, after reflected by the optical recording medium 2109, the light has a circular polarization having the direction opposite to that in the above-mentioned case of coming into the optical recording medium 2109, is transformed into an approximately parallel beam again, comes to have a linear polarization as passing through the ¼-wavelength plate 2106 perpendicular to that in the above-mentioned case of coming into the optical recording medium 2109, is reflected by the polarization beam splitter 2103, is transformed into a convergence beam with the condenser 2110, is deflected in splitting manner by the beam splitting device 2111 into a plurality beams, which are then incident on the light-receiving device 2112. From the light-receiving device 2112, an aberration signal, an information signal, and a servo signal are detected.

Next, a case where information recording, reproduction, or deletion is performed onto the DVD-system optical recording medium with the operating wavelength of 660 nm and NA: 0.65, it having 0.6 mm in thickness of the light-incident side substrate thereof will now be described. In recent years, generally, a scheme has been employed in which light receiving/emitting devices are installed into a single can (container) in an optical pickup for DVD, and, a hologram unit which splits a beam using hologram technology. In FIG. 47, the hologram unit 2201 includes integrally a chip 2201a of a semiconductor laser, a hologram device 2201b, and a light-receiving device 2201c.

A 660-nm light which comes out of the semiconductor laser 2201a of this hologram unit 2201, passes through the hologram device 2201b, and is transformed into a parallel beam by the collimator lens 2202. It is then reflected toward the deflection prism 2104 by the dichroic prism 2203 which transmits a light in the blue wavelength zone while reflecting a light in the red wavelength zone for a DVD. The beam is deflected in its light path by 90 degrees with the deflection prism 2104, has a predetermined phase added thereto by the phase correction device 2105, passes through the ¼-wavelength plate 2105, by which it is transformed into a circular polarization, and then, it is incident onto the object lens 2108, after passing through the aperture switching device 2107. Thereby, the beam is focused as forming a minute spot on the optical recording medium 2109, by which spot information recording, reproduction, or deletion is performed on the optical recording medium 2109.

Figure 48:
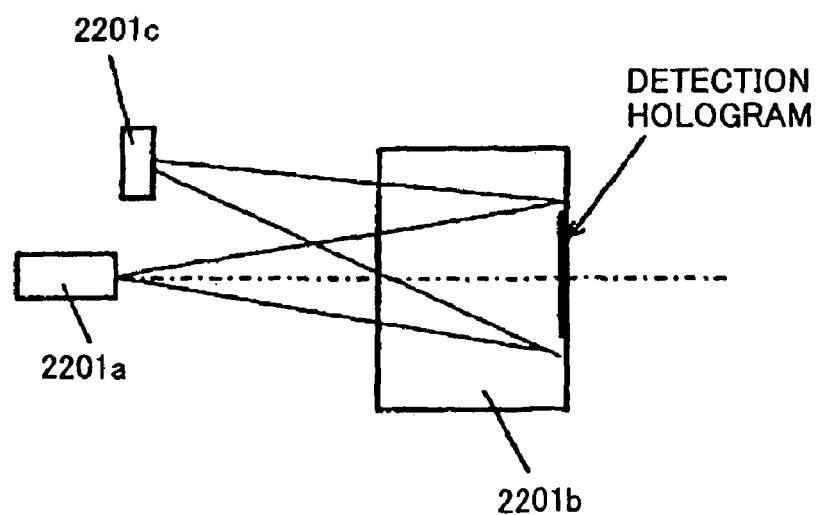
FIG. 48 illustrates a hologram unit shown in FIG. 47.

The beam reflected by the optical recording medium 2109 is deflected by the deflection prism 2104, is reflected by the dichroic prism 2203, is condensed by the collimator lens 2202, and, as shown in FIG. 48, the light reflected by the optical recording medium 2109 is diffracted toward the light-receiving device 2201c which is contained in the same can as the semiconductor laser 2201a, by the hologram device 2201b, and is received by the light-receiving device 2201c. By the light-receiving device 2201c, an aberration signal, an information signal, and a servo signal are detected from the incident light.

Figure 49:
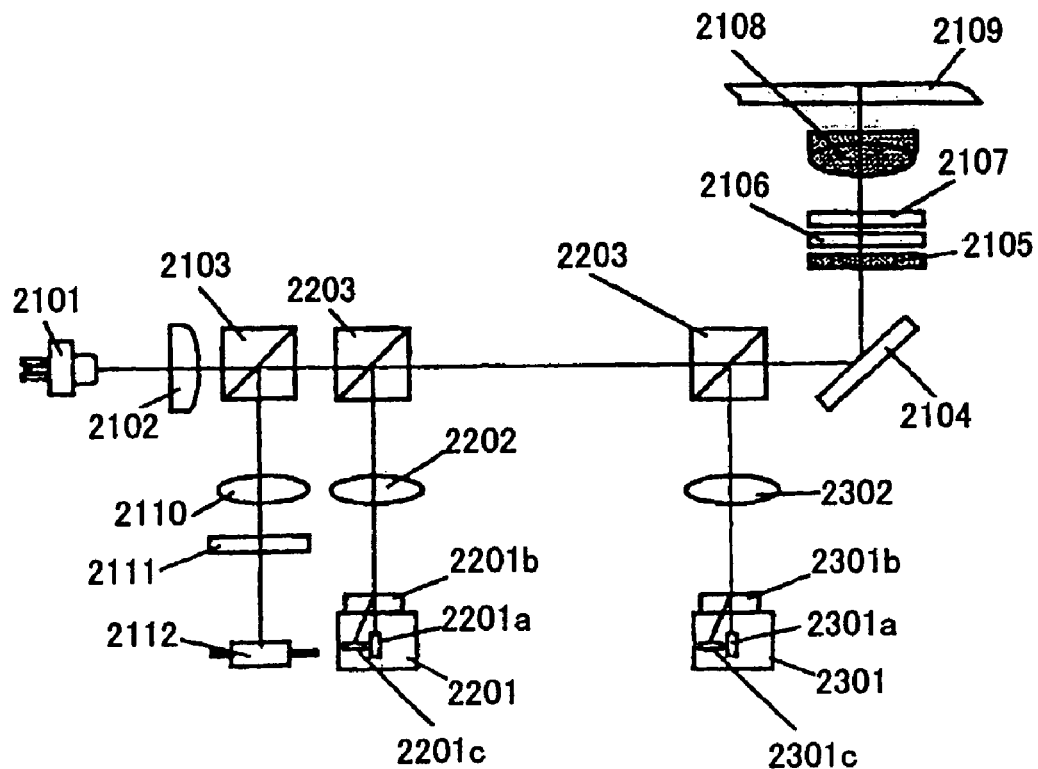
FIG. 49 shows a general configuration of an optical pickup according to a twenty-eighth embodiment of the present invention.

FIG. 49 illustrates an optical pickup according to the twenty-eighth embodiment of the present invention for performing information recording, reproduction or deletion onto a blue-system optical recording medium with an operating wavelength of 407 nm and NA: 0.65, having 0.6 mm in thickness of a light-incident side substrate thereof, a DVD-system optical recording medium with an operating wavelength of 660 nm and NA: 0.65, having 0.6 mm in thickness of a light-incident side substrate, and a CD-system optical recording medium with an operating wavelength of 780 nm and NA 0.50, having 1.2 mm in thickness of a light-incident side substrate.

This optical pickup has a blue-system optical system provided for a light in the blue wavelength zone, which includes a semiconductor laser 2101 of the blue wavelength zone, a collimator lens 2102, a polarization beam splitter 2103, dichroic prisms 2203 and 2303, a deflection prism 2104, a phase correction device 2105, a ¼-wavelength plate 2106, an aperture switching device 2107, an object lens 2108, a detection lens 2110, a beam splitting device 2111 and a light-receiving device 2112. This optical pickup further includes a DVD-system optical system provided for a light in the red wavelength zone, which includes a hologram unit 2201, a collimator lens 2202, the dichroic prisms 2203 and 2303, the deflection prism 2104, the phase correction device 2105, the ¼-wavelength plate 2106, the aperture switching device 2107, and the object lenses 2108. This optical pickup also has a CD-system optical system provided for a light in the infrared wavelength zone, which includes a hologram unit 2301, a collimator lens 2302, a dichroic prism 2303, the deflection prism 2104, the phase correction device 2105, the ¼-wavelength plate 2106, the aperture switching device 2107, and the object lens 2108.

That is, the dichroic prism 2203, 2303, the deflection prism 2104, the phase correction device 2105, the ¼-wavelength plate 2106, the aperture switching device 2107, and object lens 2108 are the common parts between two of or three optical systems. Moreover, as in the above-mentioned twenty-seventh embodiment, the object lens 2108 is designed so that the optimum wavefront be provided for the blue-system optical recording medium with the operating wavelength of 407 nm and NA: 0.65, having 0.6 mm in thickness of the light-incident side substrate thickness.

In this optical pickup in the twenty-eighth embodiment, in a case where information recording, reproduction or deletion is performed on the blue-system optical recording medium with the operating wavelength of 407 nm and NA: 0.65 having 0.6 mm in thickness of the light-incident side substrate thereof, a beam emitted in a linear polarization from the semiconductor laser 2101 with a wavelength of 407 nm is transformed into an approximately parallel beam by the collimator lens 2102, and then, passes through the polarization beam splitter 2103 and the dichroic prisms 2203 and 2303. After that, the light path is deflected 90 degrees by the deflection prism 2104, the beam then passes through the phase correction device 2105, passes through the ¼-wavelength plate 2106, by which it is transformed into a circular polarization. Then, with the aperture switching device 2107 no effect is provided, then the beam is incident onto the object lens 2108, by which it is focused into a minute spot on the optical recording medium 2109. Informational recording, reproduction, or deletion is performed by this spot onto the optical recording medium.

After being reflected by the optical recording medium 2109, the light has a circular polarization in the direction opposite to that in the above-mentioned case of coming into the optical recording medium, is transformed into an approximately parallel beam again, is transformed into a linear polarization perpendicular to that in the above-mentioned case of coming into the optical recording medium by the ¼-wavelength plate 2106, and is reflected by the polarization beam splitter 2103, is transformed into a convergence light with the condenser 2110, is deflected in a splitting manner by the beam splitting device 2111 into a plurality of beams, which are then incident on the light-receiving device 2112. From the light-receiving device 2112, an aberration signal, an information signal, and a servo signal are detected.

Next, a case will now be described where information recording, reproduction or deletion on the DVD-system optical recording medium with the operating wavelength of 660 nm and NA: 0.65, it having 0.6 mm in thickness of the light-incident side substrate thereof. As mentioned above, light receiving/emitting devices are installed in a pickup for a DVD system into one can, and such a hologram unit which separates an incident beam using a hologram is generally used, and, as such, the hologram unit 2201 shown in FIG. 49 integrally includes a semiconductor laser 2201a, hologram 2201b, and light-receiving device 2201c.

The 660-nm light which comes out of the semiconductor laser 2201a of this hologram unit 2201 passes through the hologram 2201b and thus, it is transformed into a parallel beam by the collimator lens 2202. Then, this beam is reflected by the dichroic prism 2203 which transmits a light in the blue wavelength zone while reflects a light in the red wavelength zone for DVD, in the direction toward the deflection prism 2104. By the deflection prism 2104, the light path is deflected 90 degrees, and then, a predetermined phase is added thereto by the phase correction device 2105. The ¼-wavelength plate 2106 then transforms the beam into a circular polarization, and with the aperture switching device 2107, no effect is provided at all, the beam then is incident onto the object lens 2108, by which the beam is focused into a minute spot on the optical recording medium 2109. Informational recording, reproduction, or deletion is performed by this spot on the optical recording medium.

After being reflected by the optical recording medium 2109, the beam is deflected by the deflection prism 2104, is reflected by the dichroic prism 2203, is made into a convergence light by the collimator lens 2202, is diffracted by the hologram 2201b in the direction toward the light-receiving device 2201c which is held in the same can as the semiconductor laser 2201a, and, as shown in FIG. 48, is received by light-receiving device 2201c. From the light-receiving device 2201c, a aberration signal, an information signal, and a servo signal are detected.

Then, a case will now be described where information recording, reproduction, or deletion is performed onto the CD-system optical recording medium with the operating wavelength of 780 nm and NA: 0.50, it having 1.2 mm in thickness of a light-incident side substrate thereof. As in the above-described case for DVD system, a pickup of CD system also has a light receiving/emitting device into one can, and, a hologram unit which separates beams using a hologram is used generally. As such, the hologram unit 2301 shown in FIG. 49 integrally includes a semiconductor laser 2301a, a hologram 2301b, and a light-receiving device 2301c.

A 780-nm light which comes out of the semiconductor laser 2301a of this hologram unit 2301, passes through the hologram 2301b, is made into a parallel light by the collimator lens 2302. After that, this light is reflected by the dichroic prism 2303 which transmits each of lights in the blue and red wavelength zones while reflects a light in the infrared wavelength zone, in the direction toward the deflection prism 2104. By the deflection prism 2104, the light path is deflected 90 degrees and, then, a predetermined phase is added to this light by the phase correction device 2105. The ¼-wavelength plate 2106 transforms the light into an ellipse polarization or a circular polarization, and the light is controlled in its cross section into NA: 0.50 with the aperture switching device 2107. After that, the light is incident onto the object lens 2108, and thereby, it is focused into a minute spot on the optical recording medium 2109. Informational recording, reproduction, or deletion is performed by this spot onto the optical recording medium 2109.

After being reflected by the optical recording medium 2109, the light is deflected by the deflection prism 2104, is reflected by the dichroic prism 2303, and is made into a convergence light by the collimator lens 2302, which is then diffracted in the direction toward the light-receiving device 2301c, and is received by the light-receiving device 2301c. From light-receiving device 2301c, an aberration signal, an information signal, and a servo signal are detected.

According to each of the above-described twenty-fifth through twenty-eighth embodiments, as the object lens 2108, a double stuck combined lens is used. Below, an example of the double stuck combined lens used here will now be described with reference to FIG. 50 also showing the aperture and the object lens together with the light-incident side substrate of the optical recording medium.

Figure 50:
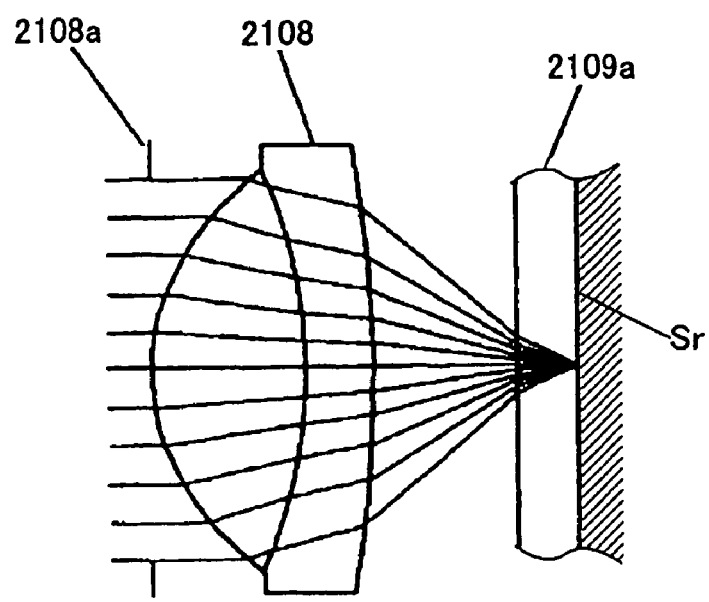
FIG. 50 illustrates an arrangement of an optical system according to the twenty-fifth embodiment.

In FIG. 50, the numeral reference 2108*a* denotes an imaginary aperture (which is the aperture control device 2107 or so actually), 2108 denotes the object lens and 2109*a* denotes the light-incident side substrate (thickness: 0.6 mm) of the optical recording medium. A beam from a light source side (left-hand side of FIG. 50) passes the opening (effective diameter: 3.9 mm) of the aperture 2108*a* as a parallel beam, and is incident onto the object lens 2108. The beam is made into a condensing beam with the object lens 2108, passes through the light-incident side substrate 2109*a* of the optical recording medium, is focused onto a recording surface Sr (right-hand side surface of the light-incident side substrate 2109*a* in the figure), and forms an optical spot thereon.

It is assumed that the object lens 2108 substantially has the numerical aperture of NA, focal length of 'f', the refractive index and the number of Abbe of the material are expressed as 'nd' and 'vd', respectively. Furthermore, an aspherical shape of the lens surface is determined by the following well-known aspherical-surface formula:

$$X=(Y^2/R)/[1+\sqrt{1-(1+K)Y/R^2}]+AY^4+BY^6+CY^8+DY^{10}+EY^{12}+FY^{14}+GY^{16}+HY^{18}+JY^{20}+\ldots]$$

where

X denotes the coordinate along the optical axis direction; Y denotes the coordinate along the direction perpendicular to the optical axis; R denotes the paraxial curvature radius; K denotes the cone constant; A, B, C, D, E, F, . . . denote high-order coefficients.

In this object lens 2108, the operating wavelength is 407 nm, and has NA: 0.65, f: 3.0 mm, and made of two types of glass materials of nd=1.69350, vd=53.2; and nd=1.92286, vd=20.9.

The specific data thereof is shown below:
Surface OBJ:
Curvature radius: infinity;
Thickness: infinity;
nd, vd: NA
Surface STO:
Curvature radius: infinity;
Thickness: 0.0 mm;
nd, vd: NA
Surface S1:
Curvature radius: 2.17087 mm;
Thickness: 1.531703 mm;
nd, vd: 1.69350, 53.2
K: −0.687287; A: 0.233052×10$^{-2}$; B: 0.933281×10$^{-4}$;
C: −0.114278×10$^{-4}$; D: 0.278221×10$^{-5}$;
E: −0.570562×10$^{-6}$; F: −0.314319×10$^{-7}$; G: 0.191630×10$^{-7}$;
H: 0.187299×10$^{-8}$; J: −0.202028×10$^{-9}$
Surface S2:
Curvature radius: −5.21857 mm;
Thickness: 0.661544 mm;
nd, vd: 1.92286, 20.9
Surface S3:
Curvature radius: −14.16919 mm;
Thickness: 1.438349 mm;
nd, vd: NA
Surface S4
Curvature radius: infinity;
Thickness: 0.6 mm;
nd, vd: 1.516330, 64.1
Surface IMG
Curvature radius: infinity;
Thickness: 0.0 mm;
nd, vd: NA
Incident pupil diameter (effective diameter of the aperture 2108*a*): 3.9 mm
Wavelength: 407 nm OBJ denotes an object point (semiconductor laser as the light source). However, the object lens 2108 is used for an infinite system, and INFINITY in each of the curvature radius and thickness means that the light source is present at infinity. STO denotes the surface of the aperture 2108*a*, where the curvature radius is determined infinity and the thickness is determined '0' for a design purpose.

S1 denotes the surface of the object lens 2108 directed to the light source; S2 denotes a surface on which the two lenses are stuck together; S3 denotes the surface of the object lens 2108 directed toward the optical recording medium. The lens thickness which is the separation between the surface S1 and S3 is 2.193247 mm, and, the thickness of 1.438349 mm of the surface S3 denotes the working distance.

S4 denotes the light-incident side surface of the light-incident side substrate 2109*a*, IMG denotes the recording surface Sr of the optical recording medium. The separation between S4 and IMG, i.e., the thickness of the light-incident side substrate is 0.6 mm, in which nd=1.516330, vd=64.1.

In this configuration, it is preferable that, in the two combined stuck lens, the first surface S1 be an aspherical surface, the third surface S3 be any of an aspherical surface, spherical surface or flat surface, and the intermediate sticking surface be a spherical surface.

Figure 51A:
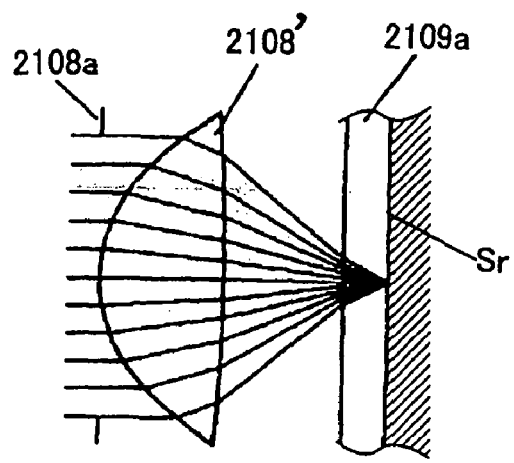
FIG. 51A illustrates an arrangement of optical system in a case of employing a single isolated object lens.
Figure 51B:
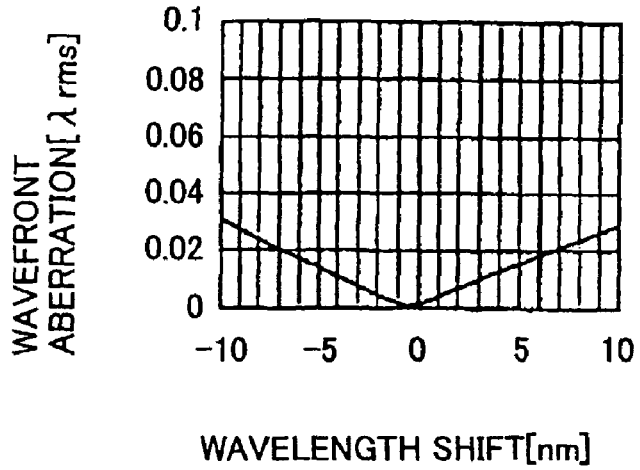
FIGS. 51B and 51C illustrate wavefront aberrations in two different types.
Figure 51C:
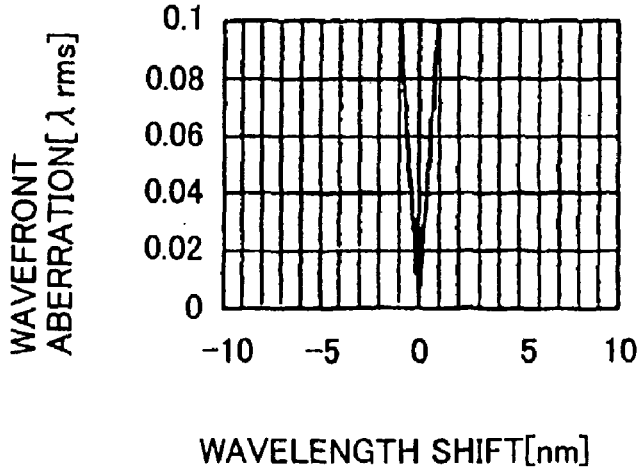

A single object lens 2108' shown in FIG. 51A for a comparison purpose, has the following characteristics, a change in the aberration according to the operating wavelength shifted from 407 nm of the central wavelength is shown in FIGS. 51B and 51C.

Incidence beam diameter: 3.9 mm;
Type of glass: BaCD5 (made by Hoya Corp.);
Thickness of substrate in the optical recording-medium: 0.6 mm FIG. 51B shows the wavefront aberration where the focus servo operation is performed so that the best focus state is obtained for each wavelength while FIG. 51C shows the wavefront aberration where the focus servo operation is fixed at a position at which the best focus state is obtained for the wavelength of 407 nm. That is, from FIG. 51B, a state of increase in the wavefront aberration can be seen for ① a variation in light-source beam emission wavelength due to a particular product or ② a fluctuation of the same according to the temperature change which (the order of milliseconds) the focus servo control can follow up. On the other hand, from FIG. 51C, a state of increase in the wavefront aberration can be seen for ③ a change in light-source beam emission wavelength according to the output shift of the same at a time of information recording/reproduction, or ④ a change of the same according to the wavelength distribution in multi-mode light emission which the focus servo control can not follow up, as mentioned above.

As described above, for the above-mentioned ① variation in the wavelength or ② fluctuation in the same which the focus servo can follow up, the order of ±10 nm should be anticipated. On the other hand, for the above-mentioned ③ change or ④ change which the focus servo cannot follow up, the order of ±1 nm should be anticipated.

On the other hand, as to the allowable maximum wavefront aberration, generally speaking, it should be controlled within 0.07λ which is the Marechal's reference value which can be regarded as negligible. Accordingly, in this case, as a first requirement, the wavefront aberration occurring after the focus servo control is performed should be less than 0.07λ for a range of ±10 nm of the central wavelength. As a second requirement, the wavefront aberration should be less than 0.07λ for a range of ±1 nm of the central wavelength.

In these terms, the single object lens 2108' shown in FIG. 51A does not satisfy the second requirement as shown in FIG. 51C. Accordingly, in this case, the beam spot may not be well focused on the optical recording medium, and, thus, signal recording/reproduction error/degradation may occur. Accordingly, some special device which can effectively reduce the aberration is needed for putting this machine into a practical use.

Figure 52:
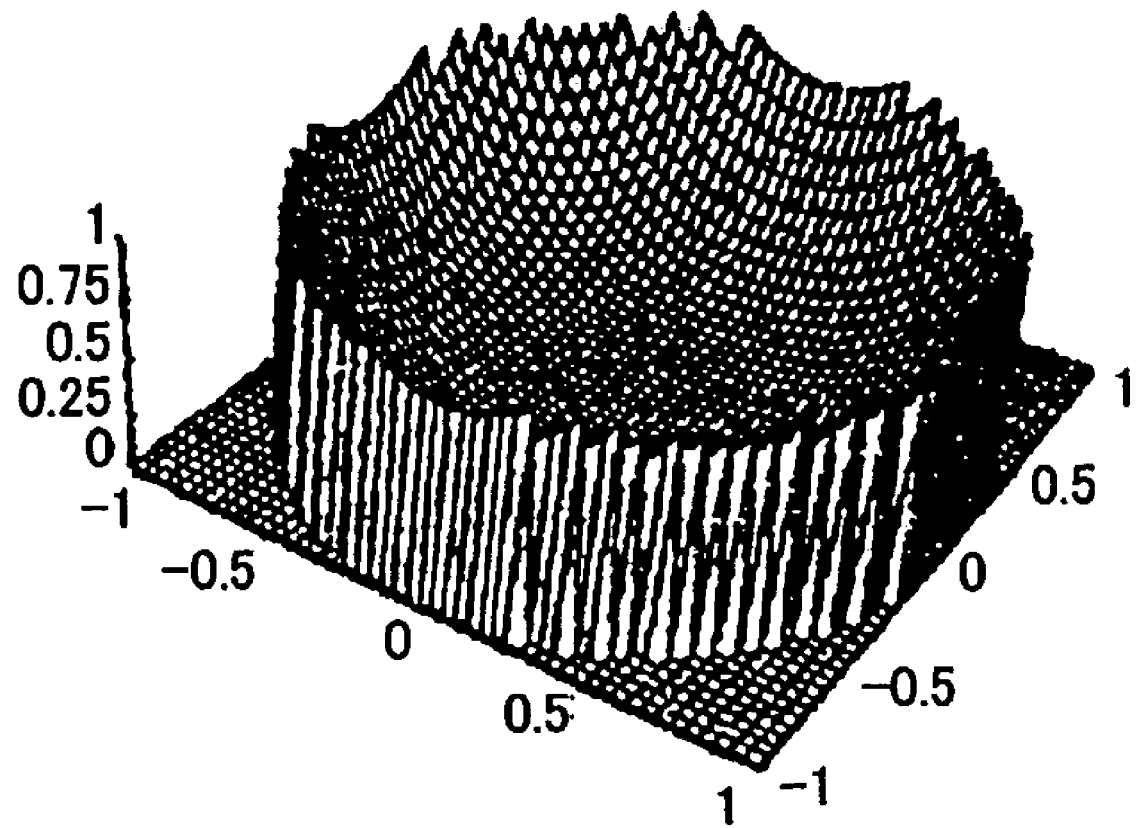
FIG. 52 shows a wavefront aberration in a three-dimensional manner.

FIG. 52 shows a situation of wavefront aberration which increase according to a wavelength change. As shown in the figure, this has an even-th shape symmetrical with respect to the optical axis. A specific device for effectively reducing such a symmetrical aberration with respect to the optical axis will now be described. Two types of devices for this purpose can be considered. One thereof is to provide a concentric circular phase shift to a beam to be incident onto the object lens. The other one is to control the divergence state of the object lens incidence light.

Figure 53A:
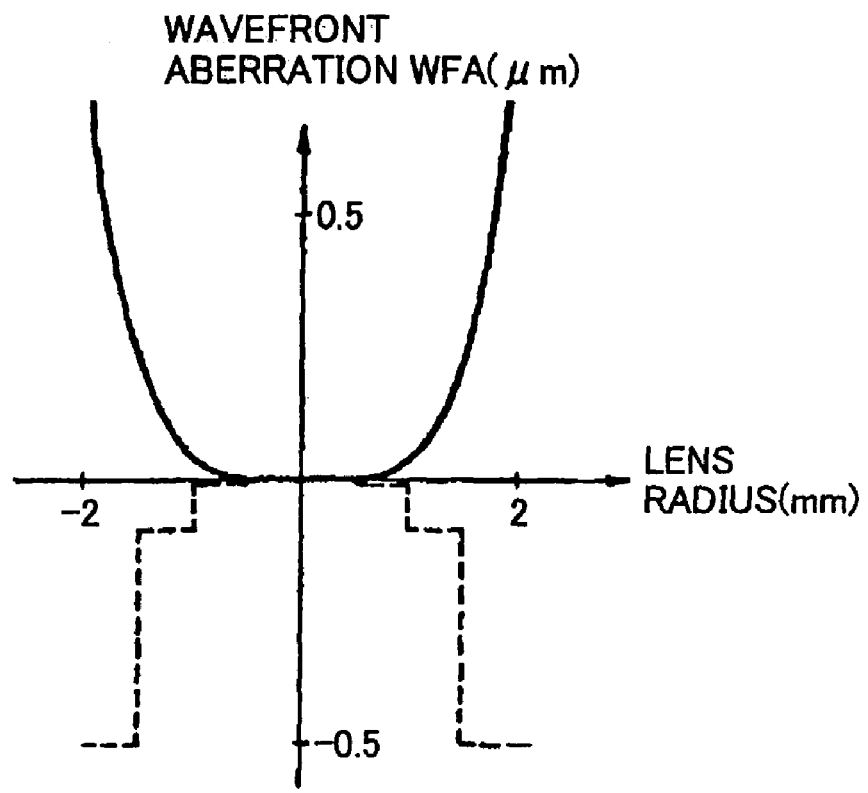
FIGS. 53A, 53B, 54A and 54B illustrate a principle of a scheme of wavefront aberration correction according to the present invention.
Figure 53B:
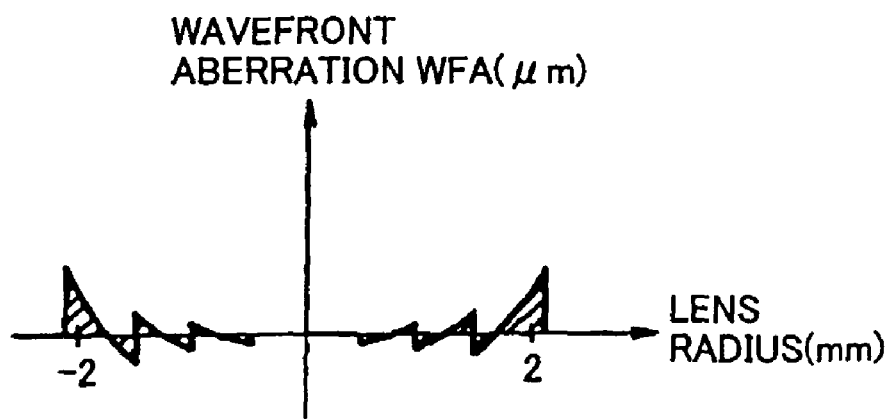

First, how to give a concentric circular phase shift to a beam incident onto the object lens will now be described. To give a concentric circular phase shift to a beam means to give a concentric circular shift in delay on a wavefront of the beam. Accordingly, the desired effect can be achieved by providing an aberration which has the magnitude same as but has the opposite polarity to the aberration which the entire optical system originally has. For example, it is assumed that the aberration occurring is as shown in FIG. 52. The solid curve line, shown in FIG. 53A, shows the same wavefront aberration expressed as a 2-dimensional curve. When a phase shift shown by the broken curve shown in FIG. 53A is provided to a beam which is incident onto the object lens from the end of light source, the aberration can be cancelled out by the delay of the wavefront of the beam to which the phase shift is thus provided. FIG. 53B shows the sum of the solid curve (wavefront aberration) shown in FIG. 53A, and the broken curve (delay of the wavefront provided by the intentionally provided phase shift). Accordingly, by providing a correction device which can provide the phase shift as shown by the broken curve shown in FIG. 53A, the aberration can be well corrected or effectively reduced as shown in FIG. 53B.

Figure 54A:
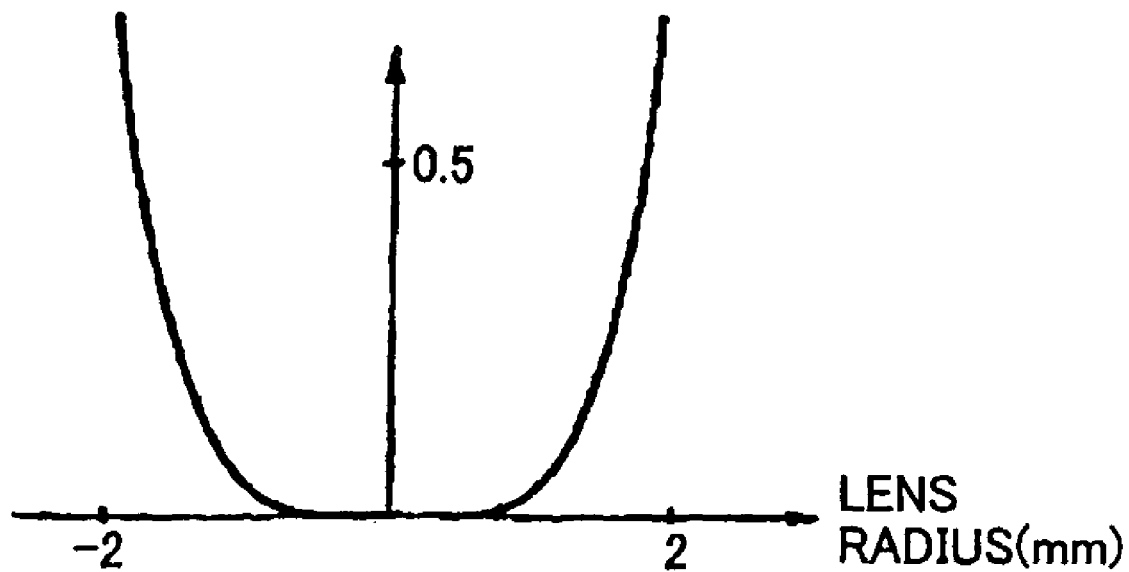
Figure 54B:
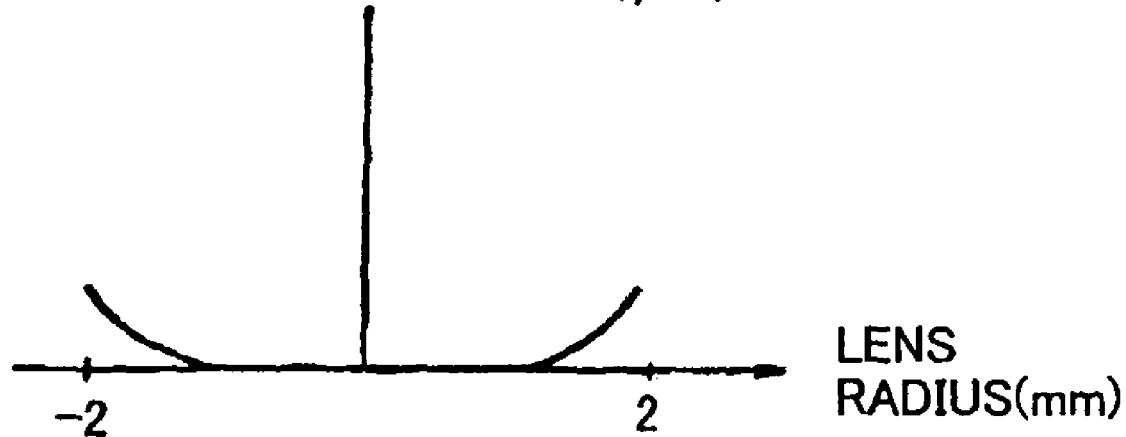

A similar effect can be achieved also by an aberration correction device which changes the divergence state of a beam incident onto the object lens. To change the divergence state of a beam incident onto the object lens is equivalent to, to generate an aberration symmetrical with respect to the optical axis. Accordingly, by appropriately changing the divergence state of the beam, it is possible to generate an aberration having the same magnitude, but has the opposite polarity to the aberration which the entire optical system originally has, so as to cancel it out. It is assumed that the aberration symmetrical with respect to the optical axis which the entire optical system of the relevant machine originally has is as shown in FIG. 52. FIG. 54A shows the same wavefront aberration as a 2-dimensional curve. When the divergence state of the incidence beam onto the object lens is changed appropriately, a wavefront aberration as shown in FIG. 54B is obtained. In comparison to the same shown in FIG. 54A, it is clearly seen that the wavefront aberration is well corrected or effectively reduced.

By applying such an aberration correction device, it becomes possible to well control the wavefront aberration caused by the above-mentioned ① variation in the wavelength or ② fluctuation of the same which the focus servo control can follow up.

Figure 67:
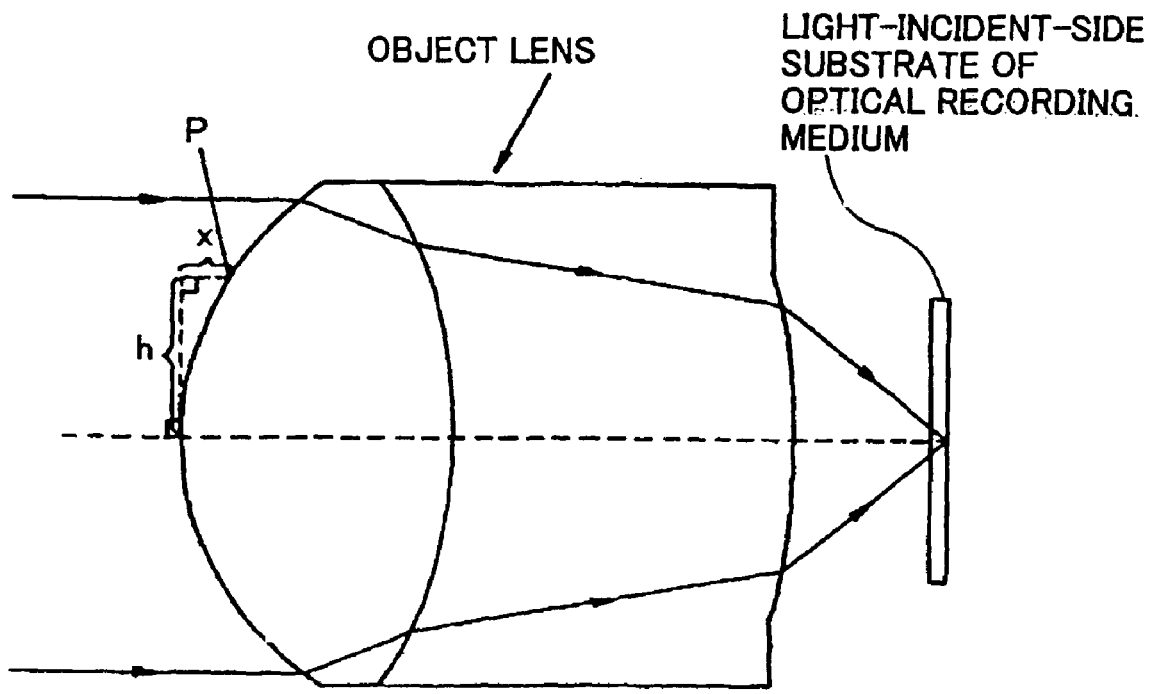
FIG. 67 illustrates a two-piece-stuck combined lens in the related art.

On the other hand, in order to well control the wavefront aberration occurring due to the above-mentioned ③ change in wavelength or ④ the same due to wavefront distribution which the focus servo control cannot follow up, it is advantageous to apply a two combined stuck lens combining a convex lens and a concave lens having different Abbe's numbers such as that disclosed by Japanese laid-open patent application No. 2001-13406 (see FIG. 67), for example.

Figure 55:
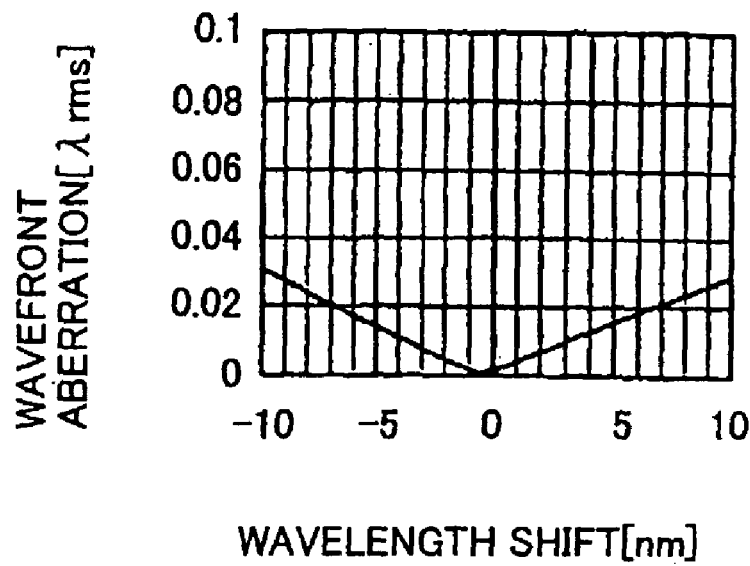
FIG. 55 shows a wavefront aberration in case where the object lens is fixed to a best focus position of 407 nm.

FIG. 55 shows a change in wavefront aberration with respect to a wavelength change in case the focus servo is fixed at the best focus position on the central wavelength of 407 nm. In this figure, the broken-line curve shows the change in wavefront aberration in the same conditions on the case of the single object lens 2108' (see FIG. 51A) shown in FIG. 51C, while the solid-line curve shows the wavefront aberration in the same condition on the case of the combined stuck object lens 2108 in each of the above-mentioned twenty-fifth through twenty-eighth embodiments. Compared with the single isolated ball object lens 2108', the wavefront aberration falls within 0.07λ, even when the wavelength changes on the order of ±1 nm. Accordingly, the chromatic aberration is satisfactorily controlled in the case of two stuck combined lens 2108 according to the present invention.

Moreover, the weight of the combined stuck object lens 2108 shown in FIG. 50 is approximately 85 mg, and thus, it is lighter than that in the art disclosed in the above-mentioned Japanese laid-open patent application No. 2001-13406. This is because, according to the twenty-fifth through twenty-eighth embodiments, an aberration correction is achieved by utilizing a separate device such as a phase correction device described later for a wavelength variation or wavelength fluctuation which the focus servo control can follow up. Thereby, a sufficient performance can be ensured even when the thickness of the object lens is reduced. Furthermore, by applying such glass types different in Abbe's number by more than 30 as mentioned above, the chromatic aberration can be sufficiently corrected or reduced by such a type of combined stuck object lens.

As mentioned above, according to the twenty-fifth through twenty-eighth embodiments of the present invention, the chromatic aberration caused by wavelength change which the focus servo control by an actuator cannot follow can be well corrected or reduced. On the other hand, as for the other types of wavelength variation/fluctuation, i.e., the above-mentioned ① variation in oscillation wavelength in particular product of the light source or ② fluctuation in wavelength due to temperature change, the chromatic aberration caused by this type of wavelength variation/fluctuation can be well controlled by means of the phase correction device 2105 or expander 2113 described above. Such a type of correction device can perform a sufficient chromatic aberration control function as a result controlling its phase shift or its moving amount according to an output signal provided by a predetermined wavefront aberration detection device.

Figure 56:
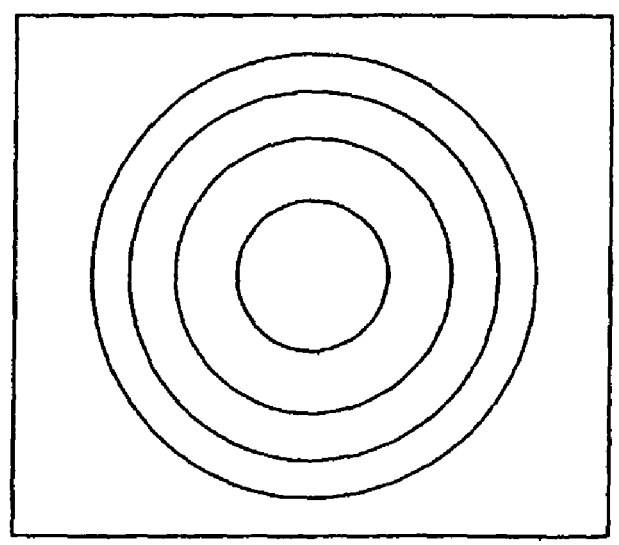
FIG. 56 illustrates an electrode pattern of a liquid crystal device used as a phase correction device according to the present invention.

As for the above-mentioned phase correction device 2105, an electro-optic device such as a liquid crystal device may be applied, as shown in FIG. 56. Specifically, as shown in FIG. 56, a liquid crystal device can change the refractive index 'n' of the liquid crystal at each electrode division free in a range between n1 and n2, as a transparent electrode at least one side is divided in a shape of concentric circles, to which applied is a voltage independently for each electrode division (with respect to a common electrode) of each concentric circular zone, and controls the above-mentioned voltage. When the refractive index 'n' is controlled, a desired phase difference Δn·d (2π/λ) can be given to an incident light which passes through each zone, as a result of a light path difference Δn·d being controlled (Δn denoting a difference in the refractive index, and d denoting the cell thickness of liquid crystal), where the wavelength is denoted as λ.

It is assumed that a spherical aberration occurring due to difference in wavelength or substrate thickness which is detected by the wavefront aberration detection device, which will be described later is as shown in FIG. 53A. A solid curve shown in FIG. 53A shows this wavefront aberration as a 2-dimensional curve. When a voltage applied to each concentric circular electrode of the liquid crystal device is adjusted so that a phase difference as shown by a broken curve shown in FIG. 53A be given to a beam which is incident onto the object lens from the side of the light source, the wavefront aberration can be cancelled out thanks to the delay of the wavefront in each concentric cross-sectional part of the beam which passes through the liquid crystal device. FIG. 53B shows the sum total of the solid curve (spherical aberration) in FIG. 53A, and the broken curve (delay of the wavefront cause by the liquid crystal device), i.e., the wavefront aberration after correction. Thus, the wavefront aberration can be remarkably corrected or reduced.

Figure 57:
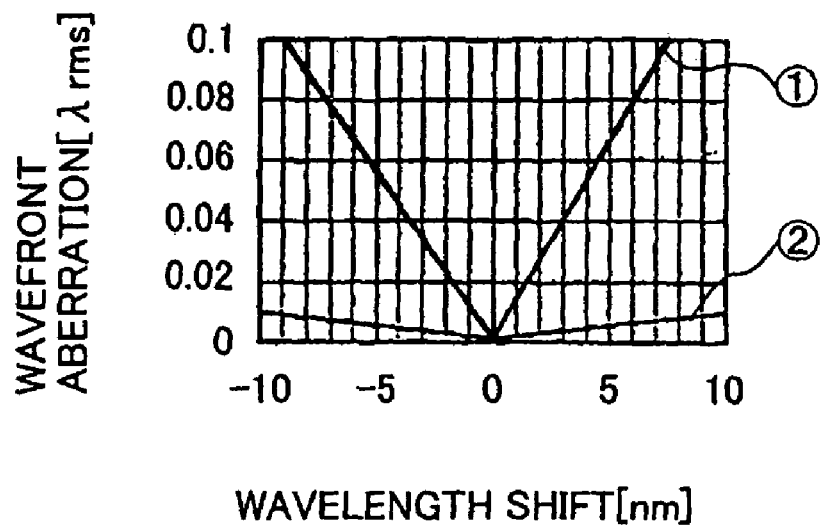
FIG. 57 illustrates an effect of phase correction on the wavefront aberration.

FIG. 57 shows a situation of wavefront aberration after a focal adjustment of the object lens 2108 of FIG. 50 is performed. As can be seen therefrom, it is clear that the satisfactory wavefront is obtained for each wavelength by applying such a phase correction device, where the curve ① shows the case where the phase correction device is not applied while the curve ② shows the case where the same is applied.

By the way, when NA of the object lens is further increased or the wavelength of the light source is further shortened, the influence of wavefront aberration caused due to a manufacture error of the lens, the thickness error of the transparent substrate of the optical recording medium, etc. becomes relatively conspicuous. The wavefront aberration caused due to the thickness error of the transparent substrate of the optical recording medium is given by the following formula, in general:

$$W_{40} = (n^2 - 1)/(8n^3) \times (d \times NA^4 / \lambda)$$

where 'n' denotes the refractive index of the transparent substrate of the optical recording medium; 'd' denotes the thickness of the transparent substrate; NA denotes the numeral aperture of the object lens; and λ denotes the wavelength of the light source.

From this formula, it is clear that the wavefront aberration becomes larger as the wavelength is shortened or NA is increased. Similarly, also, due to a manufacture error of various optical parts/components, especially, the object lens used for focusing a beam onto the optical recording medium in the optical pickup, an increase in the aberration becomes conspicuous as the wavelength is reduced or NA is increased. From such a matter, a special device for well controlling the wavefront aberration is needed to be provided in such an optical pickup applying the increased NA or shortened wavelength.

Further, when a multilayer optical recording medium having a plurality of recording layers on each of which information is recorded for the purpose of effectively increasing the recording capacity is applied, the distance between respective recording layers (spacer thickness) also causes a wavefront aberration. In the generation of blue system, 30-micrometer order is assumed, and, thus, a control of the wavefront aberration is demanded.

Furthermore, when a light of red wavelength zone is applied to the object lens designed so that the wavefront aberration becomes minimum especially for the blue wavelength zone with an infinite system and a beam spot is formed onto a DVD-system optical recording medium, or a light of infrared wavelength zone is applied with an infinite system and a beam spot is formed onto a CD-system optical recording medium, the wavefront aberration and chromatic aberration caused due to a difference in wavelength or a difference in substrate thickness may occur. Accordingly, for the purpose of achieving a compatibility with a conventional optical recording medium, an aberration correction device is needed.

Each of these aberrations is an aberration symmetrical with respect to the optical axis, and the shape thereof similar to that shown in FIG. 52. Accordingly, it is possible to apply a common phase correction device such as that described above for correcting or effectively reducing aberrations caused due to the above-mentioned substrate thickness error, the spacer thickness of multilayer optical recording medium, and for the compatibility with the conventional optical recording medium with the aberration correction device for a wavelength change. As for the medium identification device for identifying the type of the optical recording medium loaded so as to appropriately setting the phase shift of the phase correction device, a configuration in which a light source of blue, red, or infrared is turned on, and, then, a luminous energy level of a returning light reflected by the optical recording medium loaded is detected may be used for the medium type identification, for example.

Figure 58:
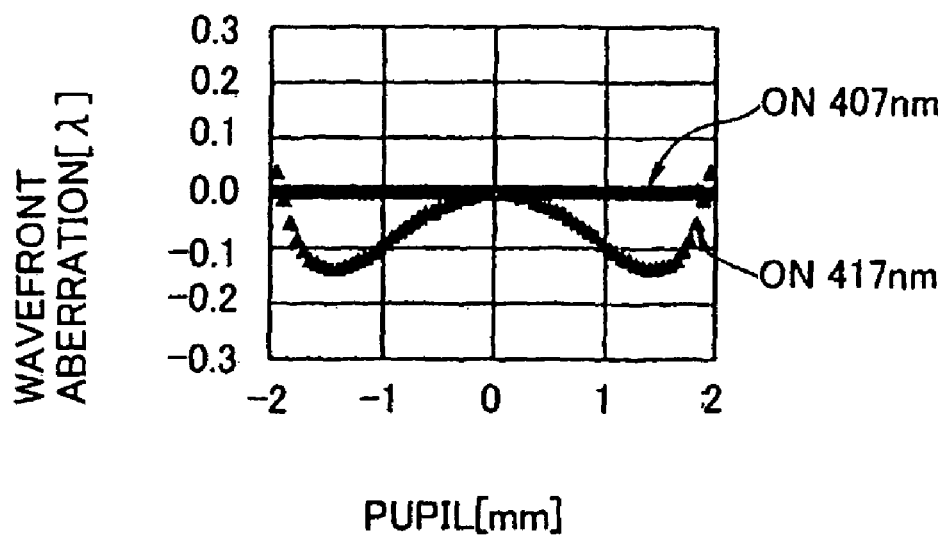
FIG. 58 shows wavefront aberrations in different wavelengths.
Figure 59:
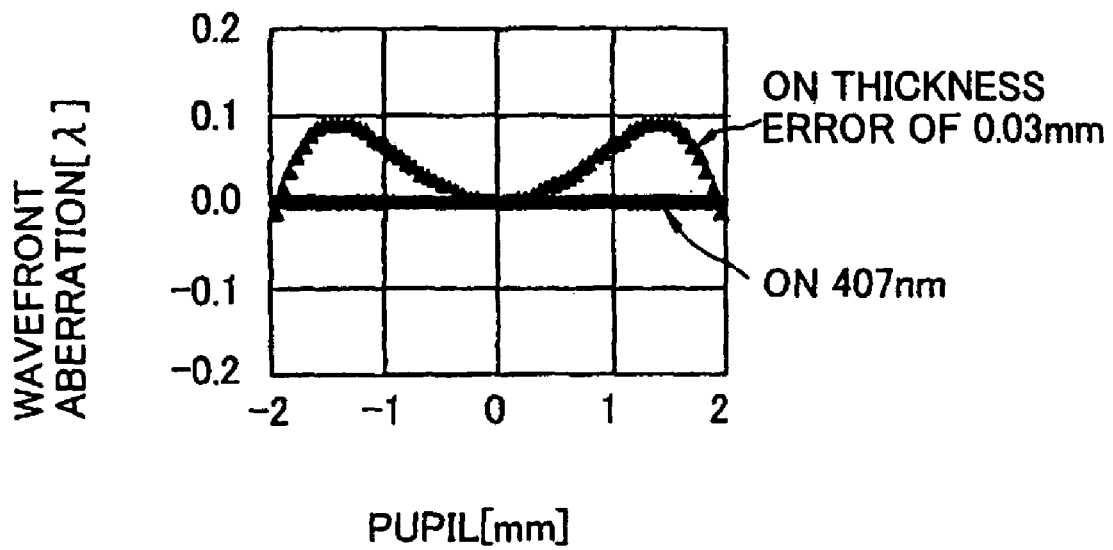
FIG. 59 shows a change in wavefront aberration due to substrate thickness error.

Accordingly, the phase correction device 2105 in each of the twenty-fifth through twenty-eighth embodiments of the present invention may also be used for correcting or effectively reducing the wavefront aberration occurring due to the substrate thickness error of a blue-system optical recording medium, interlayer distance (spacer thickness) of a multilayer optical recording medium, and so forth, together. For example, the wavefront aberration (sectional view) when a light with a wavelength of 417 nm is applied onto the object lens 2108 designed for a central wavelength of 407 nm shown in FIG. 50 is shown in FIG. 58. On the other hand, the wavefront aberration (sectional view) when the thickness of the optical recording medium applied shifts 0.03 mm with the same object lens 2108 becomes as shown in FIG. 59. As shown, it can be seen that each aberration has an even-th shape symmetrical with respect to the optical axis. Accordingly, it can be well controlled by applying the above-mentioned phase correction device 2105.

Figure 60:
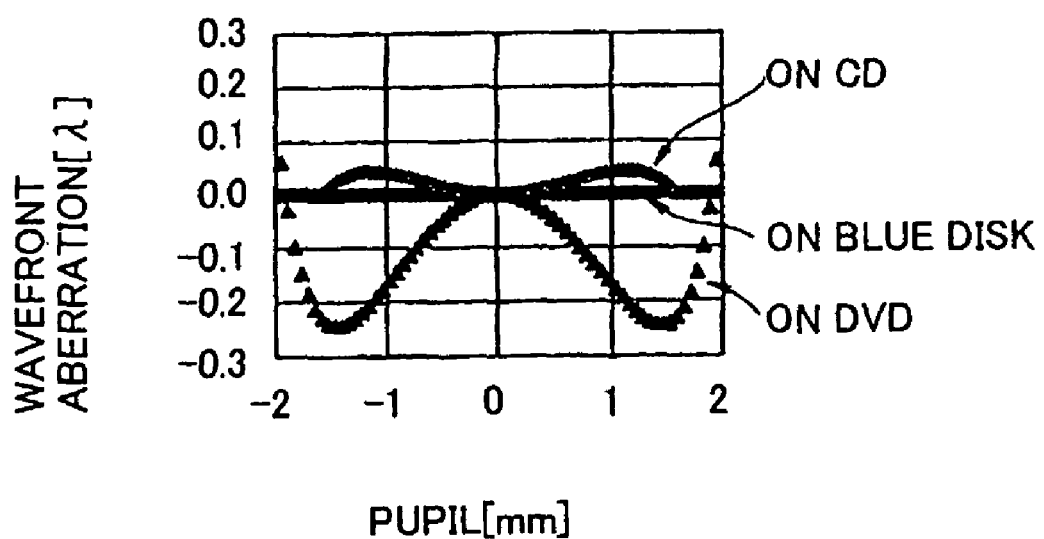
FIG. 60 shows a change in wavefront aberration according to a difference in type of optical recording medium.

Moreover, the phase correction device 2105 in each of the twenty-fifth through twenty-eighth embodiments may also be used for well controlling collectively of the wavefront aberration occurring when a conventional optical recording medium, such as a DVD-system optical recording medium or a CD-system optical recording medium is loaded, and a beam spot is formed thereon by the optical pickup in the embodiment. FIG. 60 shows the wavefront aberrations occurring when a beam spot is formed in the conditions of the wavelength of 660 nm, substrate thickness 0.6 mm and NA: 0.65 using the object lens designed for the central wavelength of 407 nm, optical recording-medium substrate thickness 0.6 mm and NA: 0.65; and the wavefront aberration occurring in the conditions of the wavelength of 780 nm, the substrate thickness 1.2 mm and NA: 0.50, respectively. As can be seen from the figure, each wavefront aberration has an even-th shape symmetrical with respect to the optical axis as those shown in FIGS. 58 and 59. Accordingly, by applying the above-mentioned phase correction device 2105, each of these wavefront aberrations occurring when a beam spot is formed on a different-type of optical recording medium can be well controlled.

Figure 61:
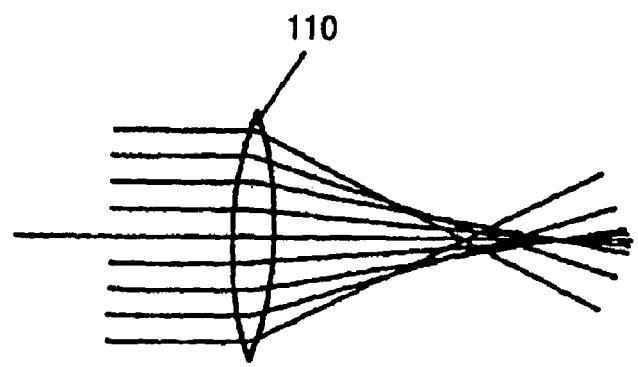
FIGS. 61 and 62 illustrate a principle of wavefront detection scheme according to the present invention.

As mentioned above, according to the twenty-fifth through twenty-eighth embodiments of the present invention, as a control signal for the phase correction device 2105, an output signal of a wavefront aberration detection device may be used. As described above with reference to FIG. 52, a chromatic aberration occurs due to occurrence of wavefront variation or wavelength fluctuation, and, thereby, a shape of a beam spot formed on the recording surface of an optical recording medium applied is distorted. Thereby, the wavefront of a beam reflected by the recording surface is distorted, and thus, an aberration occurs in the beam returning to the light-receiving device 2112 via the detection lens 2110 shown in FIG. 45. FIG. 61 shows this state. When such an aberration occurs in the returning beam, with respect to a standard wavefront of the returning beam, a delay in wavefront occurs concentrically about the optical axis, and a position at which the wavefront delayed with respect to the focus point at which the standard wavefront focuses is in a defocus state. Then, the state of spherical aberration can be seen by taking out the difference between the delayed wavefront and the standard wavefront, and thus, the focus state can thus be detected.

Figure 62:
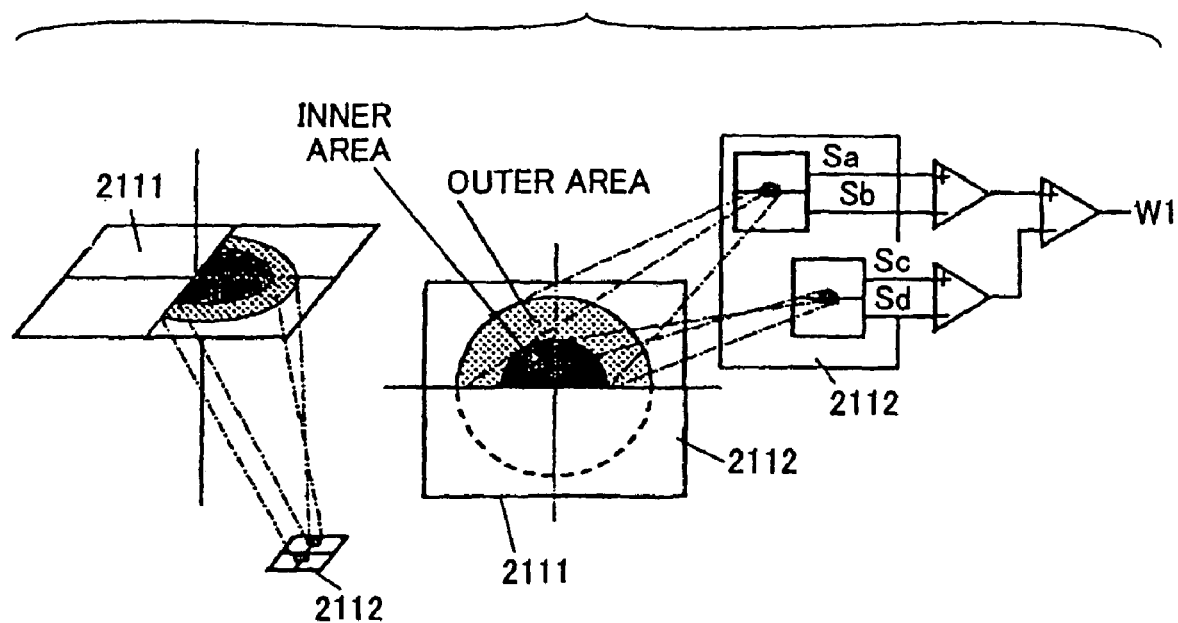

For example, as shown in FIG. 62, a light-receiving device 2112 is provided in which a light-receiving area is divided, while a concentric division pattern of a hologram 2111 is provided, whereby each concentric cross-sectional zone of an incident beam can be detected. As shown in FIG. 62, the hologram 2111 has a configuration such that symmetrical dividing in the jitter direction (of an optical recording medium loaded) on the plane perpendicular to the optical axis is made, and, one division is further divided concentrically, and, thus, a hologram is formed. A light-receiving device 2112 includes 2-divided light-receiving devices which detect beams diffracted by the hologram, as shown. The amounts of movements of light-point images of a hologram-diffracted light are detected thereby, and a difference W1 between a difference (Sa−Sb) and a difference (Sc−Sd) detected by the respective light-receiving devices is regarded as the spherical aberration, as follows:

$$W1 = (Sa - Sb - Sc + Sd)$$

The state of W1=0 indicates that no aberration occurs.

The expander 2113 as shown in FIG. 46 may also be used for any of the twenty-fifth through twenty-eighth embodiments of the present invention, instead of the phase correction device 2105. The expander 113 includes two lenses and an interval adjustment device (not shown) to adjust the interval between these lenses. In the two lenses, one is a positive lens and the other is a negative lens. Although the negative lens is located nearer to the light source, the reverse order is also possible. When the interval of the positive and the negative lenses is changed, an aberration symmetrical with respect to the optical axis occurs in a beam applied to the object lens 2108 can be controlled accordingly. Accordingly, the thus-created aberration symmetrical with respect to the optical axis is used for canceling out the chromatic aberration occurring due to the above-mentioned original wavelength variation/fluctuation/change.

It is assumed that an aberration detected by the above-mentioned aberration detection method is as shown in FIG. 52. FIG. 54A also shows this wavefront aberration as a 2-dimensional curve. When the interval of the positive and negative lenses of the expander 5113 is changed on a beam directed toward the object lens 2108 so as to control the divergence state of the beam, a wavefront aberration such as that shown in FIG. 54B may be provided. Thus, it is possible to well control the wavefront aberration by means of the expander 2113.

The above-mentioned aperture switching device 2107 shown in FIGS. 47 and 49 which switches a beam applied to the object lens will now be described. The above-described optical pickup according to the twenty-seventh embodiment of the present invention is a so-called two-generation compatibility type optical pickup including the two light sources for a light of blue wavelength zone and a light of red wavelength zone for DVD. The above-described optical pickup according to the twenty-eighth embodiment of the present invention is a three-generation compatibility type optical pickup including the three light sources for a light of blue wavelength zone, a light of red wavelength zone for DVD, and a light of infrared wavelength zone for CD.

As for such an optical pickup compatible for a plurality of these generations, the NA applied differs according to the generation. The NA for a CD-system optical recording medium is set in the range of 0.45 through 0.55, the operating wavelength of 780±20 nm is used, and 1.2±0.03 mm in substrate thickness is applied. The NA for a DVD-system optical recording medium is set in the range of 0.59 through 0.66, 0.6±0.03 mm in the substrate thickness is applied, and the operating wavelength of 660±20 nm is used. As for an optical pickup using the blue wavelength zone, NA of 0.65 through 0.85 may be applied.

That is, it is necessary to switch the NA, and the switching of NA is performed by switching a beam diameter of a beam applied to the object lens, according to the light source applied. The switching of the beam diameter may be achieved by using optical characteristics of reflection, diffraction, or absorption according to the wavelength zone or the polarization direction, by using, for example, an aperture switching device as a beam diameter switching device.

Below, with reference to the configuration of the optical pickup shown in FIG. 49, the aperture switching device in the case where NA of 0.50 is applied for performing information recording or reproduction onto a CD-system optical recording medium, NA of 0.65 is applied onto a DVD-system optical recording medium and NA of 0.70 is applied onto a blue-system optical recording medium will now be described.

Figure 63A:
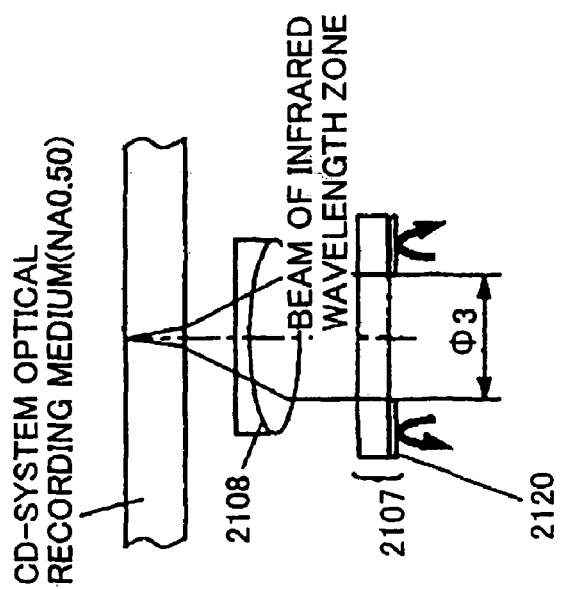
FIGS. 63A through 63C illustrate a reflective-type aperture switching device.
Figure 63B:
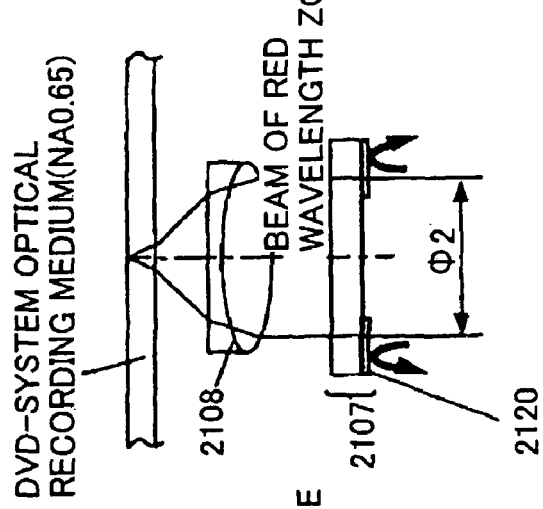
Figure 63C:
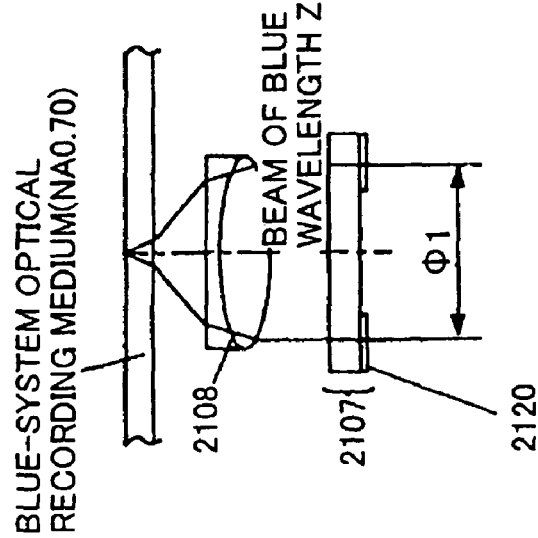

As shown in FIGS. 63A, 63B and 63C, a device which switches a beam diameter by reflection may be used according to the wavelength of a beam which comes out of the light source, as the aperture switching device 2107. In this case, a dielectric optical multilayer film which specifically has a wavelength selection property is used. The light transmission characteristic of the aperture switching device 2107 of FIGS. 63A, 63B and 63C is such that the central area within the diameter of $\phi 3$ in which no dielectric optical multilayer film is provided has a high transmissivity for the blue wavelength zone, the red (DVD system) wavelength zone and the infrared (CD system) wavelength zone (see FIG. 63C); the next peripheral area in the diameter range of $\phi 3$ through $\phi 2$ (area from the perimeter of $\phi 3$ toward $\phi 2$) has a high transmissivity only for a light of the blue wavelength zone and red wavelength zone but a low transmissivity for a light of the infrared wavelength zone (see FIG. 63B); and the further peripheral area in the diameter range of $\phi 2$ through $\phi 1$ (area from the perimeter of $\phi 2$ toward $\phi 1$) has a high transmissivity only for a light of blue wavelength zone but a low transmissivity for a light of infrared wavelength zone and red wavelength zone (see FIG. 63A).

Figure 64A:
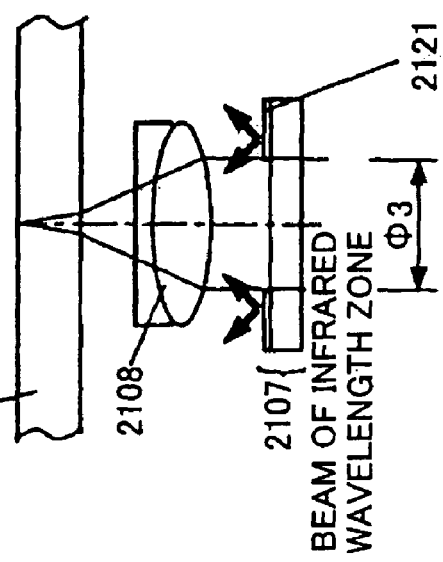
FIGS. 64A through 64C illustrate a diffraction-type aperture switching device.
Figure 64B:
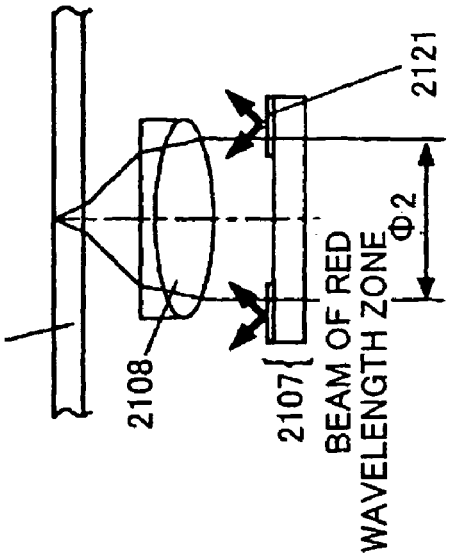
Figure 64C:
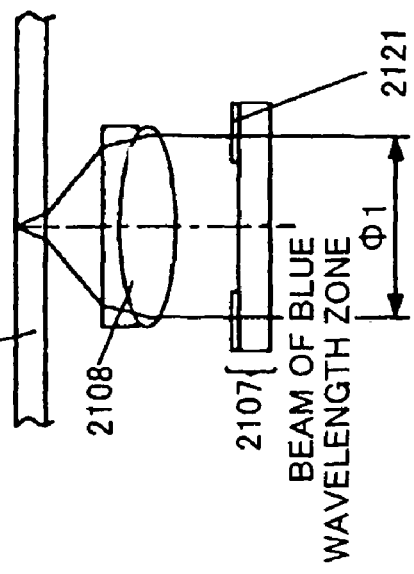

Alternatively, the device which switches a beam diameter by diffraction according to the wavelength of a beam which comes out of the light source may be used as the aperture switching device 2107 as shown in FIGS. 64A, 64B and 64C. In this case, a diffraction lattice which specifically has a wavelength selection property is used. The optical transmission characteristic is such that the central area within $\phi 3$ in which no diffraction lattice is provided transmits a light of blue wavelength zone, red wavelength zone, and infrared wavelength zone; the next peripheral area in the range of $\phi 3$ through $\phi 2$ (area from the perimeter of $\phi 3$ toward $\phi 2$) has no effect on a light of blue wavelength zone and red wavelength zone, but diffracts only a light of infrared wavelength zone; and the further peripheral area in the range of $\phi 2$ through $\phi 1$ (area from the perimeter of $\phi 2$ toward $\phi 1$) has no effect on a light of blue wavelength zone but diffracts a light of red wavelength zone and infrared wavelength zone.

Figures 65A, 65B, 65C:
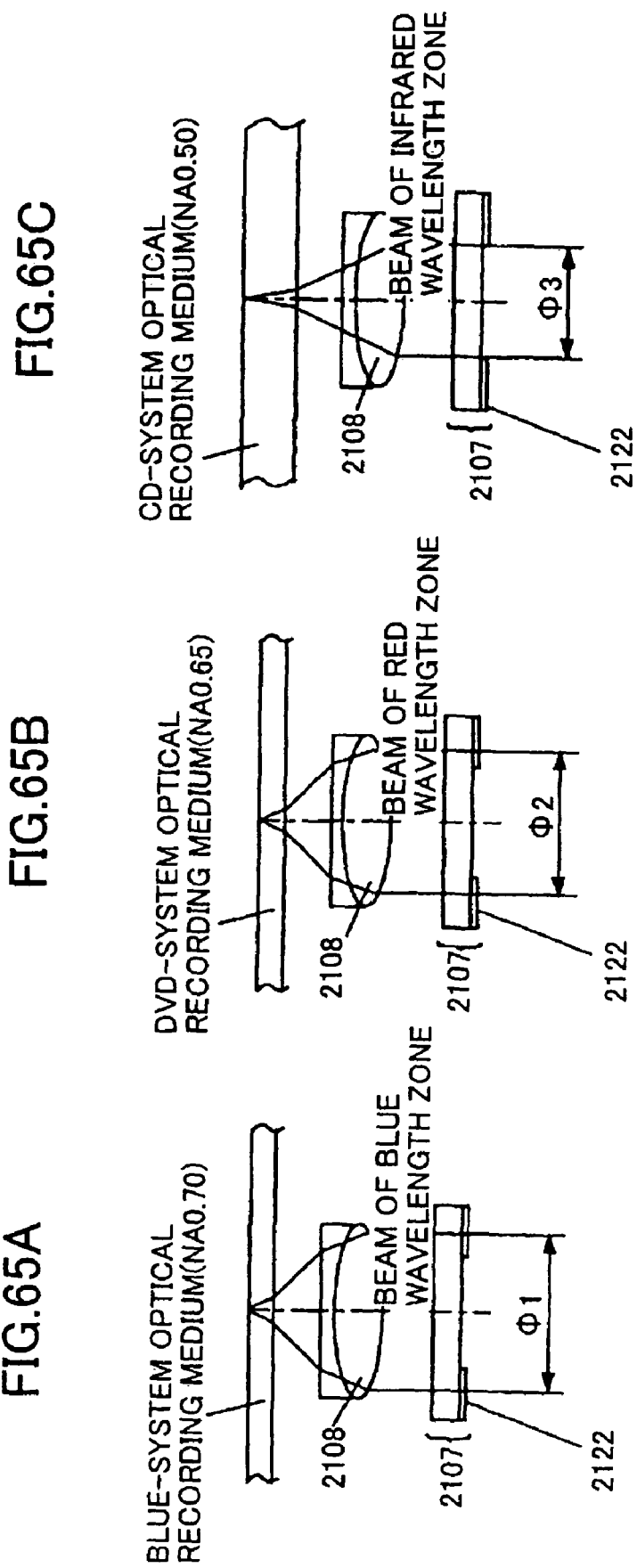
FIGS. 65A through 65C illustrate an absorbing-type aperture switching device.

Further alternatively, a device which switches a beam diameter thanks to an absorption according to the wavelength of a beam which comes out of the light source may be used as the aperture switching device 2107 as shown in FIGS. 65A through 65C.

Other than the above-mentioned examples, as the aperture switching device which switches a beam diameter according to wavelength, any other device may be instead applied which utilizes a polarization characteristic, for example. That is, the light sources may be arranged so that the polarization direction of the light of red wavelength zone and infrared wavelength zone may intersect perpendicularly, and according to this polarization direction that intersects perpendicularly, the aperture may be switched.

Figure 66A:
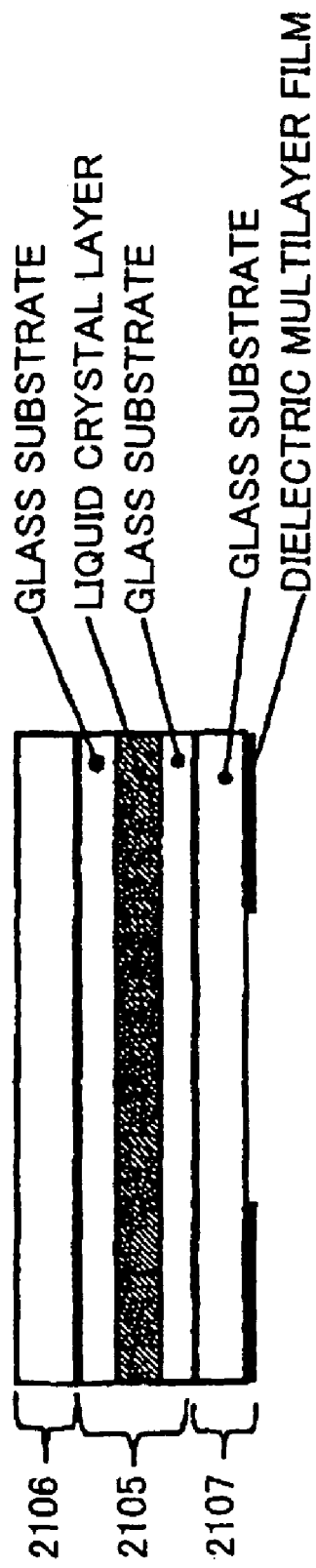
FIGS. 66A and 66B illustrate a scheme of integral combination configurations according to the present invention.
Figure 66B:
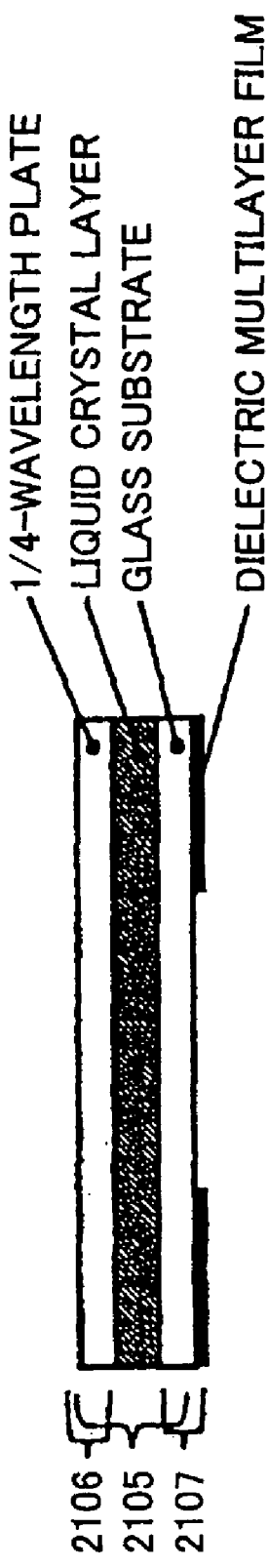

In each of the above-mentioned twenty-fifth through twenty-eighth embodiments compatible among the two or three-types of optical recording media, as shown in FIG. 66A, the phase correction device 2105, the ¼-wavelength plate 2106, and the aperture switching device 2107 may be combined integrally. Thereby, simplification of assembly process can be attained. Moreover, as shown in FIG. 66B, one of the glass substrates which sandwich the liquid crystal layer which forms the phase correction device 2105 is formed as the ¼-wavelength plate 2106, while the aperture switching device 2107 is formed by a dielectric multilayer film formed on a side of the other glass substrate opposite to the liquid crystal layer. Alternatively, it is also possible that, in the configuration shown in FIG. 66B, a dielectric multilayer film is formed rather on a side of the ¼-wavelength plate 2106 opposite to the liquid crystal layer. Thereby, with the thickness and weight equivalent to those of the conventional configuration of the glass substrate, the liquid crystal layer and the glass substrate in the stated order, the phase correction device 2105, the ¼-wavelength plate 2106, and the aperture switching device 2107 can be provided integrally.

Furthermore, the above-mentioned phase correction device 2105, the ¼-wavelength plate 2106, and the aperture switching device 2107 may be provided on an actuator together with the object lens, and, thus may be moved integrally. Thereby, a wavefront degradation caused by a relative shift and relative tilt among these components/parts can be effectively reduced compared with the case where these components/parts are provided separately. In addition, the actuator according to the embodiment of the present invention may be of any of two through four axes of moving dimensions. In other words, in addition to two-directional control for focus and tracking control operations, one-directional tilt control for the radial direction or the jitter direction, and, thus, total three-axis actuator may be provided. Alternatively, by adding two-direction tilt control for both the radial and jitter directions, and, thus, total four-axis actuator may be provided. When the inclination of the object lens is changed by such a three-axis or four-axis actuator, coma aberration may occur in a beam passing through the object lens. Accordingly, this coma aberration may be utilized to cancel out the coma aberration occurring due to an inclination of an optical recording medium.

FIG. 21 is an internal perspective view showing a general configuration of an information recording/reproduction apparatus according to the eighteenth embodiment of the present invention described above. The same figure is also used for illustrating a twenty-fourth embodiment of the present invention. The information recording/reproducing apparatus 10, according to the twenty-fourth embodiment also performs at least one of informational recording, reproduction, and deletion with an optical pickup 11 onto an optical recording medium 20. The optical recording medium 20 is disk-like, and is contained in a cartridge 21 as a protection case. Insertion of the optical recording medium 20 is carried out in a direction of an arrow indicated as "disk insertion" shown in the figure through an insertion opening 12 in the information recording/reproducing apparatus 10, the disk-like optical recording medium 20 is then rotated by a spindle motor 13, and informational recording, reproduction, or deletion is performed thereon by the optical pickup 11.

As this optical pickup 11, the optical pickup in each of the above-mentioned twenty-fifth through twenty-eighth embodiments of the present invention may be applied.

According to the above-described twenty-fifth through twenty-eighth embodiments of the present invention, as the chromatic aberration correction device, the first chromatic aberration correction device for controlling a wavefront aberration occurring due to a change in wavelength which the focus servo control cannot follow up, i.e., a change in wavelength caused by a change in light-emission intensity occurring at a time of optical information recording/reproduction, or a change in wavelength caused by a wavelength distribution provided for the multi-mode light emission; and also, the second chromatic aberration correction device for controlling a wavefront aberration occurring due to a change in wavelength which the focus servo control can follow up, i.e., a variation in central wavelength of the light source due to a particular product lot or the same occurring due to a temperature change. Accordingly, various types of chromatic aberrations can be controlled. Furthermore, the above-mentioned second chromatic aberration correction device may be used in common as an aberration correction device for substrate thickness error of an optical recording medium, an aberration correction device for a distance between a plurality of information recording surfaces of a multilayer optical recording medium, an aberration correction device for enabling proper compatibility between different-generation optical recording media having different operation wavelengths and different substrate thicknesses. Accordingly, it is possible to provide an optical pickup in which chromatic aberrations and so forth can be well controlled without considerably increasing the number of components/parts.

Before specifically describing twenty-ninth embodiment and other embodiments of the present invention, some related arts will now be described for reference.

"Optical design for compatible lens between DVD and the next generation video disk system", M. Itonaga: J. Magn. Soc. Japan, Vol. 25, No. 3-2, 201 discloses a compatibility type optical pickup for a blue-system optical recording medium and DVD-system optical recording medium. This has two semiconductor lasers having different wavelengths and a phase correction device having a hologram pattern formed therein. Information recording and reproduction are performed with a beam coming from one semiconductor laser onto a blue-system optical recording medium with a thickness of 0.1 mm using a light with a wavelength of 405 nm. On the other hand, information recording and reproduction is performed with a beam coming from the other semiconductor laser onto a DVD-system optical recording medium with a thickness of 0.6 mm using a light with a wavelength of 650 nm. The phase distribution is not changed for the light with the wavelength of 405 nm, while the phase distribution is changed for the light with the wavelength of 660 nm by the phase correction device. Thereby, a spherical aberration occurring due to the difference in the substrate thickness can be effectively reduced.

"BLUE/DVD/CD COMPATIBLE OPTICAL HEAD WITH THREE WAVELENGTHS AND A WAVELENGTH SELECTIVE FILTER", ISOM2001, a collection of provisional papers, Ryuichi Katayama and Yuichi Komatsu, pages 30-31, discloses a method of information recording or reproducing onto three types of optical recording media, i.e., a blue-system optical recording medium, a DVD-system optical recording medium and a CD-system optical recording medium with one object lens. In this method, three different semiconductor lasers (the wavelength of 405 nm, 650 nm, and 780 nm), and a phase correction device having a wavelength selection property are applied. Thereby, a beam is applied onto a blue-system optical recording medium with a thickness of 0.1 mm with a light from an infinite system with a wavelength of 405 nm; a beam is applied onto a DVD-system optical recording medium with a thickness of 0.6 mm using a light from a finite system with a wavelength of 660 nm; and a CD-system optical recording medium with a thickness of 1.2 mm using a light from a finite system with a wavelength of 780 nm. The above-mentioned phase correction device which is a wavelength selection phase plate that has a phase distribution not changed for a light with the wavelength of 405 nm, while it has a phase distribution changed for a light of the wavelengths of 660 nm and 780 nm. According to this method, two types, of measures are taken for the purpose of controlling the spherical aberration caused due to the difference in the substrate thickness of optical recording medium, one of which is to apply the wavelength-selection phase correction device, and the other of which is to apply the finite system on DVD/CD.

However, by the method described above, a satisfactory wavefront characteristic may not be obtained at a time of compatible application between a DVD-system optical recording medium and a CD-system optical recording medium. As a spherical aberration at a diffraction limit, Marechal's criterion: 0.07 λrms may be used. In this regard, as to an optical pickup, there may occur various error factors, i.e., a thickness error of optical recording medium, a tilt error of optical recording medium, a defocus error occurring due to a positional error between the object lens and optical recording medium, and so forth. Then, probable aberrations which may occur due to these error factors should be regarded as a sum total thereof, and the thus-obtained sum total should fall within the above-mentioned criterion. In this term, it is preferable that the spherical aberration (median) even assuming no error fall within 0.03 λrms.

In this regard, in the above-described method of taking the two types of measures for the wavefront correction, the spherical aberration (median) on a DVD-system optical recording medium is as large as approximately 0.05 λrms. This is because, it is not possible to control the spherical aberration on each of DVD system and CD system into the minimum by means of a single phase correction device. Therefore, a design should be made such that an intermediate (compromise) value be regarded as a target value for the phase correction device between the requirements on which the spherical aberration on the DVD system and CD system are minimum, respectively. As a result, it should not be possible to well control the spherical aberration for each case.

Moreover, in the above-described plan, finite systems are applied for the DVD-system light path and CD system light path. However, when finite systems are applied, the spherical aberration may increase accordingly with a tracking operation of the object lens. Another aspect of the present invention is directed to solve the above-described problems, and, thus, another object of the present invention is especially to well control the residual spherical aberration into less than 0.030 λrms at the design median in a configuration of an optical pickup in which the above-mentioned three-types of optical recording systems, i.e., blue system, DVD system and CD system can be handled with a single common object lens.

Figure 68:
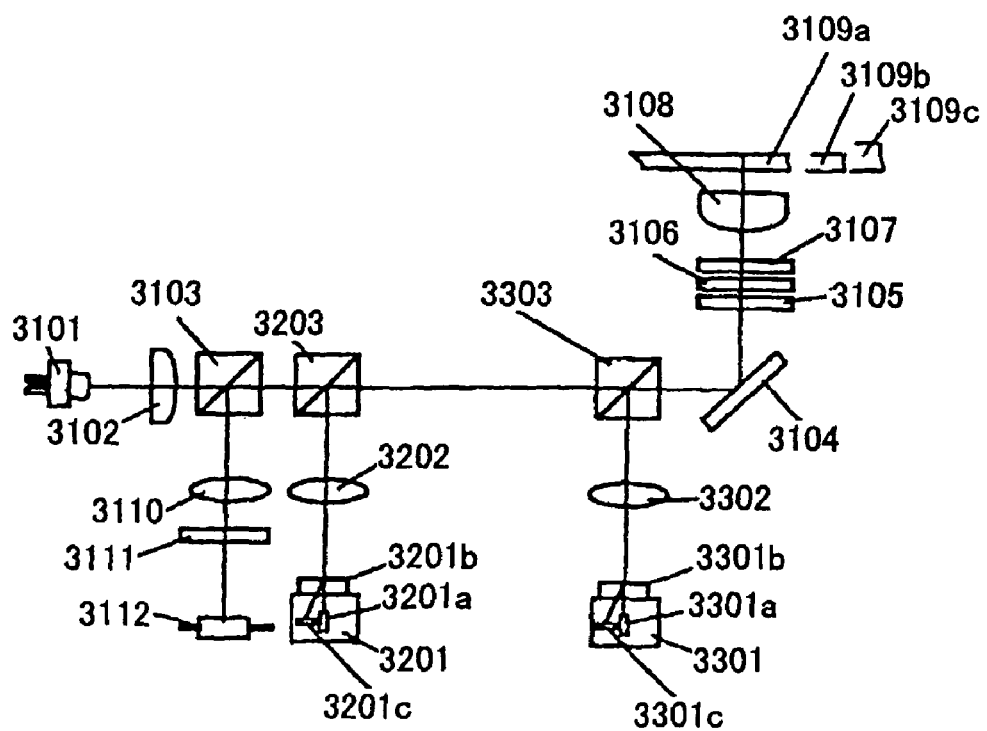
FIG. 68 shows a general configuration of an optical pickup according to a twenty-ninth embodiment of the present invention.

FIG. 68 shows a general configuration of an optical pickup according to a twenty-ninth embodiment of the present invention. By this optical pickup, information recording, reproduction or deletion is performed on each of a blue-system optical recording medium of an operating wavelength of 407 nm, NA: 0.65, and 0.6 mm in its light-incident side substrate thickness; a DVD-system optical recording medium of an operating wavelength of 660 nm, and NA: 0.65 and 0.6 mm in its light-incident side substrate thickness; and a CD-system optical recording medium of an operating wavelength of 780 nm, NA: 0.50 and 1.2 mm in its light-incident side substrate thickness.

As shown in FIG. 68, in this optical pickup, a blue optical system through which a light with a wavelength of 407 nm passes includes a semiconductor laser 3101 with a wavelength of 407 nm, a collimator lens 3102, a polarization beam splitter 3103, dichroic prisms 3203, 3303, a prism 3104, a phase correction device 3105, a wavelength plate 3106, an aperture control device 3107, an object lens 3108, a detection lens 3110, a beam splitting device 3111, and a light-receiving device 3112. Furthermore, a DVD optical system through which a light with a wavelength of 660 nm passes includes a hologram unit 3201, a coupling lens 3202, the dichroic prisms 3203, 3303, the prism 3104, the phase correction device 3105, the wavelength plate 3106, the aperture control device 3107, and the object lens 3108.

A CD optical system through which a light with a wavelength of 780 nm passes includes a hologram unit 3301, a coupling lens 3302, the dichroic prism 3303, the prism 104, the phase correction device 3105, the wavelength plate 3106, the aperture control device 3107, and the object lens 3108.

That is, the dichroic prisms 3203, 3303, prism 3104, phase correction device 3105, wavelength plate 3106, aperture control device 3107, and object lens 3108 are common parts for the above-mentioned two or three optical systems.

The object lens 3108 is designed so that the spherical aberration occurring when an infinite system is applied is minimum especially for a blue-system optical recording medium of the operating wavelength of 407 nm, NA: 0.65, and 0.6 mm in its light-incident side substrate thickness.

As for optical recording media 3109a, 3109b, and 3109c to be loaded, these optical recording media have substrate thicknesses and operating wavelengths different from each other. Specifically, the blue-system optical recording medium 3109a has the substrate thickness of is 0.6 mm; the DVD-system optical recording medium 3109b has the substrate thickness of 0.6 mm; and the CD-system optical recording medium 3109c has the substrate thickness of 1.2 mm. At a time of information recording or reproduction, on a rotation mechanism not shown, one optical recording medium thereof is loaded, and, thereby, is rotated at a high speed.

In the above-described optical pickup, a case where information recording, reproduction or deletion is performed on the blue-system optical recording medium of the operating wavelength 407 nm, NA: 0.65, and 0.6 mm of its light-incident side substrate thickness will now be described. A beam emitted in a linear polarization from the semiconductor laser 3101 with a wavelength of 407 nm is transformed into an approximately parallel beam by the coupling lens 3102, and then, passes through the polarization beam splitter 3103 and the dichroic prisms 3203 and 3303. After that, the light path is deflected 90 degrees by the prism 3104, the beam then passes through the phase correction device 3105, passes through the wavelength plate 3106, by which it is transformed into a circular polarization. Then, NA is controlled into 0.65 with the aperture control device 3107, then it is incident onto the object lens 3108, by which it is focused into a minute spot on the optical recording medium 3109a. Informational recording, reproduction, or deletion is performed by this spot onto the optical recording medium.

After being reflected by the optical recording medium 3109a, the light has a circular polarization in the direction opposite to that in the above-mentioned case of coming into the optical recording medium, is transformed into an approximately parallel beam again, is transformed into a linear polarization perpendicular to that in the above-mentioned case of coming into the optical recording medium by the wavelength plate 3106, and is reflected by the polarization beam splitter 3103, is transformed into a convergence light with the detection lens 3110, is deflected in a splitting manner by the beam splitting device 3111 into a plurality of beams, which are then incident on the light-receiving device 3112. From the light-receiving device 3112, an aberration signal, an information signal, and a servo signal are detected.

Next, a case will now be described where information recording, reproduction or deletion on the DVD-system optical recording medium with the operating wavelength of 660 nm and NA: 0.65, it having 0.6 mm in thickness of the light-incident side substrate thereof. As mentioned above, light receiving/emitting devices are installed in a pickup or a DVD system into one can, and such a hologram unit which separates an incident beam using a hologram is generally used, and, as such, the hologram unit 3201 shown in FIG. 68 integrally includes a semiconductor laser 3201a, hologram 3201b, and light-receiving device 3201c. The 660-nm light which comes out of the semiconductor laser 3201a of this hologram unit 3201 passes through the hologram 3201b and thus, it is transformed into a parallel beam by the coupling lens 3202. Then, this beam is reflected by the dichroic prism 3203 which transmits a light in the wavelength of 407 nm while reflecting a light in the wavelength of 660 nm, in the direction toward the prism 3104. By the prism 3104, the light path is deflected 90 degrees, and then, a predetermined phase is added thereto by the phase correction device 3105. The wavelength plate 3106 then transforms the beam into a circular or elliptic polarization, and with the aperture control device 3107, no effect is provided at all, the beam then is incident onto the object lens 3108, by which the beam is focused into a minute spot on the optical recording medium 3109b. Informational recording, reproduction, or deletion is performed by this spot on the optical recording medium.

Figure 69:
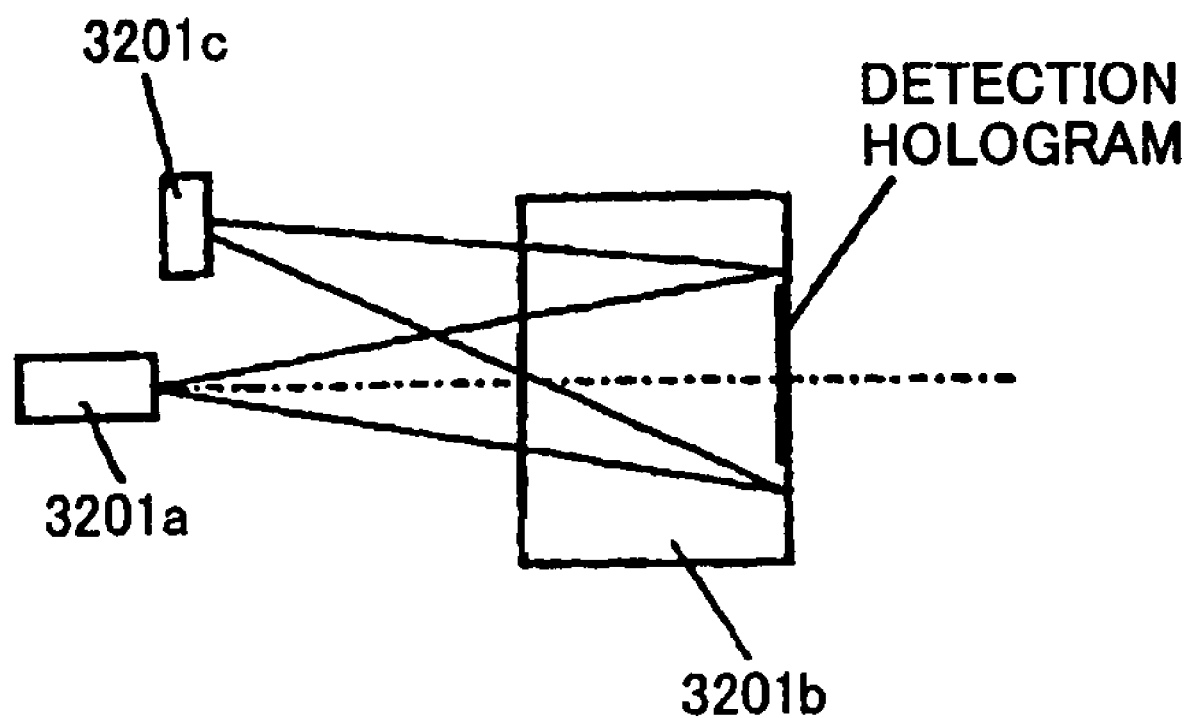
FIG. 69 illustrates a hologram unit shown in FIG. 68.

After being reflected by the optical recording medium 3109b, the beam is deflected by the prism 3104, is reflected by the dichroic prism 3203, is made into a convergence light by the coupling lens 3202, is diffracted by the hologram 3201b in the direction toward the light-receiving device 3201c which is held in the same can as the semiconductor laser 3201a, and, as shown in FIG. 69, is received by light-receiving device 3201c. From the light-receiving device 3201c, an aberration signal, an information signal, and a servo signal are detected.

After being reflected by the optical recording medium 2109c, the light is deflected by the prism 3104, is reflected by the dichroic prism 3303, and is made into a convergence light by the coupling lens 3302, which is then diffracted in the direction toward the light-receiving device 3301c, and is received by the light-receiving device 3301c. From light-receiving device 3301c, an aberration signal, an information signal, and a servo signal are detected.

Figure 70:
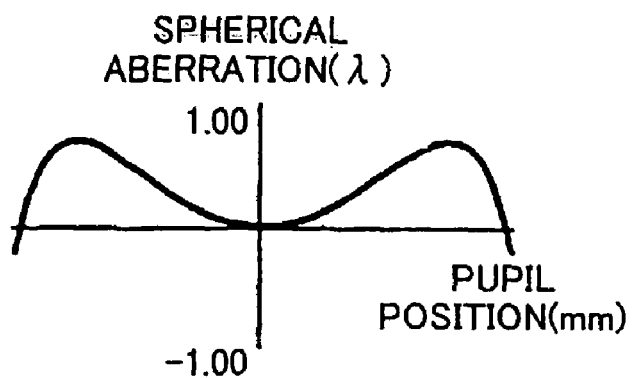
FIGS. 70, 71 and 72 show a change in spherical aberration according to a difference in wavelength applied in case of applying a common single object lens.
Figure 71:
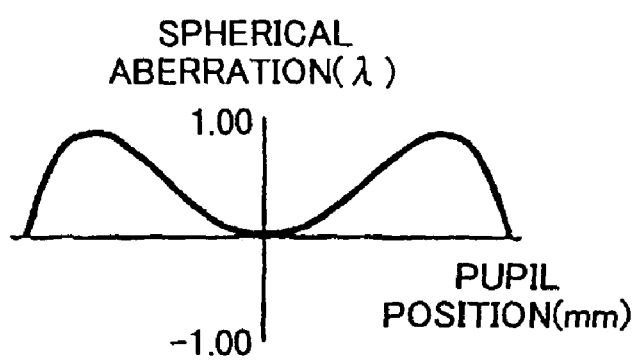
Figure 72:
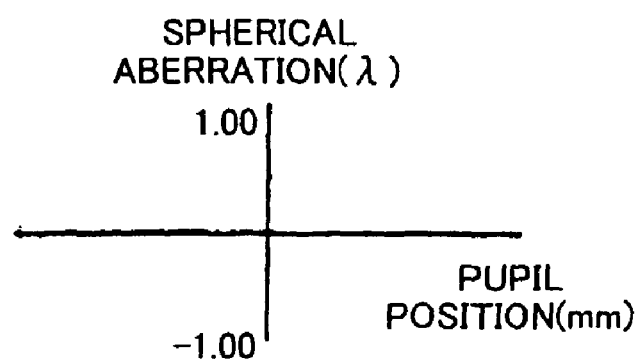

When the single object lens 3108 with which the wavefront of spherical aberration becomes minimum on the wavelength of 407 nm has a light with a wavelength of 660 nm incident with an infinite system, wherewith a beam spot is formed on the DVD-system optical recording-medium 3109b, or has a light with a wavelength of 780 nm incident with an infinite system, wherewith a beam spot is formed on the CD-system optical recording medium 3109c, the spherical aberrations shown in FIG. 70 or FIG. 71 occur due to a difference in wavelength or a difference in substrate thickness. FIG. 72 shows a spherical aberration with a wavelength of 407 nm. According to the twenty-ninth embodiment of the present invention, in order to produce a spherical aberration having the opposite polarity to that of the DVD system shown in FIG. 70, the phase correction device 3105 is provided. Moreover, in order to produce a spherical aberration opposite in polarity to that of the CD system shown in FIG. 71, the CD system light-path is configured with the finite system.

According to the present embodiment, the phase correction device 3105 is configured so that it has a wavelength selection property such as to provide no effect to each of the wavelength of 407 nm and the wavelength of 780 nm, but to exert a necessary phase correction function on the wavelength of 660 nm.

The DVD system light-path which performs a wavefront correction or control operation using the phase correction device 3105 according to the twenty-ninth embodiment of the present invention will now be described.

The phase correction device 3105 performs+1-th diffraction on a light of wavelength of 660 nm so that the light passing therethrough thus have a spherical aberration to cancel out the sum of a spherical aberration of the object lens 3108 and a spherical aberration occurring when the light passes through the 0.6-mm substrate of the DVD-system recording medium 3109b. Accordingly, the +1-th diffracted light exiting the phase correction device 3106 is focused on the recording surface of the DVD-system optical recording medium 3109b without aberration.

Figure 73A:
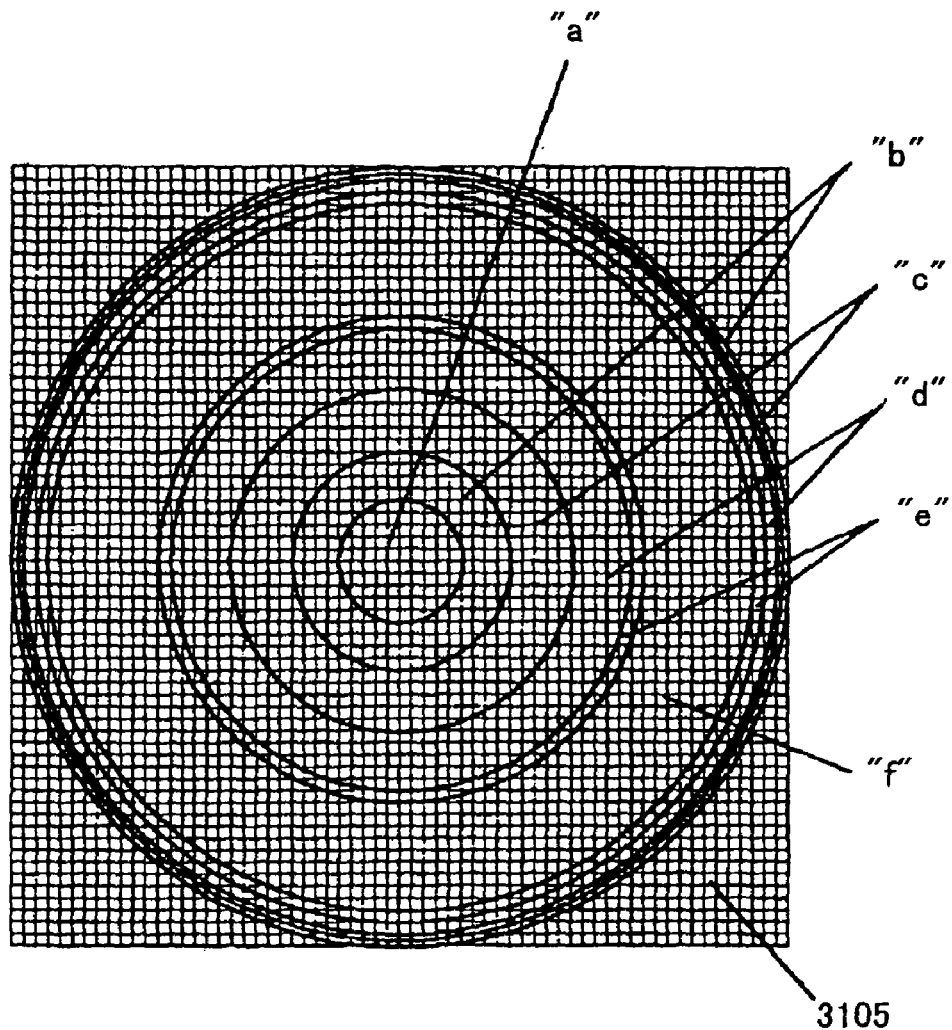
FIGS. 73A and 73B illustrate a phase correction device used in the configuration shown in FIG. 68.
Figure 73B:
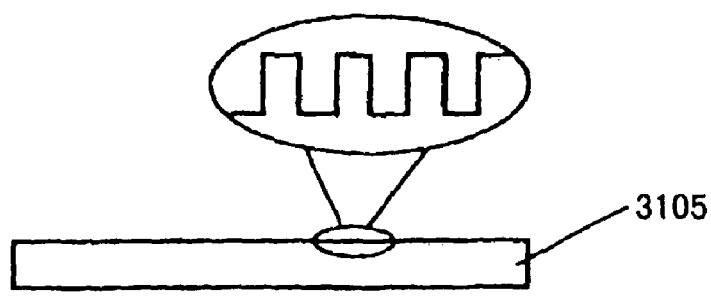

FIG. 73A shows a plan view of this phase correction device 3105, and FIG. 73B shows a sectional view of the same. As shown in FIG. 73A, the phase correction device 3105 has a pattern (including concentric areas, "a", "b", "c", "d", "e" and "f", in the stated order from the center) of concentric circular interference fringes, and, thus, has the above-mentioned function of spherical aberration correction on the +1-th diffracted light.

The phase correction device 3105 according to the twenty-ninth embodiment of the present invention has a dead band on the wavelength of 407 nm and the wavelength of 780 nm. For this purpose, the phase correction device 3105 has the following configuration:

A phase difference $\delta(\lambda)$ occurring where 'n' denotes the refractive index of the substrate material of the phase correction device 3105, 'h' denotes the depth of each rectangularcross-sectional groove formed therein (see FIG. 73B), and λ denotes the wavelength of the light source, is expressed by the following formula:

$$\delta(\lambda) = 2\pi(n-1)h/\lambda \quad (1)$$

Accordingly, the substrate material and the depth 'h' should be determined such that each of δ(407 nm) and δ(780 nm) be an integer multiple of 2π. For example, in case BaCD5 by Hoya Corp. is used as the substrate material having the groove depth 'h' of 4.02 micrometers, for 407 nm:
n=1.604949,
δ(407 nm)=12.0π(=2.0π×6);
for 660 nm:
n=1.586051,
δ(660 nm)=7.1π(=1.1π)
for 780 nm:
n=1.582509,
δ(780 nm)=6.0π(=2.0π×3).

Figure 74:
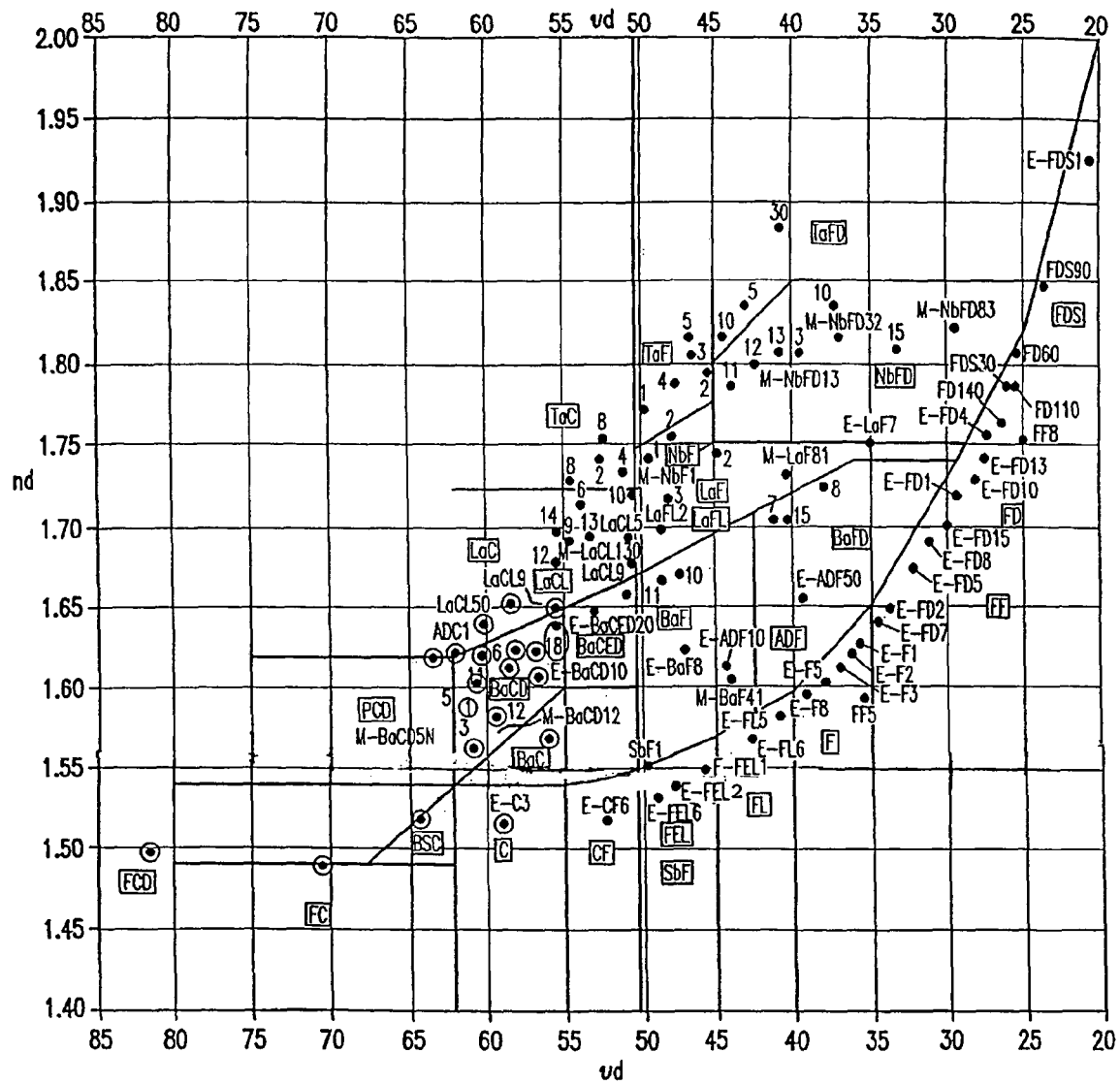
FIG. 74 illustrates a glass map applicable to the present invention.

FIG. 74 shows a glass map of Hoya Corp. When glass types are selected as marked up by circles from the following Table 1 according to the following formulas (2) and (3):

$$1.50 < nd < 1.66 \quad (2)$$

$$55 < vd < 85 \quad (3)$$

where 'nd' denotes the refractive index and vd denotes Abbe's number, a phase difference error with each of a wavelength of 407 nm and a wavelength of 780 nm falls within 0.002π, and thus, it becomes possible to provide the dead zone on the wavelength of 407 nm and the wavelength of 780 nm.

TABLE 1

| Glass name | d-line refractive index (nd) | Abbe's number (vd) |
|---|---|---|
| BSC7 | 1.51680 | 64.2 |
| E-C3 | 1.51823 | 59.0 |
| BaCD11 | 1.56384 | 60.8 |
| M-BaCD12 | 1.58313 | 59.5 |
| BaC4 | 1.56833 | 56.0 |
| M-BaCD5N | 1.58913 | 61.3 |
| BaCD14 | 1.60311 | 60.7 |
| BaCD4 | 1.61272 | 58.6 |
| BaCD2 | 1.60738 | 56.7 |
| E-BaCD10 | 1.62280 | 56.9 |
| BaCD16 | 1.62041 | 60.3 |
| BaCD15 | 1.62299 | 58.1 |
| BaCD18 | 1.63854 | 55.5 |
| PCD4 | 1.61800 | 63.4 |
| ADC1 | 1.62000 | 62.2 |
| LaCL60 | 1.64000 | 60.2 |
| LaC7 | 1.65160 | 58.4 |
| LaCL2 | 1.65020 | 55.7 |
| FCD1 | 1.49700 | 81.6 |
| FC5 | 1.48749 | 70.4 |

With application of such a material, and, also, a pitch shape is determined such that, by the thus-obtained phase correction device, a +1-th diffraction is performed on a light of wavelength of 660 nm, and, then, a spherical aberration be produced by which the sum of a spherical aberration occurring when a light exiting the object lens 3108 passes through the 0.6-mm substrate of a DVD-system optical recording medium 3109b and a spherical aberration of the optical system including the object lens 3108, phase correction device 105, etc. is cancelled out.

In addition, the phase correction device 3105 may be produced by a glass mold forming technique, or may be produced by an etching technique, or by a cutting technique. Moreover, the refractive index and the Abbe's number should satisfy the above-mentioned formulas (2) and (3) according to the glass map shown in FIG. 74. Alternatively, a resin material may also be applied as long as it has a product forming property and a transfer property and satisfies the range shown in FIG. 74. In this case, the above-mentioned concentric circular interference fringes of the phase correction device 3105 should be produced by injection mold technique with a metallic die having the pattern of the same therein.

Furthermore, as can be seen from the above-mentioned formula (1) and the glass map shown in FIG. 74, more glass types may occur when the wavelengths of 407 nm and 780 nm are applied which have the ratio near an integer rather than selecting a glass type with which an integer multiple of 2π may be obtained with the wavelengths of both 407 nm and 660 nm or both 660 nm and 780 nm.

A variant embodiment of the above-described twenty-ninth embodiment will now be described. In this embodiment, a single object lens 3108 which has the minimum wavefront aberration on the wavelength of 400 nm is applied. On this object lens 3108, when a light with a wavelength of 660 nm is applied by an infinite system, and a beam spot is formed onto a DVD-system optical recording-medium 3109b; or a light with a wavelength of 780 nm is applied by an infinite system and a beam spot is formed therewith onto a CD-system optical recording medium 3109c, a spherical aberration occurs due to a difference in wavelength or a difference in substrate thickness. According to the present embodiment, in order to produce a spherical aberration opposite in polarity to that of the DVD system shown in FIG. 70, the DVD system light-path is configured as a finite system instead, and, also, the phase correction device 3105 is provided. Furthermore, in order to produce a spherical aberration opposite in polarity to that of the CD system shown in FIG. 71, the CD system light-path is also configured as a finite system instead. The above-mentioned phase correction device 3105 has a wavelength selection property, and has a dead zone on the wavelength of 400 nm. Moreover, it has no phase correction area in a range through which the CD-system light path passes. Accordingly, this phase correction device 3105 has no effect also on the wavelength of 780 nm. Accordingly, this phase correction device 3105 has no effect on each of the wavelengths of 400 nm and 780 nm while it has a predetermined phase correction performance on the wavelength of 660 nm.

Figure 75:
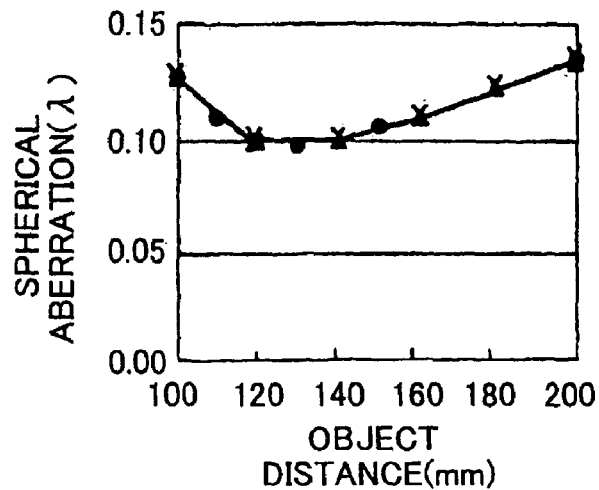
FIG. 75 shows a change in wavefront according to a change in object distance in a DVD-system optical system.

The DVD-system light path which performs a wavefront correction using the phase correction device 3105 according to the above-mentioned variant embodiment of the twenty-ninth embodiment will now be described. The DVD-system light path is configured with the finite system. This means that a beam to be applied to the object lens is made in a divergent state or convergent state. When the divergent state is selected for a beam applied to the object lens, the spherical aberration is changed accordingly. Accordingly, it is advantageous to select a divergent state such that, thereby, the original spherical aberration be cancelled out. When the object distance (which is equivalent to the interval between the light source and the object lens) of the DVD-system optical system is changed in the finite system as shown in FIG. 75, the wavefront of spherical aberration can be controlled accordingly. According to FIG. 75, the wavefront degradation becomes minimum near 120-160 mm in the object distance. Although FIG. 75 assumes that no components/parts exist between the object lens and light source, the coupling lens 3202 for shortening the light-path length as shown in FIG. 68 between the object lens and light source is provided actually.

Figure 76A:
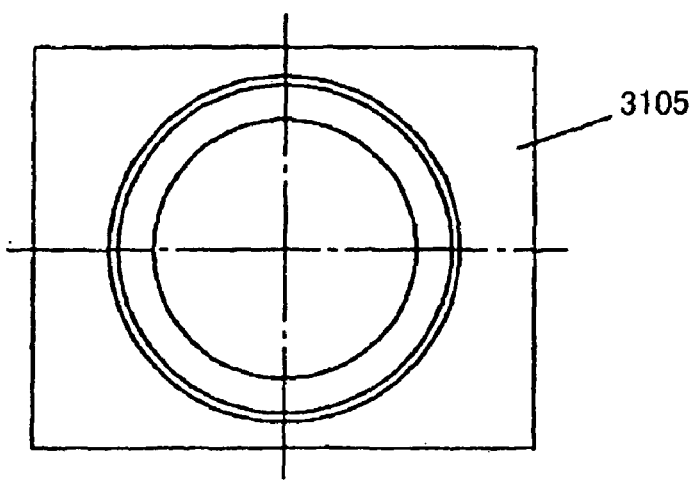
FIGS. 76A and 76B illustrate a phase correction device also applicable in the configuration shown in FIG. 68.
Figure 76B:
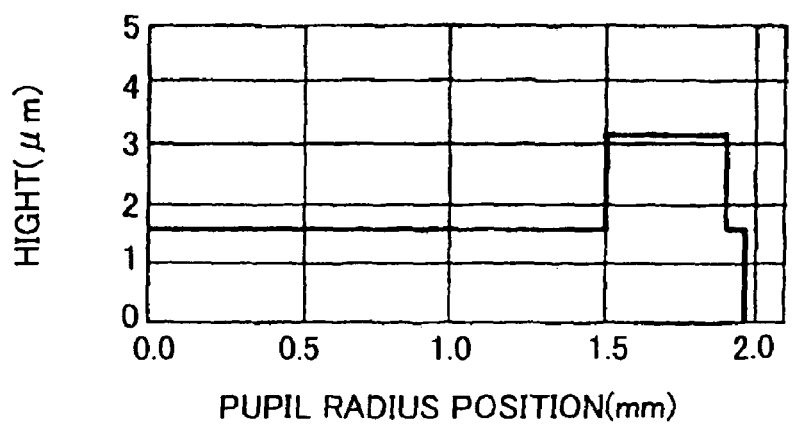

However, the wavefront aberration of the DVD-system light-path cannot be well controlled only with the configuration of the finite system described above. Then, in the present variant embodiment of the twenty-ninth embodiment, in addition to providing the configuration of finite system, the phase correction device is provided for the purpose of controlling the wavefront aberration in the DVD-system light path further. The phase correction device 3105 has a spherical aberration which cancels out the sum of the spherical aberration produced in case a light exiting the object lens 3108 passes through the thickness 0.6 mm substrate of the DVD-system optical recording medium 3109b and the spherical aberration which the object lens 3108 has. FIG. 76A shows a plan view of this phase correction device, and FIG. 76B shows a sectional view of the same taken along the optical axis. As shown in these figures, the phase correction device 3105 has a concentric circular pattern, and has a stair-step shape in the section. As mentioned above, in order to omit the phase correction area from the area through which the CD-system light path passes, the stair-step shape is formed outside of the pupil diameter 1.5 mm corresponding to NA: 0.50 for CD.

Further, the phase correction device 3105 has a dead zone on the wavelength of 400 nm. A phase difference: $\delta(\lambda)$ is expressed by the above-mentioned formula (1). Then, same as in the above-mentioned discussion of the twenty-ninth embodiment, a substrate material and 'h' should be determined such that $\delta(400\ nm)$ be an integer multiple of $2\pi$. For example, in case FCD1 of Hoya Corp. is applied, for $\lambda$=400 nm, n=1.507672, $\delta(400\ nm)=4\pi(=2.0\pi\times2)$;

for $\lambda$=660 nm, n=1.495051, $\delta(660\ nm)=2.36\pi(=0.367\pi)$; and for $\lambda$=780 nm, n=1.492821, $\delta(780\ nm)=1.99\lambda$.

Then, the phase correction device 3105 should be configured as described above so as to perform a phase shift on a light with a wavelength of 660 nm such that the sum of the spherical aberration occurring when the light exiting the object lens 3108 passes through the 0.6-mm substrate of the DVD-system optical recording medium 3109b and the spherical aberration which the optical system including the object lenses 3108, the phase correction devices 3105, etc. can be cancelled out thereby. In addition, as mentioned above, the phase correction device 3105 may be produced by a glass mold forming technique, may be produced by using an etching technique, or by a cutting technique.

The CD system light-path which performs wavefront correction by applying a beam from a finite system will now be described. The finite system is thus used in the CD optical system. Applying the finite system provides a divergent or convergent beam to be incident onto the object lens. Generally speaking, by thus controlling the divergent state of a beam incident onto the object lens, it is possible to control the spherical aberration. Accordingly, by appropriately setting the divergent state of the beam incident onto the object lens, it is possible to cancel out the originally occurring spherical aberration.

Figure 77:
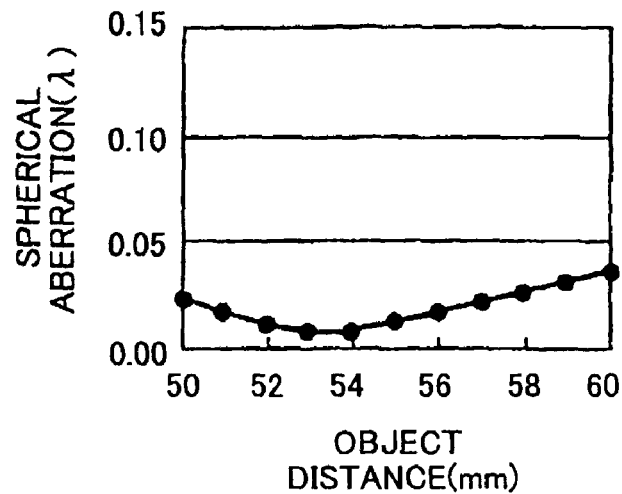
FIG. 77 shows a change in wavefront according to a change in object distance in a CD-system optical system.

When the object distance (equivalent to the interval between the light source and object lens) in the CD system optical system which forms the finite system is changed, as shown in FIG. 77, the wavefront of spherical aberration can be controlled. Thus, the wavefront aberration can be controlled into less than 0.03 $\lambda$rms, and as a result, only applying the configuration of finite system to the CD system light path, the wavefront correction can be well achieved. According to FIG. 77, the wavefront degradation becomes minimum near 53 mm in the object distance. Although FIG. 77 assumes that no components/parts exist between the object lens and light source, the coupling lens 3302 for shortening the light-path length is inserted therein as shown in FIG. 68 between the object lens and light source actually.

Figure 78A:
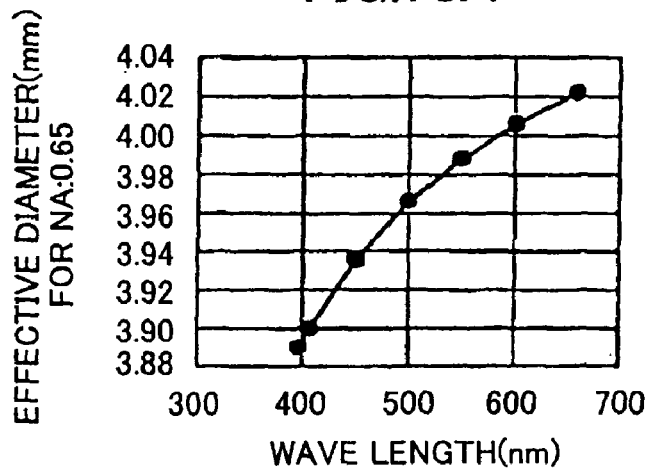
FIG. 78A shows a relation of an effective diameter needed for NA: 0.65 with respect to a wavelength applied.

When a light with a wavelength of 660 nm having the same beam diameter is incident onto the object lens which has the wavefront best on the wavelength of 407 nm by an infinite system, the refraction power decreases, and the numerical aperture becomes lowered. Therefore, according to the twenty-ninth embodiment, a larger beam diameter $\phi 2$ of beam is applied to the wavelength of 660 nm than a beam diameter of $\phi 1$ applied on the wavelength of 407 nm. FIG. 78A shows a relation of the effective diameter providing NA: 0.65 with respect to the wavelength in the object lens which has the characteristic mentioned later (Table 2). Therefore, for the purpose of simplification, the optical system applied is assumed as being an infinite system.

From FIG. 78A, it can be seen that it is necessary to set the above-mentioned beam diameter $\phi 2$ into approximately 4.02 mm at a time of information recording or reproduction onto a DVD-system optical recording medium to which the wavelength of 660 nm is applied. Further, a still larger beam diameter is needed in case of applying a finite system, especially a divergent system, specifically, according to the above-mentioned variant embodiment of the twenty-ninth embodiment, $\phi 2$ should be approximately 4.05 mm.

Figure 78B:
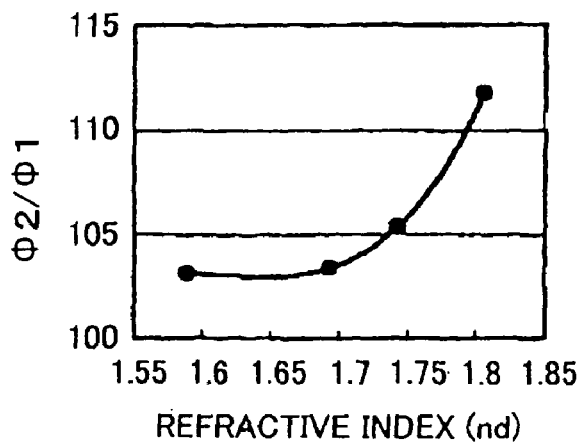
FIG. 78B shows a relation of a $\phi 1/\phi 2$ with respect to a refractive index applied.

Moreover, the relation between the beam diameters $\phi 1$ and $\phi 2$ changes also according to the glass type applied to the object lens. FIG. 78B shows the relation of $\phi 2/\phi 1$ with respect to the refractive index 'nd' on the d line when the glass type is changed. Thus, an appropriate $\phi 2$ should be selected according to the glass type applied to the object lens.

On the other hand, the optimal NA needed in the case of information recording/reproduction onto a CD-system optical recording medium is approximately 0.50. Then, by the same method as that mentioned above with reference to FIG. 78A, the optimal effective diameter $\phi 3$ in this case is estimated as being approximately 3.2 mm.

As the above-mentioned device for switching a beam diameter according to the wavelength of the light source applied, an aperture control device is used for this purpose. The aperture control device has a configuration such as to switch a beam diameter passing therethrough using an optical characteristic, such as reflection, diffraction, or absorption, according to a wavelength zone or the polarization direction of an incident light.

Figure 79A:
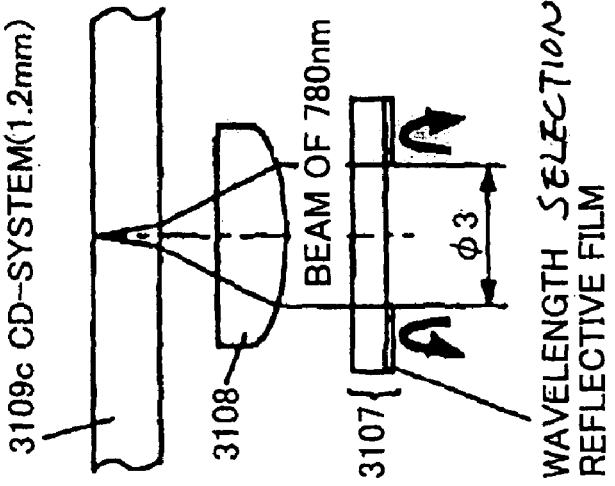
FIGS. 79A through 79C illustrate a reflective-type aperture switching device.
Figure 79B:
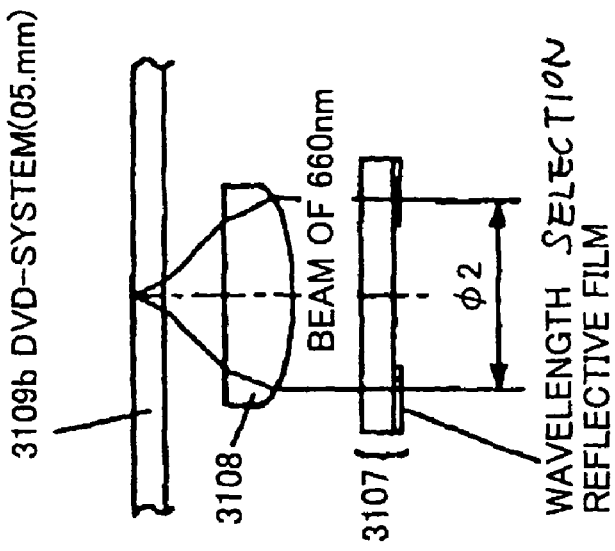
Figure 79C:
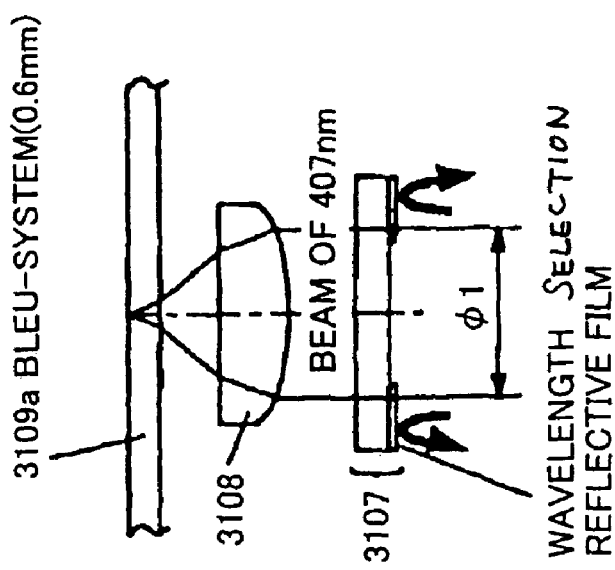

As the aperture control device according to the twenty-ninth embodiment, as shown in FIGS. 79A, 79B and 79C, a device which switches a beam diameter by reflection may be used according to the wavelength of a beam which comes out of the light source, as the aperture switching device 3107. In this case, a dielectric optical multilayer film which specifically has a wavelength selection property is used. The light transmission characteristic of the aperture switching device 3107 of FIGS. 79A, 79B and 79C is such that the central area within the diameter of $\phi 3$ in which no dielectric optical multilayer film is provided has a high transmissivity for the wavelengths of 407 nm, 660 nm and 780 nm; the next peripheral area in the diameter range of $\phi 3$ through $\phi 1$ (area from the perimeter of $\phi 3$ toward $\phi 1$) has a high transmissivity only for a light of the wavelengths of 407 nm and 660 nm zone but a low transmissivity for a light of the wavelength of 780 nm; and the further peripheral area in the diameter range of $\phi 2$ through $\phi 1$ (area from the perimeter of $\phi 2$ toward $\phi 1$) has a high transmissivity only for a light of the wavelength of 660 nm but a low transmissivity for a light of the wavelengths of 407 nm and 780 nm.

Figure 80A:
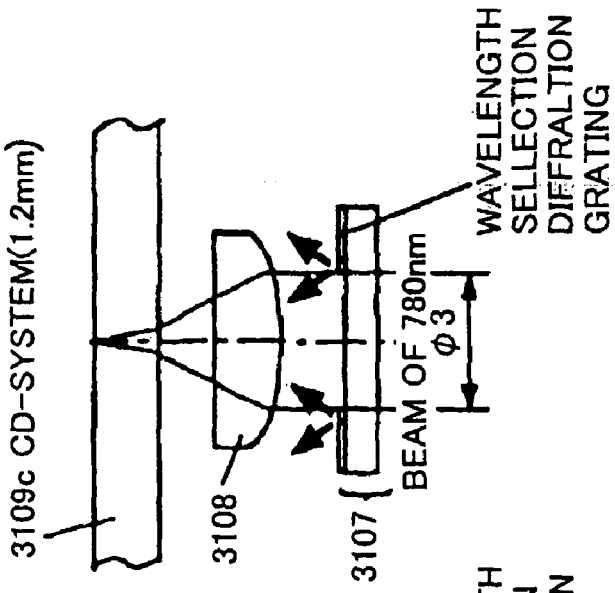
FIGS. 80A through 80C illustrate a diffraction-type aperture switching device.
Figure 80B:
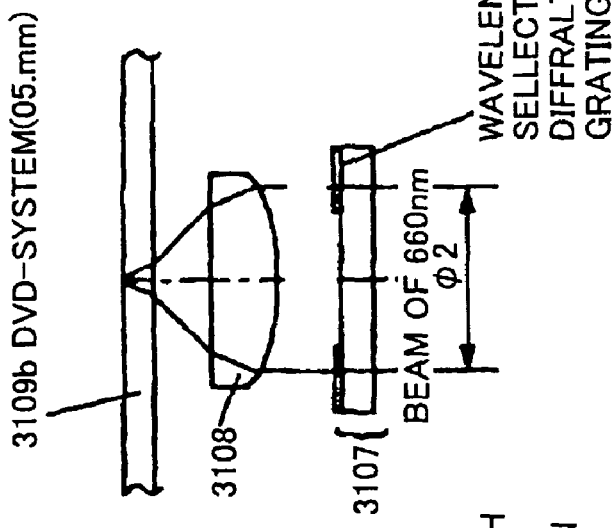
Figure 80C:
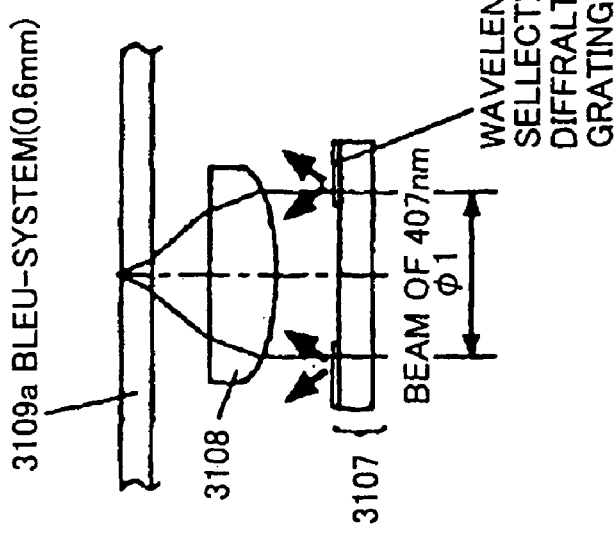

Alternatively, the device which switches a beam diameter by diffraction according to the wavelength of a beam which comes out of the light source may be used as the aperture switching device 3107 as shown in FIGS. 80A, 80B and 80C. In this case, a diffraction lattice which specifically has a wavelength selection property is used. The optical transmission characteristic is such that the central area within φ3 in which no diffraction lattice is provided transmits a light of wavelengths of 407 nm, 660 nm and 780 nm; the next peripheral area in the range of φ3 through φ1 (area from the perimeter of φ3 toward φ1) has no effect on a light of wavelengths of 407 nm and 660 nm but diffracts only a light of wavelength of 780 nm; and the further peripheral area in the range of φ2 through φ1 (area from the perimeter of φ2 toward φ1) has no effect on a light of wavelengths of 660 nm but diffracts a light of wavelengths of 407 nm and 780 nm.

Figure 81A:
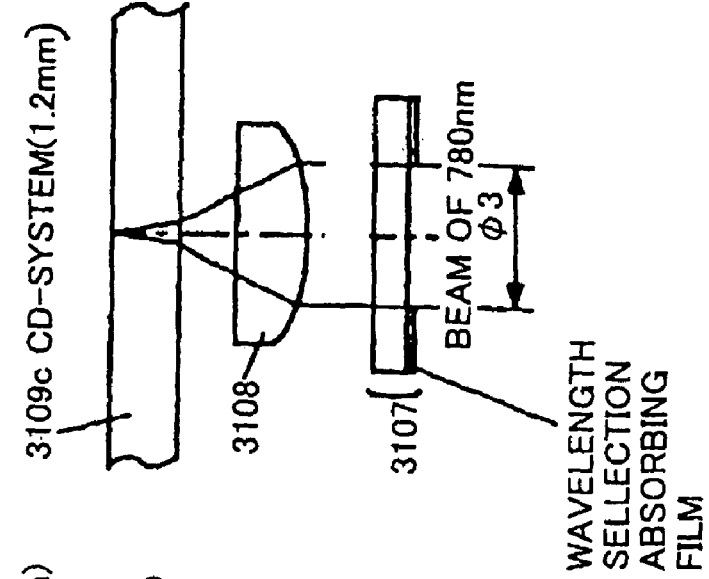
FIGS. 81A through 81C illustrate an absorbing-type aperture switching device.
Figure 81B:
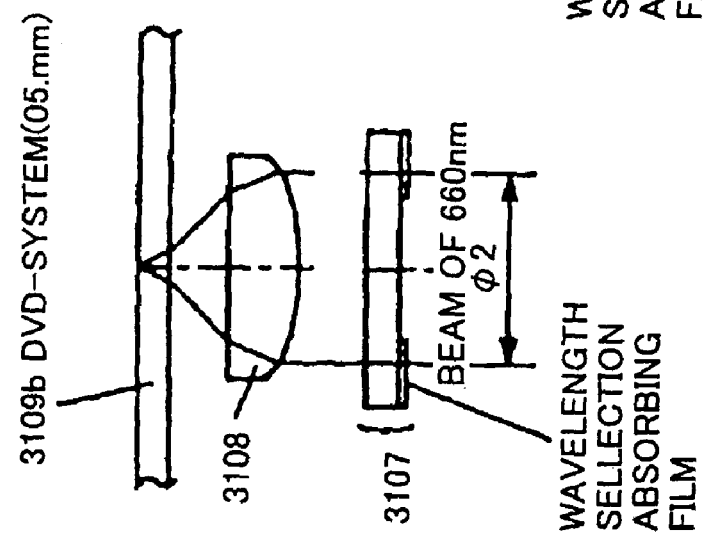
Figure 81C:
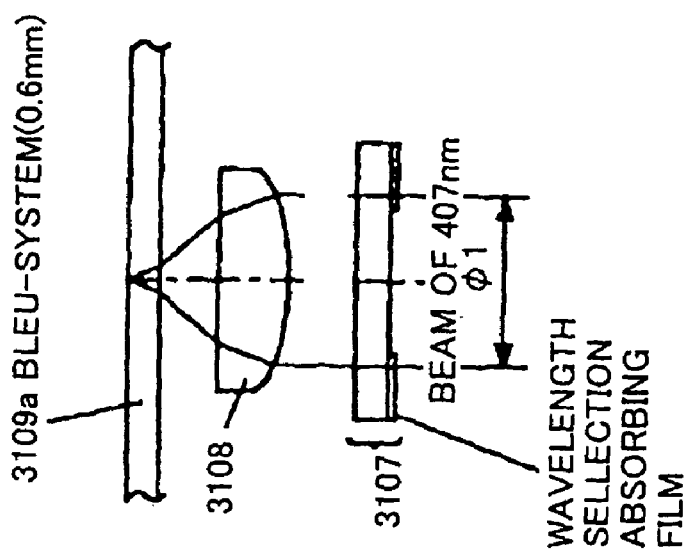

Further alternatively, a device which switches a beam diameter thanks to absorption according to the wavelength of a beam which comes out of the light source may be used as the aperture switching device 3107 as shown in FIGS. 81A, 81B and 81C.

Other than the above-mentioned examples, as the aperture switching device which switches a beam diameter according to wavelength, any other device may be instead applied which utilizes a polarization characteristic, for example. That is, the light sources may be arranged so that the polarization direction of the light of wavelengths of 660 nm and 780 nm may intersect perpendicularly, and according to this polarization direction that intersects perpendicularly, the aperture may be switched.

Furthermore, in the optical pickups in the twenty-ninth embodiment described above, the wavelength plate is provided such that, thereby, while a light with a wavelength of 407 nm is transformed into a linear polarization from a circular polarization, or from a linear polarization to a circular polarization; for lights with wavelengths of 660 nm and 780 nm, transformation into a circular polarization or an ellipse polarization from a linear polarization or the reverse thereof is performed.

As a configuration of the wavelength plate by which any of a light with a wavelength of 407 nm, a light with a wavelength of 660 nm, and a light with a wavelength of 780 nm can be transformed into a linear polarization from a circular polarization, or from a linear polarization into a circular polarization, a crystal having a thickness 't', a phase difference between the ordinary light (refractive index: no) and extraordinary light (refractive index: new) be ¼ of the wavelength of 407 nm, the wavelength of 660 nm, or the wavelength of 780 nm. In other words, this crystal used as the wavelength plate satisfies the following requirements:

$$\Delta n1 \times t = \{(2p+1)/4\} \times 407 \ (p=0, 1, \ldots)$$

Δn1: (no−ne) with respect to the light coming from the light source having the wavelength of 407 nm;

$$\Delta n2 \times t = \{(2q+1)/4\} \times 660 \ (q=0, 1, \ldots)$$

Δn2: (no−ne) with respect to the light coming from the light source having the wavelength of 660 nm;

$$\Delta n3 \times t = \{(2r+1)/4\} \times 780 \ (r=0, 1, \ldots)$$

Δn3: (no−ne) with respect to the light coming from the light source having the wavelength of 780 nm;

Similarly, as a configuration of the wavelength plate by which any of the light with wavelengths of 407 nm and 660 nm can be transformed into a linear polarization from a circular polarization, or from a linear polarization into a circular polarization, and, also, a light with a wavelength of 780 nm can be transformed into an ecliptic polarization, a crystal having a thickness 't', a phase difference between the ordinary light (refractive index: no) and extraordinary light (refractive index: new) be ¼ of the wavelength of 407 nm, or the wavelength of 660 nm. In other words, this crystal used as the ¼ wavelength plate satisfies the following requirements:

$$\Delta n1 \times t = \{(2p+1)/4\} \times 407 \ (p=0, 1, \ldots)$$

Δn1: (no−ne) with respect to the light coming from the light source having the wavelength of 407 nm;

$$\Delta n2 \times t = \{(2q+1)/4\} \times 660 \ (q=0, 1, \ldots)$$

Δn2: (no−ne) with respect to the light coming from the light source having the wavelength of 660 nm;

Further, as a configuration of the wavelength plate by which a light with a wavelength of 407 nm can be transformed into a linear polarization from a circular polarization, or from a linear polarization into a circular polarization, and, also, any light with wavelengths of 660 nm and 780 nm can be transformed into an elliptic polarization, a crystal having a thickness 't', a phase difference between the ordinary light (refractive index: no) and extraordinary light (refractive index: new) be ¼ of the wavelength of 407 nm. In other words, this crystal used as the ¼ wavelength plate satisfies the following requirements:

$$\Delta n1 \times t = \{(2p+1)/4\} \times 407 \ (p=0, 1, \ldots)$$

Δn1: (no−ne) with respect to the light coming from the light source having the wavelength of 407 nm;

As the holograms 3201b and 3301b disposed in the light-path of DVD system and CD system, when the hologram having no polarizing function is used, light-path separation between going path and returning path may not be well achieved, and, as a result, approximately 30% of the returning light reflected by the optical recording medium returns to the light source. Such a returned light may make the oscillation state of the semiconductor laser unstable, as a noise component, generally. However, according to the twenty-ninth embodiment of the present invention, the polarization direction of a beam coming from the DVD-system hologram unit 3201, shown in FIG. 68, and a light incident onto the hologram unit from the optical recording medium can be made to intersect perpendicularly, by providing the wavelength plate with the above-mentioned characteristics. Thus, a noise generated by the returned light to the semiconductor laser 3201a can be blocked by making the polarization direction of the light of the going path and the light of the returning path intersect perpendicularly. The same manner is also applied to the CD system.

Moreover, by providing the wavelength plate having the above-mentioned characteristics, a polarization separation optical system is formed by a combination of the polarization beam splitter 3103 and the wavelength plate 3106 for the blue-system optical recording medium of FIG. 68, and, thus, a sufficient luminous energy can be obtained, and, also a reduction in noise generation caused due to the returning light to the semiconductor laser 3101 can be achieved. Similarly, a polarization separation optical system is realizable by using a hologram having a polarization selection function also for each of the DVD system light-path and CD system light-path.

In addition, the wavelength plate is not limited to that of crystal which satisfies the above-mentioned requirements according to the formulas. For example, a configuration in which glass substrates sandwich a stuck arrangement of phase difference devices of an organic material may be applied. Alternatively, an electro-optic device such as a liquid crystal device may also be applied.

Figure 82:
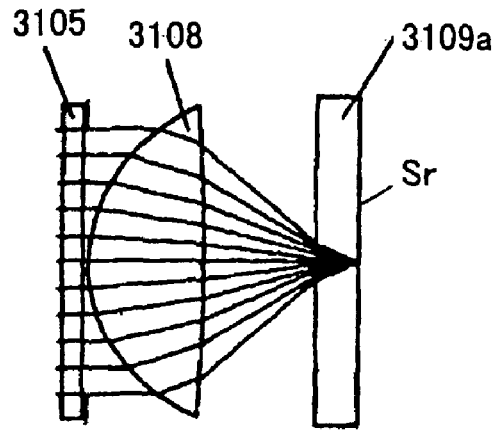
FIG. 82 illustrates an optical system for 407 nm in the twenty-ninth embodiment.

A specific numerical arrangement and specific optical characteristics in the twenty-ninth embodiment described above will now be described. As to the object lens at a time of being applied the blue optical system, an optical performance with a wavelength of 407 nm is first shown using FIG. 82 and Table 2 below. In addition, as the phase correction device 3105 has no effect for the wavelength 407 nm, the object lens 3108 will be described mainly.

The object lens 3108 in the twenty-ninth embodiment is an object lens designed so that the wavefront becomes minimum on the wavelength of 407 nm. It is assumed that the numerical aperture NA is 0.65, the focal length 'f' is 3 mm, the refractive index 'n' on the wavelength of 407 nm is 1.604949, and the glass type of the lens applied is BaCD5 by Hoya Corp.

This object lens has an aspherical surface on each side defined by the following formula:

$$X = (Y^2/R)/\left[1 + \sqrt{\{1-(1+K)Y^2/R^2\}} + AY^4 + BY^6 + CY^8 + DY^{10} + EY^{12} + FY^{14} + GY^{16} + HY^{18} + JY^{20} + \ldots\right]$$

where

X denotes the coordinate along the optical axis direction; Y denotes the coordinate along the direction perpendicular to the optical axis; R denotes the paraxial curvature radius; K denotes the cone constant; A, B, C, D, E, F, . . . denote high-order coefficients, shown in the table of lens data below.

The specific data thereof is shown below:

TABLE 2

Surface OBJ:

Curvature radius: infinity;
Thickness: infinity;
n (refractive index on 407 nm): NA
Surface S1:

Curvature radius: infinity;
Thickness: 0.3 mm;
n (refractive index on 407 nm): 1.604949
Surface S2 (Note 1):

Curvature radius: infinity;
Thickness: 0 mm;
n (refractive index on 407 nm): NA
Surface STO:

Curvature radius: infinity;
Thickness: 0.0 mm;
n (refractive index on 407 nm): NA
Surface S4:

Curvature radius: 1.98113 mm;
Thickness: 1.700000 mm;
n (refractive index on 407 nm): 1.604949
K: −0.673789; A: 0.351168 × $10^{-2}$; B: 0.194193 × $10^{-3}$;
C: 0.365786 × $10^{-4}$; D: −0.204776 × $10^{-4}$;
Surface S5:

Curvature radius: −14.62096 mm;
Thickness: 1.659252 mm;
n (refractive index on 407 nm): NA
K: 29.741231; A: 0.136479 × $10^{-1}$; B:
−0.371045 × $10^{-2}$; C: 0.613663 × $10^{-3}$;
D: −0.404300 × $10^{-4}$;
Surface S6:

Curvature radius: Infinity;
Thickness: 0.6 mm;
n (refractive index on 407 nm): 1.620200

TABLE 2-continued

Surface IMG:

Curvature radius: Infinity;
Thickness: 0.0 mm;
n (refractive index on 407 nm): NA
Incident pupil diameter (effective diameter of the aperture switching device): 3.9 mm
Wavelength: 407 nm Note 1:
As to the phase correction surface data, see Table 5.

Note 1: As to the phase correction surface data, see Table 5.

OBJ, shown above, denotes an object point (semiconductor laser as the light source). However, the object lens 3108 is for an infinite system, and INFINITY in each of the curvature radius and thickness means that the light source is present at infinity. STO denotes the aperture control surface of the aperture control device, where the curvature radius is determined infinity and the thickness is determined '0' for design purpose.

Figure 83A:
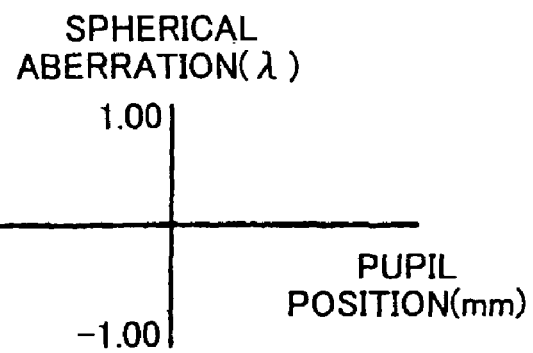

S1 denotes the surface on the side of light source of the phase correction device; S2 denotes the surface on the side of optical recording medium of the same; S4 denotes the surface of the object lens 3108 directed to the light source; and S5 denotes the surface of the same directed toward the optical recording medium. The lens thickness of the object lens is 1.7 mm, and the thickness of 1.659252 mm of the surface S5 denotes the working distance. S6 denotes the light-incident side surface of the light-incident side substrate of the optical recording medium 3109a, IMG denotes the recording surface Sr of the optical recording medium. The separation between S6 and IMG, i.e., the thickness of the light-incident side substrate of the optical recording medium is 0.6 mm, where n=1.604949. The incident pupil diameter shown above expresses the aperture diameter (3.9 mm) of the aperture control device;

The wavefront of spherical aberration when the phase correction device is inserted in the wavelength of 407 nm is shown in FIG. 83A. Although the wavefront of spherical aberration shown assumes a case where the phase correction device 3105 is not provided as shown in FIG. 72, since the phase correction device 3105 has no effect on the wavelength of 407 nm, the state shown in FIG. 83A should be the same as that shown in FIG. 72. The horizontal axis in this figure shows the height (pupil position) from the optical axis, and the vertical axis shows the spherical aberration. The RMS value of the spherical aberration is 0.002 λrms at this time. The calculated allowable value of 0.030 λrms can thus be satisfactorily satisfied. Accordingly, a satisfactory beam spot is formed on the optical recording medium.

A specific numerical arrangement and specific optical characteristics in the above-mentioned variant embodiment of the twenty-ninth embodiment described above will now be described. As to the object lens at a time of being applied to the blue optical system, an optical performance with a wavelength of 400 nm is first shown using FIG. 82 and Table 3 below. In addition, as the phase correction device 3105 has no effect for the wavelength 400 nm, the object lens will be described mainly.

The object lens in the variant embodiment of the twenty-ninth embodiment is an object lens designed so that the wavefront becomes minimum on the wavelength of 400 nm. It is assumed that the numerical aperture NA is 0.65, the focal length 'f' is 3 mm, the refractive index 'n' on the wavelength of 407 nm is 1.625. This object lens also has an aspherical surface on each side defined by the following formula (same as the above):

$$X = (Y^2/R)/\left[1 + \sqrt{1-(1+K)Y/R^2} + AY^4 + BY^6 + CY^8 + DY^{10} + EY^{12} + FY^{14} + GY^{16} + HY^{18} + JY^{20} + \ldots\right]$$

The specific data thereof is shown below:

TABLE 3

| Surface OBJ: |
| --- |
| Curvature radius: infinity;<br>Thickness: infinity;<br>n (refractive index on 400 nm): NA<br>Surface S1 (Note 1): |
| Curvature radius: infinity;<br>Thickness: 0.5 mm;<br>n (refractive index on 400 nm): 1.508<br>Surface S2: |
| Curvature radius: infinity;<br>Thickness: 0.0 mm;<br>n (refractive index on 400 nm): NA<br>Surface STO: |
| Curvature radius: infinity;<br>Thickness: 0.2 mm;<br>n (refractive index on 400 nm): NA<br>Surface S4: |
| Curvature radius: 2.01507 mm;<br>Thickness: 1.700000 mm;<br>n (refractive index on 400 nm): 1.625<br>K: −0.674258; A: 0.364557 × 10$^{-2}$;<br>B: 0.410494 × 10$^{-4}$; C: 0.815925 × 10$^{-4}$;<br>D: −0.444548 × 10$^{-4}$;<br>Surface S5: |
| Curvature radius: −18.13584 mm;<br>Thickness: 1.656788 mm;<br>n (refractive index on 400 nm): NA<br>K: 69.056492; A: 0.132534 × 10$^{-1}$;<br>B: −0.410601 × 10$^{-2}$; C: 0.595437 × 10$^{-3}$;<br>D: −0.200993 × 10$^{-4}$;<br>Surface S6: |
| Curvature radius: Infinity;<br>Thickness: 0.6 mm;<br>n (refractive index on 400 nm): 1.623<br>Surface IMG |
| Curvature radius: infinity;<br>Thickness: 0.0 mm;<br>n (refractive index on 400 nm): NA<br>Incident pupil diameter (effective diameter of the aperture switching device): 3.9 mm<br>Wavelength: 400 nm |

Note 1:
As to the phase correction surface data, see FIG. 76B.

In this case, the lens thickness of the object lens is 1.7 mm, and the thickness of 1.656788 mm of the surface S5 denotes the working distance. The separation between S6 and IMG, i.e., the thickness of the light-incident side substrate of the optical recording medium is 0.6 mm, where n=1.623. Same as the above, the incident pupil diameter shown above expresses the aperture diameter (3.9 mm) of the aperture control device;

As the phase correction device in the variant embodiment of the twenty-ninth embodiment has no effect on the wavelength of 400 nm, a wavefront of spherical aberration similar to that shown in FIG. 72 can be obtained. The RMS value of the spherical aberration is 0.002 λrms at this time. The calculated allowable value of 0.030 λrms can thus be satisfactorily satisfied. Accordingly, a satisfactory beam spot is formed on the optical recording medium.

Figure 84:
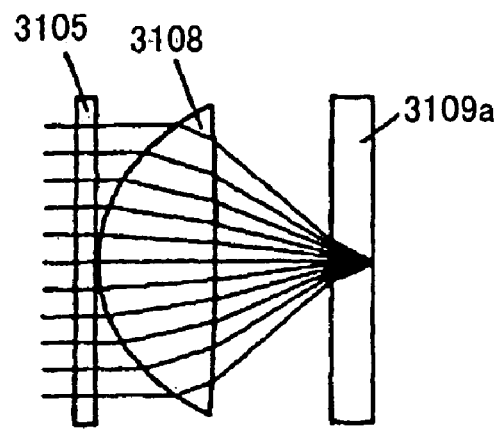
FIG. 84 illustrates an optical system for 660 nm in the twenty-ninth embodiment.

With reference to FIG. 84 and Table 4 below, a numeral arrangement and an optical performance with a wavelength of 660 nm of the phase correction device 3105 will now be described together with the other conditions in the optical pickup according to the twenty-ninth embodiment when information recording, reproduction or deletion is performed on a DVD-system optical recording medium 3109b. In this case, although the shape of the object lens 3108 and the thickness of the phase correction device 3105 are the same as those shown in Table 2 above, the refractive index of each component, the working distance and the effective aperture diameter differ. The phase shift amount of phase shift performed on the light-path length by the phase correction device 3105 thanks to the interference fringes formed in the surface directed to the object lens 3108 is expressed a light-path difference function γ(h) by the following formula:

$$\gamma(h) = (C1h^2 + C2h^4 + C3h^6 + \ldots) \times m \times \lambda$$

where:
'h' denotes the height from the optical axis;
'Ci' denotes an n-th (even-th) light-path difference function coefficient
'm' denotes the number of a diffraction order; and
'λ' denotes the wavelength applied The phase shift amount is expressed such that the direction in which the light-path length increases is regarded as a positive direction. In the twenty-ninth embodiment, the pattern of concentric interference fringe formed in the phase correction device 3105 is designed so as to utilize the +1-th (first) diffracted light. However, any other order of diffracted light may be utilized. For example, 2-th (second) diffracted light may be utilized instead.

TABLE 4

| Surface OBJ: |
| --- |
| Curvature radius: infinity;<br>Thickness: infinity;<br>n (refractive index on 660 nm): NA<br>Surface S1: |
| Curvature radius: infinity;<br>Thickness: 0.3 mm;<br>n (refractive index on 660 nm): 1.586051<br>Surface S2 (Note 1): |
| Curvature radius: infinity;<br>Thickness: 0 mm;<br>n (refractive index on 660 nm): NA<br>Surface STO: |
| Curvature radius: infinity;<br>Thickness: 0.0 mm;<br>n (refractive index on 660 nm): NA<br>Surface S4: |
| Curvature radius: 1.98113 mm;<br>Thickness: 1.700000 mm;<br>n (refractive index on 660 nm): 1.586051<br>K: −0.673789; A: 0.351168 × 10$^{-2}$;<br>B: 0.194193 × 10$^{-3}$; C: 0.365786 × 10$^{-4}$;<br>D: −0.204776 × 10$^{-4}$;<br>Surface S5: |
| Curvature radius: −14.62096 mm;<br>Thickness: 1.744863 mm;<br>n (refractive index on 660 nm): NA |

TABLE 4-continued

K: 29.741231; A: 0.136479 × 10$^{-1}$;
B: −0.371045 × 10$^{-2}$; C: 0.613663 × 10$^{-3}$;
D: −0.404300 × 10$^{-4}$;
Surface S6:

Curvature radius: Infinity;
Thickness: 0.6 mm;
n (refractive index on 660 nm): 1.578000
Surface IMG Curvature radius: infinity;
Thickness: 0.0 mm;
n (refractive index on 660 nm): NA
Incident pupil diameter (effective diameter of the
aperture switching device): 4.02 mm
Wavelength: 660 nm Note 1:
As to the phase correction surface data, see Table 5.

Table 5.

According to the twenty-ninth embodiment, the pattern of the interference fringes of the phase correction device 3105 is designed so that the spherical aberration become minimum on the wavelength of 660 nm, and the light-path difference function coefficient Ci has the following values (Table 5):

TABLE 5

Surface S2 (phase correction surface):

C1 = 1.3437 × 10$^{-3}$; C2 = −2.0345 × 10$^{-5}$;
C3 = −2.9447 × 10$^{-5}$; C4 = 1.6631 × 10$^{-5}$;
C5 = −4.1025 × 10$^{-6}$; C6 = 2.8446 × 10$^{-7}$

Figure 85A:
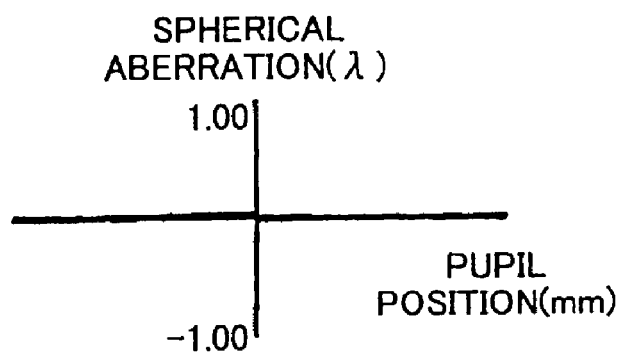
FIGS. 85A, 85B, 86A and 86B show spherical aberrations in cases of employing different types optical systems and different types of phase correction devices in the twenty-ninth embodiment in case of applying 660 nm.

The wavefront of spherical aberration in case where the phase correction device is used with the wavelength of 660 nm is shown in FIG. 85A. The horizontal axis shows the height from the optical axis and the vertical axis shows the spherical aberration. The RMS value of the spherical aberration at this time is 0.001 λrms. As this value is sufficiently lower than the calculated allowable value 0.030 λrms, a satisfactory beam spot can be formed.

With reference to FIG. 84 and Table 6 below, a numeral arrangement and an optical performance with a wavelength of 660 nm of the DVD optical system will now be described in the optical pickup according to the above-mentioned variant embodiment of the twenty-ninth embodiment when information recording, reproduction or deletion is performed on a DVD-system optical recording medium 3109b. In this case, although the shape of the object lens 3108 and the thickness of the phase correction device 3105 are the same as those shown in Table 3 above, the refractive index of each device, the working distance and the effective aperture diameter differ. Further, as the DVD-system optical system is configured into a finite system, the wavefront aberration is minimized. As descried above with reference to FIG. 75, the optimum wavefront can be obtained when the object distance is set as 148 mm.

TABLE 6

Surface OBJ:

Curvature radius: infinity;
Thickness: infinity; 148 mm
n (refractive index on 660 nm): NA TABLE 6-continued Surface S1 (Note 1):

Curvature radius: infinity;
Thickness: 0.5 mm;
n (refractive index on 660 nm): 1.495
Surface S2:

Curvature radius: infinity;
Thickness: 0 mm;
n (refractive index on 660 nm): NA
Surface STO:

Curvature radius: infinity;
Thickness: 0.2 mm;
n (refractive index on 660 nm): NA
Surface S4:

Curvature radius: 2.01507 mm;
Thickness: 1.700000 mm;
n (refractive index on 660 nm): 1.603
K: −0.674258; A: 0.364557 × 10$^{-2}$;
B: 0.410494 × 10$^{-4}$; C: 0.815925 × 10$^{-4}$;
D: −0.444548 × 10$^{-4}$;
Surface S5:

Curvature radius: −18.13584 mm;
Thickness: 1.794028 mm;
n (refractive index on 660 nm): NA
K: 69.056492; A: 0.132534 × 10$^{-1}$;
B: −0.410601 × 10$^{-2}$; C: 0.595437 × 10$^{-3}$;
D: −0.200993 × 10$^{-4}$;
Surface S6:

Curvature radius: Infinity;
Thickness: 0.6 mm;
n (refractive index on 660 nm): 1.579
Surface IMG Curvature radius: infinity;
Thickness: 0.0 mm;
n (refractive index on 660 nm): NA
Incident pupil diameter (effective diameter of the
aperture switching device): 4.05 mm
Wavelength: 660 nm Note 1:
As to the phase correction surface data, see FIG. 76B.

Figure 86A:
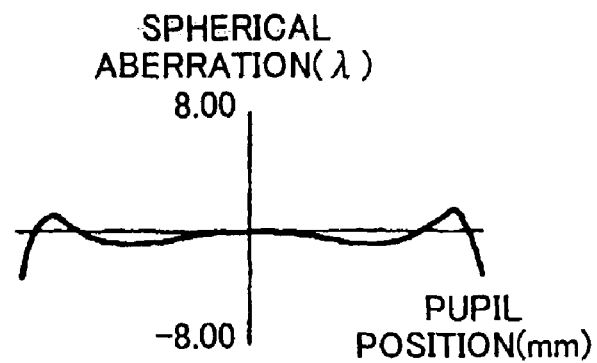

Actually, reduction in the light path is attained by inserting the coupling lens 3302 in the light path between the light source and the object lens as shown in the configuration of the optical pickup of FIG. 68. FIG. 86A shows the spherical aberration of a finite-system incident light with a wavelength of 660 nm in case the phase correction device is not inserted. In this case, the RMS value of the spherical aberration of the finite-system incident light in the wavelength of 660 nm is 0.1092 λrms. This wavefront of spherical aberration can be controlled by using the phase correction device.

The specific configuration of the phase correction device will now be described. The pattern of the phase correction device has concentric stair steps, where a difference in height between adjacent stair steps is expressed by an integer multiple of a predetermined value 'h'. Assuming that 'n' denotes the refractive index of the phase correction device, and λ denotes the wavelength of a light applied, the phase difference δ(λ) occurring in the light passing through between parts of absence and existence of a phase plate pattern is expressed by the following formula (1) (same as the above):

$$\delta(\lambda) = 2\pi(n-1)h/\lambda \qquad (1)$$

According to the variant embodiment of the twenty-ninth embodiment, the phase correction device 3105 is configured such that 'h' is selected such that the phase difference be an integer multiple of 2π occurring when a light of 400 nm passes therethrough. For example, in case FCD1 by Hoya Corp. is used as the substrate material having the groove depth 'h': 1.5758 micrometers, for 400 nm:

n=1.507672,

δ(400 nm)=4π(=2.0π×2);

for 660 nm:

n=1.495051,

δ(660 nm)=2.36π(=0.36π)

for 780 nm:

n=1.492821,

δ(780 nm)=1.99π

Then, the above-mentioned 'h' is selected as the predetermined height unit, and, thus, a shape of stair steps for controlling the wavefront of spherical aberration remaining in the finite system is determined. As a result, the shape shown in FIG. 76B is obtained.

Figure 86B:
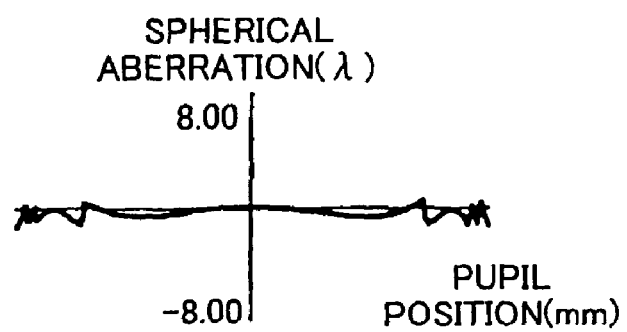

FIG. 86B shows the spherical aberration in case the phase correction device 3105 shown in FIG. 76B is applied. The horizontal axis represents the height from the optical axis as the pupil radius position, while the vertical axis represents, and wavefront aberration. The RMS value of wavefront aberration is less than 0.029 λrms, and thus, it is possible to acquire satisfactory information recording/reproduction signal characteristics.

Figure 87:
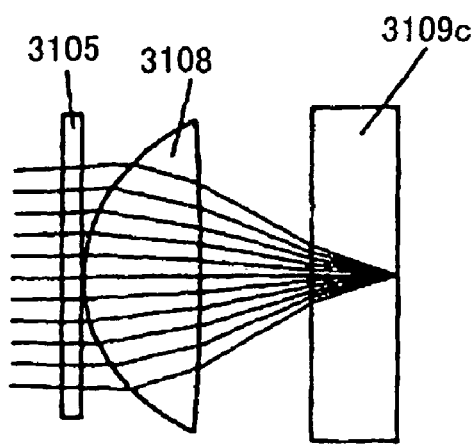
FIG. 87 illustrates an optical system for 780 nm in the twenty-ninth embodiment.

With reference to FIG. 87 and Table 7 below, a numeral arrangement and an optical performance with a wavelength of 780 nm of the CD optical system will now be described in the optical pickup according to the twenty-ninth embodiment when information recording, reproduction or deletion is performed on a CD-system optical recording medium 3109c. In this case, although the shape of the object lens 3108 and the thickness of the phase correction device 3105 are the same as those shown in Table 2 above, the refractive index of each device, the working distance and the effective aperture diameter differ. Further, as the CD-system optical system is configured into a finite system, the wavefront of the spherical aberration is minimized.

TABLE 7

Surface OBJ:

Curvature radius: infinity;
Thickness: infinity; 50.15 mm
n (refractive index on 780 nm): NA
Surface S1:

Curvature radius: infinity;
Thickness: 0.3 mm;
n (refractive index on 780 nm): 1.582509
Surface S2 (Note 1):

Curvature radius: infinity;
Thickness: 0 mm;
n (refractive index on 780 nm): NA
Surface STO:

Curvature radius: infinity;
Thickness: 0.0 mm;
n (refractive index on 780 nm): NA
Surface S4:

Curvature radius: 1.98113 mm;
Thickness: 1.700000 mm;
n (refractive index on 780 nm): 1.582509
K: −0.673789; A: 0.351168 × $10^{-2}$; B: 0.194193 × $10^{-3}$;
C: 0.365786 × $10^{-4}$; D: −0.204776 × $10^{-4}$;
Surface S5:

Curvature radius: −14.62096 mm;
Thickness: 1.569894 mm;
n (refractive index on 780 nm): NA TABLE 7-continued K: 29.741231; A: 0.136479 × $10^{-1}$;
B: −0.371045 × $10^{-2}$; C: 0.613663 × $10^{-3}$;
D: −0.404300 × $10^{-4}$;
Surface S6:

Curvature radius: Infinity;
Thickness: 0.6 mm;
n (refractive index on 780 nm): 1.572683
Surface IMG Curvature radius: infinity;
Thickness: 0.0 mm;
n (refractive index on 780 nm): NA
Incident pupil diameter (effective diameter of the
aperture switching device): 3.2 mm
Wavelength: 780 nm Note 1:
As to the phase correction surface data, see Table 5.

As mentioned in the above Table 7, the optimal wavefront can be obtained by setting the object distance into 50.15 mm. Actually, reduction in the light path is attained by inserting the coupling lens 3302 in the light path between the light source and object lens, as shown in the configuration of the optical pickup shown in FIG. 68.

Figure 88A:
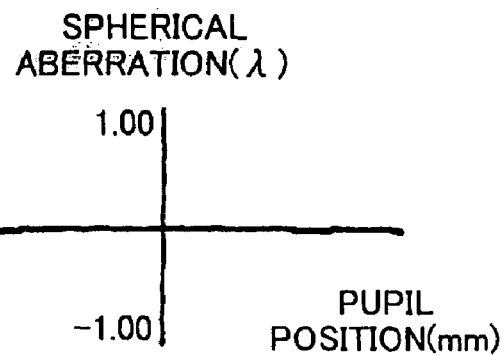
FIGS. 88A and 88B show spherical aberrations in cases of employing different types of phase correction devices in the twenty-ninth embodiment in case of applying 780 nm.

The wavefront of spherical aberration at a time of the phase correction device being inserted in the wavelength of 780 nm is shown in FIG. 88A. The horizontal axis shows the height from the optical axis and the vertical axis shows spherical aberration. The RMS value of the spherical aberration at this time is 0.006 λrms. Accordingly, the calculated permissible value 0.030 λrms for an actual use is fully satisfied, and thus, a satisfactory beam spot can be formed on the optical recording medium loaded.

With reference to FIG. 87 and Table 8 below, a numeral arrangement and an optical performance with a wavelength of 780 nm of the CD optical system will now be described in the optical pickup according to the variant embodiment of the twenty-ninth embodiment when information recording, reproduction or deletion is performed on a CD-system optical recording medium 3109c. In this case, although the shape of the object lens 3108 and the thickness of the phase correction device 3105 are the same as those shown in Table 3 above, the refractive index of each device, the working distance and the effective aperture diameter differ. Further, as the CD-system optical system is configured into a finite system, the wavefront of the spherical aberration is minimized.

TABLE 8

Surface OBJ:

Curvature radius: infinity;
Thickness: 53 mm;
n (refractive index on 780 nm): NA
Surface S1 (Note 1):

Curvature radius: infinity;
Thickness: 0.5 mm;
n (refractive index on 780 nm): 1.493
Surface S2:

Curvature radius: infinity;
Thickness: 0.0 mm;
n (refractive index on 780 nm): NA
Surface STO:

Curvature radius: infinity;
Thickness: 0.2 mm;
n (refractive index on 780 nm): NA

TABLE 8-continued

Surface S4:

Curvature radius: 2.01507 mm;
Thickness: 1.700000 mm;
n (refractive index on 780 nm): 1.603
K: −0.674258; A: 0.364557 × $10^{-2}$;
B: 0.410494 × $10^{-4}$; C: 0.815925 × $10^{-4}$;
D: −0.444548 × $10^{-4}$;
Surface S5:

Curvature radius: −14.62096 mm;
Thickness: 1.546207 mm;
n (refractive index on 780 nm): NA
K: 69.056492; A: 0.132534 × $10^{-1}$;
B: −0.410601 × $10^{-2}$; C: 0.595437 × $10^{-3}$;
D: −0.200993 × $10^{-4}$;
Surface S6:

Curvature radius: Infinity;
Thickness: 1.2 mm;
n (refractive index on 780 nm): 1.573
Surface IMG Curvature radius: infinity;
Thickness: 0.0 mm;
n (refractive index on 780 nm): NA
Incident pupil diameter (effective diameter of the aperture switching device): 3.0 mm
Wavelength: 780 nm Note 1:
As to the phase correction surface data, see FIG. 76B.

As mentioned in the above Table 8, the optimal wavefront can be obtained by setting the object distance into 53 mm. Actually, reduction in the light path is attained by inserting the coupling lens 3302 in the light path between the light source and object lens, as shown in the configuration of the optical pickup shown in FIG. 68.

The RMS value of the spherical aberration in the wavelength of 780 nm without phase correction device is 0.006 λrms. Accordingly, the calculated permissible value 0.030 λrms for an actual use is fully satisfied, and thus, a satisfactory beam spot can be formed on the optical recording medium loaded. Further, when the phase correction device is inserted, no degradation in the wavefront aberration occurs, and, thus, a satisfactory beam spot can be formed. This is because the effective pattern area of the phase correction device is provided outside of the beam diameter for the CD system.

The transmissivity η0 and the +1-th (first) diffraction efficiency η+1 of the rectangular area (in sectional view) of the phase correction device 3105 can be expressed by the following formulas:

$$\eta 0 = \cos^2(\Phi)$$

$$\eta + 1 = (4/\pi^2)\sin^2(\Phi)$$

where:

$$\Phi = \pi(n-1)h/\lambda$$

Figure 89:
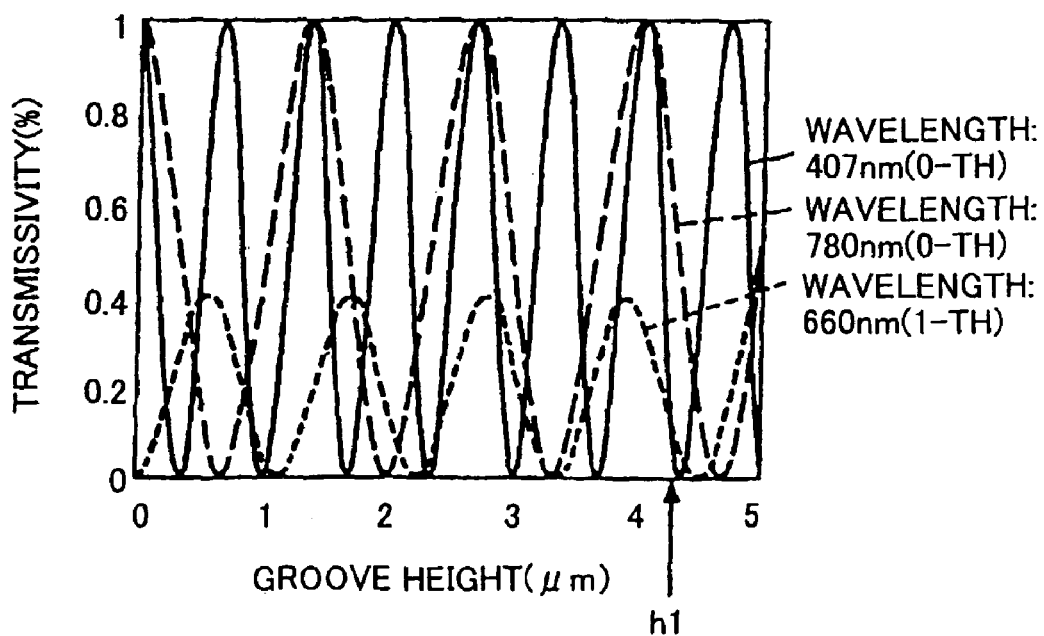
FIG. 89 shows a change in transmission rate according to a height of rectangular groove in a phase correction device.

FIG. 89 shows a relation of the transmissivity with respect to the height of the rectangular groove obtained based on these formulas. It can be seen that the maximum transmissivity can be obtained for each of the wavelength of 407 nm, the wavelength of 660 nm, and the wavelength of 780 nm at the height h1=4.02 micrometers.

Figure 90A:
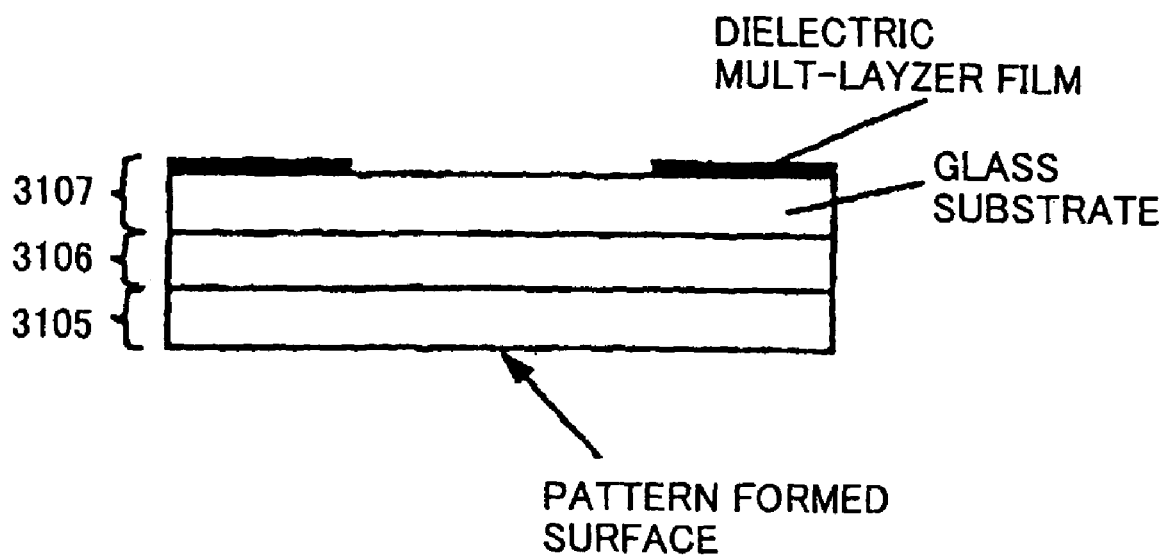
FIGS. 90A and 90B illustrate a scheme of integral combination configurations according to the present invention.
Figure 90B:
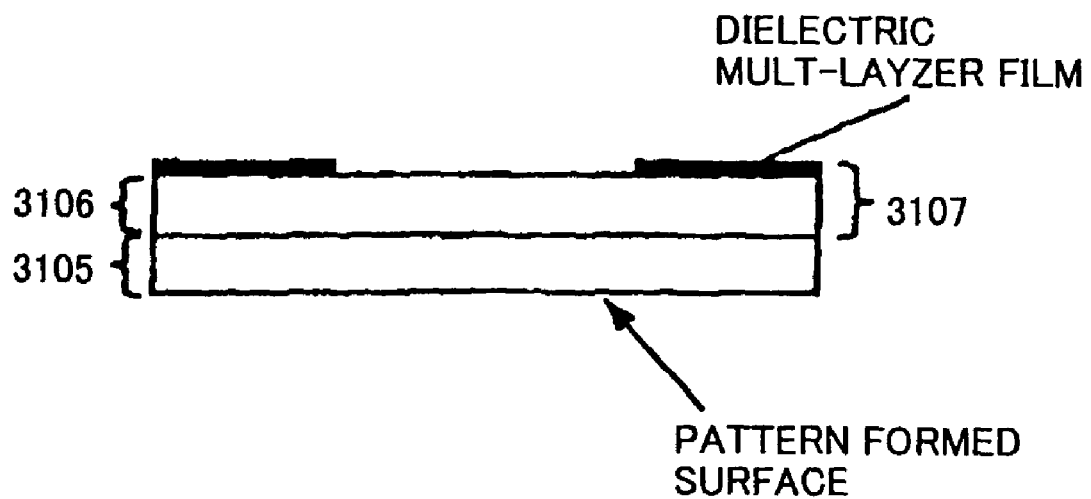

Moreover, as shown in FIG. 90A, the phase correction device 3105, the aperture control device 3107, and the wavelength plate 3106 may be combined integrally. Thereby, simplification in assembly process can be attained. Furthermore, it may also be possible that, as shown in FIG. 90B, the phase correction device 3105 and the wavelength plate 3106 are integrally combined in the stated order, and the aperture control device 3107 may be formed on the surface of the phase correction device 3105 or the surface of the wavelength plate 3106. Thereby, further reduction in the thickness of the device components as well as reduction in the weight thereof.

Figure 91A:
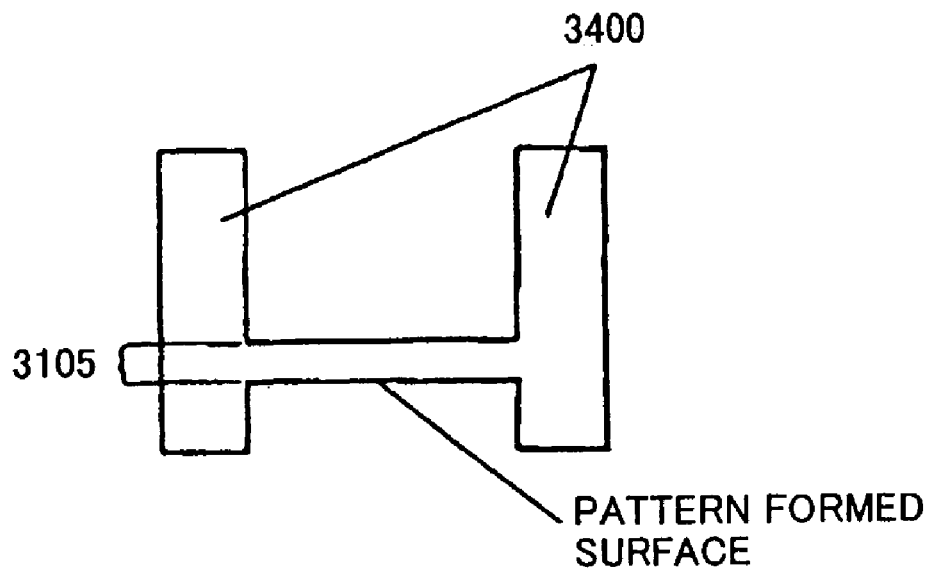
FIGS. 91A and 91B illustrate a scheme of integrating an object lens with a phase correction device.
Figure 91B:
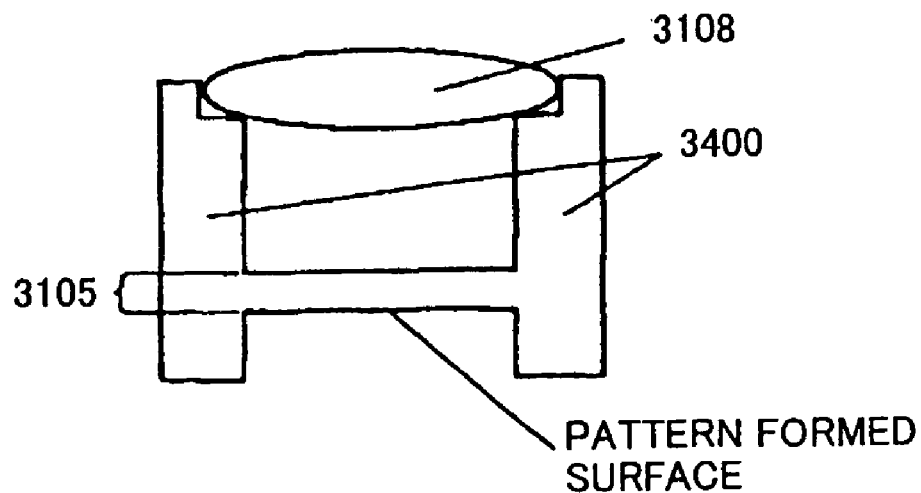

Furthermore, as shown in FIG. 91A, a flange 3400 may be provided and the phase correction device 3105 may then be internally combined therewith. Especially, as shown in FIG. 91B, the object lens 3108 may further be bonded to this flange 3400.

In addition, the phase correction device 3105 may be directly formed on the object lens 3108 by directly forming the diffraction grating on the surface of the object lens 3108. Thus, the phase correction device 3105 and the object lens 3108 can be integrally combined. Furthermore, the phase correction device 3105, the aperture control device 3107, and the wavelength plate 3108 may be mounted on an actuator (not shown), whereby these devices are moved integrally with the object lens in case of focus servo control or so. Thereby, compared with a case where they are disposed separately, the wavefront degradation caused due to a relative shift and relative tilt which may otherwise occur therebetween can be effectively controlled.

Furthermore, the actuator may be of any of two through four axes of moving dimensions. In other words, in addition to two-directional control for focus and tracking control operations, one-directional tilt control for the radial direction or the jitter direction, and, thus, total three-axis actuator may be provided. Alternatively, by adding two-direction tilt control for both the radial and jitter directions, and, thus, total four-axis actuator may be provided. When the inclination of the object lens is changed by such a three-axis or four-axis actuator, coma aberration may occur in a beam passing through the object lens. Accordingly, this coma aberration may be utilized to cancel out the coma aberration occurring due to an inclination of an optical recording medium.

As described above, according to the twenty-ninth embodiment and the variant embodiment thereof, the phase correction device is provided which acts on the DVD-system light path, the phase correction device generating a spherical aberration having the opposite polarity to an originally occurring spherical aberration; a light is applied to the CD-system light path with a finite optical system; also, a light is applied to the DVD-system light path with a finite optical system. In addition, the phase correction device has a wavelength selection function to create a dead zone on the wavelength of 407 nm (400 nm) and the wavelength of 780 nm, while a phase correction function is fully performed on a light of the wavelength of 660 nm. Thereby, not a device configuration in that an intermediate optimal value between DVD and CD is applied as mentioned above, but the optimum value for DVD can be achieved.

Figure 92:
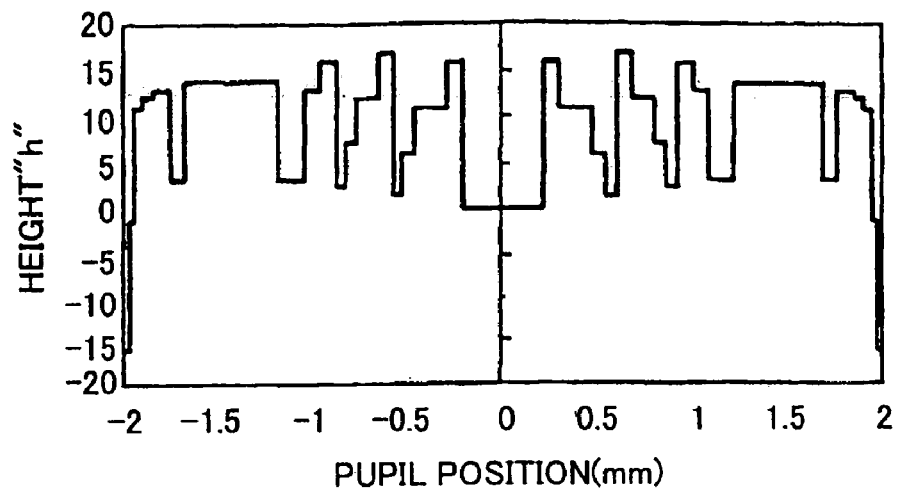
FIG. 92 illustrates a sectional view of a phase correction device according to a thirtieth embodiment of the present invention.

A thirtieth embodiment of the present invention will now be described. A point that an optical pickup according to the thirtieth embodiment differs from the optical pickup according to the above-described twenty-ninth embodiment is that a phase correction device 3105b having a shape of stair steps as shown in FIG. 92 instead of the phase correction device 3105 having a rectangle pitch as shown in FIGS. 73A and 73B.

When not using the above-mentioned phase correction device 3105b or so, in case a beam passing through the object lens 3108 with a wavelength of 660 nm passes through the light-incident side substrate of an optical recording medium loaded having the thickness of 0.6 mm, a spherical aberration remains, as mentioned above. FIG. 70 shows an example of such a remaining spherical aberration. According to the thirtieth embodiment of the present invention, the above-mentioned stair-step-shaped correction device 3105b is used as a device for controlling such a type of spherical aberration. A numerical arrangement with respect to the wavelength of 660 nm in the thirtieth embodiment of the present invention is shown in Table 9 below:

TABLE 9

Surface OBJ:

Curvature radius: infinity;
Thickness: infinity;
n (refractive index on 780 nm): NA
Surface S1:

Curvature radius: infinity;
Thickness: 0.3 mm;
n (refractive index on 660 nm): 1.586051
Surface S2 (Note 1):

Curvature radius: infinity;
Thickness: 0.0 mm;
n (refractive index on 660 nm): NA
Surface STO:

Curvature radius: infinity;
Thickness: 0.0 mm;
n (refractive index on 660 nm): NA
Surface S4:

Curvature radius: 1.98113 mm;
Thickness: 1.700000 mm;
n (refractive index on 660 nm): 1.586051
K: −0.673789; A: 0.351168 × $10^{-2}$;
B: 0.194193 × $10^{-3}$; C: 0.365786 × $10^{-4}$;
D: −0.204776 × $10^{-4}$;
Surface S5:

Curvature radius: −14.62096 mm;
Thickness: 1.725867 mm;
n (refractive index on 660 nm): NA
K: 29.741231; A: 0.136479 × $10^{-1}$;
B: −0.371045 × $10^{-2}$; C: 0.613663 × $10^{-3}$;
D: −0.404300 × $10^{-4}$;
Surface S6:

Curvature radius: Infinity;
Thickness: 0.6 mm;
n (refractive index on 660 nm): 1.578000
Surface IMG:

Curvature radius: infinity;
Thickness: 0.0 mm;
n (refractive index on 660 nm): NA
Incident pupil diameter (effective diameter of the
aperture switching device): 4.02 mm
Wavelength: 660 nm Note 1:
As to the phase correction surface data, see FIG. 92.

FIG. 92 is a sectional view of the phase correction device 3105b, and, this phase correction device 3105b has a pattern of concentric circular interference fringes formed on a glass substrate therein. The height difference between each adjacent stair steps in this phase-plate pattern in a sectional view is made an integer multiple of hi, which is a predetermined unit height. The phase difference $\delta(\lambda)$ between a light passing through a portion of the phase correction device having this phase-plate pattern and a portion not having the same is expressed by the formula (1) same as above in the twenty-ninth embodiment:

$$\delta(\lambda)=2\pi(n-1)h/\lambda \quad (1)$$

where $\lambda$ denotes the wavelength of the light applied.

As described in the twenty-ninth embodiment, when the phase correction device according to the thirtieth embodiment is produced in the range shown in FIG. 74, it is possible to select "h" such that the phase difference occurring when a light of each of 407 nm and 780 nm in wavelength passes through the phase correction device 3105b be an integer multiple of $2\pi$. For example, in case BaCD5 provided by Hoya Corp. is used as the substrate material, and "h": 1.34 micrometers, for 407 nm:
n=1.604949,
$\delta(407\text{ nm})=4.0\pi(=2.0\pi\times2)$;
for 660 nm:
n=1.586051,
$\delta(660\text{ nm})=2.4\pi(=1.4\pi)$
for 780 nm:
n=1.582509,
$\delta(780\text{ nm})=2.07\pi$.

Then, this height "h" is determined as the unit height, and, then, a shape of stair steps is created such as to control the spherical aberration occurring as shown in FIG. 70. Then, the shape shown in FIG. 92 is obtained.

Figure 83B:
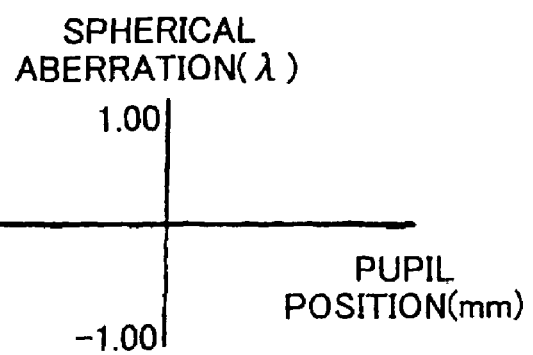
Figure 85B:
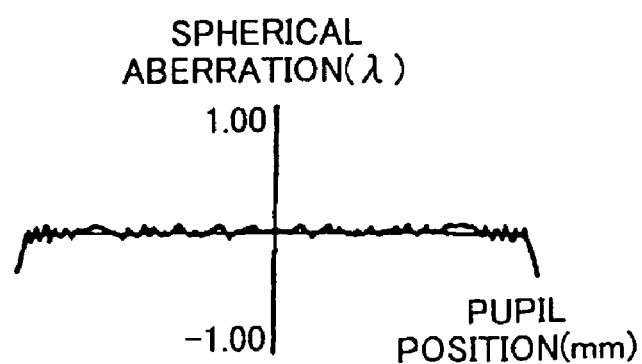
Figure 88B:
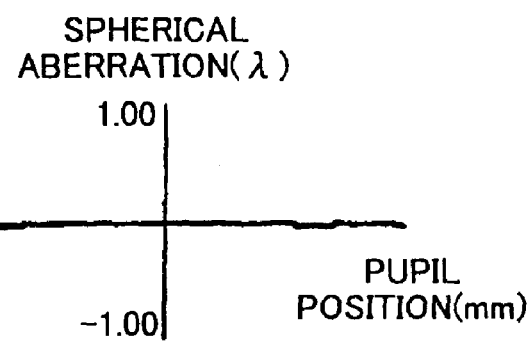

FIG. 85B shows a spherical aberration occurring at a time of using the phase correction device 3105b shown in the above-mentioned FIG. 92. In this figure, the height from the optical axis is shown in the horizontal axis, and the spherical aberration is shown in the vertical axis. From this figure, the RMS value of the spherical aberration is below 0.027 λrms, and thus, it becomes possible to acquire a satisfactory recording and reproduction signal characteristics. In addition, as in the twenty-ninth embodiment, a satisfactory wavefront characteristic is secured with each of the wavelength of 407 nm and wavelength 780 nm as shown in FIG. 83B and FIG. 88B.

Figure 93:
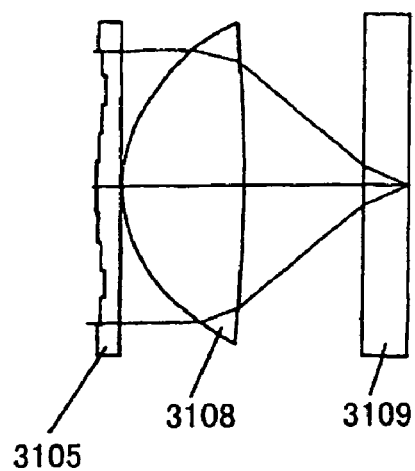
FIG. 93 illustrates an optical system according to the thirtieth embodiment of the present invention.
Figure 94:
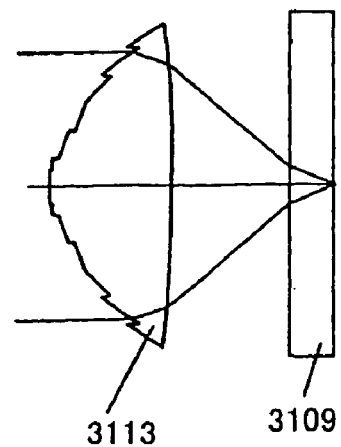
FIG. 94 illustrates a variation of the optical system shown in FIG. 93.

Also in the thirtieth embodiment, as in the twenty-ninth embodiment, the function of the phase correction device 3105 may be integrated with the object lens 3108. That is, instead of controlling the spherical aberration occurring when a light with the wavelength of 660 nm passes through the light-incident side substrate of an optical recording medium with a combination of the phase correction device 3105 and the object lens 3108 shown in FIG. 93, the phase-plate pattern may be formed directly on the surface of the object lens 3113, as shown in FIG. 94. In FIG. 94, the concentric circular pattern is formed about the optical axis on the surface directed toward the light source of the object lens 3113. In this pattern, each height of the stair steps in a sectional view thereof is determined such that the phase correction function is effective only on a light with the wavelength of 660 nm, but is not effective on a dead zone for a light of each of the wavelengths of 407 nm and 780 nm. A surface of the object lens on which the phase-plate pattern is formed is not limited to this case, but may be formed on the surface directed toward the optical recording medium, or may be formed on both sides directed toward the light source and the optical recording medium.

Figure 95:
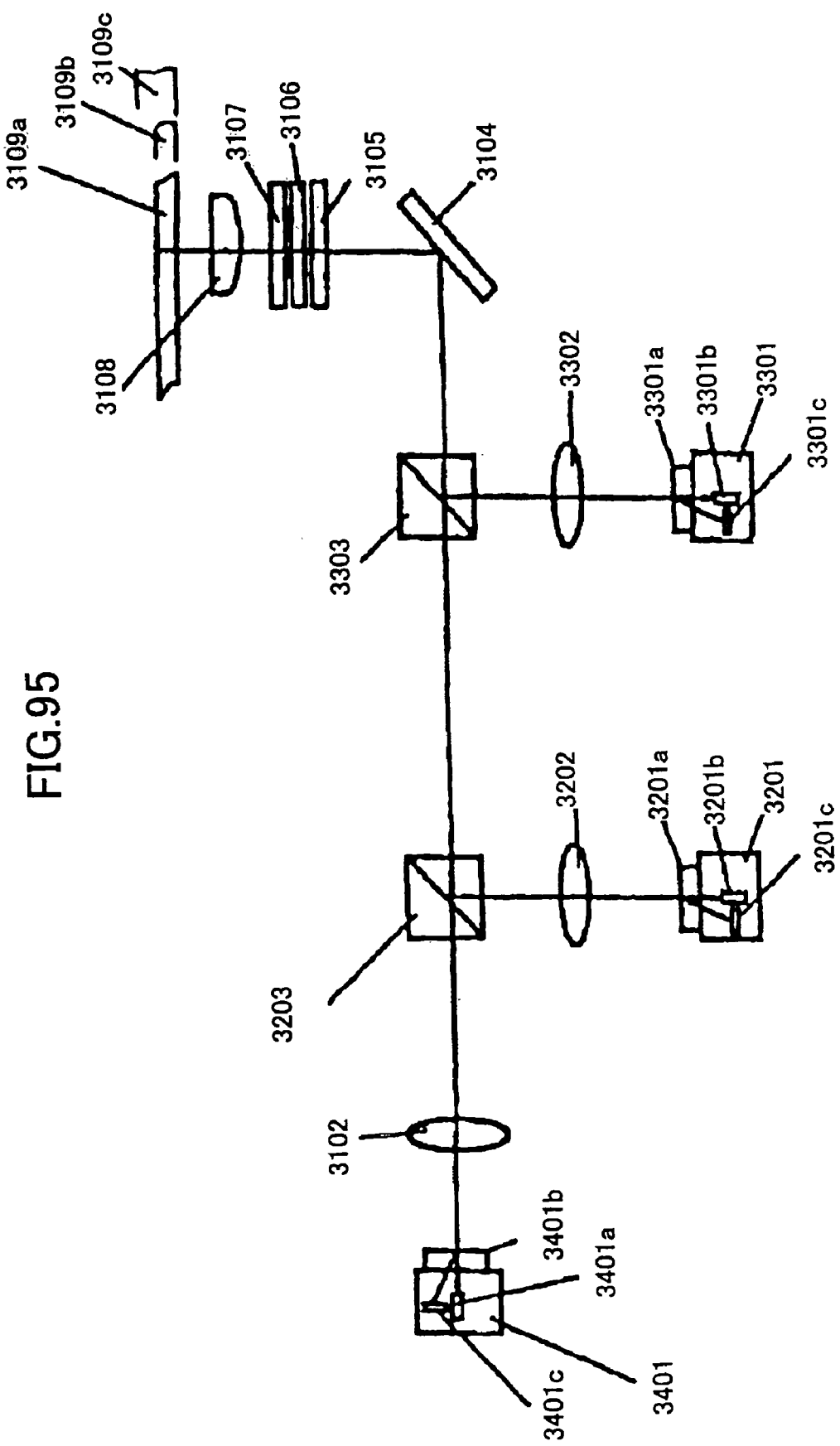
FIG. 95 shows a general configuration of an optical pickup according to a thirty-first embodiment of the present invention.

FIG. 95 shows an outline configuration of an optical pickup according to a thirty-first embodiment of the present invention. This optical pickup is same as the above-described twenty-ninth and thirtieth embodiments in that information recording, reproduction or deletion can be performed on a blue-system (large storage capacity) optical recording medium with 0.6 mm in the light-incident side substrate thickness, with the operating wavelength of 407 nm and NA: 0.65; a DVD-system optical recording medium with 0.6 mm in the light-incident side substrate thickness, with the operating wavelength of 660 nm and NA: 0.65; and a CD-system optical recording medium with 1.2 mm in the light-incident side substrate thickness, with the operating wavelength of 780 nm and NA: 0.50.

However, according to the thirty-first embodiment, different from the twenty-ninth and thirtieth embodiment, a hologram unit 3401 is provided also in the blue-system light path holding a light source (semiconductor laser 3401a), a light-receiving device 3401c, and a light-path splitting device (hologram 3401b) in a common single package. Thereby, miniaturization of the optical system and simplification in assembly process can be attained.

FIG. 96A shows an outline configuration of another optical pickup according to a first variant embodiment of the thirty-first embodiment of the present invention. This optical pickup is same as the above-described twenty-ninth, thirtieth and thirty-first embodiments in that information recording, reproduction or deletion can be performed on a blue-system (large storage capacity) optical recording medium with 0.6 mm in the light-incident side substrate thickness, with the operating wavelength of 407 nm and NA: 0.65; a DVD-system optical recording medium with 0.6 mm in the light-incident side substrate thickness, with the operating wavelength of 660 nm and NA: 0.65; and a CD-system optical recording medium with 1.2 mm in the light-incident side substrate thickness, with the operating wavelength of 780 nm and NA: 0.50.

However, this variant embodiment is different from the twenty-ninth, thirtieth and thirty-first embodiments in that light sources (semiconductor lasers 3201a and 3301a) for DVD/CD, light-receiving devices 3201c and 3301c for DVD/CD, and a hologram unit 3501 acting as a light-path splitting device (hologram 3501b) are provided in a common single package. It is possible in such a configuration to realize a three-wavelength optical system in a reduced-sized optical pickup.

Figure 96B:
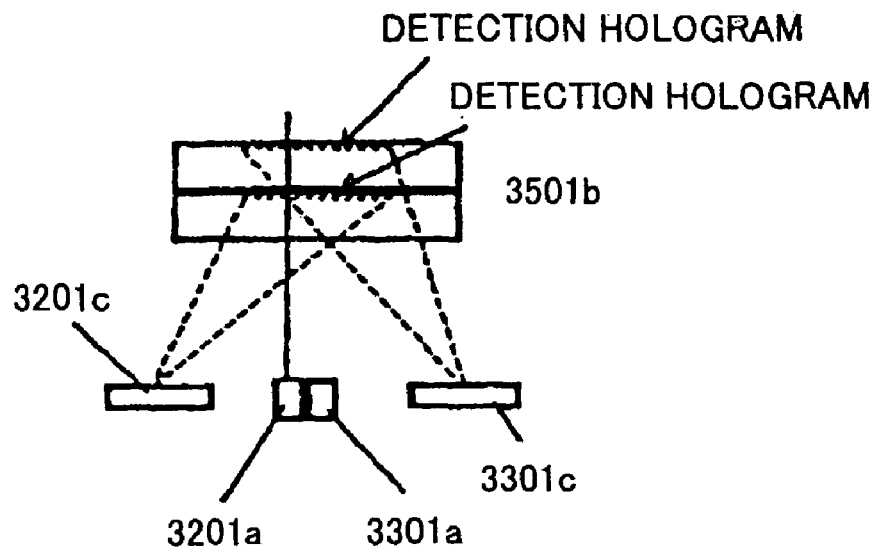
FIG. 96B illustrates a hologram unit shown in FIG. 96A.

As the above-mentioned hologram unit 3501b, as shown in FIG. 96B, a hologram unit having a layer with a hologram surface for CD and a layer with a hologram surface for DVD may be applied.

With reference to FIG. 21, an outline configuration of an information recording/reproduction device also according to a thirty-second embodiment of the present invention will now be described.

The information recording/reproduction device 10 in this embodiment performs information recording, reproduction, or deletion applying an optical pickup 11 onto an optical recording medium 20. According to the thirty-second embodiment, the optical recording medium 20 is a disk-like one, and is held by a cartridge 21 of a protection case. The optical recording medium 20 is inserted and thus loaded in a direction of an arrow "disk insertion" with the cartridge 21 via an insertion mouth 12 in the information recording/reproduction device 10. Then, the optical recording medium loaded is rotated and driven by a spindle motor 13, and thus, informational recording, reproduction, or deletion is performed thereon by the optical pickup 11. As this optical pickup 11, the optical pickup according to any one of the above-described twenty-ninth, thirtieth and thirty-first embodiments may be applied.

Furthermore, this thirty-second embodiment may be an optical information recording/reproduction device which performs multi-level recording with an information recording density multiplication factor of P1>1.8 on an optical recording medium suitable to the operating wavelength of λ: 407 nm, and NA: 0.65. Thereby, a recording capacity of 22 GB or more can be attained without applying a numerical aperture as high as NA: 0.85. That is, generally, the storage capacity to an optical recording medium is determined by the diameter of beam spot applied. In case the blue-system optical recording medium of a blue wavelength zone is used, compared with a DVD-system optical recording medium (4.7 GB), the capacity can be raised by the spot diameter ratio (wavelength/NA)$^2$, and thus, 12 GB is achievable. Then, 22 GB is achievable by further applying multi-level recording in the above-mentioned conditions. Consequently, the margin against a possible shift/variation can be increased. Since the depth of focus of an object lens should be managed seriously in proportion to the 2nd power of NA, application of the lens of NA: 0.65 can increase the margin by 1.7 times, compared with the object lens of NA: 0.85.

Furthermore, as an optical recording medium applicable to the present invention may be of one having a many recording layers collectively. The storage/recording capacity increases according to the number of layers in this case. According to each of the above-described twenty-ninth through thirty-first embodiments, a spherical aberration occurring due to inter-layer distance of such a multi-layer optical recording medium may also be controlled so as to be reduced well. Moreover, an optical recording medium having the information recording surface on both sides thereof may also be applied. Thereby, the capacity is able to be doubled.

In addition, in the description made above for each of the embodiments of the present invention, only the main wavelength, i.e., 407 nm, 660 nm or 780 nm, is described. However, actually, the present invention may be applied to the following ranges as standards:

Blue wavelength zone: wavelength of 397 nm through 417 nm;

Red wavelength zone: wavelength of 650 nm through 670 nm; and

Infrared wavelength zone: wavelength of 770 nm through 790 nm.

Similarly, as to numerical aperture, although a description has been made as it being NA: 0.65 through 0.50, the present invention may be applied to the following range Blue-system optical recording medium: NA: 0.60 through 0.70 or 0.85;

DVD-system optical recording medium: NA: 0.60 through 0.65; and CD-system optical recording medium: NA: 0.45 through 0.50.

Figure 97:
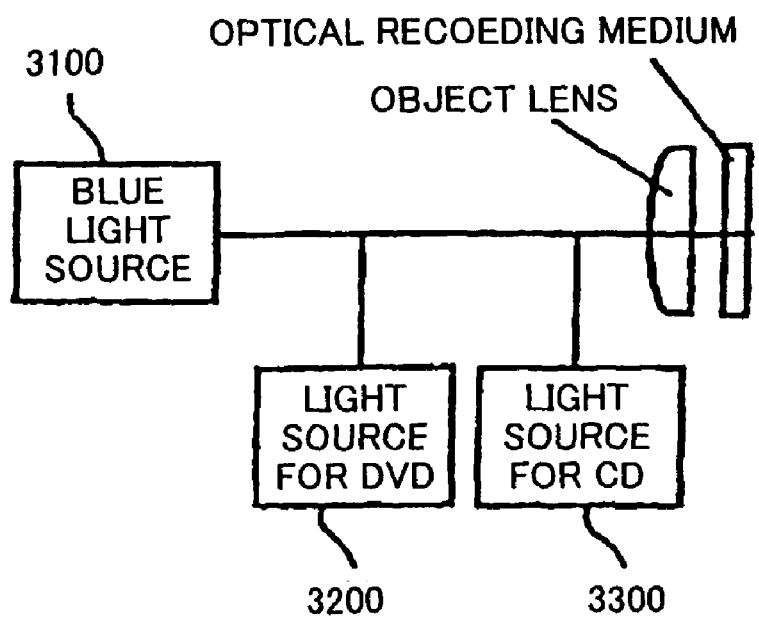
FIG. 97 illustrates a block diagram of a three-generation compatible optical pickup.

Thus, according to the twenty-ninth through thirty-first embodiments of the present invention, three light sources with different wavelengths (semiconductor lasers) and a phase correction device which has a wavelength selection function. Then, an object lens with which the wavefront of spherical aberration becomes minimum with respect to a blue-system optical recording medium with a light of a blue wavelength zone is used. The phase correction device is provided in front of the object lens, having a dead zone on a blue wavelength zone and thereby an infrared wavelength zone, such that the wavefront of spherical aberration becomes minimum for a DVD-system optical recording medium with a light of a red wavelength zone. And also, by configuring a CD-system light path into a finite system such that the wavefront of spherical aberration may become minimum for a CD-system optical recording medium with a light of an infrared wavelength zone. Thereby, it becomes possible that, for any of a blue-system optical recording medium, a DVD-system optical recording medium, and a CD-system optical recording medium (i.e., respective optical recording media in the three generations), a beam can be well controlled in diameter, and signal recording/reproduction can be made with a high S/N. Thus, it becomes possible to provide an optical pickup having light sources 3100, 3200 and 3300 of blue system, DVD system and CD system, and a single object lens enabling compatible use of a single optical pickup for optical recording media in the three generations, as shown in FIG. 97.

After that, other embodiments of the present invention will now be described also directed to an optical pickup by which, with a single object lens, information recording, reproduction, or deletion can be made onto any of three types of optical recording media, i.e., a blue-system optical recording medium using a blue wavelength zone of 400 nm, a DVD-system optical recording medium using a red wavelength zone of 660 nm, and a CD-system optical recording medium using an infrared wavelength zone of 780 nm, by a well-controlled beam spot to be applied thereonto. Especially, spherical aberration can be well controlled through respective blue/DVD/CD-system optical systems, and, specifically, a remaining spherical aberration should be controlled within 0.030 λrms in design median.

Figure 98:
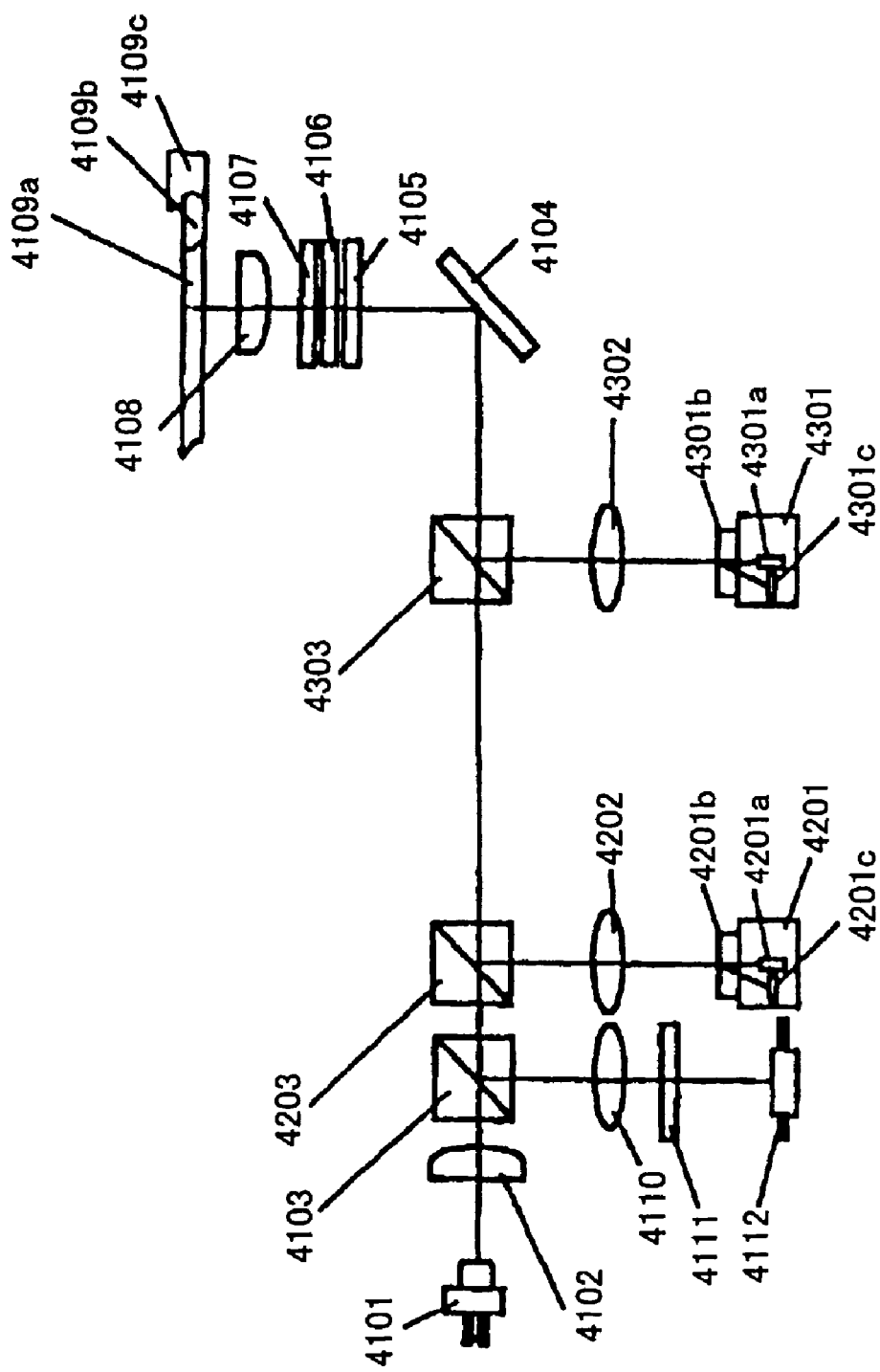
FIG. 98 shows a general configuration of an optical pickup according to a thirty-third embodiment of the present invention.

FIG. 98 shows a general configuration of an optical pickup according to a thirty-third embodiment of the present invention. By this optical pickup, information recording, reproduction or deletion is performed on each of a blue-system optical recording medium of an operating wavelength of 400 nm, NA: 0.65, and 0.6 mm in its light-incident side substrate thickness; a DVD-system optical recording medium of an operating wavelength of 660 nm, and NA: 0.65 and 0.6 mm in its light-incident side substrate thickness; and a CD-system optical recording medium of an operating wavelength of 780 nm, NA: 0.50 and 1.2 mm in its light-incident side substrate thickness.

As shown in FIG. 98, in this optical pickup, a blue optical system through which a light with a wavelength of 400 nm passes includes a semiconductor laser 4101 with a wavelength of 400 nm, a collimator lens 4102, a polarization beam splitter 4103, dichroic prisms 4203, 4303, a prism 4104, a liquid crystal device 4105, a wavelength plate 4106, an aperture control device 4107, an object lens 4108, a detection lens 4110, a beam splitting device 4111, and a light-receiving device 4112.

Furthermore, a DVD optical system through which a light with a wavelength of 660 nm passes includes a hologram unit 4201, a coupling lens 4202, the dichroic prisms 4203, 4303, the prism 4104, the liquid crystal device 4105, the wavelength plate 4106, the aperture control device 4107, and the object lens 4108.

A CD optical system through which a light with a wavelength of 780 nm passes includes a hologram unit 4301, a coupling lens 4302, the dichroic prism 4303, the prism 4104, the liquid crystal device 4105, the wavelength plate 4106, the aperture control device 4107, and the object lens 4108.

That is, the dichroic prisms 4203, 4303, prism 4104, liquid crystal device 4105, wavelength plate 4106, aperture control device 4107, and object lenses 4108 are common parts for the above-mentioned two or three optical systems.

According to the thirty-third embodiment, the object lens 4108 is designed so that the spherical aberration occurring when an infinite system is applied be minimum especially for a blue-system optical recording medium of the operating wavelength of 400 nm, NA: 0.65, and 0.6 mm in its light-incident side substrate thickness.

As for optical recording media 4109a, 4109b, and 4109c to be loaded, these optical recording media have substrate thicknesses and operating wavelengths different from each other. Specifically, the blue-system optical recording medium 4109a has the substrate thickness of is 0.6 mm; the DVD-system optical recording medium 4109b has the substrate thickness of 0.6 mm; and the CD-system optical recording medium 4109c has the substrate thickness of 1.2 mm. At a time of information recording or reproduction, on a rotation mechanism not shown, one optical recording medium thereof is loaded, and, thereby, is rotated at a high speed.

The optical pickup according to the thirty-third embodiment is also used for handling a two-layer blue-system optical recording medium having two layers of information recording surfaces. Such a two-layer optical recording medium has a first layer of information recording surface via a transparent substrate of 0.6 mm, and a second layer of information recording surface which is provided behind the first layer of information recording surface. A spacer layer is provided between these two layers having a thickness of 30 micrometers.

Further, according to the thirty-third embodiment, the object lens 4108 is designed so that the spherical aberration occurring when an infinite system is applied be minimum especially for the first layer of a blue-system optical recording medium of the operating wavelength of 400 nm, NA: 0.65, and 0.6 mm in its light-incident side substrate thickness.

In the above-described optical pickup, a case where information recording, reproduction or deletion is performed on the blue-system optical recording medium of the operating wavelength 400 nm, NA: 0.65, and 0.6 mm of its light-incident side substrate thickness will now be described. A beam emitted in a linear polarization from the semiconductor laser 4101 with a wavelength of 400 nm is transformed into an approximately parallel beam by the coupling lens 4102, and then, passes through the polarization beam splitter 4103 and the dichroic prisms 4203 and 4303. After that, the light path is deflected 90 degrees by the prism 4104, the beam then passes through the liquid crystal device 4105, passes through the wavelength plate 4106, by which it is transformed into a circular polarization. Then, NA is controlled into 0.65 with the aperture control device 4107, then it is incident onto the object lens 4108, by which it is focused into a minute spot on the optical recording medium 4109a. Informational recording, reproduction, or deletion is performed by this spot onto the optical recording medium.

After being reflected by the optical recording medium 4109a, the light has a circular polarization in the direction opposite to that in the above-mentioned case of coming into the optical recording medium, is transformed into an approximately parallel beam again, is transformed into a linear polarization perpendicular to that in the above-mentioned case of coming into the optical recording medium by the wavelength plate 4106, and is reflected by the polarization beam splitter 4103, is transformed into a convergence light with the detection lens 4110, is deflected in a splitting manner by the beam splitting device 4111 into a plurality of beams, which are then incident on the light-receiving device 4112. From the light-receiving device 4112, an aberration signal, an information signal, and a servo signal are detected.

Next, a case will now be described where information recording, reproduction or deletion on the DVD-system optical recording medium with the operating wavelength of 660 nm and NA: 0.65, having 0.6 mm in thickness of the light-incident side substrate thereof. As mentioned above, a light receiving/emitting device is installed in a pickup for a DVD system into one can, and such a hologram unit which separates an incident beam using a hologram is generally used, and the hologram unit 4201 shown in FIG. 99 integrally includes a semiconductor laser 4201a, hologram 4201b, and light-receiving device 4201c. The 660-nm light which comes out of the semiconductor laser 4201a of this hologram unit 4201 passes through the hologram 4201b and thus, it is transformed into a parallel beam by the coupling lens 4202. Then, this beam is reflected by the dichroic prism 4203 which transmits a light in the wavelength of 400 nm while reflects a light in the wavelength of 660 nm, in the direction toward the prism 4104. By the prism 4104, the light path is deflected 90 degrees, and then, a predetermined phase is added thereto by the liquid crystal device 4105. The wavelength plate 4106 then transform the beam into a circular or elliptic polarization, and with the aperture control device 4107, no effect is provided at all, the beam then is incident onto the object lens 4108, by which the beam is focused into a minute spot on the optical recording medium 4109b. Informational recording, reproduction, or deletion is performed by this spot on the optical recording medium.

Figure 99:
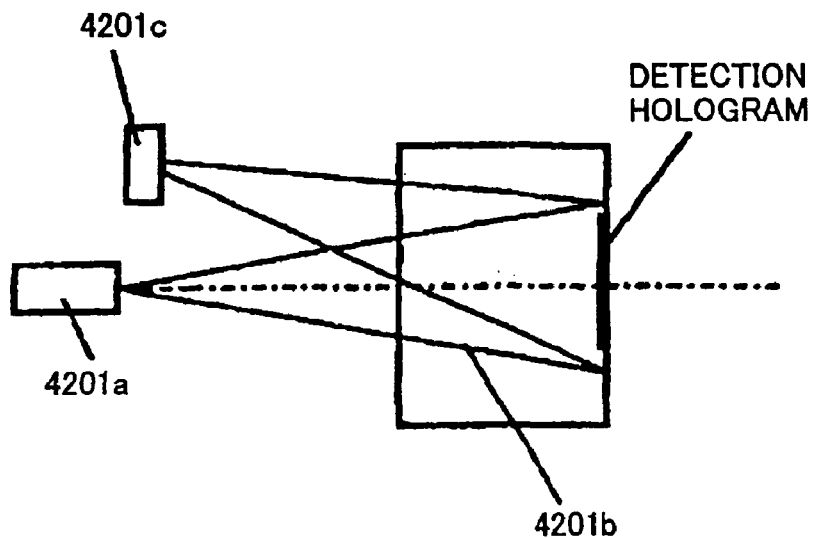
FIG. 99 illustrates a hologram unit shown in FIG. 98.

After being reflected by the optical recording medium 4109b, the beam is deflected by the prism 4104, is reflected by the dichroic prism 4203, is made into a convergence light by the coupling lens 4202, is diffracted by the hologram 4201b in the direction toward the light-receiving device 4201c which is held in the same can as the semiconductor laser 4201a as shown in FIG. 99, and is received by light-receiving device 4201c. From the light-receiving device 4201c, an aberration signal, an information signal, and a servo signal are detected.

Then, a case will now be described where information recording, reproduction, or deletion is performed onto the CD-system optical recording medium with the operating wavelength of 780 nm and NA: 0.50, having 1.2 mm in thickness of a light-incident side substrate thereof. As in the above-described case for a DVD system, a pickup of CD system also has a light receiving/emitting device into one can, and, a hologram unit which separates beams using a hologram is used generally. The hologram unit 3301 shown in FIG. 98 integrally includes a semiconductor laser 4301a, a hologram 4301b, and a light-receiving device 4301c, as in the hologram unit 4201. A 780-nm light which comes out of the semiconductor laser 4301a of this hologram unit 4301, passes through the hologram 4301b, is made into a parallel light by the coupling lens 4302. After that, this light is reflected by the dichroic prism 4303 which transmits each of lights in the blue and red wavelength zones while reflects a light in the infrared wavelength zone, in the direction toward the prism 4104. By the prism 4104, the light path is deflected 90 degrees and, then, no effect is provided to this light by the liquid crystal device 4105. The wavelength plate 4106 transforms the light into an elliptic polarization or a circular polarization, and the light is controlled in its cross section into NA: 0.50 with the aperture control device 4107. After that, the light is incident onto the object lens 3108, and thereby, it is focused into a minute spot on the optical recording medium 4109c. Informational recording, reproduction, or deletion is performed by this spot onto the optical recording medium 4109c.

After being reflected by the optical recording medium 4109c, the light is deflected by the prism 4104, is reflected by the dichroic prism 4303, and is made into a convergence light by the coupling lens 4302, which is then diffracted in the direction toward the light-receiving device 4301c, and is received by the light-receiving device 4301c. From light-receiving device 4301c, an aberration signal, an information signal, and a servo signal are detected.

Figure 100:
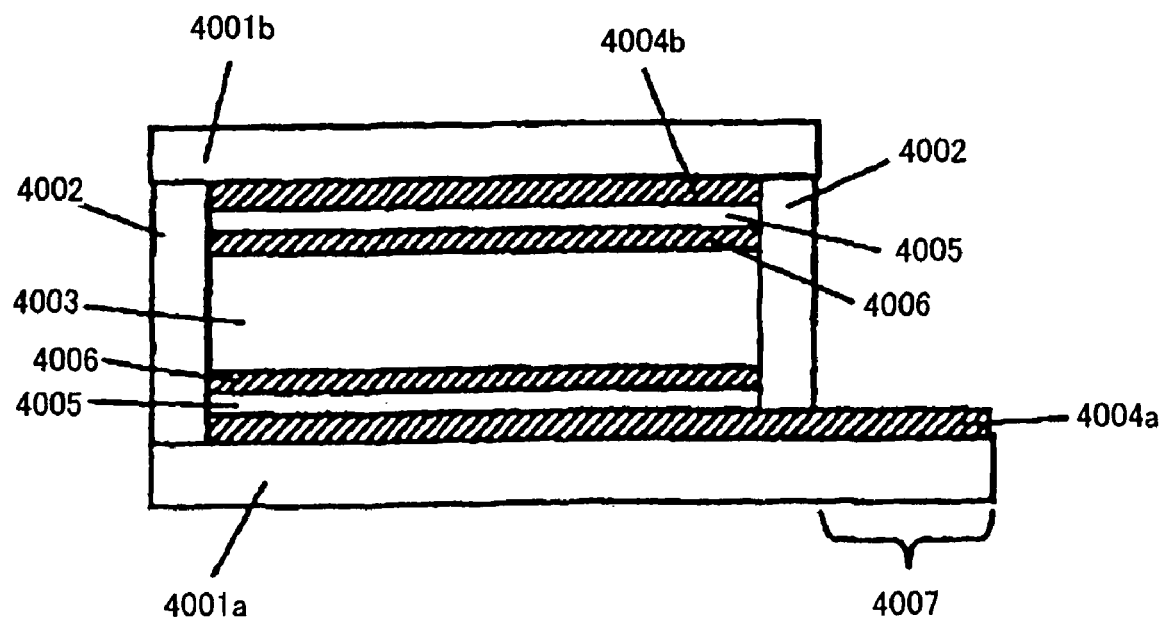
FIG. 100 illustrates a liquid crystal device shown in FIG. 98.
Figure 101A:
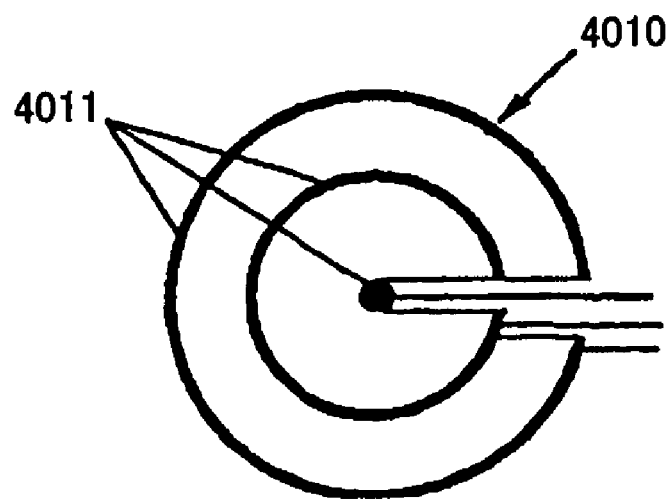
FIGS. 101A and 101B illustrate examples of applicable electrode patterns in the liquid crystal device shown in FIG. 100.
Figure 101B:
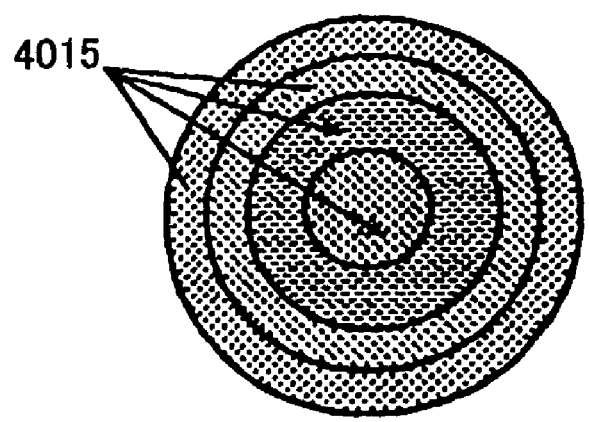

FIG. 100 is a sectional view showing an outline configuration of the liquid crystal device in the optical pickup in the thirty-third embodiment. FIGS. 101A and 101B show examples of electrode patterns of this liquid crystal device. With reference to these figures, the configuration and a principle of operation thereof will now be described.

The liquid crystal device in the thirty-third embodiment has a configuration well-known as disclosed by Japanese laid-open patent application No. 2001-143303, in that glass substrates 4001a and 4001b are stuck up via conductive spacers 4002 to form a liquid crystal cell. The inner side surface of the glass substrate 4001a is covered by an electrode 4004a, an insulated film 4005, and an orientation film 4006, in the stated order. Further, the inner side surface of glass substrate 4001b is covered by an electrode 4004b, an insulated film 4005, and an orientation film 4006, in the stated order.

The electrode 4004a has a pattern wiring such as to be connected with a control circuit via a connection line with an e electrode drawing part 4007. The electrode 4004b is electrically connected with the electrode 4004a formed on the glass substrate 4001a of the conductive spacers 4002. Therefore, the electrode 4004b is also connected with the phase correction device control circuit by the connection line with the electrode drawer part 4007. The inside of the liquid crystal cell is filled up with a liquid crystal 4003.

As to power supply to the electrodes formed on the substrates which sandwich the liquid crystal layer, a voltage-drop-type method of providing a power supply part in a uniform electrode as disclosed in paragraphs [0026] through [0036] of Japanese laid-open patent application No. 2001-143303, or a segment-type method disclosed by Japanese laid-open patent application No. 09-128785 may be applied. According to the thirty-third embodiment, the liquid crystal device 4105 has an electrode pattern concentric formed about the optical axis. FIG. 101A shows an example of the electrode configuration according to the above-mentioned voltage-drop-type method, where concentric power supply parts 4011 are formed in a form of a transparent electrode 4010, while FIG. 101B shows an example of the electrode configuration according to the above-mentioned segment-type method, where concentric segment electrodes 4015 are provided.

Moreover, in the optical pickup, according to a type of optical recording medium loaded onto a rotation mechanism, it is necessary to switch NA (numerical aperture). Assuming that the effective diameter of a beam applied is denoted as 'φ', and the focal length of the object lens is denoted by 'f', NA is given by the following formula:

$$NA = \phi/2f$$

Accordingly, a device of switching a diameter of beam which can pass therethrough should be used. For this purpose, the aperture control device 4105 (see FIG. 98) is used for switching the beam diameter according to the light source applied.

Figure 102A:
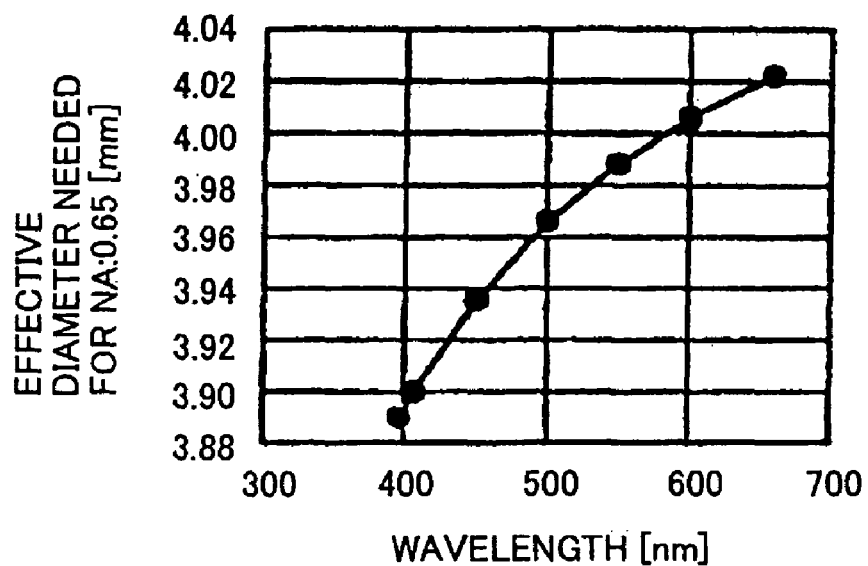
FIG. 102A shows a relation of effective diameter needed for NA: 0.65 with respect to wavelength applied.
Figure 102B:
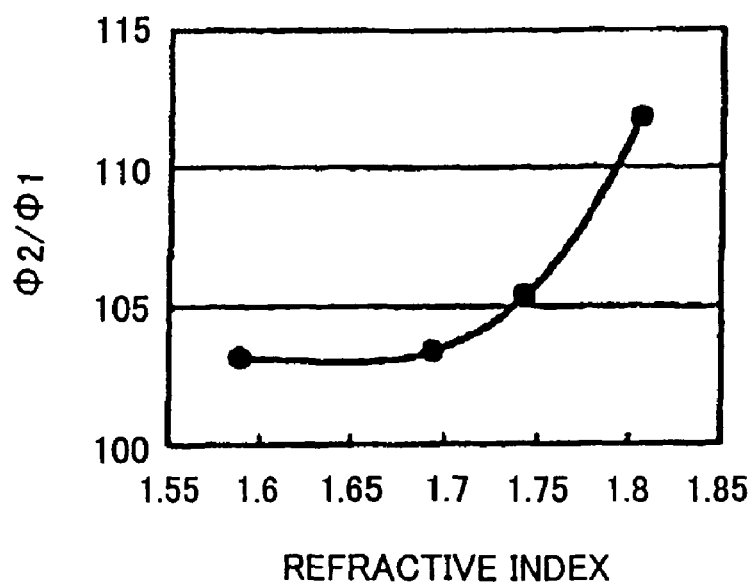
FIG. 102B shows a relation of $\phi 1/\phi 2$ with respect to refractive index applied.

When a beam having a same diameter of a wavelength of 660 nm is applied with an infinite system onto an object lens which has the best wavefront in case a beam is applied with a wavelength of 400 nm, a refraction power decreases and the numerical aperture decreases. Accordingly, according to the thirty-third embodiment, in the wavelength of 660 nm, a beam should be applied with a beam diameter φ2 larger than the beam diameter φ1 applied in the wavelength of 400 nm. FIG. 102A shows a relationship between the effective diameters needed for achieving NA: 0.65 and the wavelength applied in the following conditions:

From FIG. 102A, it is seen that it is necessary to set the beam diameter φ2 in approximately 4.02 mm at a time of information recording, reproduction or deletion is performed on a DVD-system optical recording medium for which the wavelength of 660 nm is applied. Moreover, the required relation between the beam diameters φ1 and φ2 changes also according to the glass type of the object lens. FIG. 102B shows a relationship between the required ratio φ2/φ1 and the refractive index nd on the d line in the glass type applied when various glass types are applied for an object lens having the same φ1, focal length, and numerical aperture as those of the above-mentioned object lens applied for FIG. 102A. Thereby, the appropriate φ2 should be selected according to the glass type of the object lens applied.

On the other hand, by the same method as in FIG. 102A, where the optimal NA in case of information recording onto a CD-system optical recording medium is approximately 0.5, the optimal effective diameter φ3 can be calculated as φ3=3.2 mm approximately.

For example, as the aperture control device which switches the passable beam diameter according to the lighting light source applied according to the thirty-third embodiment, a device which switches the passable beam diameter with a reflection property according to the wavelength of a beam applied from the light source, as shown in FIG. 103A may be applied. Alternatively, as shown in FIG. 103B, a device which switches the passable beam diameter with a diffraction property according to the wavelength of a beam applied from the light source may be applied. Alternatively, as shown in FIG. 103C, a device which switches the passable beam diameter with an absorption property according to the wavelength of a beam applied from the light source may be applied.

Furthermore, in the optical pickups in the thirty-third embodiment described above, the wavelength plate is provided such that, thereby, while a light with a wavelength of 400 nm is transformed into a linear polarization from a circular polarization, or from a linear polarization to a circular polarization; for lights with wavelengths of 660 nm and 780 nm, transformation into a circular polarization or an ellipse polarization from a linear polarization or the reverse thereof is performed.

As a configuration of the wavelength plate by which any of a light with a wavelength of 400 nm, a light with a wavelength of 660 nm, and a light with a wavelength of 780 nm can be transformed into a linear polarization from a circular polarization, or from a linear polarization into a circular polarization, a crystal having a thickness 't', a phase difference between the ordinary light (refractive index: no) and extraordinary light (refractive index: new) be ¼ of the wavelength of 400 nm, the wavelength of 660 nm, or the wavelength of 780 nm. In other words, this crystal used as the wavelength plate satisfies the following requirements:

$$\Delta n1 \times t = \{(2p+1)/4\} \times 400 \ (p=0, 1, \ldots)$$

Δn1: (no−ne) with respect to the light coming from the light source having the wavelength of 400 nm;

$$\Delta n2 \times t = \{(2q+1)/4\} \times 660 \ (q=0, 1, \ldots)$$

Δn2: (no−ne) with respect to the light coming from the light source having the wavelength of 660 nm;

$$\Delta n3 \times t = \{(2r+1)/4\} \times 780 \ (r=0, 1, \ldots)$$

Δn3: (no−ne) with respect to the light coming from the light source having the wavelength of 780 nm;

For example, as the hologram unit 4201b shown in FIG. 98 provided in the light path for the DVD optical system, a non-polarization-type hologram is applied, light-path splitting between going path and returning path may not be well achieved, and, as a result, approximately 30% of the returning light reflected by the optical recording medium returns to the light source. Such a returned light may make the oscillation state of the semiconductor laser unstable as a noise component, generally.

However, according to the thirty-third embodiment of the present invention, as the configuration of phase plate described above is provided, the polarization direction of a beam coming from the DVD-system hologram unit 4201, shown in FIG. 98, and a light incident onto the hologram unit from the optical recording medium can be made to intersect perpendicularly. Thus, a noise generated by the returned light to the semiconductor laser 4201a can be blocked by making the polarization direction of the light of going path and the light of returning path intersect perpendicularly.

Moreover, by providing the wavelength plate having the above-mentioned characteristics, a polarization separation optical system is formed by a combination of the polarization beam splitter 4103 and the wavelength plate 4106 for the blue-system optical recording medium of FIG. 98, and, thus, a sufficient luminous energy can be obtained, and, also a reduction in noise generation caused due to the returning light to the semiconductor laser 4101. Similarly, a polarization separation optical system is realizable by using the hologram having a polarization selection function also for each of the DVD system light-path.

Specifically, as a configuration of the wavelength plate by which any of lights with wavelengths of 400 nm and 660 nm can be transformed into a linear polarization from a circular polarization, or from a linear polarization into a circular polarization, and, also, a light with a wavelength of 780 nm can be transformed into an ecliptic polarization, a crystal having a thickness 't', a phase difference between the ordinary light (refractive index: no) and extraordinary light (refractive index: new) be ¼ of the wavelength of 400 nm, or the wavelength of 660 nm. In other words, this crystal used as the ¼ wavelength plate satisfies the following requirements:

$$\Delta n1 \times t = \{(2p+1)/4\} \times 407 \ (p=0, 1, \ldots)$$

Δn1: (no−ne) with respect to the light coming from the light source having the wavelength of 400 nm;

$$\Delta n2 \times = \{(2q+1)/4\} \times 660 \ (q=0, 1, \ldots)$$

Δn2: (no−ne) with respect to the light coming from the light source having the wavelength of 660 nm;

Further, as a configuration of the wavelength plate by which a light with wavelength of 400 nm can be transformed into a linear polarization from a circular polarization, or from a linear polarization into a circular polarization, and, also, any of lights with wavelengths of 660 nm and 780 nm can be transformed into an ecliptic polarization, a crystal having a thickness 't', a phase difference between the ordinary light (refractive index: no) and extraordinary light (refractive index: new) be ¼ of the wavelength of 400 nm. In other words, this crystal used as the ¼ wavelength plate satisfies the following requirements:

$$\Delta n1 \times t = \{(2p+1)/4\} \times 407 \ (p=0, 1, \ldots)$$

Δn1: (no−ne) with respect to the light coming from the light source having the wavelength of 400 nm;

In addition, the wavelength plate is not limited to that of crystal which satisfies the above-mentioned requirements according to the formulas. For example, a configuration in which glass substrates sandwich a stuck arrangement of phase difference devices of an organic material. Alternatively, an electro-optic device such as a liquid crystal device may also be applied.

Figure 104:
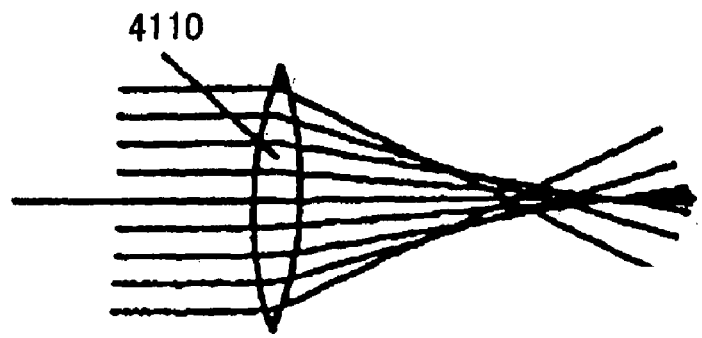
FIGS. 104 and 105 illustrate a principle of spherical aberration detection scheme according to the present invention.

With reference to FIG. 98, the beam splitting device 4111 and light reception device 4112 act as a spherical aberration detection device together, while the liquid crystal device 4105 acts as a spherical aberration correction device. As mentioned above, when thickness error occurs in an optical recording medium loaded, a shape of a beam formed on the surface thereof is distorted. Such a distortion means an aberration, and, may leads to a distortion of a wavefront of a beam reflected from the optical recording medium. As a result, a beam includes an aberration which is applied to the light-reception device 4112 via the detection lens 4110. FIG. 104 shows this state.

When such an aberration occurs in the returning beam, with respect to a standard wavefront of the returning beam, a delay in wavefront occurs concentrically about the optical axis, and a position at which the wavefront delayed with respect to the focus point at which the standard wavefront focuses is in a defocus state. Then, the state of spherical aberration can be seen by taking out the difference of the delayed wavefront and the standard wavefront, and thus, the focus state can be detected.

Figure 105:
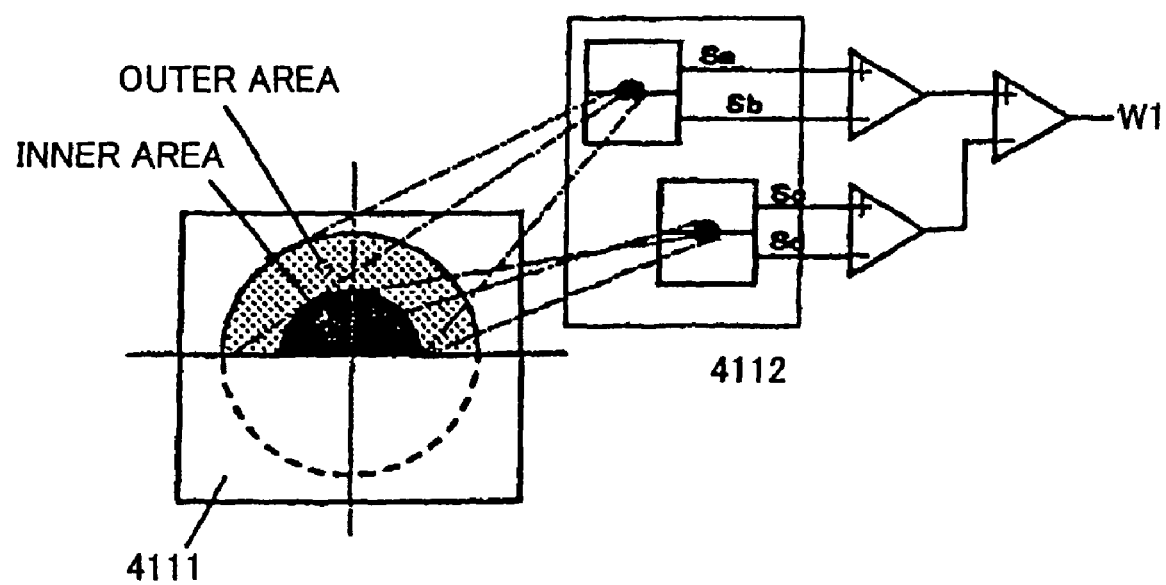

For example, as shown in FIG. 105, the light-receiving device 4112 is provided in which a light-receiving area is divided, while a concentric division pattern of the hologram 4111 is provided, whereby each concentric cross-sectional zone of an incident beam can be detected. As shown in FIG. 105, the hologram 4111 has a configuration such that a surface perpendicular to the optical axis is symmetrically divided in the jitter direction of the optical recording medium (disk), and, one half division thereof is further divided concentrically into an outer area and an inner area, thus, the hologram being formed. A light-receiving device 2112 includes 2-divided light-receiving devices which detect beams diffracted by this hologram, as shown. The amounts of movements of light-point images of a hologram-diffracted light are detected thereby, and a difference W1 between a difference (Sa−Sb) and a difference (Sc−Sd) detected by the respective light-receiving devices is regarded as the spherical aberration, as follows:

$$W1=(Sa-Sb-Sc+Sd)$$

The state of W1=0 indicates that no aberration occurs.

The liquid crystal device 4105 makes it possible to control the refractive index 'n' of the liquid crystal in a range between n1 and n2 freely with respect to relevant concentric zones by controlling a voltage applied to the electric supply part 4011 or segment electrode 4015 shown in FIGS. 101A and 101B. When the refractive index 'n' is changed, a phase difference $\Delta n \cdot d \, (2\pi/\lambda)$ can be given to an incident light which passes through each zone, as a result of a light path difference $\Delta n \cdot d$ ($\Delta n$ denoting a difference in the refractive index, and d denoting the cell thickness of liquid crystal) can be provided, where the wavelength is denoted as $\lambda$.

Figure 106:
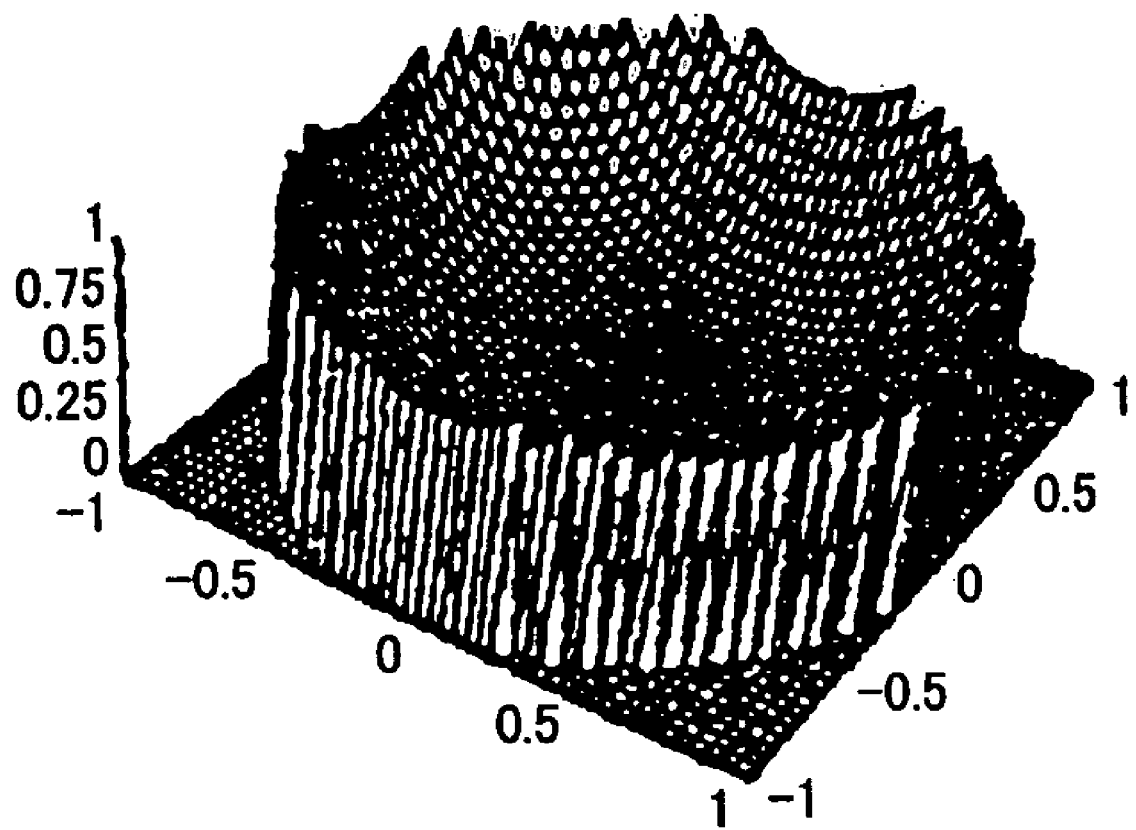
FIGS. 106, 107A, 107B, 108A, and 108B illustrate a principle of correction of spherical aberration occurring due to substrate thickness error of optical recording medium.
Figure 107A:
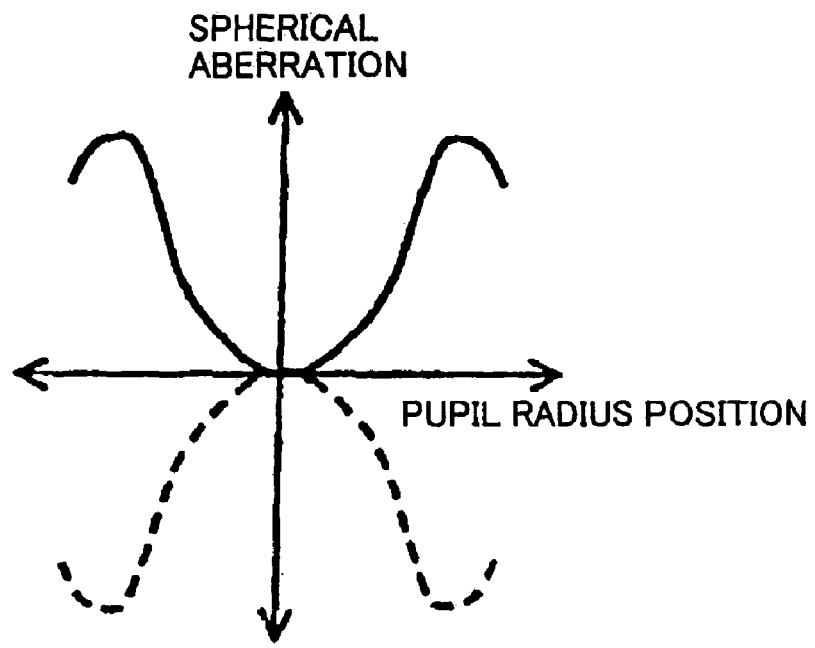
Figure 107B:
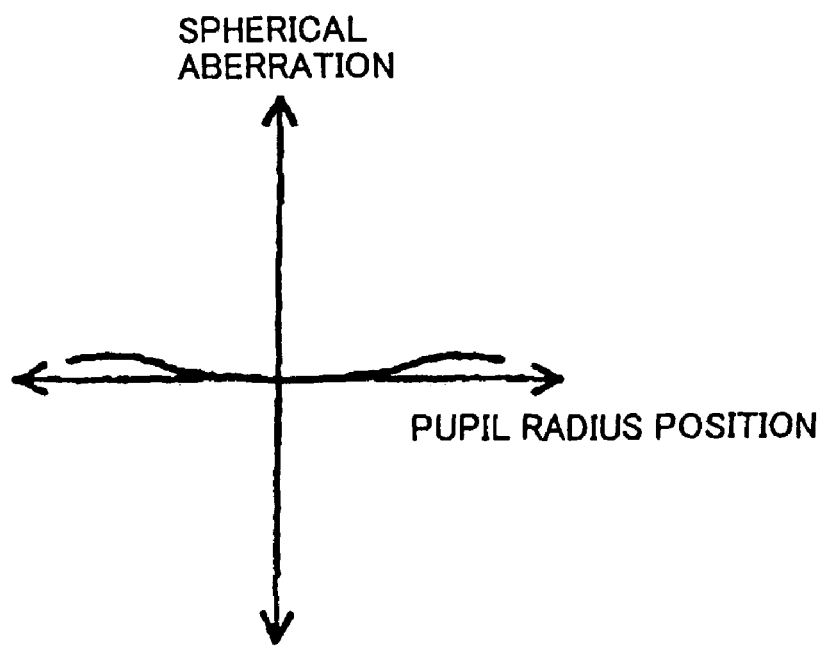

It is assumed that a spherical aberration occurring due to difference in wavelength or substrate thickness which is detected by the wavefront aberration detection device, which will be described later, is as shown in FIG. 106. A solid curve shown in FIG. 107A shows this wavefront aberration as a 2-dimensional curve. When a voltage applied to each concentric circular electrode of the liquid crystal device is adjusted so that a phase difference as shown by a broken curve shown in FIG. 107A be given to a beam which is incident onto the object lens from the side of the light source, the wavefront aberration can be cancelled out thanks to the delay of the wavefront in each concentric cross-sectional part of the beam which passes through the liquid crystal device. FIG. 107B shows the sum total of the solid curve (spherical aberration) in FIG. 107A, and the broken curve (delay of the wavefront cause by the liquid crystal device), i.e., the wavefront aberration after correction. Thus, the wavefront aberration can be remarkably corrected or reduced. FIG. 107B shows the sum of the solid curve (wavefront aberration) shown in FIG. 107A, and the broken curve (delay of the wavefront provided by the intentionally provided phase shift). Accordingly, by providing the liquid crystal device which can provide the phase shift as shown by the broken curve shown in FIG. 107A, the aberration can be well corrected or effectively reduced as shown in FIG. 107B.

Figure 108A:
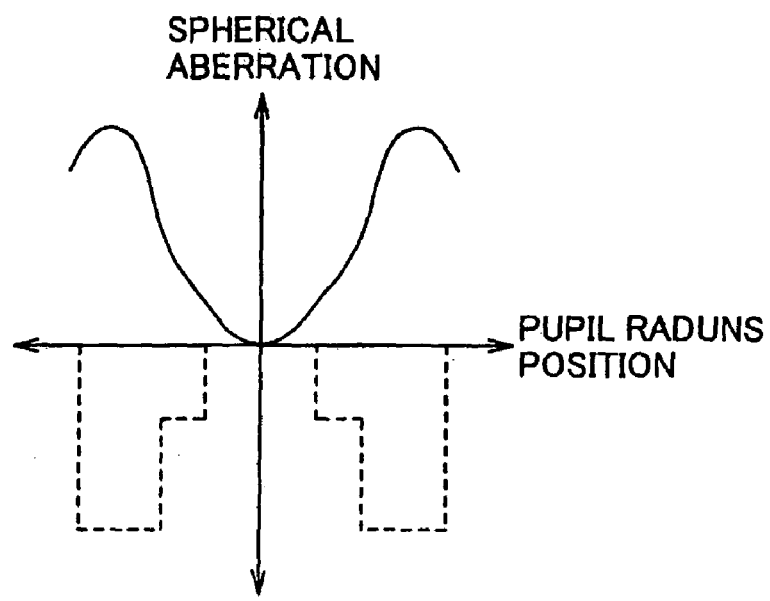
Figure 108B:
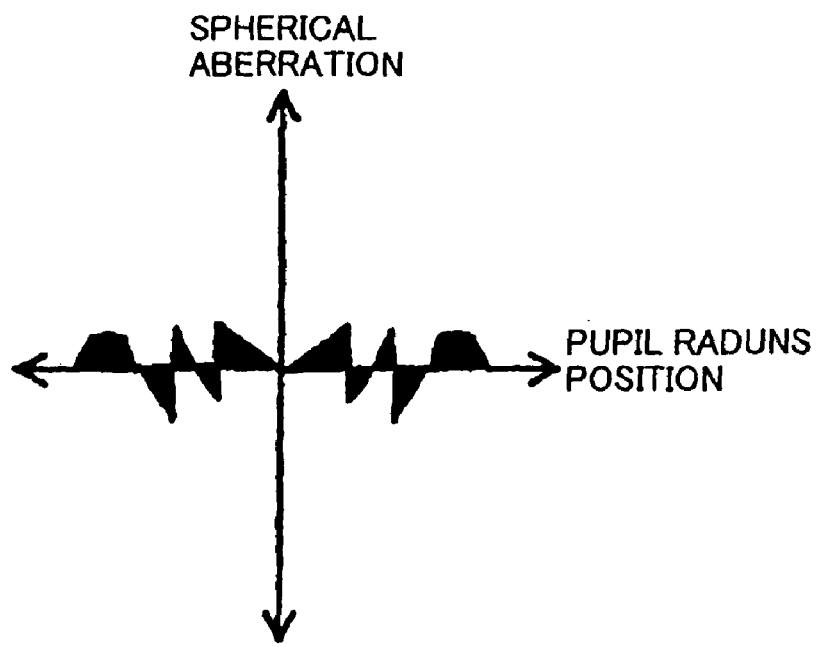

When the segment electrodes such as these shown in FIG. 101B is applied, when a phase shift shown by the broken curve shown in FIG. 108A is provided to a beam which is incident onto the object lens coming from the light source by controlling the voltage applied to each concentric segment electrode of the liquid crystal device, the aberration shown by a solid curve shown in FIG. 108A can be cancelled out by the delay of the wavefront of the beam which the phase shift is thus provided. FIG. 108B shows the sum of the solid curve (wavefront aberration) shown in FIG. 108A, and the broken curve (delay of the wavefront provided by the intentionally provided phase shift). Accordingly, by providing the liquid crystal device which can provide the phase shift as shown by the broken curve shown in FIG. 108A, the aberration can be well corrected or effectively reduced as shown in FIG. 108B.

According to the thirty-third embodiment, information recording and reproduction on any of three types of recording media, i.e., blue-system, DVD-system and CD-system recording media. In order to identify which type thereof is currently loaded, a method which is used in a so-called two-generation compatible machine for DVD and CD may be applied. In this method, when an optical recording medium is loaded in the machine, and the luminous energy level or so in a light reflected by the optical recording medium loaded is detected while a focus search operation is performed. Then, according to the thus-detected luminous energy level, or so, the type of the optical recording medium loaded can be detected.

As mentioned above, when a beam coming from the light source is applied onto the object lens at a time of information recording or reproduction onto a DVD, a spherical aberration caused by a difference in wavelength or substrate thickness may occur, and the form of the optical spot formed on the recording surface of the optical recording medium may deteriorate. In order to cancel the thus-occurring spherical aberration, information concerning amounts of spherical aberration having an opposite polarity to be intentionally added for the purpose of the cancellation is previously stored in a predetermined storage device for each type of optical recording medium. Then, according to the medium identification result detected as mentioned above, the opposite-polarity spherical aberration is added according to the relevant one of the above-mentioned beforehand-stored information.

Figure 109:
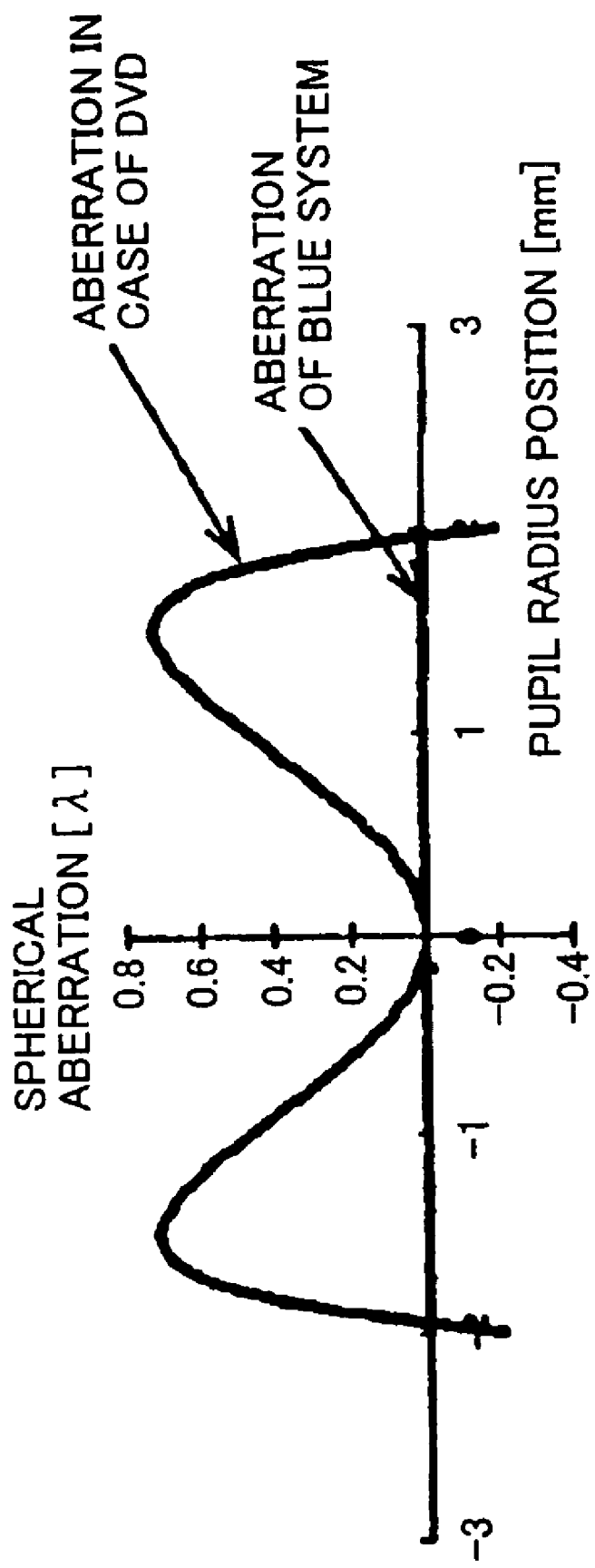
FIGS. 109, 110 and 111 show spherical aberrations in cases of applying different types of optical recording media or a different information recording surface in a multi-layer optical recording medium.
Figure 110:
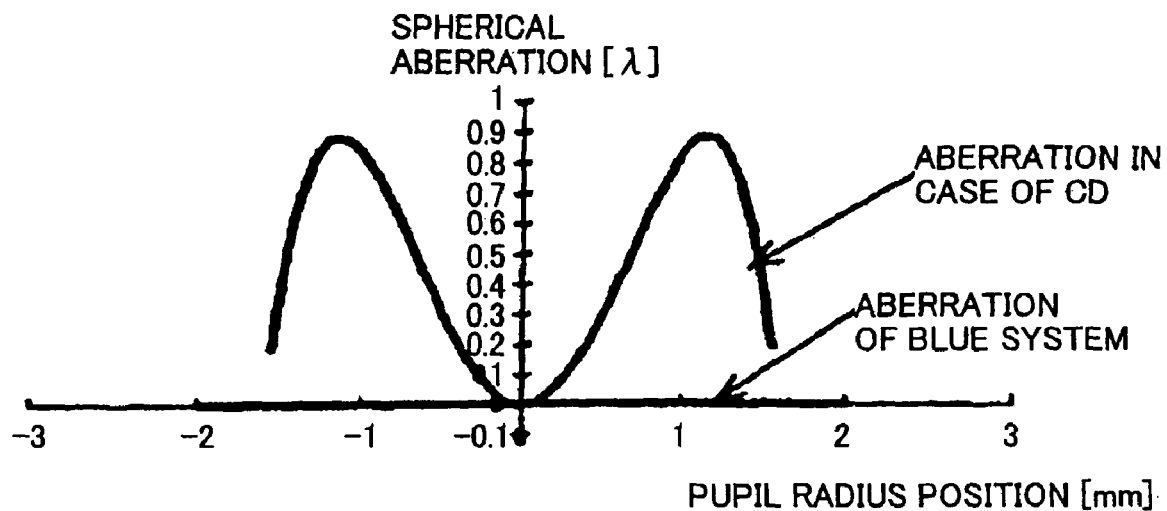

In the optical pickup shown in FIG. 98, in case a light with a wavelength of 660 nm is applied by an infinite system onto a DVD-system optical recording medium 4109*b* so as to form a beam spot thereon, or in case a light with a wavelength of 780 nm is applied by an infinite system onto a CD-system optical recording medium 4109*c* so as to form a beam spot thereon, spherical aberrations occurring due to a difference in wavelength or substrate thickness of optical recording medium is such as those shown in FIGS. 109 and 110, respectively, for example.

In order to generate a spherical aberration in an opposite polarity so as to cancel out the spherical aberration shown in FIG. 109 or 110, the liquid crystal device 4105 shown in FIG. 98 is provided. This device 4105 also generates a spherical aberration in an opposite polarity so as to cancel out a spherical aberration shown in FIG. 111 occurring when information recording/reproduction is performed onto/from the second layer of the above-mentioned two-layer blue-system optical recording medium 4109*a*.

Then, the following three types of spherical aberrations is to be appropriately controlled so as to be well reduced by means of the liquid crystal device 4105:

(1) a spherical aberration occurring due to a difference in operating wavelength at a time of compatible application of DVD;

(2) a spherical aberration occurring both due to a difference in operating wavelength and due to a difference in substrate thickness of optical recording medium at a time of compatible application of CD; and (3) a spherical aberration occurring due to an inter-layer distance in case of application of the second layer of a two-layer blue-system optical recording medium.

For this purpose, each case is first detected, and, then, according to the detection output signal, a predetermined phase shift formation (phase shift amount to be added with respect to each pupil radius position) which is previously stored as mentioned above is achieved in the liquid crystal device 4105.

Figure 112:
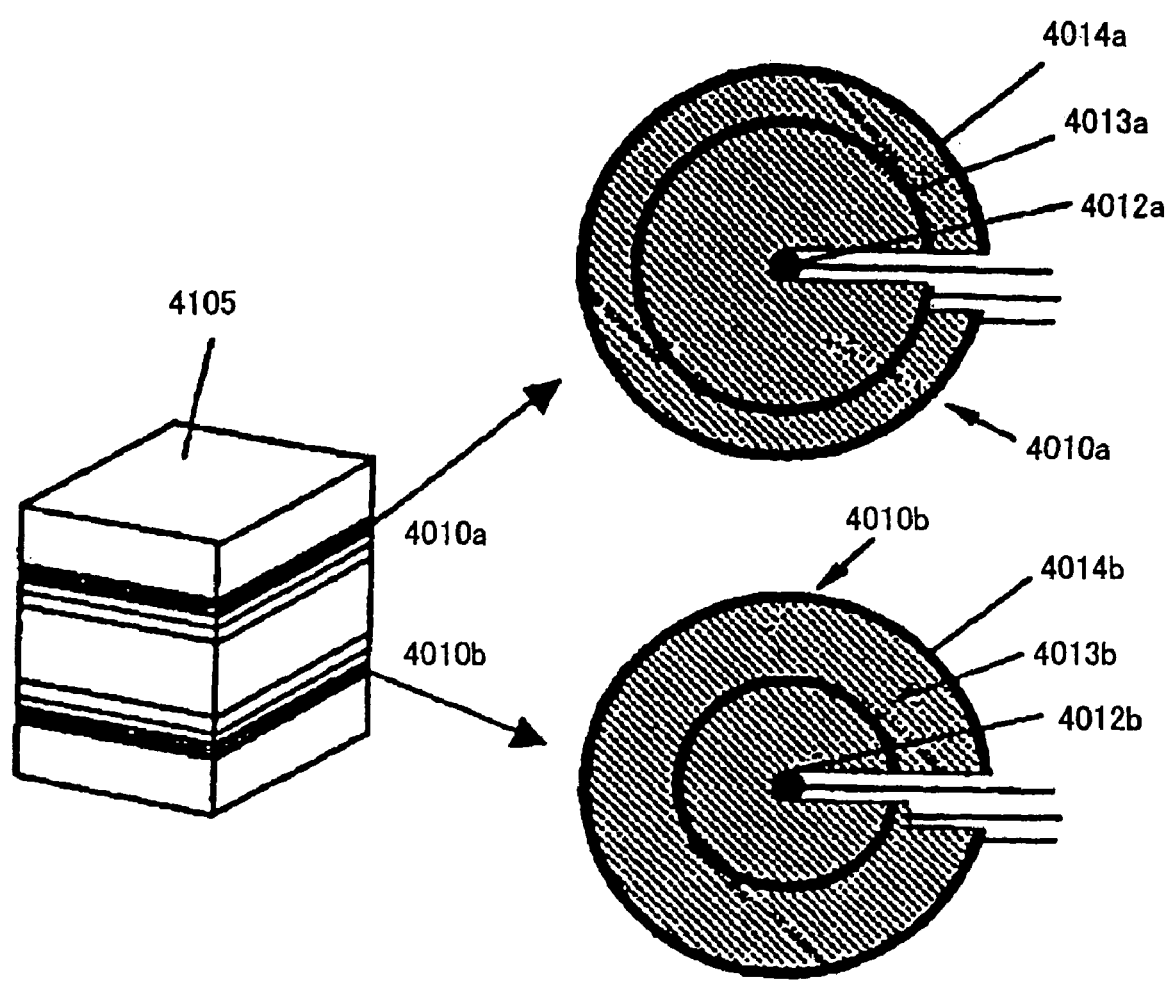
FIGS. 112 and 113 illustrate applicable configurations of liquid crystal device used for correcting spherical aberration according to the present invention.

For this purpose, as an electrode configuration in the liquid crystal device for controlling the spherical aberration, mentioned in the items (1) and (2) above, shown in FIG. 112 may be applied. That is, continuous respective transparent electrodes 4010a and 4010b are provided as a pair, metal electrodes 4012a through 4014a, and metal electrodes 4012b through 4014b are provided therefor, respectively. Metal wiring connects an external source of a signal with the metal wiring, and each of the metal electrodes can apply an arbitrary voltage to the liquid crystal layer with an external signal therethrough. Specifically, the metal electrode 4013a is located at a pupil radius position in which the spherical aberration occurring when information recording/reproduction is performed on a DVD-system optical recording medium or the second layer of a two-layer blue-system optical recording medium becomes maximum. Similarly, the metal electrode 4013b is located at a pupil radius position in which the spherical aberration occurring when information recording/reproduction is performed on a CD-system optical recording medium becomes maximum.

Figure 114:
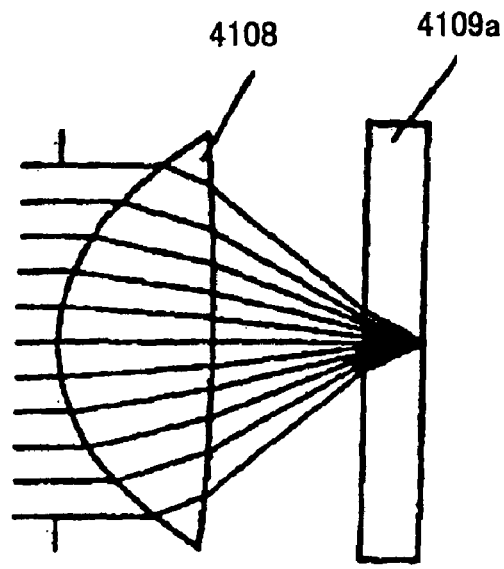
FIG. 114 illustrates an optical system according to the thirty-third embodiment of the present invention.

A case is assumed in this embodiment where the object lens has a general configuration shown in FIG. 114 and has a numerical arrangement shown in the table 10 below:

TABLE 10

Surface OBJ:

Curvature radius: infinity;
Thickness: infinity;
n (refractive index on 400 nm): NA
Surface STO:

Curvature radius: infinity;
Thickness: 0.0 mm;
n (refractive index on 400 nm): NA
Surface S1:

Curvature radius: 1.98113 mm;
Thickness: 1.700000 mm;
n (refractive index on 400 nm): 1.604949
K: 29.741231; A: $0.136479 \times 10^{-1}$;
B: $-0.371045 \times 10^{-2}$; C: $0.613663 \times 10^{-3}$;
D: $-0.404300 \times 10^{-4}$;
Surface S2:

Curvature radius: −14.62096 mm;
Thickness: 1.659252 mm;
n (refractive index on 400 nm): NA
K: $-0.673789 \times 10^{-1}$; A: $0.351168 \times 10^{-2}$;
B: $0.194193 \times 10^{-3}$; C: $0.365786 \times 10^{-4}$;
D: $-0.204776 \times 10^{-4}$;
Surface S3:

Curvature radius: Infinity;
Thickness: 0.6 mm;
n (refractive index on 400 nm): 1.620200

TABLE 10-continued

Surface IMG:

Curvature radius: infinity;
Thickness: 0.0 mm;
n (refractive index on 400 nm): NA
Incident pupil diameter (effective diameter of the aperture switching device): 3.9 mm
Wavelength: 400 nm In the above-shown table, OBJ denotes an object point (semiconductor laser as the light source). However, the object lens is for an infinite system, and INFINITY in each of the curvature radius and thickness means that the light source is present at infinity. STO denotes the aperture control surface of the aperture control device, where the curvature radius is determined infinity and the thickness is determined '0' for design purpose.

S1 denotes the surface of the object lens directed to the light source; and S2 denotes the surface of the same directed toward the optical recording medium. The lens thickness of the object lens is 1.7 mm, and the thickness of 1.659252 mm of the surface S2 denotes the working distance. S3 denotes the light-incident side surface of the light-incident side substrate of the optical recording medium, IMG denotes the recording surface of the optical recording medium. The separation between S3 and IMG, i.e., the thickness of the light-incident side substrate of the optical recording medium is 0.6 mm, where n=1.620200. The incident pupil diameter shown above expresses the aperture diameter (3.9 mm) of the aperture control device;

Furthermore, an aspherical shape of the lens surface is determined by the following well-known aspherical-surface formula:

$$X = (Y^2/R)/\left[1 + \sqrt{\{1-(1+K)Y/R^2\}} + AY^4 + BY^6 + CY^8 + DY^{10} + EY^{12} + FY^{14} + GY^{16} + HY^{18} + JY^{20} + ...\right]$$

where

X denotes the coordinate along the optical axis direction; Y denotes the coordinate along the direction perpendicular to the optical axis; R denotes the paraxial curvature radius; K denotes the cone constant; A, B, C, D, E, F, . . . denote high-order coefficients, shown in the above-shown table of lens data.

In this case, the incident beam diameters in the respective blue, DVD and CD light paths are set as φ: 3.9 mm, φ: 4.02 mm, and φ: 3.2 mm, respectively; and, then, the diameter of beam passage in the liquid crystal device is set as φ: 4.02 mm, approximately same for the DVD-system light path (actually, a margin of 0.1 through 0.2 mm is provided thereto). At this time, the pupil radius position of the metal electrode 4013a should be set in a range between 1.2 mm and 1.6 mm, while the same of the metal electrode 4013b in a range between 1.0 mm and 1.2 mm, corresponding to FIGS. 109, 110 and 111.

As mentioned above, according to the thirty-third embodiment, the following three types of spherical aberration:

(1) a spherical aberration occurring due to a difference in operating wavelength at a time of compatible application of DVD;

(2) a spherical aberration occurring both due to a difference in operating wavelength and due to a difference in substrate thickness of optical recording medium at a time of compatible application of CD; and (3) a spherical aberration occurring due to an inter-layer distance in case of application of the second layer of a two-layer blue-system optical recording medium.

Figure 111:
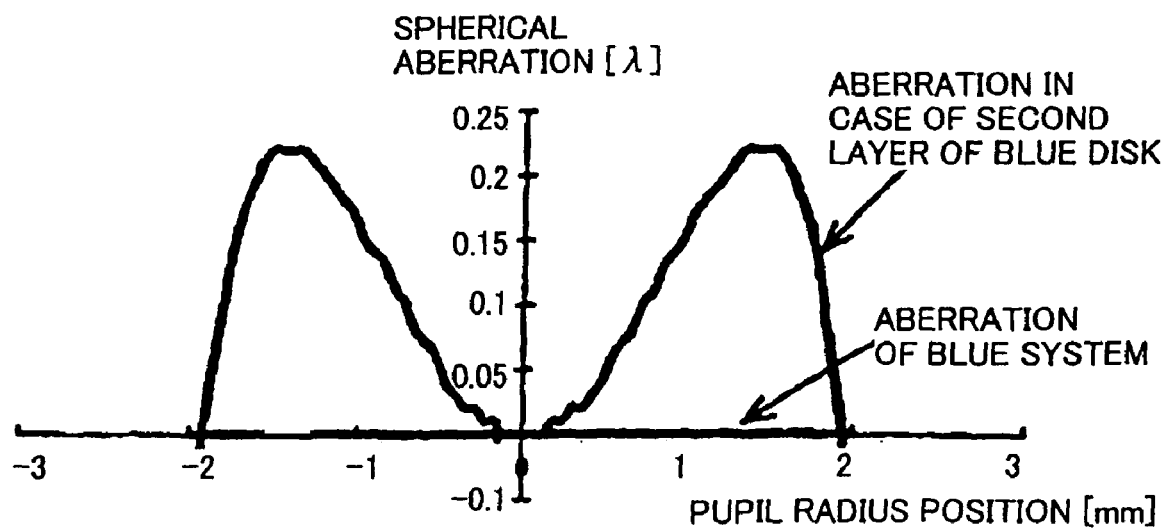

In this regard, as can be clearly seen from FIGS. 109 and 111, the position at which the spherical aberration becomes maximum is approximately coincident between the above-mentioned items (1) and (3) of spherical aberration. Accordingly, the electrode patterns 4013a and 4013b should be provided so that two (not three) peak positions are created thereby (see FIG. 112). This is because, as mentioned above, the blue-system light path and DVD-system light path are designed to be common in NA and substrate thickness applied.

Then, when a type of optical recording medium loaded is identified as mentioned above, and, for example, when the type identified is a DVD-type one, previously stored voltages to be applied are applied to the respective electrodes such that the position at which the maximum phase shift is applied be coincident with the electrode 4013a. On the other hand, when a type of optical recording medium loaded is identified as mentioned above, and, for example, when the type identified is a CD-type one, previously stored voltages to be applied are applied to the respective electrodes such that the position at which the maximum phase shift is applied be coincident with the electrode 4013b. When a type of optical recording medium loaded is identified as mentioned above, and, for example, when the type identified is a blue-type one, and, also, in case of handling the first layer of the two-layer blue-system optical recording medium, a control is made such that no effect is applied by the liquid crystal device. However, in case of handling the second layer of the same after focus jump is performed thereto, previously stored voltages to be applied are applied to the respective electrodes such that the position at which the maximum phase shift is applied be coincident with the electrode 4013a.

Figure 113:
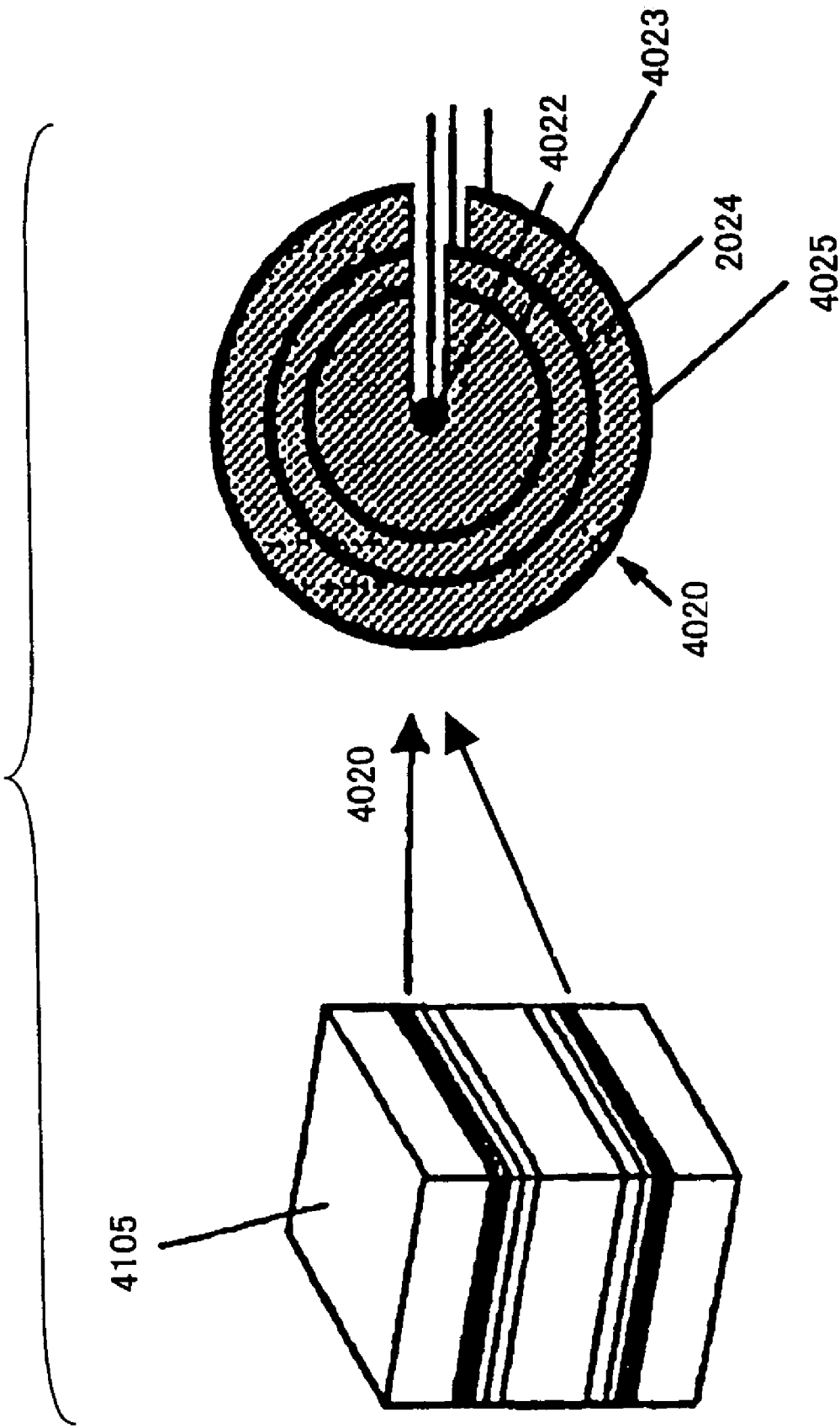

The electrode configuration of the liquid crystal device is not limited to that shown in FIG. 112, and another example such as that shown in FIG. 113 may be applied. In this example, on a continuous transparent electrode 4020 (corresponding to each one or any one of the pair of transparent electrodes 4010a and 4010b shown in FIG. 112), metal electrodes 4022 through 4025 are formed. In this case, as the DVD-system light path, a finite system is provided. The metal electrode 4023 is located at a pupil radius position at which the phase shift amount provided to a light applied becomes maximum when information recording or reproduction is performed on a DVD-system optical recording medium. The metal electrode 4024 is located at a pupil radius position at which the phase shift amount provided to a light applied becomes maximum when information recording or reproduction is performed on a CD-system optical recording medium.

Figure 115:
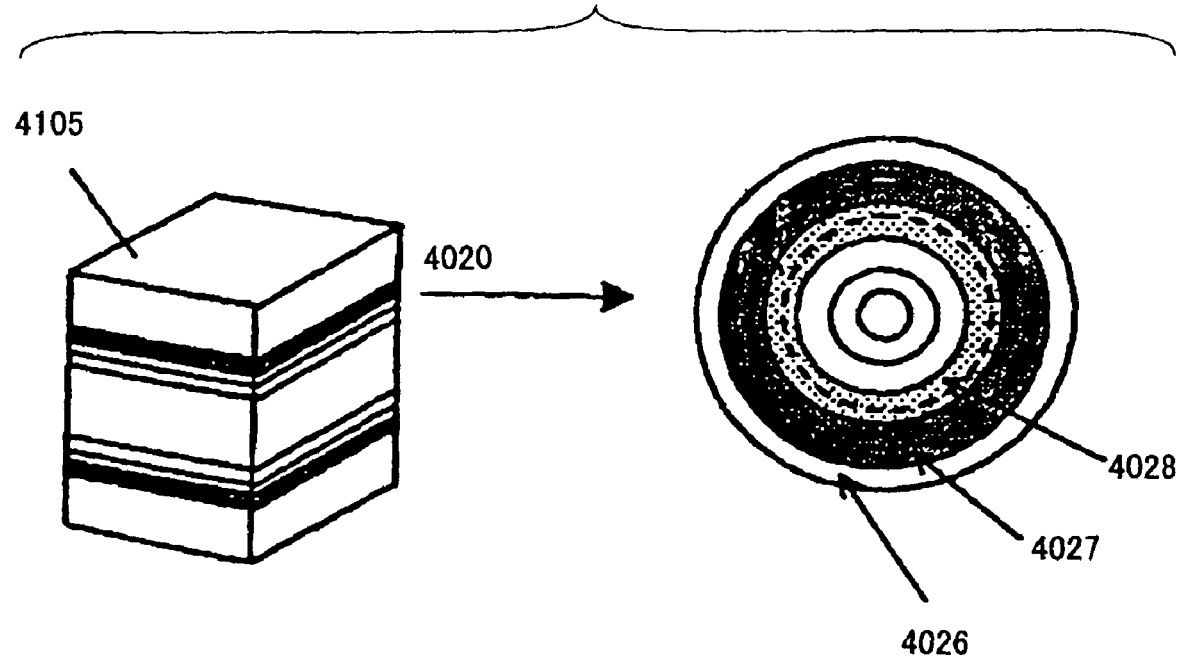
FIG. 115 illustrates another applicable configuration of liquid crystal device used for correcting spherical aberration according to the present invention.

As another alternative example, as shown in FIG. 115, on a continuous transparent electrode 4020 (corresponding to each one or any one of the pair of transparent electrodes 4010a and 4010b shown in FIG. 112), as segment electrodes, a segment electrode area 4026 is formed in the outer periphery, then, inside thereof, other segment electrode areas 4027 and 4028 are formed in the stated order toward the optical axis, wherein 1<(segment electrode area 4028)<(segment electrode area 4027)<segment electrode area 4026). The segment electrode area 4027 is provided a pupil radius position at which the phase shift amount provided to a light applied becomes maximum when information recording or reproduction is performed on a DVD-system optical recording medium or the second layer of a two-layer blue-system optical recording medium. The segment electrode area 4028 is provided a pupil radius position at which the phase shift amount provided to a light applied becomes maximum when information recording or reproduction is performed on a CD-system optical recording medium.

Figure 116A:
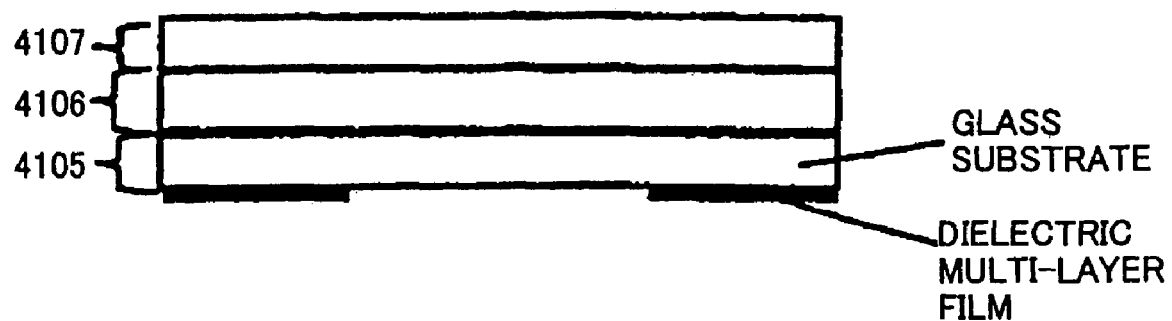
Figure 116B:
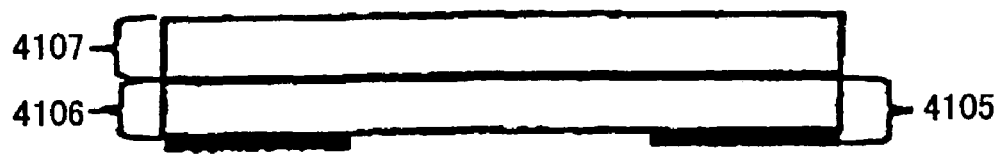

Moreover, as shown in FIG. 116A, the liquid crystal device 4105, the aperture control device 4107, and the wavelength plate 4106 may be combined integrally. Thereby, simplification in assembly process can be attained. Furthermore, it may also be possible that, as shown in FIG. 116B, the liquid crystal device 4105 and the wavelength plate 4106 are integrally combined in the stated order, and the aperture control device 4107 may be formed on the surface of the liquid crystal device 4105 or the surface of the wavelength plate 4106. Thereby, further reduction in the thickness of the device components as well as reduction in the weight thereof. Thus, integration of a plurality of devices, mounting of devices onto the actuator or the like may be made so that further reduction in the thickness of the devices/reduction in weight thereof may be achieved.

Figure 117:
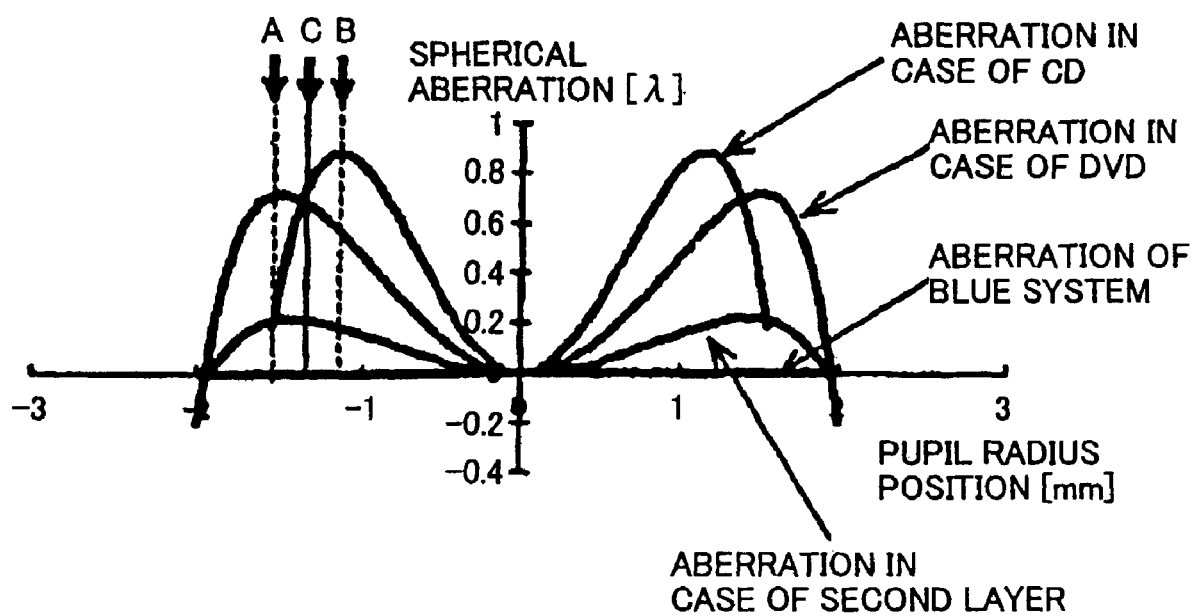

Further, in the optical pickup according to the thirty-third embodiment, as another alternative of the electrode pattern formed on the liquid crystal device 4105, other than that shown in FIG. 112 in that the plurality of voltage supply parts such that the spherical aberration occurring therewith becomes maximum at the different pupil radius positions, electrodes may be provided such that the peak of the spherical aberration occurring therewith always occurs at an approximately center (position "C" shown in FIG. 117) of the different peak positions shown in FIGS. 109, 110 and 111. Then, a predetermined amount of phase shift is provided according to the above-mentioned optical recording medium identification signal or phase aberration detection signal, or according to the optical recording medium identification signal and switching between the first and second layers of recording surface of the two-layer optical recording medium. By employing such a configuration, it is possible to simplify the electrode pattern.

Figure 128:
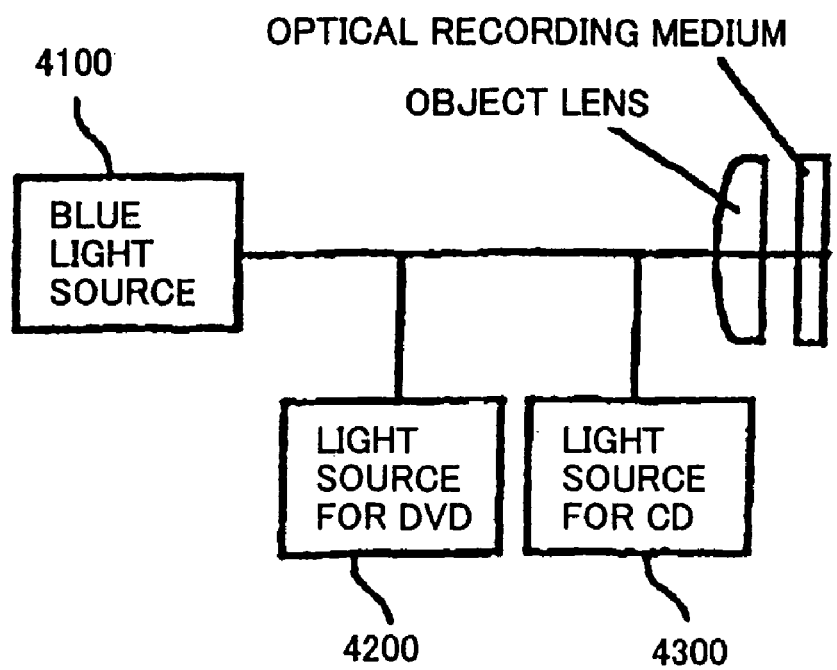
Figure 129:
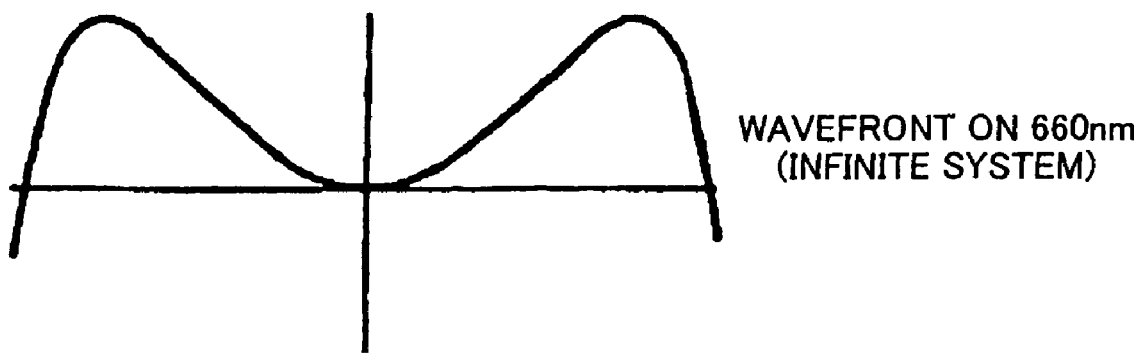
Figure 130:
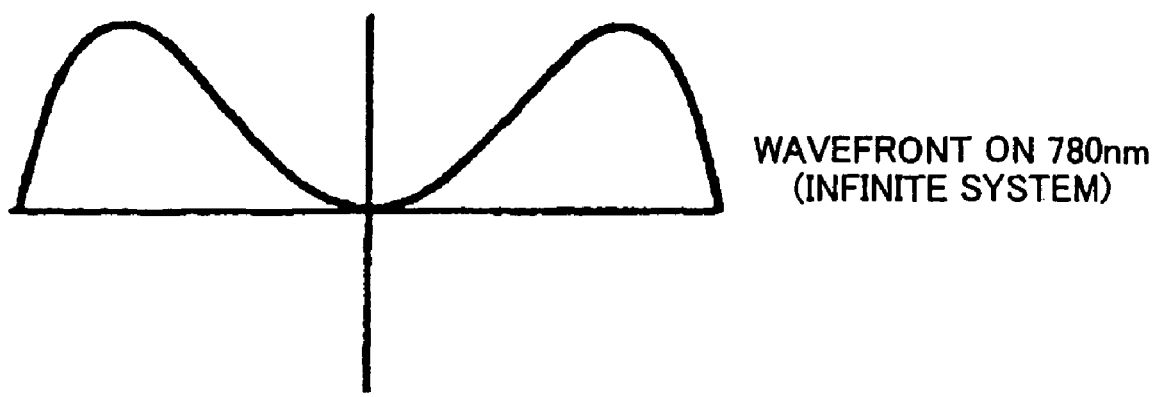
Figure 131:
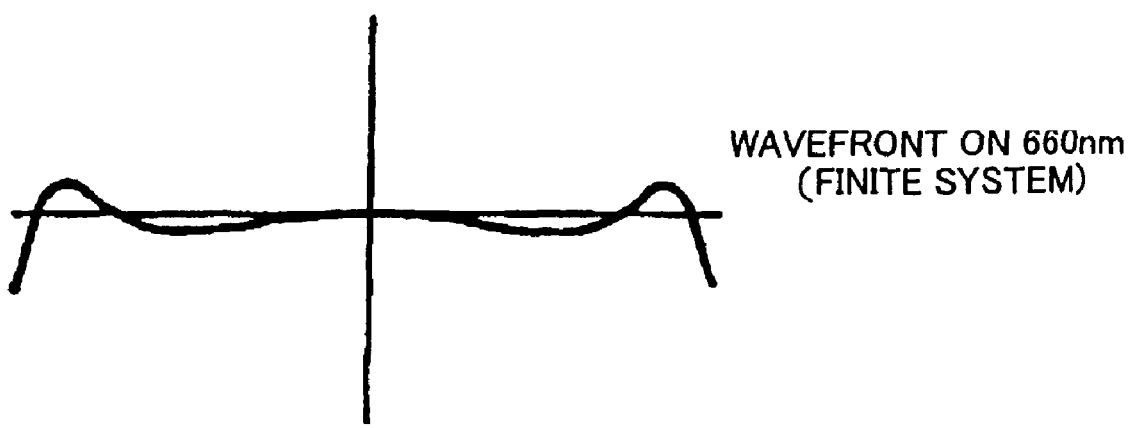

Making the DVD-system light path into a finite system means making a beam applied to the object lens into a divergent state or a convergent state. Generally speaking, to change the divergent state of a beam applied to the object lens is equivalent to, to change the spherical aberration. Accordingly, by appropriately setting the divergent state, the spherical aberration can be effectively reduced. Accordingly, in case the spherical aberration of DVD-system light path is well reduced by applying an appropriate finite system thereto (see FIG. 131 in comparison to FIGS. 128 through 130), a peripheral range between NA of 0.65 for the DVD-system and NA of 0.50 for the CD-system should be specifically selected in the electrode pattern of the liquid crystal device as the phase shift providing zone. Further, as to the CD-system light path, for the purpose of performing aberration correction by means of the liquid crystal device's phase correction function, the aberration correction zone is set in the range within NA of 0.50 for the CD-system.

Figure 118:
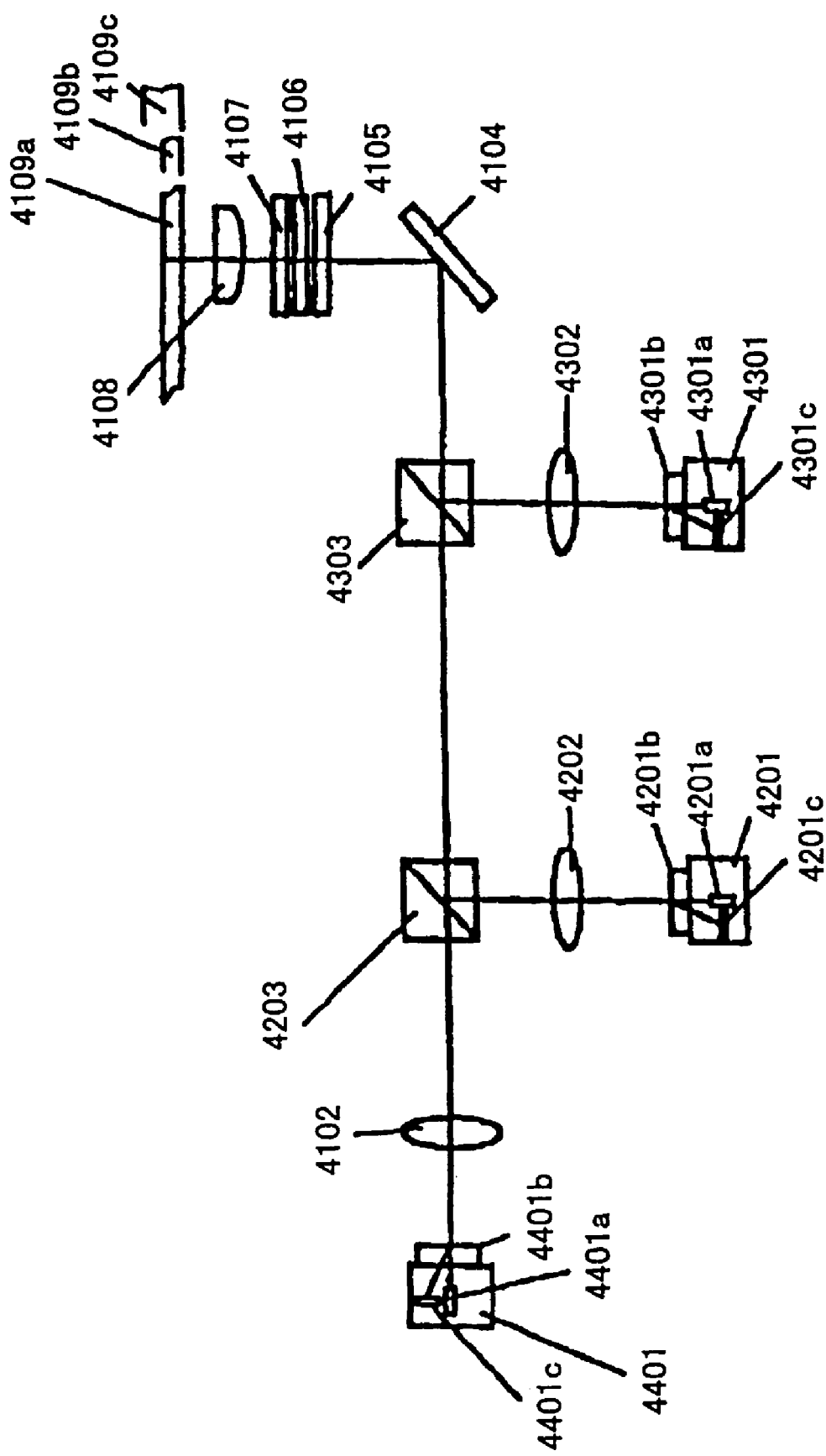

FIG. 118 shows an outline configuration of an optical pickup according to a thirty-fourth embodiment of the present invention. This optical pickup is same as the above-described twenty-ninth and thirty-third embodiments in that information recording, reproduction or deletion can be performed on a blue-system (large storage capacity) optical recording medium with 0.6 mm in the light-incident side substrate thickness, with the operating wavelength of 400 nm and NA: 0.65; a DVD-system optical recording medium with 0.6 mm in the light-incident side substrate thickness, with the operating wavelength of 660 nm and NA: 0.65; and a CD-system optical recording medium with 1.2 mm in the light-incident side substrate thickness, with the operating wavelength of 780 nm and NA: 0.50. However, according to the thirty-fourth embodiment, different from the thirty-third embodiment, a hologram unit 4401 is provided also in the blue-system light path holding a light source (semiconductor laser 4401*a*), a light-receiving device 4401*c*, and a light-path splitting device (hologram 4401*b*) in a common single package. Thereby, miniaturization of the optical system and simplification in assembly process can be attained.

Figure 119A:
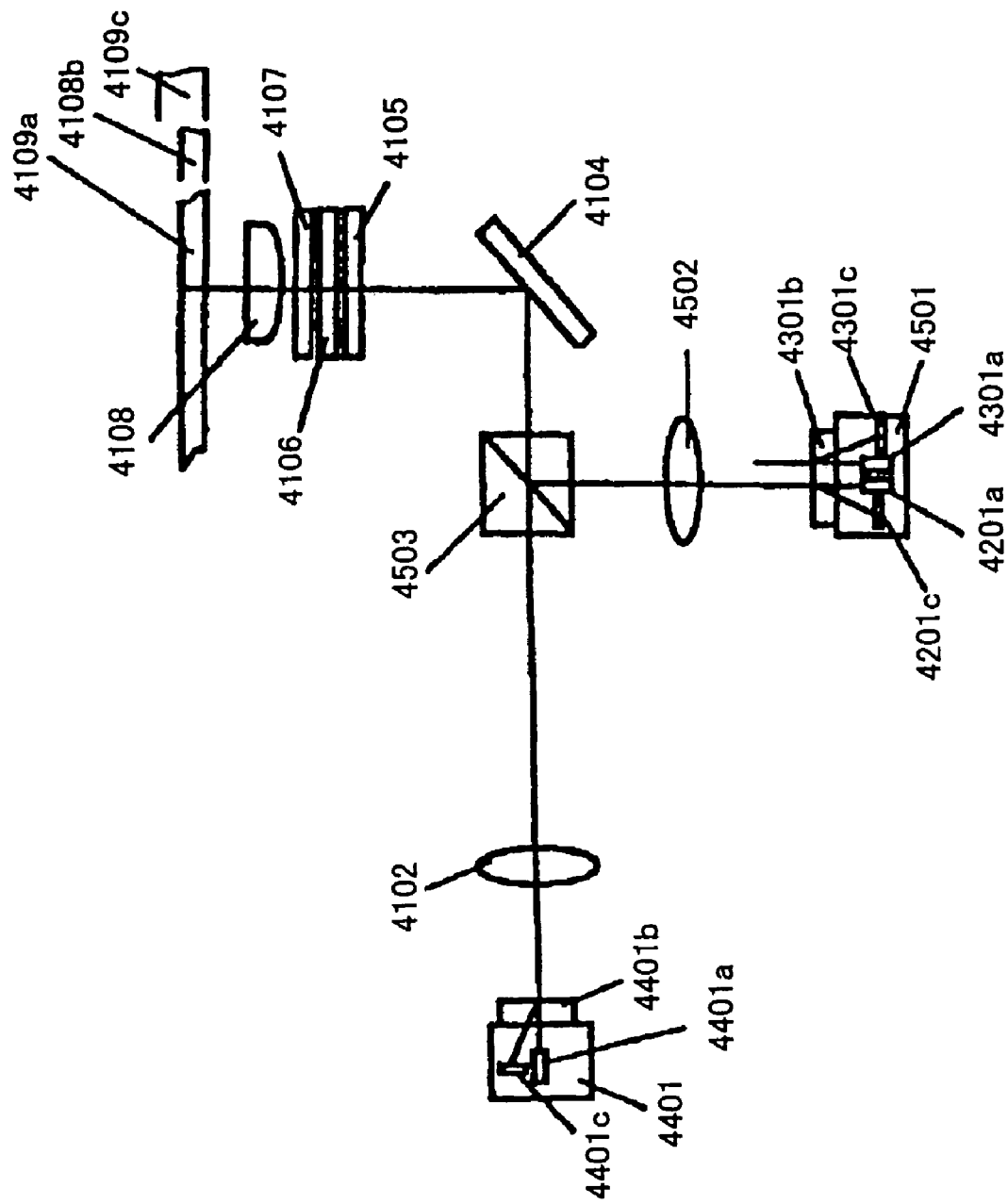
Figure 119B:
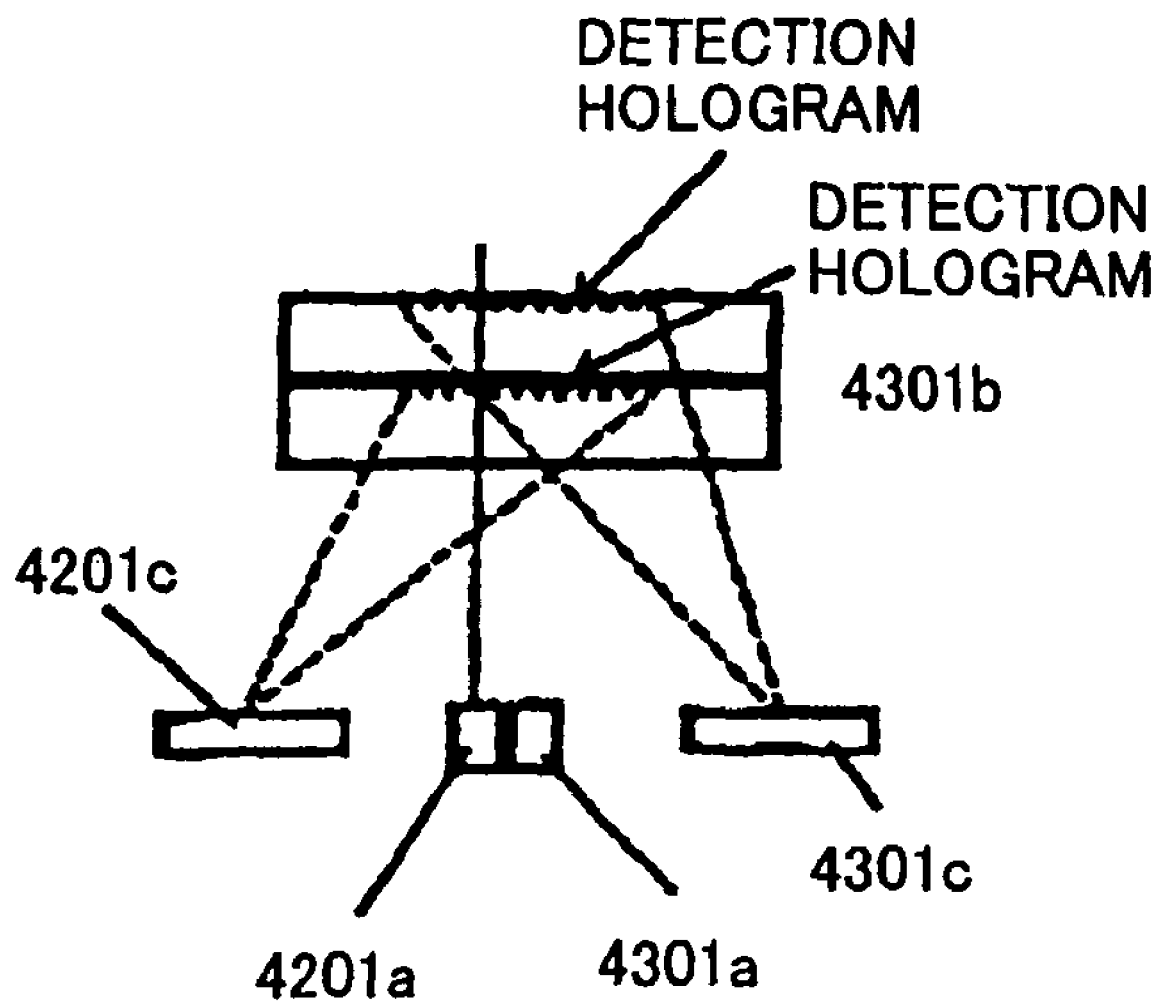

FIG. 119A shows an outline configuration of another optical pickup according to a first variant embodiment of the thirty-third embodiment of the present invention. This optical pickup is same as the above-described twenty-third embodiment in that information recording, reproduction or deletion can be performed on a blue-system (large storage capacity) optical recording medium with 0.6 mm in the light-incident side substrate thickness, with the operating wavelength of 400 nm and NA: 0.65; a DVD-system optical recording medium with 0.6 mm in the light-incident side substrate thickness, with the operating wavelength of 660 nm and NA: 0.65; and a CD-system optical recording medium with 1.2 mm in the light-incident side substrate thickness, with the operating wavelength of 780 nm and NA: 0.50. However, this variant embodiment is different from the thirty-third embodiment in that light sources (semiconductor lasers 4201*a* and 4301*a*) for DVD/CD, light-receiving devices 4201*c* and 4301*c* for DVD/CD, and a hologram unit 4501 acting as a light-path splitting device (hologram 4501*b*) are provided in a common single package. It is possible in such a configuration to realize a three-wavelength optical system in a reduced-sized optical pickup. As the above-mentioned hologram unit 4301*b*, as shown in FIG. 119B, a hologram unit having a layer with a hologram surface for CD and a layer with a hologram surface for DVD may be applied.

Moreover, a thirty-fifth embodiment of the present invention has the same configuration as that of the above-mentioned thirty-third embodiment except that a finite system is applied also for the CD-system light path. In the CD-system light path, an aberration of wavefront can be fully controlled by applying a finite system. For this reason, since the spherical aberration of the CD-system light path can be thus well controlled, it is not necessary that the liquid crystal device should have any effect on this light path. Accordingly, it becomes possible to omit the electrode pattern in the liquid crystal device for the CD-system light path.

In the liquid crystal device used the above-mentioned respective embodiments, the electrode pattern thereof is designed so that the optimal aberration control is achieved assuming that the main axis of the object lens is coincident with the optical axis of the entire optical system. Accordingly, when the object lens shifts in a radial direction (the radial direction of the disk-shaped optical recording medium) due to a tracking servo control operation with respect to the optical recording medium, a positional difference occurs between the aberration distributions for which correction operation should be made and the correction pattern formed on the liquid crystal device. Thereby, the function of aberration control may be degraded.

Figure 120A:
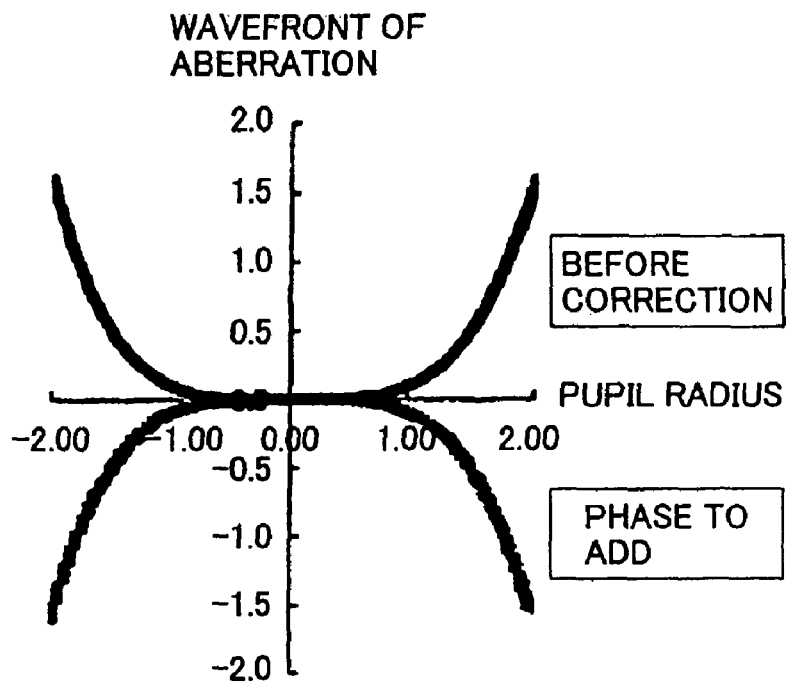
Figure 120B:
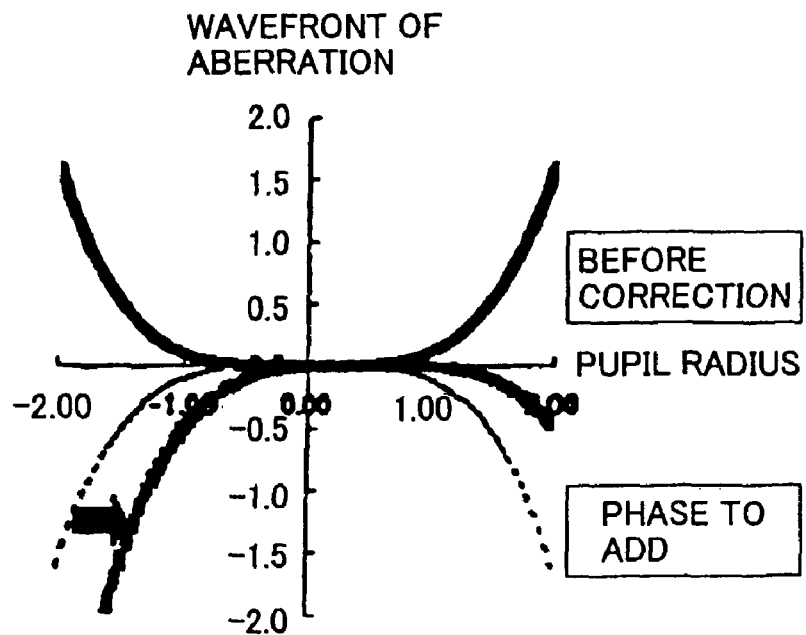

This problem will now be described briefly with reference to FIGS. 120A through 120C. When a wavefront of spherical aberration occurring at a time of compatible application of DVD or CD is as shown in the top of FIG. 120A, a phase difference as shown in the bottom of the same figure is provided by the liquid crystal device such that the spherical aberration can be cancelled out, as mentioned above. However, in case a positional difference occurs between the liquid crystal device and object lens as shown in FIG. 120B, a wavefront including aberration which cannot be cancelled out remains as shown in FIG. 120C.

In order to solve this problem of functional degradation of the aberration control based on such a shift of the object lens, the liquid crystal device is mounted on a movable part (actuator), and, thus, is driven together integrally with the object lens according to the thirty-sixth embodiment. However, if the liquid crystal device were incorporated into the actuator originally provided for the object lens, an increase in the weight, problems, i.e., an increase in the number of signal wires to be drawn with the actuator body or so arise. Accordingly, it is preferable that the liquid crystal device be provided outside of the actuator of the object lens.

Figure 120C:
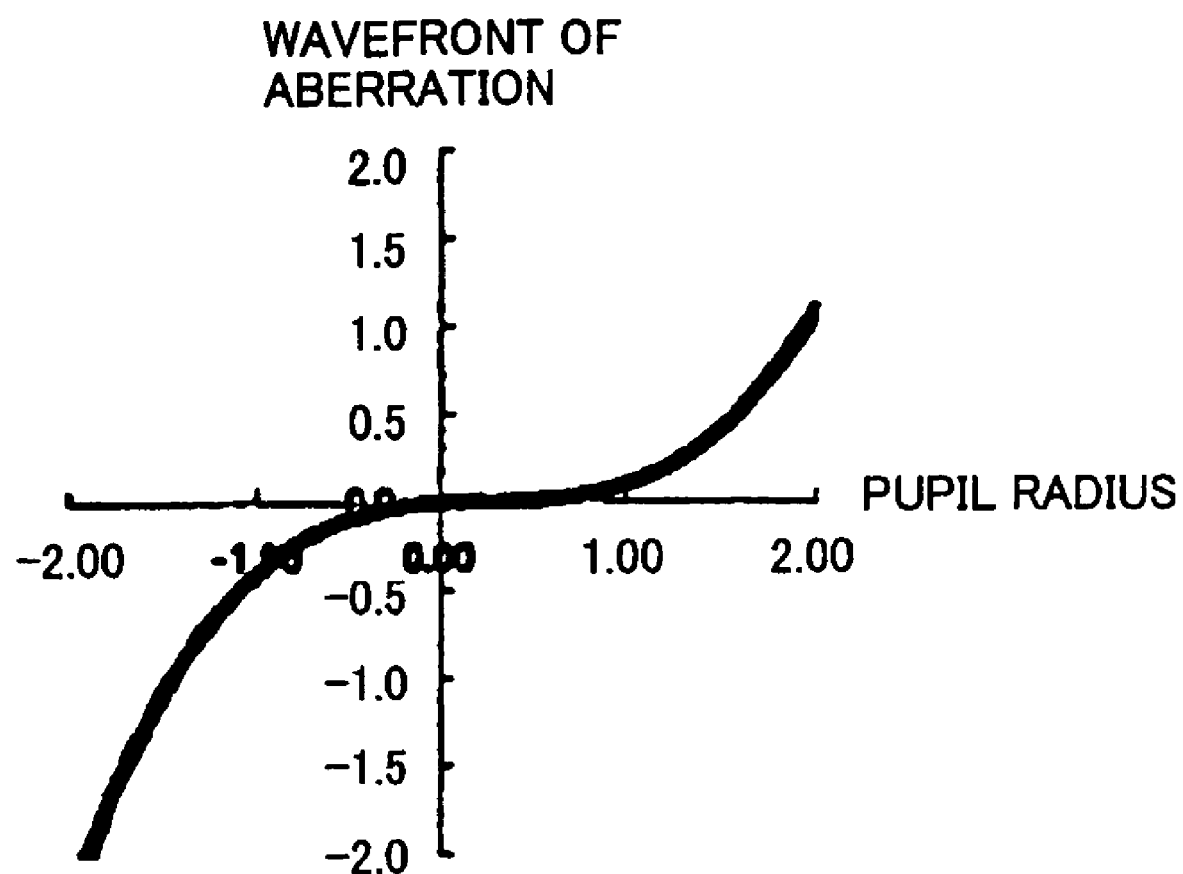

As can be seen from FIG. 120C, the remaining aberration has a shape of tertiary function anti-symmetric with respect to the optical axis. This shape is equivalent to a coma aberration disclosed by 'Laser & Optics Guide IV (2)', Hireaki Yamada, published by Melles Griot K K, June 1996, first edition, pages 22-7 through 8. According to the thirty-sixth embodiment, a remaining aberration such as that described above with reference to FIG. 120C occurring in a compatible application of CD or DVD can be removed by configuring the electrode pattern of the liquid crystal device so that the liquid crystal device act as a coma aberration correction device, as will be described later.

As mentioned above, a relative positional difference between the liquid crystal device which corrects the wavefront form symmetrically with respect to optical axis and the object lens creates a remaining coma aberration. According to the thirty-sixth embodiment, such a problematic coma aberration is detected by means of a coma aberration detection optical system including the detection lens 4110 and the light-receiving device 4112 (see FIG. 98).

Figure 121A:
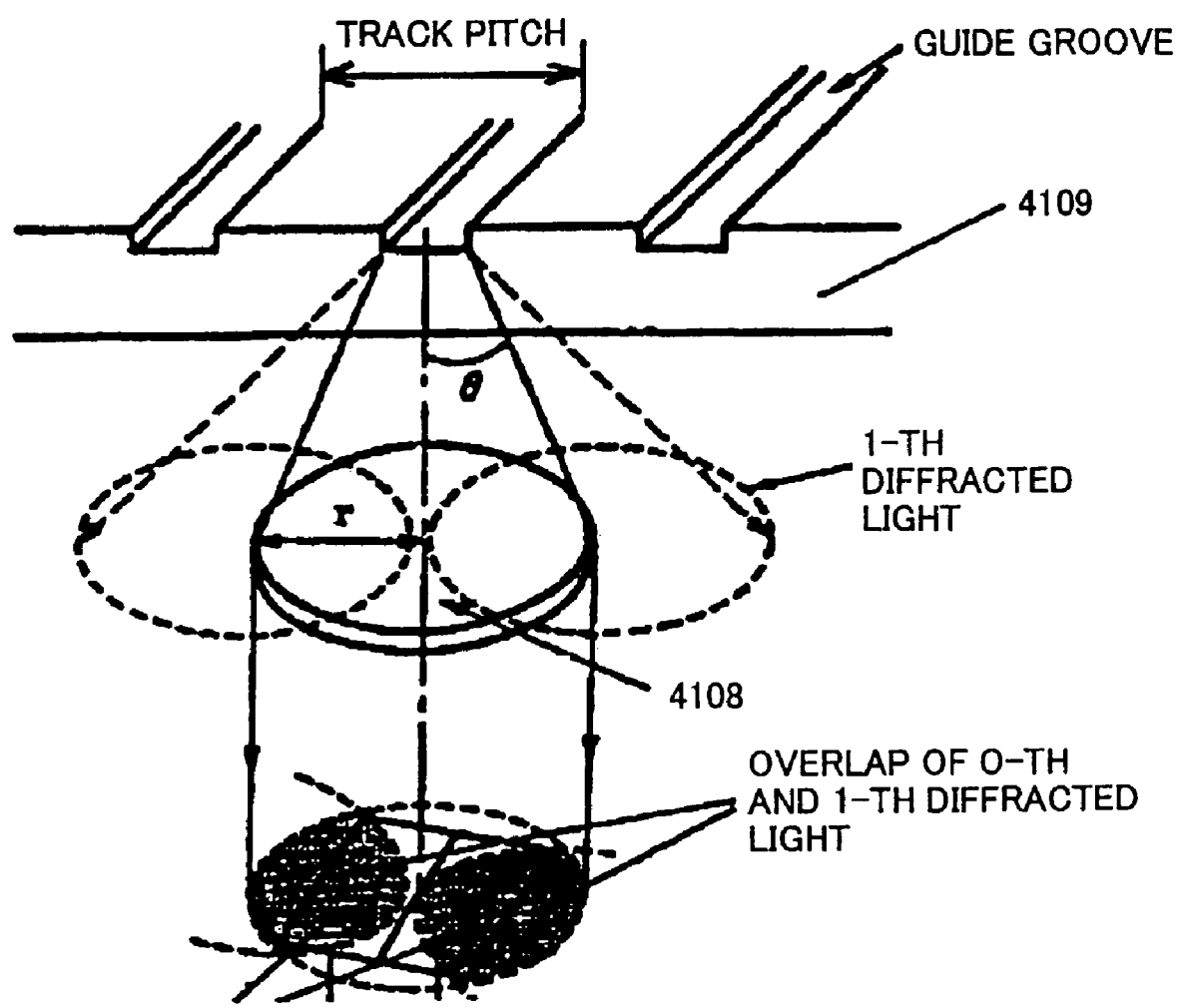
Figure 121B:
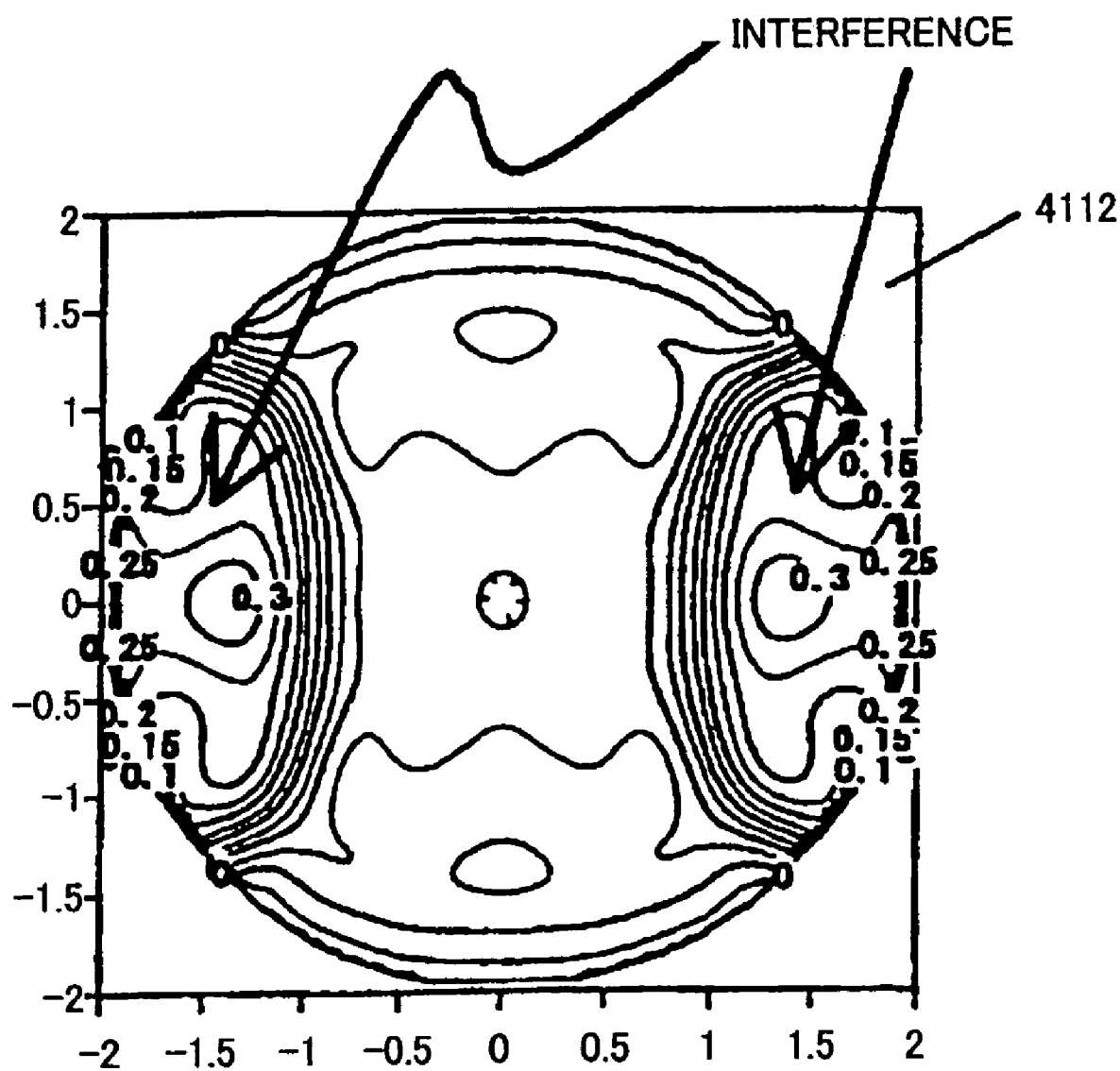

As shown in FIG. 121A, a guidance slot is formed in the optical recording medium 4109. The 0-th light which is a directly reflected light, and the ±1-th diffracted lights are contained in a light coming from the guidance slot, and such lights interfere each other. FIG. 121B shows a view of the 0-th light (straight forward light) and ±1-th diffracted lights on the light reception surface of the light-receiving device 4112. The 0th light and ±1-th diffracted lights have overlapped areas, which will now be referred to as interference zones, hereinafter.

Figure 122:
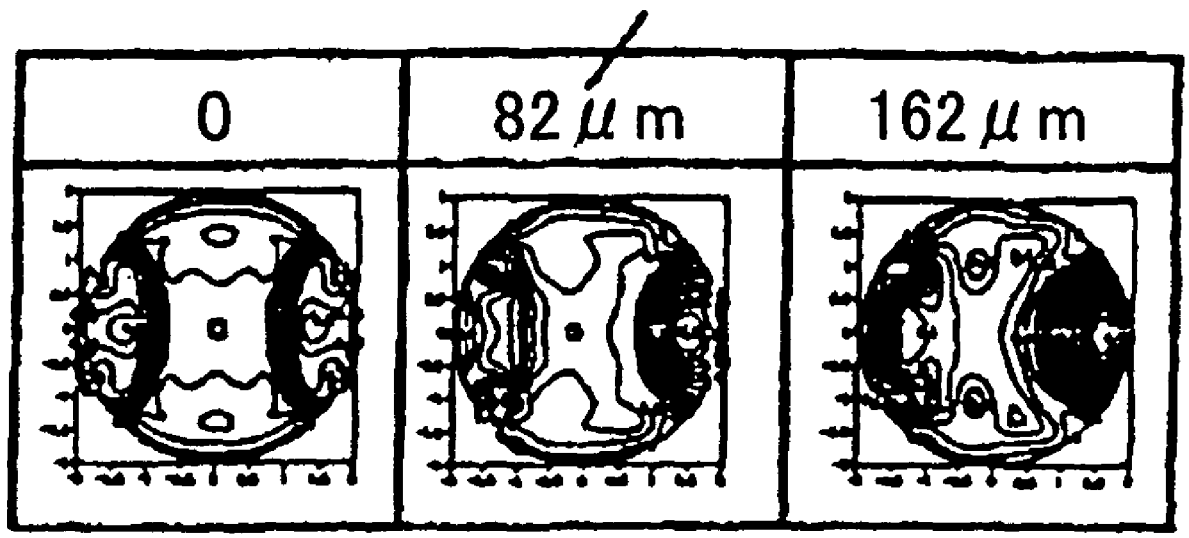

As to how the interference zones change according to a coma aberration, a description will now be made with reference to FIG. 122. FIG. 122 shows how the interference zones change as the object lens shifts with respect to the liquid crystal device which controls the spherical aberration as mentioned above. According to the shift of the object lens, as can be seen from FIG. 122, an unbalance arises in luminous energy between right and left positions. This is because a coma aberration occurs in a spot projected onto the optical recording medium 4109 due to a relative positional deference between the object lens 4108 and the liquid crystal device 4105. This unbalance occurs in a manner opposite between the interference zones on one side and on the other side. In the example shown in FIG. 122, the zone on the right-hand side becomes stronger while the left-hand side zone becomes weaker gradually, as the position difference becomes larger.

Figure 123:
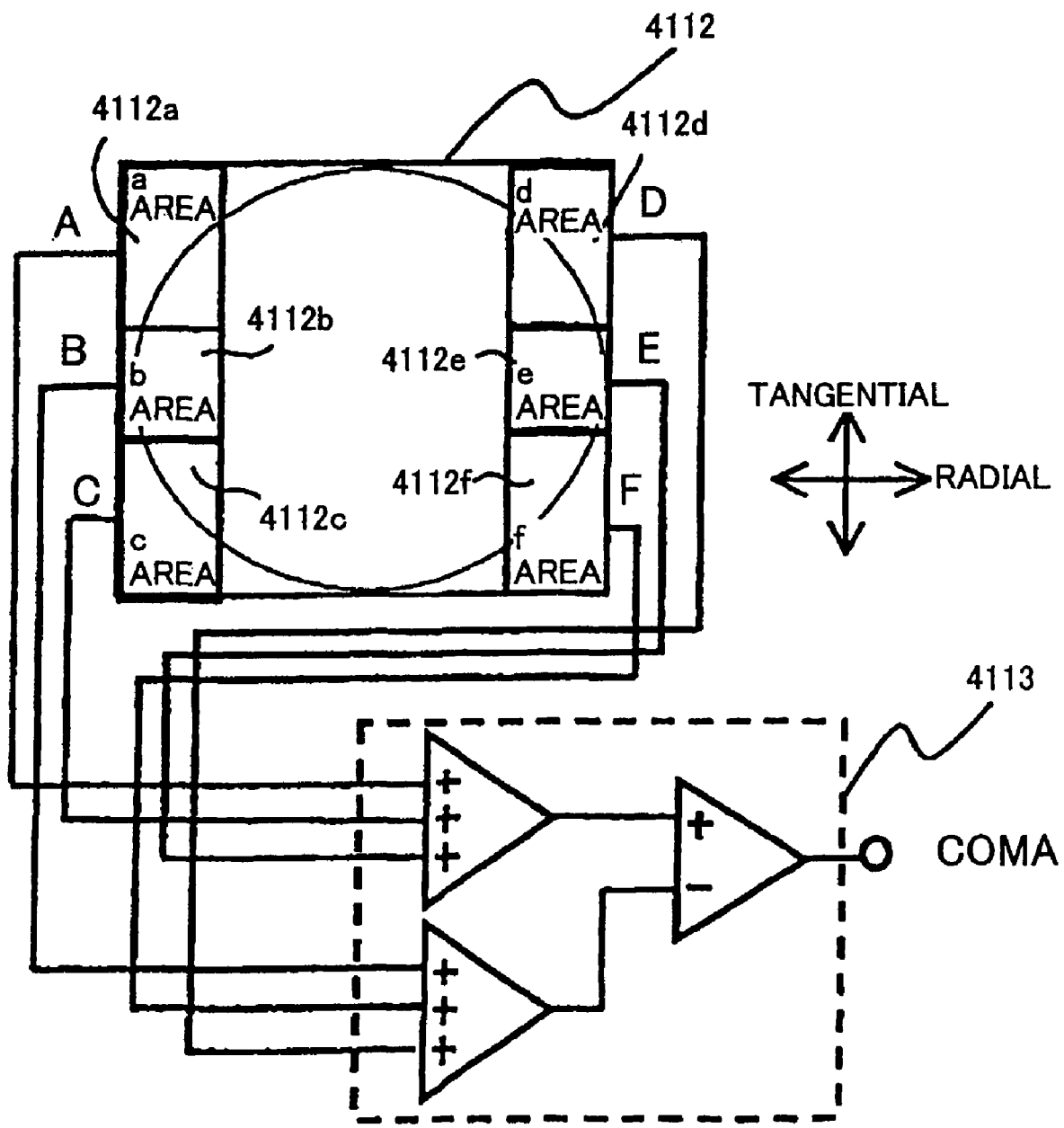
Figure 124:
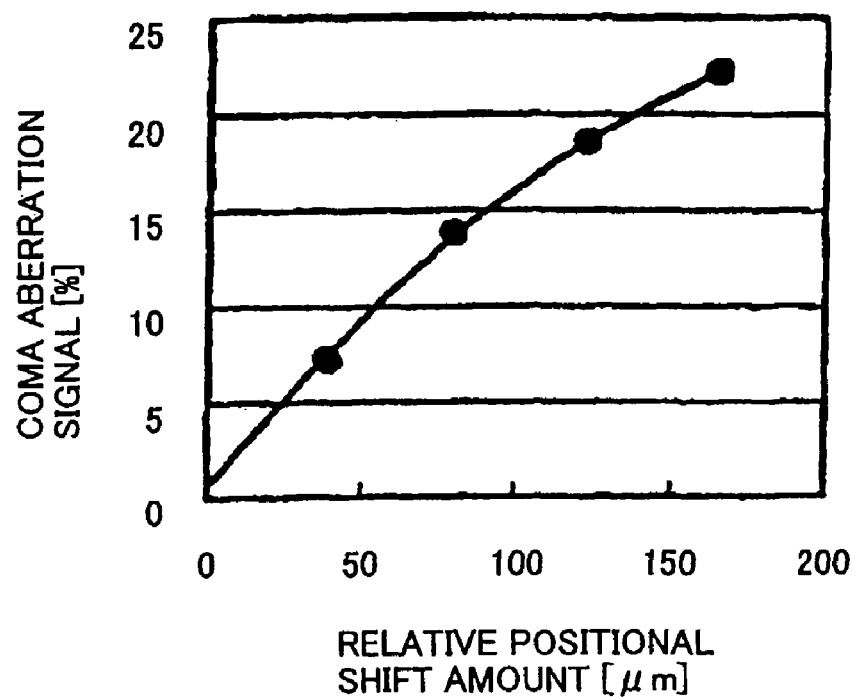

According to the thirty-sixth embodiment, as shown in FIG. 123, a light-receiving device 4112 having six-divided light-receiving areas 4112*a* through 4112*f*, and an operation device 4113 are provided and, therewith, the coma aberration is detected. Namely, the light-receiving surface of the light-receiving device 4112 is divided in the radial direction of the optical recording medium 4109, and then, thus-created each division is divided into three divisions in the rotation direction (the tangential direction) of the optical recording medium 4109. Three areas included in one side of the two divisions of the radius direction are those 4112a, 4112b and 4112c in the order of the rotation direction. Then, values indicated by luminous energy signals output from the areas 4112a, 4112b and 4112c are referred to as A, B, and C, respectively. Similarly, the other three areas included in the other side of the two divisions of the radius direction are those 4112d, 4112e and 4112f in the order of the rotation direction. Then, values indicated by luminous energy signals output from the areas 4112d, 4112e and 4112f are referred to as D, E and F, respectively. The operation device 4113 includes two summing devices and a subtraction device as shown.

The luminous energy signal output from each area of the light-receiving device 4112 is input into the operation device 4113, a predetermined operation is performed therewith, and a signal value, COMA is obtained, which operation result indicates a coma aberration in the radius direction of the optical recording medium, and is output from the operation device 4113. The above-mentioned predetermined operation is expressed by the following formula:

$$\text{COMA}=(A+C+E)-(B+D+F)$$

FIG. 27 shows the calculation result made by the operation device 4113 according to the above formula which indicates a change in the interference zones according to the relative positional deviation between the liquid crystal device 4105 and the object lens 4108. In the figure, the horizontal axis expresses the above-mentioned relative positional deviation while the vertical axis expresses the value of coma aberration signal normalized by the sum total of the values A through F output from the respective light-receiving areas 4112a through 4112f.

Other than a method of controlling the liquid crystal device 4105 according to the above-mentioned detection result of coma aberration, the following method may alternatively applied. That is, the amount of relative positional deviation between the object lens 4108 or object-lens actuator and the liquid crystal device 4105 is detected directly, and, according to the detection result, the liquid crystal device 4105 is controlled. In this case, the detection of the amount of positional deviation may be achieved by means of a well-known PSD (Position Sensor Device) provided in a fixed optical system of the optical pickup, and the distance between the object lens and the PSD is detected thereby. Then, the detected amount of positional deviation is converted into a coma aberration amount based on a predetermined data conversion table prepared beforehand. Then, according to the coma aberration amount, the liquid crystal device 4105 is appropriately controlled.

Figure 125:
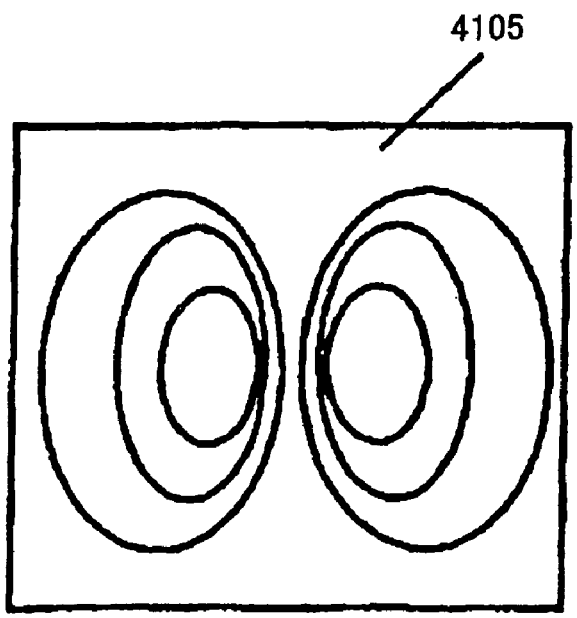

The coma aberration correction device realized in the above-mentioned liquid crystal device 4105 has a configuration of electrode pattern as shown in FIG. 125, for example, which is disposed to face the electrode patterns provided for phase correction with respect to CD/DVD compatible applications (see FIGS. 101A and 101B) described above, according to the twenty-sixth embodiment. As shown in FIG. 125, a transparent electrode is divided symmetrically in the horizontal direction in the figure, and a voltage can be applied independently between each electrode portion of each division, with respect to a common electrode.

Thereby, each corresponding division of liquid crystal device can be freely controlled to have the refractive index n through a range between n1 and n2 by controlling the above-mentioned voltage. By controlling the refractive index n, the phase difference $\Delta$nd $(2\pi/\lambda)$ can be given to the incident light which passes through each division or light-path difference $\Delta$nd can be given to the same, where $\Delta$n denotes the refractive-index difference, and 'd' denotes the cell thickness of the liquid crystal, where the wavelength is referred to as $\lambda$.

Figure 126:
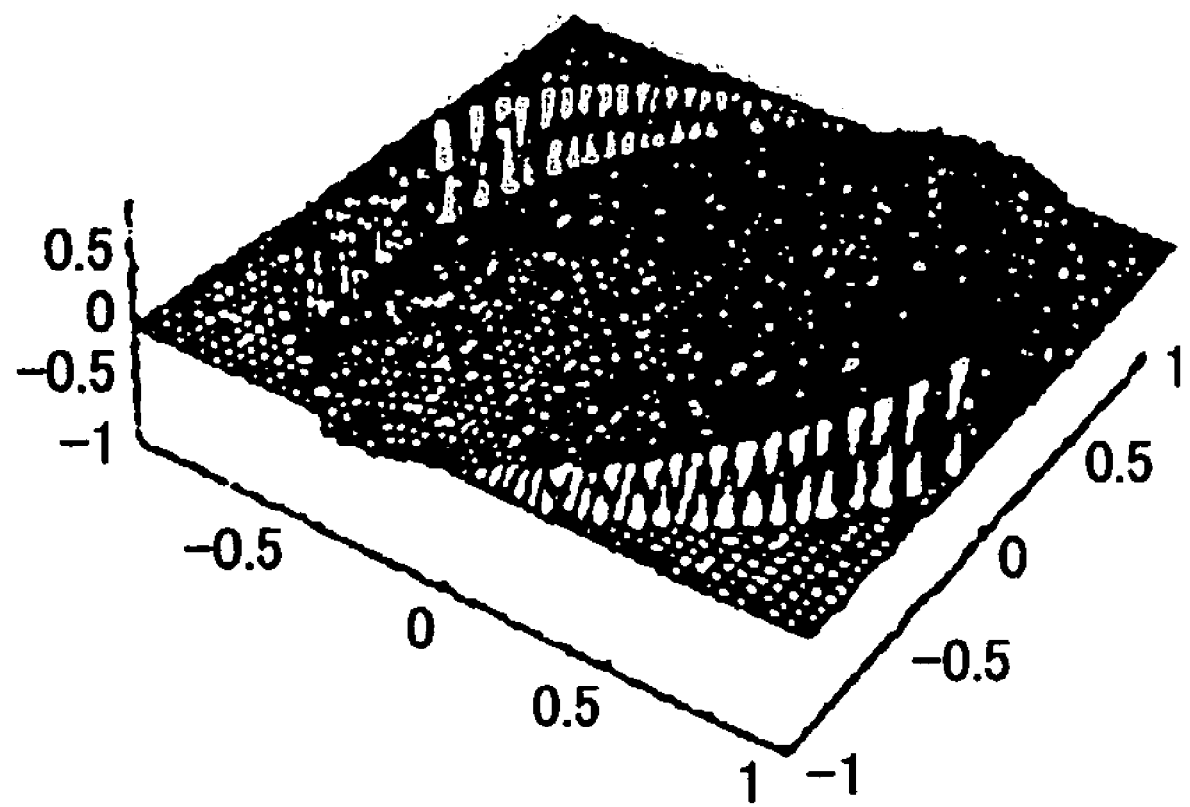
Figure 127A:
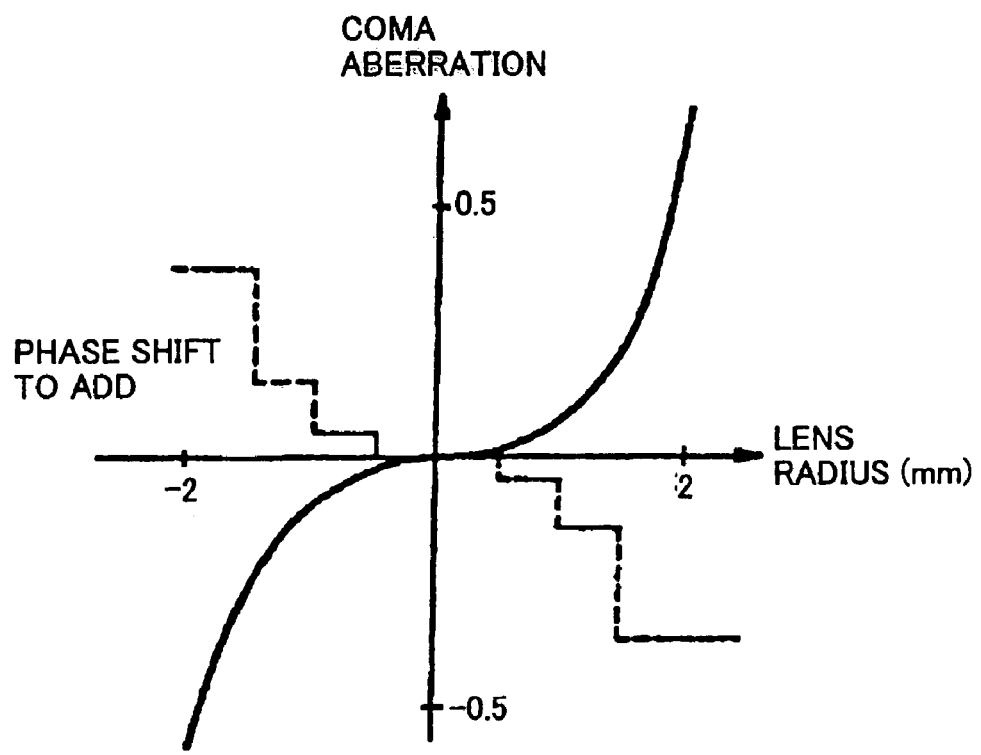
Figure 127B:
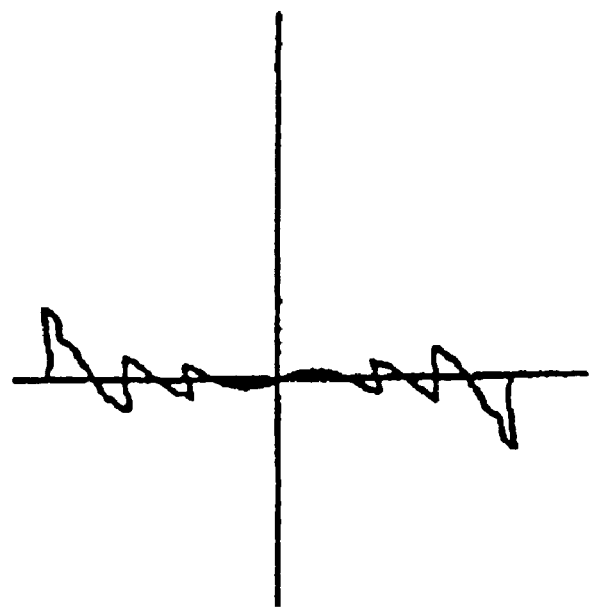

It is assumed that the coma aberration is that shown in FIG. 126. A solid curve shown in FIG. 127 shows the same aberration expressed as a 2-dimensional curve. When the voltage applied to each divisional electrode of the liquid crystal device shown in FIG. 125 is adjusted according to the detected coma aberration so that a phase difference as shown in a broken curve shown in FIG. 127A be given to a beam incident onto the object lens 4108 from the light source side, the above-mentioned coma aberration can be cancelled out by a delay of the wavefront in each part of the beam which passes through the liquid crystal device. FIG. 127B shows the sum of the solid curve (wavefront aberration) in FIG. 127A, and the broken curve (delay of the wavefront caused by the liquid crystal device), i.e., the coma aberration after the aberration correction. As can be seen clearly, the original coma aberration (solid curve shown in FIG. 127A) can be remarkably reduced.

Especially, such a coma aberration correction electrode surface may be formed on the electrode surface on the other side opposite to the electrode pattern for the above-mentioned spherical aberration correction purpose provided on one side in the liquid crystal device 4105 as shown in FIG. 113 or 115.

With reference to FIG. 21, an outline configuration of an information recording/reproduction device also according to a thirty-seventh embodiment of the present invention will now be described.

The information recording/reproduction device 10 in this embodiment performs information recording, reproduction, or deletion applying an optical pickup 11 onto an optical recording medium 20. According to the thirty-seventh embodiment, the optical recording medium 20 is a disk-like one, and is held by a cartridge 21 of a protection case. The optical recording medium 20 is inserted and thus loaded in a direction of an arrow "disk insertion" with the cartridge 21 via an insertion mouth 12 in the information recording/reproduction device 10. Then, the optical recording medium loaded is rotated and driven by a spindle motor 13, and thus, informational recording, reproduction, or deletion is performed thereon by the optical pickup 11. As this optical pickup 11, the optical pickup according to any one of the above-described thirty-third through thirty-sixth embodiments may be applied.

Furthermore, this thirty-seventh embodiment may be an optical information recording/reproduction device which performs multi-level recording with an information recording density multiplication factor of P1>1.8 on an optical recording medium suitable to the operating wavelength of $\lambda$: 400 nm, and NA: 0.65. Thereby, a recording capacity of 22 GB or more can be attained without applying a numerical aperture as high as NA: 0.85. That is, generally, the storage capacity to an optical recording medium is determined by the diameter of beam spot applied. In case the blue-system optical recording medium of a blue wavelength zone is used, compared with a DVD-system optical recording medium (4.7 GB), the capacity can be raised by the spot diameter ratio (wavelength/NA)$^2$, and thus, 12 GB is achievable. Then, 22 GB is achievable by further applying multi-level recording in the above-mentioned conditions. Consequently, the margin against a possible shift/variation can be increased. Since the depth of focus of an object lens should be managed seriously in proportion to the 2nd power of NA, application of the lens of NA: 0.65 can increase the margin by 1.7 times, compared with the object lens of NA: 0.85.

In addition, in the description made above for each of the embodiments of the present invention, only the main wavelength, i.e., 400 nm, 660 nm or 780 nm, is described. However, actually, the present invention may be applied to the following ranges as standards:

Blue wavelength zone: wavelength of 397 nm through 417 nm;

Red wavelength zone: wavelength of 650 nm through 670 nm; and

Infrared wavelength zone: wavelength of 770 nm through 790 nm.

Similarly, as to numerical aperture, although a description has been made as it being NA: 0.65 or 0.50, the present invention may be applied to the following range Blue-system optical recording medium: NA: 0.60 through 0.70;

DVD-system optical recording medium: NA: 0.60 through 0.65; and

CD-system optical recording medium: NA: 0.45 through 0.50.

Thus, according to the thirty-third through thirty-sixth embodiments of the present invention, a spherical aberration otherwise occurring when information recording/reproduction is performed on a DVD-system or CD-system optical recording medium with an object lens designed suitable for a blue-system recording medium, or a spherical aberration otherwise occurring due to substrate thickness variation in a blue-system optical recording medium or due to a inter-layer distance in a multi-layer blue-system optical recording medium can be well controlled by means of a single liquid crystal device. Accordingly, it becomes possible in an optical pickup according to the present invention to form a satisfactory beam spot on any of a large-capacity blue-system optical recording medium, and a conventional DVD-system or CD-system optical recording medium. Thereby, it is possible to provide an optical pickup in which, without substantially increasing the number of parts/components, information recording/reproduction can be made with high S/N.

Further, the present invention is not limited to the above-described embodiments, and variations and modifications may be made without departing from the scope of the present invention.

The present application is based on Japanese priority applications. Nos. 2002-051722, 2002-140998, 2002-193248, 2002-212224, 2002-226011, 2002-226023, 2002-366552, 2003-003506 and 2003-003525, filed on Feb. 27, 2002, May 16, 2002, Jul. 2, 2002, Jul. 22, 2002, Aug. 2, 2002, Aug. 2, 2002, Dec. 18, 2002, Jan. 9, 2003 and Jan. 9, 2003, respectively, the entire contents of which are hereby incorporated by reference.

What is claimed is:

1. An optical pickup which performs at least one of recording, reproduction and deletion of information onto an optical recording medium, comprising:

three light sources which are configured to emit lights of three wavelengths of $\lambda 1$, $\lambda 2$ and $\lambda 3$, respectively, where $\lambda 1 < \lambda 2 < \lambda 3$;

an object lens which is configured to condense a light coming from each of the three light sources onto the optical recording medium;

an aperture switching device which is configured to switch a numerical aperture applied among NA1, NA2 and NA3, where $NA1 \geq NA2 \geq NA3$;

a phase correction device which is configured to change a phase distribution of a beam which passes therethrough;

a wavelength plate, configured to transform light of the wavelength $\lambda 1$ from a linear polarization into a circular polarization, or from a circular polarization into a linear polarization, and transform lights of the wavelengths $\lambda 2$ and $\lambda 3$ from a linear polarization into an ellipse polarization; and at least one of a polarization separation optical system for the wavelength $\lambda 1$, a polarization separation optical system for the wavelength $\lambda 2$, and a polarization separation optical system for the wavelength $\lambda 3$, wherein:

said phase correction device is configured to change the phase of an incident beam only within an area in a range approximately between NA2 and NA3, and is configured to provide a phase shift of an integer multiple of $2\pi$ to a light of the wavelength of $\lambda 1$; and said aperture switching device switches a beam diameter according to a wavelength zone using an optical characteristic of any one of reflection, diffraction, and absorption.

2. The optical pickup as claimed in claim 1, wherein said phase correction device has a phase pattern having a concentric shape on a surface perpendicular to an optical axis, and having a rectangular shape in two steps on a section taken along the optical axis.

3. The optical pickup as claimed in claim 1, wherein said phase correction device has a phase pattern having a concentric shape on a surface perpendicular to an optical axis, and having a shape of not less than three stair steps on a section taken along the optical axis.

4. The optical pickup as claimed in claim 1, wherein said object lens is configured to be used in a condition of beam incidence with a finite system at least when one of the respective light sources of the three wavelengths is applied.

5. The optical pickup as claimed in claim 4, wherein said object lens is configured to be used in a condition of a beam incidence with a finite system when each of the respective light sources of the wavelengths of $\lambda 2$ and $\lambda 3$ from among the three wavelengths of $\lambda 1$, $\lambda 2$ and $\lambda 2$ is applied, where $\lambda 1 \leq \lambda 2 \leq \lambda 3$.

6. The optical pickup as claimed in claim 1, wherein said aperture switching device is configured to switch the numerical aperture according to the wavelength of a light emitted from the light source applied and is integrally formed with the phase correction device.

7. The optical pickup as claimed in claim 1, further comprising a polarization device which is configured to change the polarization state according to the wavelength of a light emitted from the light source applied, wherein said polarization device is integrally formed with the phase correction device.

8. The optical pickup as claimed in claim 1, wherein said phase correction device has a flange portion.

9. The optical pickup as claimed in claim 8, wherein said flange portion supports the object lens.

10. The optical pickup as claimed in claim 1, wherein said phase correction device is configured to move integrally with the object lens.

11. An information processing apparatus which employs the optical pickup claimed in claim 1, and is configured to perform at least one recording, reproduction and deletion of information onto the optical recording medium.

* * * * *